(12) United States Patent
Pogorelik et al.

(10) Patent No.: US 12,346,432 B2
(45) Date of Patent: Jul. 1, 2025

(54) SECURING SYSTEMS EMPLOYING ARTIFICIAL INTELLIGENCE

(71) Applicant: INTEL CORPORATION, Santa Clara, CA (US)

(72) Inventors: Oleg Pogorelik, Lapid (IL); Alex Nayshtut, Gan Yavne (IL); Omer Ben-Shalom, Rishon le-Tzion (IL); Denis Klimov, Beersheba (IL); Raizy Kellermann, Jerusalem (IL); Guy Barnhart-Magen, Herzliya (IL); Vadim Sukhomlinov, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 338 days.

(21) Appl. No.: 17/254,235

(22) PCT Filed: Apr. 23, 2019

(86) PCT No.: PCT/US2019/028687
§ 371 (c)(1),
(2) Date: Dec. 18, 2020

(87) PCT Pub. No.: WO2020/142110
PCT Pub. Date: Jul. 9, 2020

(65) Prior Publication Data
US 2021/0319098 A1    Oct. 14, 2021

Related U.S. Application Data

(60) Provisional application No. 62/786,941, filed on Dec. 31, 2018.

(51) Int. Cl.
G06F 21/55      (2013.01)
G06N 3/04       (2023.01)
(Continued)

(52) U.S. Cl.
CPC .............. *G06F 21/554* (2013.01); *G06N 3/04* (2013.01); *G06N 3/045* (2023.01); *G06N 3/084* (2013.01);
(Continued)

(58) Field of Classification Search
None
See application file for complete search history.

(56) References Cited

U.S. PATENT DOCUMENTS 4,849,905 A * 7/1989 Loeb ...................... G06N 5/047
                                                    706/904
4,890,240 A * 12/1989 Loeb ...................... G06N 5/047
                                                    706/48
(Continued)

FOREIGN PATENT DOCUMENTS

CN    108347430 A    7/2018
JP    2018173843 A   11/2018
(Continued)

OTHER PUBLICATIONS

Juuti "PRADA: Protecting Against DNN Model Stealing Attacks," May 7, 2018, pp. 1-16 (Year: 2018).*

(Continued)

*Primary Examiner* — Luu T Pham
*Assistant Examiner* — James J Wilcox
(74) *Attorney, Agent, or Firm* — KDW FIRM PLLC

(57) ABSTRACT

Techniques and apparatuses to harden AI systems against various attacks are provided. Among the different techniques and apparatuses, is provided, techniques and apparatuses that expand the domain for an inference model to include both visible classes and well as hidden classes. The hidden classes can be used to detect possible probing attacks against the model.

17 Claims, 70 Drawing Sheets

(51) Int. Cl.
*G06N 3/045* (2023.01)
*G06N 3/084* (2023.01)
*G06N 3/094* (2023.01)
*G06N 5/04* (2023.01)
*G06N 20/00* (2019.01)
*G06N 7/01* (2023.01)

(52) U.S. Cl.
CPC .............. *G06N 3/094* (2023.01); *G06N 5/04* (2013.01); *G06N 20/00* (2019.01); *G06F 2221/034* (2013.01); *G06N 7/01* (2023.01)

(56) References Cited

U.S. PATENT DOCUMENTS

| | | | | |
|---|---|---|---|---|
| 5,166,046 A * | 11/1992 | Okusa | G03C 1/29 | 430/572 |
| 5,188,925 A * | 2/1993 | Hagiwara | G03C 7/3046 | 430/428 |
| 5,202,229 A * | 4/1993 | Kuse | G03C 7/413 | 430/387 |
| 5,238,797 A * | 8/1993 | Hirabayashi | G03C 7/3335 | 430/522 |
| 5,248,586 A * | 9/1993 | Nagaoka | G03C 7/39252 | 430/607 |
| 5,252,446 A * | 10/1993 | Hirabayashi | G03C 7/3012 | 430/505 |
| 5,258,269 A * | 11/1993 | Yagi | G03C 3/00 | 430/501 |
| 5,270,156 A * | 12/1993 | Hirabayashi | G03C 7/3225 | 430/957 |
| 5,275,926 A * | 1/1994 | Hirabayashi | G03C 7/3012 | 430/505 |
| 5,358,842 A * | 10/1994 | Kasai | G03C 1/035 | 430/569 |
| 5,362,618 A * | 11/1994 | Ishikawa | G03C 1/015 | 430/569 |
| 5,382,500 A * | 1/1995 | Sugita | G03C 7/301 | 430/505 |
| 5,398,304 A * | 3/1995 | Bauman | G06N 5/043 | 706/45 |
| 5,402,524 A * | 3/1995 | Bauman | G06N 5/043 | 706/45 |
| 5,402,526 A * | 3/1995 | Bauman | G06N 5/043 | 706/45 |
| 5,412,756 A * | 5/1995 | Bauman | G06N 5/043 | 706/45 |
| 5,419,806 A * | 5/1995 | Huebner | H01L 23/48 | 257/E21.705 |
| 5,473,732 A * | 12/1995 | Chang | G06N 5/046 | 706/50 |
| 5,478,720 A * | 12/1995 | Heki | G03C 1/24 | 430/572 |
| H1594 H * | 9/1996 | Sekiya | | 430/506 |
| 5,599,767 A * | 2/1997 | Lew | A01N 25/28 | 504/342 |
| 5,629,142 A * | 5/1997 | Maskasky | G03C 1/0051 | 430/641 |
| 5,841,949 A * | 11/1998 | Nakaya | G06N 5/048 | 706/59 |
| 6,074,493 A * | 6/2000 | Nakagawa | C23C 8/22 | 148/216 |
| 6,150,080 A * | 11/2000 | Ando | G03C 1/0051 | 430/567 |
| 6,200,738 B1 * | 3/2001 | Takano | G03C 5/08 | 430/404 |
| 6,418,432 B1 * | 7/2002 | Cohen | G06F 16/9538 | 707/999.005 |
| 6,446,056 B1 * | 9/2002 | Sadakuni | G06N 20/00 | 345/157 |
| 6,587,853 B1 * | 7/2003 | LaRue | G06N 5/04 | 707/999.009 |
| 6,738,753 B1 * | 5/2004 | Hogan | G06N 5/043 | 706/12 |
| 6,996,843 B1 * | 2/2006 | Moran | H04L 63/1408 | 706/45 |
| 7,136,710 B1 * | 11/2006 | Hoffberg | G16H 40/67 | 700/83 |
| 7,233,936 B1 * | 6/2007 | Muller | G06N 5/045 | 706/2 |
| 7,236,963 B1 * | 6/2007 | LaMuth | G06N 5/04 | 706/45 |
| 7,287,014 B2 * | 10/2007 | Chen | G06N 3/043 | 706/16 |
| 7,624,274 B1 * | 11/2009 | Alspector | H04L 51/212 | 713/180 |
| 8,280,831 B1 * | 10/2012 | Rubin | G06N 5/04 | 706/12 |
| 8,447,419 B1 * | 5/2013 | de Anda Fast | G06N 3/126 | 700/83 |
| 8,478,698 B1 * | 7/2013 | Mah | G16H 50/20 | 706/12 |
| 8,909,950 B1 * | 12/2014 | Levchuk | G06N 20/00 | 455/418 |
| 9,177,259 B1 * | 11/2015 | Levchuk | G06N 20/00 | |
| 9,280,745 B1 * | 3/2016 | Clark | G06N 5/04 | |
| 9,342,796 B1 * | 5/2016 | McClintock | G06N 5/02 | |
| 9,443,192 B1 * | 9/2016 | Cosic | G06N 5/048 | |
| 9,495,541 B2 * | 11/2016 | Polychronakis | G06F 21/54 | |
| 9,516,053 B1 * | 12/2016 | Muddu | G06F 16/9024 | |
| RE46,310 E * | 2/2017 | Hoffberg | H04N 21/252 | |
| 9,652,510 B1 * | 5/2017 | Huang | G06F 16/24578 | |
| 9,679,256 B2 * | 6/2017 | Briscoe | G06N 20/00 | |
| 9,710,753 B1 * | 7/2017 | Shams | H04L 12/2827 | |
| 9,754,221 B1 * | 9/2017 | Nagaraja | G06N 3/045 | |
| 9,817,957 B1 * | 11/2017 | Molina-Markham | G06F 21/602 | |
| 9,818,061 B1 * | 11/2017 | Shams | G06F 3/167 | |
| 9,892,133 B1 * | 2/2018 | Biessmann | G06F 16/5846 | |
| 9,919,648 B1 * | 3/2018 | Pedersen | G10L 25/78 | |
| 9,922,285 B1 * | 3/2018 | Glode | G06N 3/08 | |
| 9,946,789 B1 * | 4/2018 | Li | G06F 16/93 | |
| 9,946,876 B2 * | 4/2018 | Wojnowicz | G06F 21/562 | |
| 9,959,412 B2 * | 5/2018 | Strauss | G06F 16/24578 | |
| 9,961,204 B1 * | 5/2018 | Moran | G06Q 10/06393 | |
| 9,971,973 B1 * | 5/2018 | Smith | G06N 20/00 | |
| 9,985,984 B1 * | 5/2018 | Chavez | G06N 20/20 | |
| 10,007,755 B2 * | 6/2018 | Sanchez | G16H 70/60 | |
| 10,019,520 B1 * | 7/2018 | Muske | G06F 16/951 | |
| 10,042,636 B1 * | 8/2018 | Srivastava | G06N 20/00 | |
| 10,043,040 B1 * | 8/2018 | Kenthapadi | G06F 21/64 | |
| 10,078,743 B1 * | 9/2018 | Baldi | G06F 21/316 | |
| 10,095,747 B1 * | 10/2018 | Rajpara | G06F 16/24575 | |
| 10,140,553 B1 * | 11/2018 | Vasisht | G06V 20/20 | |
| 10,152,349 B1 * | 12/2018 | Anand | G06N 20/00 | |
| 10,152,970 B1 * | 12/2018 | Olabiyi | G06N 3/044 | |
| 10,154,379 B2 * | 12/2018 | Mei | H04L 67/535 | |
| 10,157,352 B1 * | 12/2018 | Chan | G06N 5/047 | |
| 10,158,645 B1 * | 12/2018 | Kenthapadi | G06N 20/00 | |
| 10,209,974 B1 * | 2/2019 | Patton | G06F 8/60 | |
| 10,210,861 B1 * | 2/2019 | Arel | G06N 20/00 | |
| 10,225,277 B1 * | 3/2019 | Shintre | G06F 21/6254 | |
| 10,242,230 B1 * | 3/2019 | Kenthapadi | G06F 21/6254 | |
| 10,242,665 B1 * | 3/2019 | Abeloe | B60W 30/0956 | |
| 10,282,553 B1 * | 5/2019 | Schroeder | G06N 20/00 | |
| 10,282,720 B1 * | 5/2019 | Buibas | G06Q 20/40 | |
| 10,306,059 B1 * | 5/2019 | Bondareva | H04L 51/214 | |
| 10,320,813 B1 * | 6/2019 | Ahmed | H04L 63/1416 | |
| 10,341,430 B1 * | 7/2019 | Badawy | H04L 63/08 | |
| 10,354,122 B1 * | 7/2019 | He | G06F 18/241 | |
| 10,372,978 B1 * | 8/2019 | Smith | G06V 20/30 | |
| 10,373,322 B1 * | 8/2019 | Buibas | G06T 7/246 | |
| 10,380,613 B1 * | 8/2019 | Liu | G06Q 30/0202 | |
| 10,381,006 B1 * | 8/2019 | Eriksson | G10L 15/22 | |
| 10,388,272 B1 * | 8/2019 | Thomson | G10L 15/22 | |
| 10,410,125 B1 * | 9/2019 | Finkelstein | G06N 7/01 | |
| 10,410,273 B1 * | 9/2019 | Finkelstein | G06N 7/01 | |
| 10,417,350 B1 * | 9/2019 | Mohamed | G06N 20/00 | |
| 10,432,653 B2 * | 10/2019 | Sim | H04L 63/1441 | |
| 10,438,264 B1 * | 10/2019 | Viswanathan | G06N 5/04 | |

(56) References Cited

U.S. PATENT DOCUMENTS

| | | | | |
|---|---|---|---|---|
| 10,440,187 B1* | 10/2019 | Mandel | | H04M 3/5233 |
| 10,446,271 B2* | 10/2019 | Sanchez | | G16Z 99/00 |
| 10,462,170 B1* | 10/2019 | Wang | | H04L 63/1416 |
| 10,467,527 B1* | 11/2019 | Margaglia | | G06F 16/30 |
| 10,482,554 B1* | 11/2019 | Vukich | | G06N 3/063 |
| 10,497,012 B1* | 12/2019 | Majumder | | G06N 7/01 |
| 10,521,718 B1* | 12/2019 | Szegedy | | G06N 3/084 |
| 10,530,671 B2* | 1/2020 | Sanders | | H04L 69/22 |
| 10,565,499 B2* | 2/2020 | Bourdev | | G06V 30/19147 |
| 10,572,606 B1* | 2/2020 | Paley | | G06N 5/043 |
| 10,573,296 B1* | 2/2020 | Arel | | G06N 3/045 |
| RE47,908 E* | 3/2020 | Hoffberg | | H04N 21/4532 |
| 10,576,380 B1* | 3/2020 | Beltran | | A63F 13/65 |
| 10,594,757 B1* | 3/2020 | Shevchenko | | G10L 15/22 |
| 10,600,004 B1* | 3/2020 | Misko | | G06N 3/084 |
| 10,601,862 B1* | 3/2020 | Kurupati | | G06N 20/00 |
| 10,614,361 B2* | 4/2020 | Chung | | G06N 3/084 |
| 10,616,343 B1* | 4/2020 | Alameh | | H04L 67/12 |
| 10,628,546 B1* | 4/2020 | Colwell | | G06F 30/27 |
| 10,635,903 B1* | 4/2020 | Harvey | | G06T 7/0002 |
| 10,650,928 B1* | 5/2020 | Larson | | G16H 40/67 |
| 10,657,259 B2* | 5/2020 | Lee | | G06N 5/041 |
| RE48,056 E* | 6/2020 | Hoffberg | | H04N 21/44008 |
| 10,671,735 B2* | 6/2020 | Gupta | | G06N 3/02 |
| 10,672,109 B2* | 6/2020 | Vogels | | G06T 5/60 |
| 10,673,880 B1* | 6/2020 | Pratt | | H04L 63/1425 |
| 10,679,015 B1* | 6/2020 | Szarvas | | G06N 7/00 |
| 10,694,526 B2* | 6/2020 | Nguyen | | H04W 72/541 |
| 10,699,051 B1* | 6/2020 | Zhang | | G06F 30/392 |
| 10,699,079 B1* | 6/2020 | Paley | | G06F 40/30 |
| 10,700,866 B2* | 6/2020 | Antonatos | | G06N 20/00 |
| 10,706,144 B1* | 7/2020 | Moritz | | G06F 21/55 |
| 10,706,360 B2* | 7/2020 | Sanchez | | G16H 50/70 |
| 10,706,450 B1* | 7/2020 | Tavernier | | G06F 16/9535 |
| 10,719,301 B1* | 7/2020 | Dasgupta | | G06F 8/34 |
| 10,721,195 B2* | 7/2020 | Jakobsson | | H04L 51/48 |
| 10,729,351 B1* | 8/2020 | Chen | | A61B 5/364 |
| 10,747,962 B1* | 8/2020 | Fuerstenau | | G06N 3/08 |
| 10,755,171 B1* | 8/2020 | Sharifi | | G06N 3/08 |
| 10,764,313 B1* | 9/2020 | Mushtaq | | G06N 20/00 |
| 10,771,489 B1* | 9/2020 | Bisht | | G06N 20/00 |
| 10,776,626 B1* | 9/2020 | Lin | | G06V 10/82 |
| 10,776,712 B2* | 9/2020 | Oono | | G06N 3/082 |
| 10,789,367 B2* | 9/2020 | Joseph Durairaj | | G06N 3/043 |
| 10,789,523 B1* | 9/2020 | Kopf | | G06N 3/088 |
| 10,810,472 B2* | 10/2020 | Malak | | G06F 40/30 |
| 10,811,139 B1* | 10/2020 | Wang | | G06N 20/20 |
| 10,816,978 B1* | 10/2020 | Schwalb | | G08G 1/012 |
| 10,817,604 B1* | 10/2020 | Kimball | | G06F 21/563 |
| 10,817,740 B2* | 10/2020 | Tariq | | G06V 20/56 |
| 10,826,934 B2* | 11/2020 | Krasser | | H04L 63/1416 |
| 10,832,095 B2* | 11/2020 | Panciatici | | G06V 20/00 |
| 10,853,583 B1* | 12/2020 | Platt | | G06F 40/56 |
| 10,853,661 B2* | 12/2020 | Xu | | G06F 40/237 |
| 10,872,087 B2* | 12/2020 | Guo | | G06N 7/01 |
| 10,896,534 B1* | 1/2021 | Smith | | H04L 51/10 |
| 10,909,604 B1* | 2/2021 | Zappella | | G06N 20/00 |
| 10,922,616 B1* | 2/2021 | Liu | | G06Q 30/0601 |
| 10,936,704 B2* | 3/2021 | Mehta | | G06F 21/316 |
| 10,936,922 B2* | 3/2021 | Tariq | | G06F 18/2413 |
| 10,943,069 B1* | 3/2021 | Paley | | G10L 17/18 |
| 10,963,649 B1* | 3/2021 | Sippel | | G06N 20/00 |
| 10,963,812 B1* | 3/2021 | Varadarajan | | G06N 7/01 |
| 10,970,188 B1* | 4/2021 | Åvist | | H04L 63/1441 |
| 10,970,647 B1* | 4/2021 | Cevahir | | H04L 51/52 |
| 10,977,711 B1* | 4/2021 | Verma | | G06F 18/231 |
| 10,981,564 B2* | 4/2021 | Herman | | B60W 30/0956 |
| 10,990,899 B2* | 4/2021 | Le | | H04L 67/306 |
| 11,004,135 B1* | 5/2021 | Sandler | | G06Q 30/0631 |
| 11,010,472 B1* | 5/2021 | Powers | | G06N 5/01 |
| 11,010,687 B2* | 5/2021 | Mehdad | | G06N 20/00 |
| 11,010,848 B1* | 5/2021 | Colucci | | G06Q 50/182 |
| 11,017,764 B1* | 5/2021 | Das | | G06F 16/24578 |
| 11,036,857 B2* | 6/2021 | Tran | | G06N 3/045 |
| 11,042,692 B1* | 6/2021 | Greisen | | G06F 40/14 |
| 11,068,661 B1* | 7/2021 | Nichols | | G06N 20/00 |
| 11,080,336 B2* | 8/2021 | Van Dusen | | G06N 5/02 |
| 11,093,855 B1* | 8/2021 | Fiedler | | G06N 20/00 |
| 11,100,399 B2* | 8/2021 | Dong | | G06N 3/084 |
| 11,102,244 B1* | 8/2021 | Jakobsson | | H04L 51/42 |
| 11,119,630 B1* | 9/2021 | Marchetti | | G06N 5/04 |
| 11,120,361 B1* | 9/2021 | Januschowski | | G06N 20/00 |
| 11,120,364 B1* | 9/2021 | Gokalp | | G06N 20/00 |
| 11,120,368 B2* | 9/2021 | Varadarajan | | G06N 7/01 |
| 11,126,914 B2* | 9/2021 | Thibault | | G06N 20/00 |
| 11,132,602 B1* | 9/2021 | Xie | | G06F 9/44552 |
| 11,138,249 B1* | 10/2021 | Tosik | | G06F 16/3347 |
| 11,158,012 B1* | 10/2021 | Rajpara | | G06Q 50/18 |
| 11,164,093 B1* | 11/2021 | Zappella | | G06N 5/045 |
| 11,164,107 B1* | 11/2021 | Craib | | G06N 20/00 |
| 11,176,475 B1* | 11/2021 | Smith | | G06N 5/02 |
| 11,176,484 B1* | 11/2021 | Dorner | | G06F 16/738 |
| 11,210,396 B2* | 12/2021 | Alsulami | | G06F 21/10 |
| 11,221,990 B2* | 1/2022 | Taylor, Jr. | | G06F 16/1744 |
| 11,244,050 B2* | 2/2022 | Nataraj | | G06F 21/57 |
| 11,245,726 B1* | 2/2022 | Kats | | G06N 20/00 |
| 11,250,311 B2* | 2/2022 | Johansen | | G06N 3/044 |
| 11,250,515 B1* | 2/2022 | Feiteira | | G06Q 40/08 |
| 11,270,227 B2* | 3/2022 | Veshchikov | | G06F 16/23 |
| 11,293,689 B2* | 4/2022 | Hwang | | G06N 20/00 |
| 11,341,242 B2* | 5/2022 | Tseng | | G06N 20/00 |
| 11,360,546 B2* | 6/2022 | Iodice | | G01S 15/08 |
| 11,361,403 B2* | 6/2022 | Kalchbrenner | | G06T 3/4046 |
| 11,367,117 B1* | 6/2022 | Cheng | | G06F 40/30 |
| 11,372,381 B1* | 6/2022 | Trowbridge | | G06N 7/01 |
| 11,373,117 B1* | 6/2022 | Cui | | G06F 16/285 |
| 11,373,257 B1* | 6/2022 | Guo | | G06N 20/00 |
| 11,375,256 B1* | 6/2022 | Dorner | | G06N 3/04 |
| 11,379,855 B1* | 7/2022 | Anderson | | G06N 20/00 |
| 11,392,751 B1* | 7/2022 | Szarvas | | G06N 3/08 |
| 11,410,062 B2* | 8/2022 | Wang | | G06Q 30/0248 |
| 11,415,425 B1* | 8/2022 | Merchant | | H04L 41/16 |
| 11,420,296 B2* | 8/2022 | Liu | | C22C 38/14 |
| 11,424,993 B1* | 8/2022 | Chaoji | | H04L 41/5009 |
| 11,449,763 B2* | 9/2022 | de Nijs | | G06F 16/9536 |
| 11,457,031 B1* | 9/2022 | Bisht | | G06N 7/01 |
| 11,475,053 B1* | 10/2022 | Das | | G06F 16/3344 |
| 11,475,337 B1* | 10/2022 | Lindner | | G06N 5/01 |
| 11,475,350 B2* | 10/2022 | McMahan | | H04L 67/10 |
| 11,475,368 B2* | 10/2022 | Shang | | G06N 5/01 |
| 11,481,669 B2* | 10/2022 | Rolfe | | G06N 7/08 |
| 11,483,319 B2* | 10/2022 | Okunlola | | G06N 7/01 |
| 11,494,686 B1* | 11/2022 | Mandayam Comar | | G06N 20/00 |
| 11,494,721 B1* | 11/2022 | Lah | | G06Q 30/0201 |
| 11,501,101 B1* | 11/2022 | Ganesan | | G06F 18/22 |
| 11,501,172 B2* | 11/2022 | Hilprecht | | G06N 3/045 |
| 11,507,032 B2* | 11/2022 | Nakagawa | | G06F 18/23213 |
| 11,521,106 B2* | 12/2022 | Nock | | G06N 3/08 |
| 11,531,852 B2* | 12/2022 | Vahdat | | G06N 7/01 |
| 11,537,506 B1* | 12/2022 | Dasgupta | | G06N 3/10 |
| 11,556,746 B1* | 1/2023 | Dasgupta | | G06N 20/00 |
| 11,558,403 B2* | 1/2023 | Ryver | | H04L 9/0852 |
| 11,562,076 B2* | 1/2023 | El-Moussa | | H04L 63/1466 |
| 11,568,148 B1* | 1/2023 | Nichols | | G06N 5/041 |
| 11,568,979 B1* | 1/2023 | Granato | | G16H 10/60 |
| 11,576,624 B2* | 2/2023 | Villongco | | A61B 5/318 |
| 11,586,860 B2* | 2/2023 | Assaderaghi | | G06N 20/00 |
| 11,592,818 B2* | 2/2023 | Tariq | | G05D 1/0246 |
| 11,599,927 B1* | 3/2023 | Flunkert | | G06F 40/30 |
| 11,604,937 B2* | 3/2023 | Andersson | | G06N 20/00 |
| 11,605,013 B2* | 3/2023 | Manamohan | | H04L 9/3239 |
| 11,636,377 B1* | 4/2023 | Xu | | G06N 3/044 |
| | | | | 706/12 |
| 11,651,271 B1* | 5/2023 | Xu | | G06N 7/01 |
| | | | | 706/12 |
| 11,676,025 B2* | 6/2023 | Kolter | | G06N 3/048 |
| | | | | 706/20 |
| 11,720,686 B1* | 8/2023 | Cross | | G06F 9/455 |
| | | | | 726/25 |
| 11,722,510 B2* | 8/2023 | Lewis | | G06N 20/00 |
| | | | | 726/22 |
| 11,755,726 B2* | 9/2023 | Ma | | G06N 20/20 |
| | | | | 706/12 |

(56) References Cited

U.S. PATENT DOCUMENTS

| | | | | |
|---|---|---|---|---|
| 11,763,950 B1* | 9/2023 | Larson | G06N 20/20 | 705/3 |
| 11,770,404 B2* | 9/2023 | McNee | G06N 20/20 | 726/23 |
| 11,785,022 B2* | 10/2023 | Ma | G06N 3/088 | 726/23 |
| 11,797,769 B1* | 10/2023 | Gangadharaiah | G06N 3/0442 | |
| 11,803,641 B2* | 10/2023 | Ma | G06F 21/53 | |
| 11,816,575 B2* | 11/2023 | Gu | G06F 21/606 | |
| 11,855,849 B1* | 12/2023 | Davis | H04L 41/16 | |
| 11,868,436 B1* | 1/2024 | Gokalp | G06N 7/00 | |
| 11,874,904 B2* | 1/2024 | Yoon | G06F 21/31 | |
| 11,875,230 B1* | 1/2024 | Gokalp | G06F 16/2423 | |
| 11,880,746 B1* | 1/2024 | Cahoon | G06N 20/00 | |
| 11,941,491 B2* | 3/2024 | Harang | G06F 21/56 | |
| 11,966,839 B2* | 4/2024 | van den Oord | G06N 3/045 | |
| 12,118,455 B2* | 10/2024 | Liang | G06V 10/772 | |
| 2002/0029205 A1* | 3/2002 | Pedraza | G06N 20/00 | 706/21 |
| 2002/0162107 A1* | 10/2002 | Gutta | G06N 20/00 | 725/47 |
| 2003/0069863 A1* | 4/2003 | Sadakuni | G06N 3/008 | 706/11 |
| 2004/0098147 A1* | 5/2004 | Voon | G06N 5/048 | 700/173 |
| 2004/0103013 A1* | 5/2004 | Jameson | G06Q 10/063 | 705/7.28 |
| 2004/0162797 A1* | 8/2004 | Bridges | G06N 5/02 | 706/50 |
| 2004/0177052 A1* | 9/2004 | Bridges | G06N 5/046 | 706/45 |
| 2006/0090566 A1* | 5/2006 | Oda | G01L 9/006 | 73/715 |
| 2006/0200259 A1* | 9/2006 | Hoffberg | H04N 5/782 | 700/86 |
| 2006/0211672 A1* | 9/2006 | Jacobson | A61K 31/415 | 514/394 |
| 2007/0094195 A1* | 4/2007 | Wang | G06F 18/214 | 706/46 |
| 2007/0181232 A1* | 8/2007 | Han | C22C 38/12 | 148/330 |
| 2007/0192262 A1* | 8/2007 | Marianetti | G06N 3/049 | 706/12 |
| 2007/0214467 A1* | 9/2007 | Fukuda | G11B 7/2403 | |
| 2007/0276723 A1* | 11/2007 | Samid | G06N 5/04 | 705/12 |
| 2008/0005137 A1* | 1/2008 | Surendran | G06F 18/2321 | |
| 2008/0098222 A1* | 4/2008 | Zilberman | G06F 21/83 | 713/170 |
| 2008/0210126 A1* | 9/2008 | Apeagyei | C08G 16/0237 | 252/182.29 |
| 2008/0251167 A1* | 10/2008 | Han | C22C 38/004 | 148/645 |
| 2008/0251168 A1* | 10/2008 | Han | C22C 38/12 | 148/330 |
| 2008/0255684 A1* | 10/2008 | Wong | G05B 13/0285 | 700/173 |
| 2009/0037260 A1* | 2/2009 | Felten | G06Q 10/00 | 705/12 |
| 2009/0254572 A1* | 10/2009 | Redlich | G06Q 10/10 | |
| 2009/0300765 A1* | 12/2009 | Moskovitch | G06F 21/562 | 726/24 |
| 2010/0057645 A1* | 3/2010 | Lauritsen | G06N 5/042 | 706/11 |
| 2010/0121808 A1* | 5/2010 | Kuhn | G06N 20/00 | 463/43 |
| 2010/0250497 A1* | 9/2010 | Redlich | G06Q 10/06 | 707/661 |
| 2011/0060425 A1* | 3/2011 | Freed | G06N 3/008 | 700/33 |
| 2011/0135165 A1* | 6/2011 | Wechsler | G06F 18/211 | 382/118 |
| 2011/0135166 A1* | 6/2011 | Wechsler | G06V 40/172 | 382/118 |
| 2011/0173147 A1* | 7/2011 | de Kleer | G06N 5/04 | 706/46 |
| 2011/0174606 A1* | 7/2011 | Funk | H01J 37/3244 | 422/105 |
| 2011/0277037 A1* | 11/2011 | Burke | G06F 21/60 | 726/26 |
| 2012/0023062 A1* | 1/2012 | Vashist | G06N 20/10 | 706/59 |
| 2012/0028042 A1* | 2/2012 | Mori | C09J 7/35 | 525/445 |
| 2012/0172734 A1* | 7/2012 | Fujii | A61B 5/0225 | 600/493 |
| 2012/0254333 A1* | 10/2012 | Chandramouli | G06F 40/10 | 709/206 |
| 2013/0097706 A1* | 4/2013 | Titonis | G06F 21/566 | 726/22 |
| 2013/0111005 A1* | 5/2013 | Chu | G06Q 50/20 | 709/224 |
| 2013/0198119 A1* | 8/2013 | Eberhardt, III | G06N 20/00 | 706/12 |
| 2013/0266925 A1* | 10/2013 | Nunamaker, Jr. | G09B 7/00 | 434/362 |
| 2013/0282628 A1* | 10/2013 | Bengfort | G06F 16/36 | 706/12 |
| 2014/0006323 A1* | 1/2014 | Nugent | H04L 63/1408 | 706/14 |
| 2014/0019468 A1* | 1/2014 | Federoff | G06Q 50/01 | 707/758 |
| 2014/0032467 A1* | 1/2014 | Reddy | G06N 20/00 | 706/46 |
| 2014/0046891 A1* | 2/2014 | Banas | G06N 5/022 | 706/46 |
| 2014/0075004 A1* | 3/2014 | Van Dusen | G07C 13/00 | 709/223 |
| 2014/0082449 A1* | 3/2014 | Zhang | H03M 13/6343 | 714/E11.002 |
| 2014/0143183 A1* | 5/2014 | Sigal | G06N 20/00 | 706/12 |
| 2014/0180980 A1* | 6/2014 | Hido | G06Q 10/10 | 706/12 |
| 2014/0226855 A1* | 8/2014 | Savvides | H04W 4/021 | 382/103 |
| 2014/0304200 A1* | 10/2014 | Wall | G16H 50/20 | 706/12 |
| 2015/0006465 A1* | 1/2015 | Mah | A61B 5/4552 | 706/52 |
| 2015/0032670 A1* | 1/2015 | Brazell | G06N 5/04 | 706/46 |
| 2015/0046332 A1* | 2/2015 | Adjaoute | G06Q 20/4016 | 705/44 |
| 2015/0052090 A1* | 2/2015 | Lin | G06N 7/01 | 706/12 |
| 2015/0112812 A1* | 4/2015 | Weinsberg | G06N 20/10 | 705/14.66 |
| 2015/0154495 A1* | 6/2015 | Qiu | G06N 5/048 | 706/14 |
| 2015/0154502 A1* | 6/2015 | Qiu | G06N 5/048 | 706/46 |
| 2015/0159057 A1* | 6/2015 | Henckens | C09J 5/06 | 252/514 |
| 2015/0163242 A1* | 6/2015 | Laidlaw | H04L 63/1425 | 726/22 |
| 2015/0172308 A1* | 6/2015 | Borohovski | G06F 40/143 | 726/25 |
| 2015/0188941 A1* | 7/2015 | Boshmaf | H04L 63/1441 | 726/22 |
| 2015/0269383 A1* | 9/2015 | Lang | G06F 21/57 | 726/1 |
| 2015/0286945 A1* | 10/2015 | Brewster | G06N 5/04 | 706/46 |
| 2015/0347918 A1* | 12/2015 | Lucey | G06N 7/01 | 706/12 |
| 2015/0361535 A1* | 12/2015 | Foissey | C21D 6/002 | 148/599 |

(56) References Cited

U.S. PATENT DOCUMENTS

| | | | |
|---|---|---|---|
| 2015/0363702 A1* | 12/2015 | Baum | G06N 5/048 706/52 |
| 2016/0004958 A1* | 1/2016 | Byng | G06N 7/08 706/10 |
| 2016/0055427 A1* | 2/2016 | Adjaoute | G06Q 30/0201 706/12 |
| 2016/0063502 A1* | 3/2016 | Adjaoute | G06Q 20/4016 705/44 |
| 2016/0071017 A1* | 3/2016 | Adjaoute | G06Q 20/4016 706/52 |
| 2016/0078365 A1* | 3/2016 | Baumard | H04L 63/1425 706/12 |
| 2016/0078366 A1* | 3/2016 | Kaplan | G06N 5/022 706/12 |
| 2016/0078368 A1* | 3/2016 | Kakhandiki | G06N 5/04 706/12 |
| 2016/0091965 A1* | 3/2016 | Wang | G06F 3/0346 345/156 |
| 2016/0094573 A1* | 3/2016 | Sood | G06F 21/554 726/1 |
| 2016/0156646 A1* | 6/2016 | Hsueh | G06N 20/00 726/1 |
| 2016/0162457 A1* | 6/2016 | Munro | G06F 16/3329 715/230 |
| 2016/0162478 A1* | 6/2016 | Blassin | G06Q 10/063112 706/12 |
| 2016/0217501 A1* | 7/2016 | Brigham | G06N 5/04 |
| 2016/0267384 A1* | 9/2016 | Salam | H04L 41/0893 |
| 2016/0275308 A1* | 9/2016 | Hubaux | G16B 50/00 |
| 2016/0300158 A1* | 10/2016 | Masato | G06N 3/006 |
| 2016/0303483 A1* | 10/2016 | Snoddy | G06N 3/006 |
| 2016/0321563 A1* | 11/2016 | Sinha | G06N 3/008 |
| 2016/0330219 A1* | 11/2016 | Hasan | G01C 21/387 |
| 2016/0350194 A1* | 12/2016 | Mohan | G05B 23/0254 |
| 2016/0379106 A1* | 12/2016 | Qi | G06F 16/90332 706/11 |
| 2016/0379107 A1* | 12/2016 | Li | B25J 11/0005 706/11 |
| 2017/0011026 A1* | 1/2017 | Byron | G06N 7/01 |
| 2017/0017722 A1* | 1/2017 | Henderson | G06N 20/00 |
| 2017/0053320 A1* | 2/2017 | Russek | H04N 21/25883 |
| 2017/0061659 A1* | 3/2017 | Puri | G06F 16/23 |
| 2017/0086943 A1* | 3/2017 | Mah | G06V 10/764 |
| 2017/0098172 A1* | 4/2017 | Ellenbogen | H04L 43/04 |
| 2017/0103194 A1* | 4/2017 | Wechsler | G06F 21/316 |
| 2017/0105163 A1* | 4/2017 | Hu | H04W 40/06 |
| 2017/0109655 A1* | 4/2017 | Miyazaki | G06N 5/022 |
| 2017/0124311 A1* | 5/2017 | Li | H04L 9/40 |
| 2017/0132822 A1* | 5/2017 | Marschke | G06Q 30/0631 |
| 2017/0147940 A1* | 5/2017 | Mitola, III | G06N 20/00 |
| 2017/0161105 A1* | 6/2017 | Barrett | G06F 9/4881 |
| 2017/0169230 A1* | 6/2017 | Zheng | G06N 20/00 |
| 2017/0169360 A1* | 6/2017 | Veeramachaneni | G06F 21/56 |
| 2017/0193397 A1* | 7/2017 | Kottha | G06F 40/30 |
| 2017/0213156 A1* | 7/2017 | Hammond | G06F 8/31 |
| 2017/0214701 A1* | 7/2017 | Hasan | H04L 63/1491 |
| 2017/0220817 A1* | 8/2017 | Shen | G06F 21/6254 |
| 2017/0228459 A1* | 8/2017 | Wang | G06N 20/00 |
| 2017/0243136 A1* | 8/2017 | Ho Kang | H04L 51/046 |
| 2017/0255702 A1* | 9/2017 | Liu | G06N 5/04 |
| 2017/0255879 A1* | 9/2017 | Chen | G06N 7/01 |
| 2017/0262757 A1* | 9/2017 | Martin | G06Q 10/067 |
| 2017/0272458 A1* | 9/2017 | Muddu | H04L 43/062 |
| 2017/0286671 A1* | 10/2017 | Chari | G06F 21/552 |
| 2017/0293845 A1* | 10/2017 | McAllister | G06F 16/3344 |
| 2017/0308800 A1* | 10/2017 | Cichon | G06N 20/00 |
| 2017/0310483 A1* | 10/2017 | Nagao | G06F 21/44 |
| 2017/0323204 A1* | 11/2017 | Akbulut | G06F 16/3329 |
| 2017/0330205 A1* | 11/2017 | Belanger | G06F 18/24155 |
| 2017/0344887 A1* | 11/2017 | Ahmed | G06N 20/00 |
| 2017/0346839 A1* | 11/2017 | Peppe | H04L 63/1433 |
| 2017/0353481 A1* | 12/2017 | Kong | H04L 63/1425 |
| 2017/0357893 A1* | 12/2017 | Dexter | G06N 20/00 |
| 2017/0357910 A1* | 12/2017 | Sommer | G06F 9/54 |
| 2017/0372191 A1* | 12/2017 | Reaux-Savonte | G06N 5/048 |
| 2018/0001206 A1* | 1/2018 | Osman | A63F 13/798 |
| 2018/0004870 A1* | 1/2018 | Ohayon | G06N 20/00 |
| 2018/0018571 A1* | 1/2018 | Schwartz | G06N 5/02 |
| 2018/0028294 A1* | 2/2018 | Azernikov | G06F 18/24143 |
| 2018/0032082 A1* | 2/2018 | Shalev-Shwartz | G06N 20/00 |
| 2018/0032505 A1* | 2/2018 | Hoetzer | G06Q 10/10 |
| 2018/0039745 A1* | 2/2018 | Chevalier | G16H 30/40 |
| 2018/0039776 A1* | 2/2018 | Loman | G06F 21/566 |
| 2018/0053114 A1* | 2/2018 | Adjaoute | G06N 20/00 |
| 2018/0053274 A1* | 2/2018 | Kendall | G06Q 50/265 |
| 2018/0075293 A1* | 3/2018 | Schinas | G06V 40/20 |
| 2018/0089164 A1* | 3/2018 | Iida | G06N 5/022 |
| 2018/0089349 A1* | 3/2018 | Rezgui | G06F 30/39 |
| 2018/0089591 A1* | 3/2018 | Zeiler | G06F 3/048 |
| 2018/0089592 A1* | 3/2018 | Zeiler | G06N 3/045 |
| 2018/0089593 A1* | 3/2018 | Patel | G06F 30/00 |
| 2018/0096157 A1* | 4/2018 | Israel | G06F 21/566 |
| 2018/0096260 A1* | 4/2018 | Zimmer | G06N 5/025 |
| 2018/0097841 A1* | 4/2018 | Stolarz | G06N 5/043 |
| 2018/0101760 A1* | 4/2018 | Nelson | G06N 5/04 |
| 2018/0101771 A1* | 4/2018 | Schwarm | G06N 20/00 |
| 2018/0101854 A1* | 4/2018 | Jones-McFadden | G06F 3/0481 |
| 2018/0107879 A1* | 4/2018 | Laput | G06N 20/00 |
| 2018/0107923 A1* | 4/2018 | Benson | H04W 12/084 |
| 2018/0107924 A1* | 4/2018 | Benson | G06N 20/10 |
| 2018/0107940 A1* | 4/2018 | Lieberman | G06N 20/00 |
| 2018/0108272 A1* | 4/2018 | Ahmad | G06N 5/02 |
| 2018/0121824 A1* | 5/2018 | Han | G06F 16/283 |
| 2018/0124108 A1* | 5/2018 | Irimie | G06N 5/02 |
| 2018/0144024 A1* | 5/2018 | Fu | G06F 16/243 |
| 2018/0144255 A1* | 5/2018 | Shams | G10L 25/66 |
| 2018/0150455 A1* | 5/2018 | Hu | G06N 5/00 |
| 2018/0150749 A1* | 5/2018 | Wu | G06N 5/04 |
| 2018/0150752 A1* | 5/2018 | Henderson | G06N 20/00 |
| 2018/0150843 A1* | 5/2018 | Adjaoute | G06N 20/00 |
| 2018/0159879 A1* | 6/2018 | Mestha | G06N 3/084 |
| 2018/0159889 A1* | 6/2018 | Sjouwerman | G06F 16/951 |
| 2018/0165554 A1* | 6/2018 | Zhang | G06N 3/045 |
| 2018/0165597 A1* | 6/2018 | Jordan | G06N 20/00 |
| 2018/0174019 A1* | 6/2018 | Henderson | G06N 5/02 |
| 2018/0174071 A1* | 6/2018 | Bhatt | G06V 10/774 |
| 2018/0174088 A1* | 6/2018 | Brown | G06N 20/00 |
| 2018/0174684 A1* | 6/2018 | Eastman | G16H 50/20 |
| 2018/0182187 A1* | 6/2018 | Tong | G07C 5/0841 |
| 2018/0182475 A1* | 6/2018 | Cossler | G16H 50/50 |
| 2018/0189642 A1* | 7/2018 | Boesch | G06N 3/047 |
| 2018/0190249 A1* | 7/2018 | Roblek | G10H 1/0025 |
| 2018/0198807 A1* | 7/2018 | Johns | H04L 63/1425 |
| 2018/0204126 A1* | 7/2018 | Gallé | G06Q 40/03 |
| 2018/0211117 A1* | 7/2018 | Ratti | G06V 10/764 |
| 2018/0211259 A1* | 7/2018 | Vu | G06N 5/04 |
| 2018/0218238 A1* | 8/2018 | Viirre | G06N 5/01 |
| 2018/0218475 A1* | 8/2018 | Riabov | G06N 20/00 |
| 2018/0219897 A1* | 8/2018 | Muddu | G06F 16/444 |
| 2018/0225616 A1* | 8/2018 | Jones | C12Y 101/00 |
| 2018/0232622 A1* | 8/2018 | Polkowski | G16H 50/20 |
| 2018/0234671 A1* | 8/2018 | Yang | G06T 15/205 |
| 2018/0238698 A1* | 8/2018 | Pedersen | G01C 21/343 |
| 2018/0240021 A1* | 8/2018 | Al-Harbi | G06F 30/20 |
| 2018/0240473 A1 | 8/2018 | Baracaldo Angel | |
| 2018/0246883 A1* | 8/2018 | Wang | G06F 17/18 |
| 2018/0247227 A1* | 8/2018 | Holtham | G06N 7/01 |
| 2018/0253658 A1* | 9/2018 | Baran | G06Q 50/01 |
| 2018/0260700 A1* | 9/2018 | Nagaraja | G06N 3/044 |
| 2018/0260734 A1* | 9/2018 | Beveridge | G06N 20/00 |
| 2018/0268506 A1* | 9/2018 | Wodetzki | G06N 20/00 |
| 2018/0276524 A1* | 9/2018 | Reaux-Savonte | G06F 16/288 |
| 2018/0276551 A1* | 9/2018 | Reaux-Savonte | G06N 5/04 |
| 2018/0276710 A1* | 9/2018 | Tietzen | G06Q 30/0269 |
| 2018/0284758 A1* | 10/2018 | Cella | G06F 16/2477 |
| 2018/0285413 A1* | 10/2018 | Vora | G06F 16/245 |
| 2018/0285736 A1* | 10/2018 | Baum | G06N 20/00 |
| 2018/0285740 A1* | 10/2018 | Smyth | G06N 3/084 |
| 2018/0288086 A1* | 10/2018 | Amiri | G06N 3/08 |
| 2018/0288091 A1* | 10/2018 | Doron | H04L 63/1458 |
| 2018/0293507 A1* | 10/2018 | Lian | G06F 16/337 |
| 2018/0299841 A1* | 10/2018 | Appu | G05B 13/0285 |

(56) References Cited

U.S. PATENT DOCUMENTS

| | | | |
|---|---|---|---|
| 2018/0300480 A1* | 10/2018 | Sawhney | G06F 21/563 |
| 2018/0300793 A1* | 10/2018 | Chen | G06Q 30/0631 |
| 2018/0301158 A1* | 10/2018 | Zou | G10L 21/0208 |
| 2018/0307509 A1* | 10/2018 | Dai | G06F 9/5027 |
| 2018/0307833 A1* | 10/2018 | Noeth | H04L 63/1425 |
| 2018/0308005 A1* | 10/2018 | Banipal | G06N 3/04 |
| 2018/0308010 A1* | 10/2018 | Bunch | G06N 5/01 |
| 2018/0308025 A1* | 10/2018 | Bansal | G06N 3/02 |
| 2018/0308475 A1* | 10/2018 | Locke | G06F 40/279 |
| 2018/0314960 A1* | 11/2018 | Martinez Hernandez Magro | G16H 50/20 |
| 2018/0315499 A1* | 11/2018 | Appelbaum | G16H 20/60 |
| 2018/0322370 A1* | 11/2018 | Sun | G06V 30/1985 |
| 2018/0322419 A1* | 11/2018 | Bugenhagen | G06N 5/043 |
| 2018/0329375 A1* | 11/2018 | Gharabegian | G05B 15/02 |
| 2018/0329894 A1* | 11/2018 | Zhao | G06F 40/51 |
| 2018/0330379 A1* | 11/2018 | Zoldi | G06N 3/045 |
| 2018/0332256 A1* | 11/2018 | Ni | G06V 10/457 |
| 2018/0336193 A1* | 11/2018 | Liu | G06F 40/186 |
| 2018/0336206 A1* | 11/2018 | Wan | G06V 30/268 |
| 2018/0336415 A1* | 11/2018 | Anorga | G06N 20/00 |
| 2018/0336439 A1 | 11/2018 | Kliger et al. | |
| 2018/0336459 A1* | 11/2018 | Baughman | G06N 5/025 |
| 2018/0336463 A1* | 11/2018 | Bloom | G06N 3/08 |
| 2018/0336471 A1 | 11/2018 | Rezagholizadeh et al. | |
| 2018/0341698 A1* | 11/2018 | Wang | G06N 5/02 |
| 2018/0341700 A1* | 11/2018 | Chen | G06N 3/045 |
| 2018/0341878 A1* | 11/2018 | Azout | G06N 20/00 |
| 2018/0349605 A1* | 12/2018 | Wiebe | G06N 3/045 |
| 2018/0349743 A1* | 12/2018 | Iurii | G06V 30/19173 |
| 2018/0349793 A1* | 12/2018 | Triolo | G06N 5/048 |
| 2018/0349795 A1* | 12/2018 | Boyle | G06Q 10/067 |
| 2018/0357225 A1* | 12/2018 | Liu | H04L 51/02 |
| 2018/0357508 A1* | 12/2018 | Cui | G06N 3/08 |
| 2018/0357514 A1* | 12/2018 | Zisimopoulos | G06V 10/764 |
| 2018/0357552 A1* | 12/2018 | Campos | G06N 5/043 |
| 2018/0357557 A1* | 12/2018 | Williams | G06Q 30/0201 |
| 2018/0357570 A1* | 12/2018 | Sun | G06N 20/00 |
| 2018/0357571 A1* | 12/2018 | Sun | G06N 3/006 |
| 2018/0365026 A1* | 12/2018 | Jernigan | G06F 9/453 |
| 2018/0365225 A1* | 12/2018 | Wu | G06N 20/00 |
| 2018/0365258 A1* | 12/2018 | Huang | G06N 5/04 |
| 2018/0365294 A1* | 12/2018 | Cho | G06F 16/24542 |
| 2018/0365534 A1* | 12/2018 | Luo | G06F 11/3438 |
| 2018/0365555 A1* | 12/2018 | Aslam | G06N 3/084 |
| 2018/0365574 A1* | 12/2018 | Qiao | G06N 7/01 |
| 2018/0365579 A1* | 12/2018 | Wan | G06F 16/3334 |
| 2018/0373782 A1* | 12/2018 | Liu | G06F 16/90335 |
| 2018/0373979 A1* | 12/2018 | Wang | G06F 18/24143 |
| 2018/0374138 A1* | 12/2018 | Mohamed | G06N 20/00 |
| 2018/0374475 A1* | 12/2018 | Lewis | G16H 40/67 |
| 2018/0375806 A1* | 12/2018 | Manning | H04L 67/53 |
| 2019/0005126 A1* | 1/2019 | Chen | G06F 18/22 |
| 2019/0005411 A1* | 1/2019 | Eads | G06F 16/2246 |
| 2019/0012310 A1* | 1/2019 | Cho | G06F 40/242 |
| 2019/0012390 A1* | 1/2019 | Nishant | G06N 3/006 |
| 2019/0012442 A1* | 1/2019 | Hunegnaw | G06V 40/161 |
| 2019/0012605 A1* | 1/2019 | Rajagopal | G06N 20/00 |
| 2019/0012841 A1* | 1/2019 | Kim | G06N 5/04 |
| 2019/0014643 A1* | 1/2019 | Gharabegian | F21S 9/037 |
| 2019/0018692 A1* | 1/2019 | Indyk | G06F 9/453 |
| 2019/0019083 A1* | 1/2019 | Trunck | G06N 3/04 |
| 2019/0019222 A1* | 1/2019 | Agrawal | G06Q 50/01 |
| 2019/0019242 A1* | 1/2019 | Bajpai | G06Q 30/0603 |
| 2019/0026586 A1* | 1/2019 | Liu | G06V 10/17 |
| 2019/0026637 A1* | 1/2019 | Mehta | G06N 20/00 |
| 2019/0035504 A1* | 1/2019 | Jang | G16H 70/60 |
| 2019/0041842 A1* | 2/2019 | Cella | G06N 5/046 |
| 2019/0041948 A1* | 2/2019 | Kelly | G06F 1/28 |
| 2019/0042551 A1* | 2/2019 | Hwang | G06V 30/40 |
| 2019/0042745 A1* | 2/2019 | Chen | G06V 20/62 |
| 2019/0042747 A1* | 2/2019 | Sukhomlinov | G06F 21/6218 |
| 2019/0042908 A1* | 2/2019 | Garcia | G06N 3/006 |
| 2019/0042955 A1* | 2/2019 | Cahill | G06N 5/04 |
| 2019/0043474 A1* | 2/2019 | Kingsbury | G06F 40/117 |
| 2019/0050049 A1* | 2/2019 | Qawami | G06N 5/04 |
| 2019/0050564 A1* | 2/2019 | Pogorelik | G06N 20/00 |
| 2019/0050686 A1* | 2/2019 | Moustafa | G06F 3/011 |
| 2019/0050771 A1* | 2/2019 | Meharwade | G06Q 10/067 |
| 2019/0051398 A1* | 2/2019 | Zankowski | G06N 20/00 |
| 2019/0057164 A1* | 2/2019 | Zhou | G06F 16/9032 |
| 2019/0057313 A1* | 2/2019 | Hirshman | G06N 3/126 |
| 2019/0057322 A1* | 2/2019 | Desiraju | G06N 7/02 |
| 2019/0057521 A1* | 2/2019 | Teixeira | A61B 6/545 |
| 2019/0057777 A1* | 2/2019 | Joshi | G16H 50/30 |
| 2019/0058609 A1* | 2/2019 | Cui | H04L 12/1859 |
| 2019/0058736 A1* | 2/2019 | Stupak | H04L 63/20 |
| 2019/0065464 A1* | 2/2019 | Finley | G06N 3/044 |
| 2019/0065498 A1* | 2/2019 | Yuan | G06F 16/24522 |
| 2019/0065960 A1* | 2/2019 | Taylor | G06N 20/00 |
| 2019/0065970 A1* | 2/2019 | Bonutti | G06T 7/0012 |
| 2019/0066133 A1* | 2/2019 | Cotton | G06Q 30/0202 |
| 2019/0066675 A1* | 2/2019 | Liang | G10L 15/063 |
| 2019/0073335 A1* | 3/2019 | Foley | G06F 18/214 |
| 2019/0073560 A1* | 3/2019 | Matei | G06N 3/08 |
| 2019/0079915 A1* | 3/2019 | Min | G06F 16/3329 |
| 2019/0080063 A1* | 3/2019 | Rice | G06F 21/6245 |
| 2019/0080148 A1* | 3/2019 | He | G06V 10/764 |
| 2019/0080250 A1* | 3/2019 | Denorme | G16B 45/00 |
| 2019/0087395 A1* | 3/2019 | Priestas | G06F 40/169 |
| 2019/0087736 A1* | 3/2019 | Kita | G06F 18/285 |
| 2019/0095775 A1* | 3/2019 | Lembersky | G06N 3/006 |
| 2019/0095798 A1* | 3/2019 | Baker | G06N 7/01 |
| 2019/0101985 A1* | 4/2019 | Sajda | G06F 3/017 |
| 2019/0102155 A1* | 4/2019 | Garvey | G06F 8/61 |
| 2019/0102679 A1* | 4/2019 | Roberts | G06N 5/02 |
| 2019/0102681 A1* | 4/2019 | Roberts | G06N 20/00 |
| 2019/0102684 A1* | 4/2019 | Beran | G05B 23/0216 |
| 2019/0102698 A1* | 4/2019 | Roberts | G06F 16/221 |
| 2019/0102835 A1* | 4/2019 | Bjonerud | H04L 65/403 |
| 2019/0103092 A1* | 4/2019 | Rusak | G06N 3/045 |
| 2019/0103107 A1* | 4/2019 | Cohen | G06F 16/908 |
| 2019/0107846 A1* | 4/2019 | Roy | G08G 5/80 |
| 2019/0108286 A1* | 4/2019 | Pan | G06F 16/50 |
| 2019/0108353 A1* | 4/2019 | Sadeh | G06N 20/00 |
| 2019/0108396 A1* | 4/2019 | Dal Mutto | G06V 20/52 |
| 2019/0108458 A1* | 4/2019 | Yu | A41H 43/00 |
| 2019/0109878 A1* | 4/2019 | Boyadjiev | G06N 5/022 |
| 2019/0111839 A1* | 4/2019 | Lee | B60Q 9/00 |
| 2019/0114422 A1* | 4/2019 | Johnson | G06F 9/30098 |
| 2019/0114462 A1* | 4/2019 | Jang | G06N 3/084 |
| 2019/0114551 A1* | 4/2019 | Chereshnev | G06Q 30/0254 |
| 2019/0114557 A1* | 4/2019 | Ashrafi | G06N 7/08 |
| 2019/0116136 A1* | 4/2019 | Baudart | H04L 63/1491 |
| 2019/0121673 A1* | 4/2019 | Gold | G06F 16/245 |
| 2019/0121889 A1* | 4/2019 | Gold | G06T 1/20 |
| 2019/0122071 A1* | 4/2019 | Jin | G06V 40/174 |
| 2019/0122093 A1* | 4/2019 | Yonekura | G06N 20/00 |
| 2019/0122153 A1* | 4/2019 | Meharwade | G06Q 10/06313 |
| 2019/0122409 A1* | 4/2019 | Meadows | G06T 13/40 |
| 2019/0130101 A1* | 5/2019 | Chen | G06N 3/048 |
| 2019/0130102 A1* | 5/2019 | Johnson | G06F 12/1045 |
| 2019/0130110 A1* | 5/2019 | Lee | G06N 3/08 |
| 2019/0130221 A1* | 5/2019 | Bose | G06N 3/045 |
| 2019/0130225 A1* | 5/2019 | Ding | G06V 10/761 |
| 2019/0130279 A1* | 5/2019 | Beggel | G06V 10/82 |
| 2019/0130321 A1* | 5/2019 | Yeoh | G06N 20/00 |
| 2019/0132203 A1* | 5/2019 | Wince | G06F 9/4881 |
| 2019/0132343 A1* | 5/2019 | Chen | G06N 3/045 |
| 2019/0132344 A1* | 5/2019 | Lem | G06N 20/00 |
| 2019/0132354 A1* | 5/2019 | Akiba | H04L 63/1466 |
| 2019/0138635 A1* | 5/2019 | Givon | G06N 20/00 |
| 2019/0138719 A1* | 5/2019 | Sultana | G06F 21/552 |
| 2019/0138930 A1* | 5/2019 | Margiolas | G06Q 30/0251 |
| 2019/0138961 A1* | 5/2019 | Santiago | G06Q 10/063118 |
| 2019/0139098 A1* | 5/2019 | Margiolas | G06N 20/00 |
| 2019/0140913 A1* | 5/2019 | Guim Bernat | H04L 41/5019 |
| 2019/0141060 A1* | 5/2019 | Lim | G06N 5/04 |
| 2019/0147321 A1* | 5/2019 | Miyato | G06T 5/00 382/157 |
| 2019/0147355 A1* | 5/2019 | Rennie | G06N 3/044 706/47 |
| 2019/0147371 A1* | 5/2019 | Deo | G06N 20/20 706/12 |

(56) References Cited

U.S. PATENT DOCUMENTS

| | | | |
|---|---|---|---|
| 2019/0148023 A1* | 5/2019 | Sadilek | G06N 3/044 |
| | | | 705/2 |
| 2019/0156222 A1* | 5/2019 | Emma | G06N 5/041 |
| 2019/0156949 A1* | 5/2019 | Lee | A61B 5/389 |
| 2019/0163691 A1* | 5/2019 | Brunet | G06F 40/35 |
| 2019/0163714 A1* | 5/2019 | Ma | G06F 16/2465 |
| 2019/0163814 A1* | 5/2019 | Codella | G06N 5/022 |
| 2019/0164087 A1* | 5/2019 | Ghibril | G06N 5/02 |
| 2019/0164202 A1* | 5/2019 | Ukhalkar | G06N 20/00 |
| 2019/0171187 A1* | 6/2019 | Cella | G06N 3/126 |
| 2019/0171793 A1* | 6/2019 | Aykol | G16C 20/10 |
| 2019/0171822 A1* | 6/2019 | Sjouwerman | H04L 63/1483 |
| 2019/0171944 A1* | 6/2019 | Lu | G06N 5/022 |
| 2019/0171965 A1* | 6/2019 | Ferguson, Jr. | G06N 20/00 |
| 2019/0173762 A1* | 6/2019 | Byers | G06N 20/00 |
| 2019/0173899 A1* | 6/2019 | Tews | H04L 63/1425 |
| 2019/0173918 A1* | 6/2019 | Sites | H04L 63/1483 |
| 2019/0173919 A1* | 6/2019 | Irimie | H04L 63/1483 |
| 2019/0176987 A1* | 6/2019 | Beecham | G08B 17/005 |
| 2019/0179647 A1* | 6/2019 | Deka | G06N 7/01 |
| 2019/0180154 A1* | 6/2019 | Orlov | G06F 40/289 |
| 2019/0180746 A1* | 6/2019 | Diwan | G06F 16/252 |
| 2019/0187785 A1* | 6/2019 | Kim | G10L 17/22 |
| 2019/0188212 A1* | 6/2019 | Miller | H04L 63/145 |
| 2019/0188562 A1* | 6/2019 | Edwards | G06N 5/045 |
| 2019/0192083 A1* | 6/2019 | Laszlo | A61B 5/369 |
| 2019/0192258 A1* | 6/2019 | Kang | G06F 3/12 |
| 2019/0196586 A1* | 6/2019 | Laszlo | A61B 5/372 |
| 2019/0197120 A1* | 6/2019 | Lohia | G06N 5/022 |
| 2019/0197442 A1* | 6/2019 | Lu | G06Q 20/4016 |
| 2019/0197585 A1* | 6/2019 | Sylvester, II | G06Q 30/0269 |
| 2019/0199733 A1* | 6/2019 | Aaltonen | G06Q 10/06316 |
| 2019/0205636 A1* | 7/2019 | Saraswat | G06V 30/412 |
| 2019/0213115 A1* | 7/2019 | Takawale | G06F 11/3692 |
| 2019/0213168 A1* | 7/2019 | Kim | G06F 18/217 |
| 2019/0213407 A1* | 7/2019 | Toivanen | G06V 10/945 |
| 2019/0213486 A1* | 7/2019 | Do | G06N 5/022 |
| 2019/0213499 A1* | 7/2019 | Kita | G06N 20/00 |
| 2019/0213502 A1* | 7/2019 | Navratil | G06N 20/00 |
| 2019/0213503 A1* | 7/2019 | Navratil | G06F 9/541 |
| 2019/0213685 A1* | 7/2019 | Ironside | G06N 20/00 |
| 2019/0215329 A1* | 7/2019 | Levy | G06N 20/00 |
| 2019/0221001 A1* | 7/2019 | Dassa | G06N 3/045 |
| 2019/0223983 A1* | 7/2019 | Mah | G06F 18/24323 |
| 2019/0230107 A1* | 7/2019 | De Sapio | H04L 63/145 |
| 2019/0236173 A1* | 8/2019 | Ghatage | G06F 16/22 |
| 2019/0236466 A1* | 8/2019 | Harrison | G06N 5/043 |
| 2019/0236598 A1* | 8/2019 | Padmanabhan | G06Q 20/389 |
| 2019/0238568 A1* | 8/2019 | Goswami | G06F 21/566 |
| 2019/0244103 A1* | 8/2019 | Wang | G06N 3/088 |
| 2019/0244122 A1* | 8/2019 | Li | G06N 5/022 |
| 2019/0245866 A1* | 8/2019 | Anderson | G06N 20/00 |
| 2019/0251417 A1* | 8/2019 | Bennett | G06N 5/022 |
| 2019/0258939 A1* | 8/2019 | Min | G06N 3/0442 |
| 2019/0258953 A1* | 8/2019 | Lang | G06N 3/08 |
| 2019/0259499 A1* | 8/2019 | Hong | G16H 50/20 |
| 2019/0260804 A1* | 8/2019 | Beck | G06F 18/232 |
| 2019/0273509 A1* | 9/2019 | Elkind | H03M 7/4093 |
| 2019/0273510 A1* | 9/2019 | Elkind | H03M 7/4093 |
| 2019/0285496 A1* | 9/2019 | Takimoto | G01L 19/0084 |
| 2019/0287515 A1* | 9/2019 | Li | G06N 3/084 |
| 2019/0294243 A1* | 9/2019 | Laszlo | G06N 20/00 |
| 2019/0294871 A1* | 9/2019 | Vaezi Joze | G06V 40/103 |
| 2019/0294921 A1* | 9/2019 | Kalenkov | G06V 30/1916 |
| 2019/0302766 A1* | 10/2019 | Mondello | H04L 9/3247 |
| 2019/0303636 A1* | 10/2019 | Olivastri | G06N 3/045 |
| 2019/0303669 A1* | 10/2019 | Spooner | G06N 3/08 |
| 2019/0304157 A1* | 10/2019 | Amer | G06V 40/23 |
| 2019/0310592 A1* | 10/2019 | Hazard | G06F 18/214 |
| 2019/0310634 A1* | 10/2019 | Hazard | G06N 5/04 |
| 2019/0310635 A1* | 10/2019 | Hazard | G06N 20/00 |
| 2019/0311131 A1* | 10/2019 | Hassanshahi | G06F 8/433 |
| 2019/0311286 A1* | 10/2019 | Stadler | G06Q 50/06 |
| 2019/0311298 A1* | 10/2019 | Kopp | G01C 25/00 |
| 2019/0311813 A1* | 10/2019 | Hie | G16H 10/40 |
| 2019/0318099 A1* | 10/2019 | Carvalho | G06F 21/577 |
| 2019/0318219 A1* | 10/2019 | Arora | G06N 5/04 |
| 2019/0318238 A1* | 10/2019 | Nokbak Nyembe | G06N 5/043 |
| 2019/0325060 A1* | 10/2019 | Fenoglio | G06F 16/906 |
| 2019/0325084 A1* | 10/2019 | Peng | G06V 40/28 |
| 2019/0325163 A1* | 10/2019 | Sharad | G06F 21/82 |
| 2019/0325264 A1* | 10/2019 | Keserich | G06F 18/214 |
| 2019/0325354 A1* | 10/2019 | Rajnayak | G06F 18/2413 |
| 2019/0325528 A1* | 10/2019 | Adjaoute | G06N 3/006 |
| 2019/0325621 A1* | 10/2019 | Wang | G06N 3/045 |
| 2019/0332892 A1* | 10/2019 | Wickesberg | G06N 20/20 |
| 2019/0339989 A1* | 11/2019 | Liang | G06F 16/907 |
| 2019/0340419 A1* | 11/2019 | Milman | G06N 20/00 |
| 2019/0340525 A1* | 11/2019 | Katz | G05B 13/041 |
| 2019/0340578 A1* | 11/2019 | Jung | G06Q 50/205 |
| 2019/0347371 A1* | 11/2019 | Sankar | G06Q 10/06312 |
| 2019/0347484 A1* | 11/2019 | Sridhar | G06N 5/043 |
| 2019/0347567 A1* | 11/2019 | Njie | G06N 3/04 |
| 2019/0349333 A1* | 11/2019 | Pickover | H04L 63/0245 |
| 2019/0350538 A1* | 11/2019 | Wilson | G06T 5/001 |
| 2019/0354632 A1* | 11/2019 | Mital | G06N 20/00 |
| 2019/0354633 A1* | 11/2019 | Mital | G06N 20/00 |
| 2019/0354759 A1* | 11/2019 | Somers | A63F 13/67 |
| 2019/0354805 A1* | 11/2019 | Hind | G06F 18/253 |
| 2019/0354850 A1* | 11/2019 | Watson | G06N 3/045 |
| 2019/0354882 A1* | 11/2019 | Sharma | G16H 30/20 |
| 2019/0362645 A1* | 11/2019 | Miller | G06N 5/041 |
| 2019/0370386 A1* | 12/2019 | Brandwine | G06F 18/241 |
| 2019/0370388 A1* | 12/2019 | Li | G06F 40/295 |
| 2019/0370397 A1* | 12/2019 | Kummamuru | G06F 40/295 |
| 2019/0370440 A1* | 12/2019 | Gu | G06N 3/048 |
| 2019/0370473 A1* | 12/2019 | Matrosov | G06N 3/044 |
| 2019/0370489 A1* | 12/2019 | Brandwine | G06F 21/6218 |
| 2019/0370660 A1* | 12/2019 | Wong | G06N 3/048 |
| 2019/0370697 A1* | 12/2019 | Ramachandra | G06F 18/285 |
| 2019/0371438 A1* | 12/2019 | Chintamaneni | G10L 15/26 |
| 2019/0373186 A1* | 12/2019 | Ortiz Egea | G06V 10/454 |
| 2019/0374160 A1* | 12/2019 | Yin | A61B 5/14551 |
| 2019/0377987 A1* | 12/2019 | Price | G06N 3/045 |
| 2019/0378052 A1* | 12/2019 | Badhwar | G06N 20/00 |
| 2019/0379699 A1* | 12/2019 | Katragadda | H04L 63/1425 |
| 2019/0384640 A1* | 12/2019 | Swamy | G06F 9/453 |
| 2019/0385090 A1* | 12/2019 | Katole | G06N 5/04 |
| 2019/0385610 A1* | 12/2019 | Steelberg | G10L 25/90 |
| 2019/0385738 A1* | 12/2019 | Hoelzer | G06V 10/945 |
| 2019/0391901 A1* | 12/2019 | Gupta | G06N 3/08 |
| 2019/0392122 A1* | 12/2019 | Foster | G06F 21/6245 |
| 2019/0392285 A1* | 12/2019 | Manaharlal Kakkad | |
| | | | H04L 51/02 |
| 2019/0392305 A1* | 12/2019 | Gu | G06F 21/53 |
| 2020/0004351 A1* | 1/2020 | Marchant | G06N 20/00 |
| 2020/0004834 A1* | 1/2020 | Sadeddin | G06Q 10/087 |
| 2020/0004890 A1* | 1/2020 | Myhre | G06F 40/30 |
| 2020/0005116 A1* | 1/2020 | Kuo | G06N 3/08 |
| 2020/0005117 A1* | 1/2020 | Yuan | G06F 40/35 |
| 2020/0005133 A1* | 1/2020 | Zhang | G06F 17/10 |
| 2020/0005170 A1* | 1/2020 | Priel | G06F 21/55 |
| 2020/0005191 A1* | 1/2020 | Ganti | G06N 20/00 |
| 2020/0008696 A1* | 1/2020 | Sirendi | A61B 5/7275 |
| 2020/0012917 A1* | 1/2020 | Pham | G06F 18/2411 |
| 2020/0013411 A1* | 1/2020 | Kumar | G10L 17/24 |
| 2020/0014697 A1* | 1/2020 | Karin | G06N 20/00 |
| 2020/0019699 A1* | 1/2020 | Araujo | G06N 3/045 |
| 2020/0019821 A1* | 1/2020 | Baracaldo-Angel | G06F 18/10 |
| 2020/0019852 A1* | 1/2020 | Yoon | G06N 3/088 |
| 2020/0019893 A1* | 1/2020 | Lu | G06N 5/025 |
| 2020/0019938 A1* | 1/2020 | Wang | G06Q 20/123 |
| 2020/0020094 A1* | 1/2020 | Chang | G01N 33/447 |
| 2020/0020179 A1* | 1/2020 | Advani | G06N 20/00 |
| 2020/0021873 A1* | 1/2020 | Swaminathan | H04N 21/466 |
| 2020/0027005 A1* | 1/2020 | Harrison | G06N 5/02 |
| 2020/0027530 A1* | 1/2020 | Boroczky | G16H 10/20 |
| 2020/0027554 A1* | 1/2020 | Boroczky | G16H 30/40 |
| 2020/0027567 A1* | 1/2020 | Xie | G16H 20/10 |
| 2020/0028885 A1* | 1/2020 | Gordon | G06N 5/046 |
| 2020/0035240 A1* | 1/2020 | Will | G06N 5/022 |
| 2020/0035350 A1* | 1/2020 | Sullivan | G06T 11/001 |
| 2020/0042643 A1* | 2/2020 | Carrier | G06N 5/01 |
| 2020/0042702 A1* | 2/2020 | Rubin | G06F 21/56 |

(56) References Cited

U.S. PATENT DOCUMENTS

| | | | |
|---|---|---|---|
| 2020/0042888 A1* | 2/2020 | Yu | G11C 11/161 |
| 2020/0045069 A1* | 2/2020 | Nanda | H04L 63/1425 |
| 2020/0049129 A1* | 2/2020 | Girardot | F03D 7/0224 |
| 2020/0050761 A1* | 2/2020 | Lancioni | G06F 21/566 |
| 2020/0050945 A1* | 2/2020 | Chen | G06F 18/214 |
| 2020/0053155 A1* | 2/2020 | Shi | G06N 5/046 |
| 2020/0057951 A1* | 2/2020 | Soni | G06F 8/34 |
| 2020/0058295 A1* | 2/2020 | Debnath | G10L 15/22 |
| 2020/0065342 A1* | 2/2020 | Panuganty | G06F 16/9535 |
| 2020/0065716 A1* | 2/2020 | Aharonov | G06N 20/00 |
| 2020/0065791 A1* | 2/2020 | Patil | G06V 20/20 |
| 2020/0067851 A1* | 2/2020 | Yigit | H04L 41/16 |
| 2020/0067861 A1* | 2/2020 | Leddy | G06F 21/6245 |
| 2020/0067935 A1* | 2/2020 | Carnes, III | H04L 63/101 |
| 2020/0067969 A1* | 2/2020 | Abbaszadeh | G06N 5/04 |
| 2020/0073475 A1* | 3/2020 | Keane | G06N 20/00 |
| 2020/0073716 A1* | 3/2020 | Kaul | G06F 9/5005 |
| 2020/0073788 A1* | 3/2020 | Saha | G06F 11/3688 |
| 2020/0073882 A1* | 3/2020 | Guggilla | G06N 5/02 |
| 2020/0082270 A1* | 3/2020 | Gu | G06N 3/045 |
| 2020/0082293 A1* | 3/2020 | Sengupta | G06N 3/008 |
| 2020/0085214 A1* | 3/2020 | Patil | G06N 20/00 |
| 2020/0089653 A1* | 3/2020 | Hong | A61B 5/0008 |
| 2020/0089768 A1* | 3/2020 | Kim | G06F 40/42 |
| 2020/0090002 A1* | 3/2020 | Zhu | G06N 3/047 |
| 2020/0090049 A1* | 3/2020 | Aliper | G06N 3/045 |
| 2020/0090382 A1* | 3/2020 | Huang | G06N 3/084 |
| 2020/0092237 A1* | 3/2020 | Sharifi | H04N 21/47217 |
| 2020/0092265 A1* | 3/2020 | Sivakumar | G06N 20/00 |
| 2020/0097582 A1* | 3/2020 | Jedek | G06F 3/0632 |
| 2020/0097587 A1* | 3/2020 | Klein | G06F 16/2462 |
| 2020/0097763 A1* | 3/2020 | Haerterich | G06N 20/00 |
| 2020/0098030 A1* | 3/2020 | Pizza | G06Q 30/0631 |
| 2020/0101616 A1* | 4/2020 | Fan | E04G 21/122 |
| 2020/0104357 A1* | 4/2020 | Bellegarda | G06F 40/232 |
| 2020/0104579 A1* | 4/2020 | Agarwal | G06N 3/084 |
| 2020/0104636 A1* | 4/2020 | Halevi | G06F 18/211 |
| 2020/0104777 A1* | 4/2020 | Bouhini | G06Q 10/063112 |
| 2020/0105418 A1* | 4/2020 | Mei | G16H 50/50 |
| 2020/0107163 A1* | 4/2020 | Li | G06F 18/24137 |
| 2020/0110930 A1* | 4/2020 | Simantov | G06N 20/00 |
| 2020/0111005 A1* | 4/2020 | Ghosh | G06N 3/042 |
| 2020/0111096 A1* | 4/2020 | Liu | H04L 67/55 |
| 2020/0117582 A1* | 4/2020 | Srivastava | G06F 11/3684 |
| 2020/0125695 A1* | 4/2020 | Shao | G06N 3/0418 |
| 2020/0125945 A1* | 4/2020 | Lee | G06N 3/082 |
| 2020/0125978 A1* | 4/2020 | Abbaszadeh | H04L 63/14 |
| 2020/0126215 A1* | 4/2020 | Bronkalla | G16H 30/20 |
| 2020/0128025 A1* | 4/2020 | Sant-Miller | G06N 20/20 |
| 2020/0133970 A1* | 4/2020 | Khabiri | G06N 3/045 |
| 2020/0134390 A1* | 4/2020 | Morimura | G06F 18/295 |
| 2020/0134391 A1* | 4/2020 | Assaderaghi | G06V 10/82 |
| 2020/0134461 A1* | 4/2020 | Chai | G06N 3/084 |
| 2020/0134695 A1* | 4/2020 | Avlani | G06N 5/04 |
| 2020/0135635 A1* | 4/2020 | Chen | H01L 23/53257 |
| 2020/0143045 A1* | 5/2020 | Joye | G06F 21/75 |
| 2020/0143053 A1* | 5/2020 | Gutierrez | G06F 21/554 |
| 2020/0143262 A1* | 5/2020 | Khare | G06N 20/00 |
| 2020/0143266 A1* | 5/2020 | El-Hay | G06N 3/047 |
| 2020/0143274 A1* | 5/2020 | Chitta | G06N 5/048 |
| 2020/0151821 A1* | 5/2020 | Singhal | G06Q 50/01 |
| 2020/0152173 A1* | 5/2020 | Smith | G10L 15/16 |
| 2020/0153964 A1* | 5/2020 | Copeland | G06N 5/046 |
| 2020/0159886 A1* | 5/2020 | ReMine | G06F 30/15 |
| 2020/0159997 A1* | 5/2020 | Wu | G06N 3/047 |
| 2020/0160510 A1* | 5/2020 | Lindemer | G06F 40/216 |
| 2020/0160856 A1* | 5/2020 | Kline | G06F 3/167 |
| 2020/0167427 A1* | 5/2020 | Filoti | G06N 3/08 |
| 2020/0167471 A1* | 5/2020 | Rouhani | G06N 7/01 |
| 2020/0167914 A1* | 5/2020 | Stamatoyannopoulos | G16B 40/30 |
| 2020/0168302 A1* | 5/2020 | Isayev | G06N 3/047 |
| 2020/0175085 A1* | 6/2020 | Haas | G06N 20/00 |
| 2020/0175176 A1* | 6/2020 | Fischer | G06V 10/82 |
| 2020/0175201 A1* | 6/2020 | Kramer | G06F 21/6254 |
| 2020/0175329 A1* | 6/2020 | Malaya | G06V 10/82 |
| 2020/0175478 A1* | 6/2020 | Lee | G06N 20/00 |
| 2020/0184054 A1* | 6/2020 | Storm | G06N 5/04 |
| 2020/0184307 A1* | 6/2020 | Lipka | G06N 3/02 |
| 2020/0184582 A1* | 6/2020 | Fox | G06N 5/02 |
| 2020/0184968 A1* | 6/2020 | Han | H04R 1/323 |
| 2020/0190957 A1* | 6/2020 | Madasu | G06N 20/00 |
| 2020/0193285 A1* | 6/2020 | Ishii | G06N 3/084 |
| 2020/0193607 A1* | 6/2020 | Sun | G06T 7/143 |
| 2020/0195500 A1* | 6/2020 | Kishen | G06F 9/45558 |
| 2020/0195615 A1* | 6/2020 | Pikle | G06F 21/6209 |
| 2020/0202400 A1* | 6/2020 | Seroussi | G06Q 30/0633 |
| 2020/0204572 A1* | 6/2020 | Jeyakumar | H04L 63/123 |
| 2020/0210490 A1* | 7/2020 | Hutchins | G06F 40/30 |
| 2020/0210523 A1* | 7/2020 | Aghajanyan | G06N 3/044 |
| 2020/0210575 A1* | 7/2020 | Huang | G06N 3/084 |
| 2020/0210808 A1* | 7/2020 | Dong | G06N 3/084 |
| 2020/0210924 A1* | 7/2020 | Ghosh | G06N 5/022 |
| 2020/0226748 A1* | 7/2020 | Kaufman | G06V 10/809 |
| 2020/0231466 A1* | 7/2020 | Lu | G01N 33/18 |
| 2020/0244699 A1* | 7/2020 | Hutchinson | H04L 63/1466 |
| 2020/0250780 A1* | 8/2020 | Spangenberg | H04L 9/0643 |
| 2020/0259861 A1* | 8/2020 | Margel | H04L 63/20 |
| 2020/0259865 A1* | 8/2020 | Raff | H04L 43/0876 |
| 2020/0279371 A1* | 9/2020 | Wenzel | G06T 7/0012 |
| 2020/0285939 A1* | 9/2020 | Baker | G06N 3/045 |
| 2020/0285952 A1* | 9/2020 | Liu | G06N 3/08 |
| 2020/0293655 A1* | 9/2020 | Long | G06N 20/00 |
| 2020/0293682 A1* | 9/2020 | Zonouz | G06F 21/52 |
| 2020/0302313 A1* | 9/2020 | Jeong | G10L 15/08 |
| 2020/0311572 A1* | 10/2020 | Baker | G06N 20/00 |
| 2020/0320438 A1* | 10/2020 | Lin | G06N 5/01 |
| 2020/0327443 A1* | 10/2020 | Van Vredendaal | G06F 21/554 |
| 2020/0336507 A1* | 10/2020 | Lee | G06F 21/577 |
| 2020/0344251 A1* | 10/2020 | Jeyakumar | G06F 16/951 |
| 2020/0372154 A1* | 11/2020 | Bacher | H04L 41/145 |
| 2020/0381131 A1* | 12/2020 | Toleti | G16H 40/60 |
| 2020/0396258 A1* | 12/2020 | Jeyakumar | H04L 63/1433 |
| 2020/0396645 A1* | 12/2020 | Grinshpun | H04N 21/44008 |
| 2021/0004682 A1* | 1/2021 | Gong | G06N 3/08 |
| 2021/0027306 A1* | 1/2021 | Somaraju | G06Q 50/01 |
| 2021/0037040 A1* | 2/2021 | Aleks | H04L 63/1433 |
| 2021/0073376 A1* | 3/2021 | Tran | G06N 3/045 |
| 2021/0110045 A1* | 4/2021 | Buesser | G06N 3/088 |
| 2021/0112090 A1* | 4/2021 | Rivera | H04L 63/1441 |
| 2021/0133911 A1* | 5/2021 | Yao | G06N 3/045 |
| 2021/0144174 A1* | 5/2021 | N | G06N 20/00 |
| 2021/0181695 A1* | 6/2021 | Feng | G06N 20/00 |
| 2021/0194924 A1* | 6/2021 | Heinemeyer | G06F 21/577 |
| 2021/0209247 A1* | 7/2021 | Mohassel | A63B 21/023 |
| 2021/0211438 A1* | 7/2021 | Trim | G06N 20/00 |
| 2021/0214875 A1* | 7/2021 | Choi | G06N 3/08 |
| 2021/0232670 A1* | 7/2021 | Kim | G06F 21/32 |
| 2021/0248443 A1* | 8/2021 | Shu | G06F 16/9024 |
| 2021/0250438 A1* | 8/2021 | Lu | G06F 3/0482 |
| 2021/0263493 A1* | 8/2021 | Claussen | G06N 20/00 |
| 2021/0273953 A1* | 9/2021 | Fellows | G06F 21/554 |
| 2021/0273960 A1* | 9/2021 | Humphrey | H04L 63/1425 |
| 2021/0273961 A1* | 9/2021 | Humphrey | H04L 63/1416 |
| 2021/0273967 A1* | 9/2021 | Vela | H04L 63/1466 |
| 2021/0273973 A1* | 9/2021 | Boyer | H04L 63/1416 |
| 2021/0287141 A1* | 9/2021 | Molloy | G06F 18/22 |
| 2021/0304430 A1* | 9/2021 | Vendas Da Costa | G06T 7/70 |
| 2021/0312276 A1* | 10/2021 | Rawat | G06F 18/24143 |
| 2021/0312327 A1* | 10/2021 | Kaneko | G06T 5/00 |
| 2021/0319098 A1* | 10/2021 | Pogorelik | G06N 5/04 |
| 2021/0328969 A1* | 10/2021 | Gaddam | G06F 21/44 |
| 2021/0365114 A1* | 11/2021 | Hewage | G06N 20/00 |
| 2021/0374237 A1* | 12/2021 | Momeni Milajerdi | G06F 21/554 |
| 2021/0383274 A1* | 12/2021 | Takahashi | G06N 3/02 |
| 2021/0397895 A1* | 12/2021 | Sun | G06N 3/045 |
| 2022/0006830 A1* | 1/2022 | Wescoe | H04L 63/1433 |
| 2022/0035961 A1* | 2/2022 | Ziabari | G06N 3/045 |
| 2022/0046031 A1* | 2/2022 | Kaidi | H04L 63/1433 |
| 2022/0046047 A1* | 2/2022 | Lewis | H04L 63/1425 |
| 2022/0050897 A1* | 2/2022 | Gaddam | G06N 3/006 |
| 2022/0069990 A1* | 3/2022 | Ryckman | G01B 1/00 |
| 2022/0092464 A1* | 3/2022 | Wistuba | G06N 20/00 |

(56) References Cited

U.S. PATENT DOCUMENTS

| | | | | |
|---|---|---|---|---|
| 2022/0129712 | A1* | 4/2022 | Sallee | G06N 3/04 |
| 2022/0131904 | A1* | 4/2022 | Wright | H04L 63/102 |
| 2022/0179990 | A1* | 6/2022 | Tran | G06F 21/602 |
| 2022/0201014 | A1* | 6/2022 | Saha | G06N 20/00 |
| 2022/0201042 | A1* | 6/2022 | Crabtree | G06F 16/2477 |
| 2022/0210200 | A1* | 6/2022 | Crabtree | G06F 16/951 |
| 2022/0222238 | A1* | 7/2022 | Herrema, III | H04L 63/14 |
| 2022/0300306 | A1* | 9/2022 | Leung | G06N 5/04 |
| 2022/0300788 | A1* | 9/2022 | Lin | G06N 3/08 |
| 2022/0319072 | A1* | 10/2022 | Yamakawa | G06T 7/0012 |
| 2022/0336415 | A1* | 10/2022 | Tang | H01L 24/32 |
| 2022/0337251 | A1* | 10/2022 | Nalamalpu | H01L 25/18 |
| 2022/0360597 | A1* | 11/2022 | Fellows | H04L 51/212 |
| 2022/0377093 | A1* | 11/2022 | Crabtree | H04L 43/045 |
| 2023/0007042 | A1* | 1/2023 | Haworth | H04L 63/205 |
| 2023/0012220 | A1* | 1/2023 | Humphrey | G06F 21/53 |
| 2023/0028886 | A1* | 1/2023 | Zhang | G06N 20/10 |
| 2023/0054575 | A1* | 2/2023 | Cohen | G07C 5/0808 |
| 2023/0067824 | A1* | 3/2023 | Ichikawa | G06Q 30/0201 |
| 2023/0082782 | A1* | 3/2023 | Reesink | C11C 3/123 525/339 |
| 2023/0095415 | A1* | 3/2023 | Boyer | H04L 63/1408 726/23 |
| 2023/0103447 | A1* | 4/2023 | Subramoney | G06F 9/4406 718/1 |
| 2023/0169176 | A1* | 6/2023 | Lee | G06F 21/577 726/26 |
| 2023/0205891 | A1* | 6/2023 | Yellapragada | H04L 63/1433 726/25 |
| 2023/0208869 | A1* | 6/2023 | Bisht | G06N 5/041 726/23 |
| 2023/0208870 | A1* | 6/2023 | Yellapragada | H04L 63/1433 726/22 |
| 2023/0208871 | A1* | 6/2023 | Yellapragada | G06N 5/046 726/25 |
| 2023/0249847 | A1* | 8/2023 | Haney | B64G 1/36 701/13 |
| 2023/0259658 | A1* | 8/2023 | Munoz Delgado | G06N 3/045 726/22 |
| 2023/0268108 | A1* | 8/2023 | Maat | H02K 3/04 310/208 |
| 2023/0274003 | A1* | 8/2023 | Liu | G06F 21/577 726/26 |
| 2023/0319099 | A1* | 10/2023 | Karimibiuki | G06F 21/566 726/23 |
| 2023/0359455 | A1* | 11/2023 | Jalal | G06F 8/65 |

FOREIGN PATENT DOCUMENTS

| | | | | |
|---|---|---|---|---|
| JP | 2018173890 A | | 11/2018 | |
| WO | WO-2019014487 A1 | * | 1/2019 | G06F 21/554 |
| WO | 2018216379 A1 | | 12/2019 | |

OTHER PUBLICATIONS

Barreno et al "The Security of Machine Learning," Mach Learn, Springer, pp. 1-28 (Year: 2010).*

Papernot et al "Distillation as a Defense to Adversarial Perturbations Against Deep Neural Networks," 37th IEEE Symposium on Security & Privacy, IEEE 2016, San Jose CA, pp. 1-16 (Year: 2016).*

Huang et al "Adversarial Machine Learning," AISec '11, Oct. 21, 2011, pp. 43-57 (Year: 2011).*

Lee et al "Defending Against Machine Learning Model Stealing Attacks Using Deceptive Permutations," May 31, 2018, Pagers 1-10). (Year: 2018).*

Papernot et al "Practical Black-Box Attacks against Machine Learning," ACM, ASIA CCS'17, pp. 1-14, (Year: 2017).*

Lim et al "Accelerating Training of DNN in Distributed Machine Learning System with Shared Memory," IEEE, pp. 1209-1212 (Year: 2017).*

Dhlamini et al "Artificial Intelligence as an Aide in Management of Security Technology," IEEEAfricon2007, Paper 200, pp. 1-5 (Year: 2007).*

Heinl "Artificial (Intelligent) Agents and Active Cyber Defence: Policy Implications," 2014 6th International Conference on Cyber Conflict, pp. 53-66 (Year: 2014).*

Manavi et al "A New Method for Malware Detection Using Opcode Visualization," 2017 Artificial Intelligence and Signal Processing Conference (AISP), pp. 96-102 (Year: 2017).*

Shim et al "Unsupervised Learning in an Ensemble of Spiking Neural Networks Mediated by ITDP," PLOS Computational Biology, pp. 1-41 (Year: 2016).*

Frey et al "A Comparison of Algorithms for Inference and Learning in Probabilistic Graphical Models," IEEE Transactions on Pattern Analysis and Machine Intelligence, vol. 27, No. 9, Sep. 2005, pp. 1392-1416 (Year: 2005).*

Frey et al "A Comparison of Algorithms for Inference and Learning in Probabilistic Graphical Models." IEEE Transactions on Pattern Analysis and Machine Intelligence, pp. 1392-1416 (Year: 2005).*

Ding et al "Inference in Knowware System," Proceedings of the Eighth International Conference on Machine Learning and Cybernetics, pp. 215-220 (Year: 2009).*

Sood et al Artificial Intelligence for Designing User Profiling System for Cloud Computing Security: Experiment, 2015 International Conference on Advances in Computer Engineering and Applications, IEEE, pp. 1-8 (Year: 2015).*

Zhang "Intelligence Computing Methods in Electronic Commerce and Security," 2009 Second International Symposium on Electronic Commerce and Security, IEEE Computer Society, pp. 398-402 (Year: 2009).*

Huang et al "Application of Machine Learning Techniques to Web-Based Intelligent Learning Diagnosis System," IEEE Computer Society, pp. 1-6 (Year: 2004).*

Dimitrakakis et al "Statistical Decision Making for Authentication and Intrusion Detection," IEEE Computer Society, pp. 409-414 ( Year: 2009).*

Minsuk Kahng et al., "GAN Lab: Understanding Complex Deep Generative Models using Interactive Visual Experimentation", arXiv:1809.01587v1, Sep. 5, 2018, URL: https://arxiv.org/abs/1809.01587v1.

Nicolas Papernot et al., "Practical Black-Box Attacks against Machine Learning", arXiv:1602.02697v4, Mar. 19, 2017, URL: https://arxiv.org/abs/1602.02697v4.

International Search Report and Written Opinion for the International Patent Application No. PCT/US2019/028687, mailed Sep. 26, 2019 , 8 pages.

Derk, G.A.F., "Hardening Neural Network Models Against Stealing", Nov. 20, 2018, retrieved from the Internet: URL:https://pure.tue.nl/ws/portalfiles/portal/126148852/0850067_Derks_G.A.F._thesis.

Jutti et al., PRADA: Protecting Against DNN Model Stealing Attacks, arvix.org, Cornell University Library, 201 Olin Library, Cornell University Ithaca, NY 14853, May 7, 2018, https://doi.org/10.48550/arXiv.1805.02628.

Lee et al., "Defending Against Machine Learning Model Stealing Attacks Using Deceptive Perturbations", arvix.org, Cornell University Library, 201 Olin Library, Cornell University Ithaca, NY 14853, May 31, 2018, https://doi.org/10.48550/arXiv.1806.00054.

Supplementary European Search Report dated Sep. 19, 2022, for Application No. EP19907690.2 (nine (9) pages).

Bae et al., "Security and Privacy Issues in Deep Learning," Journal of IEEE Transactions on Artificial Intelligence, 20 pages, (2018).

Partial European Search Report for Application No. 24163021, dated May 16, 2024, 14 pages.

* cited by examiner

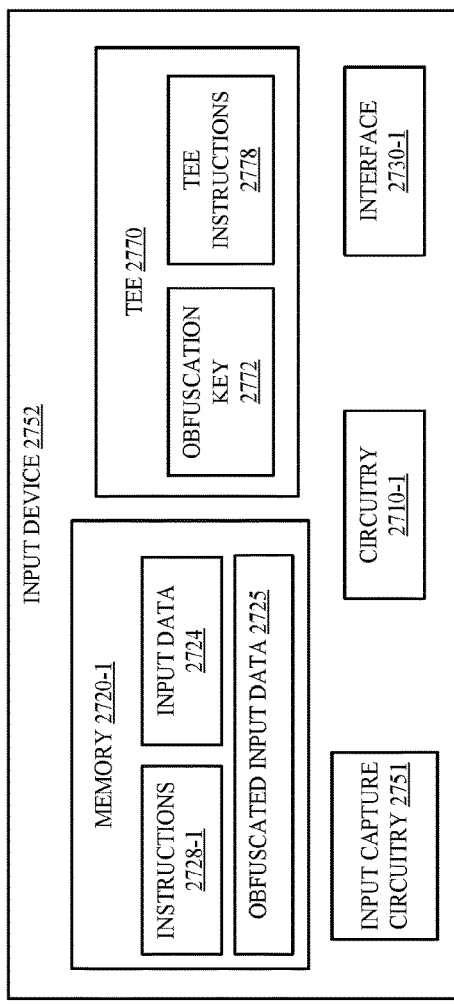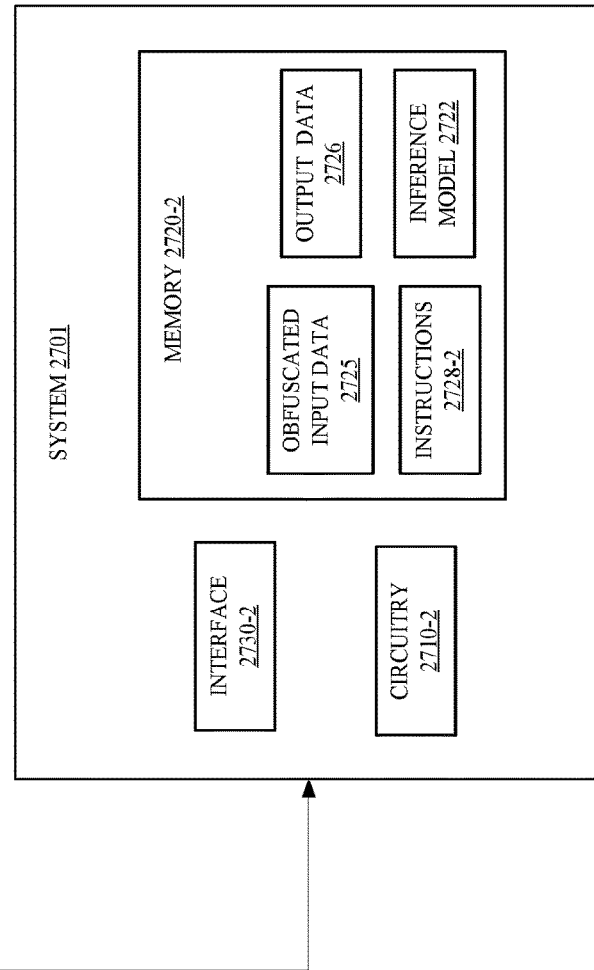
FIG. 27

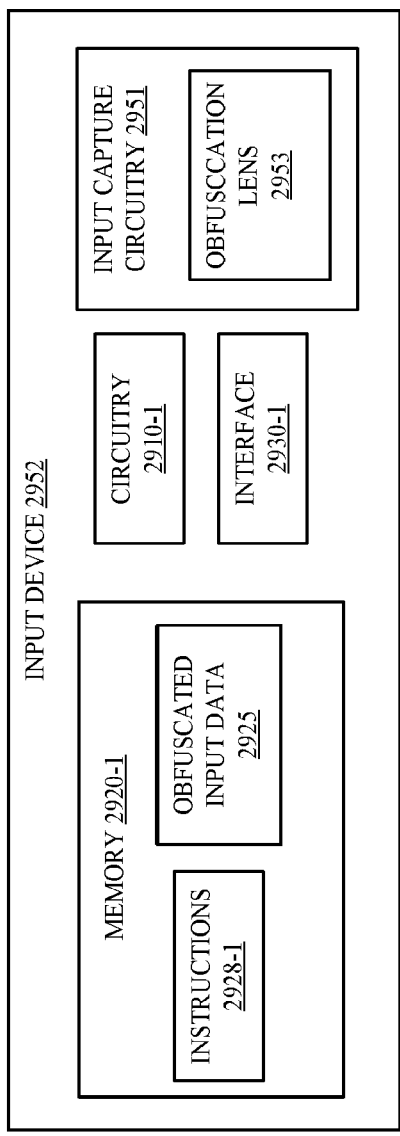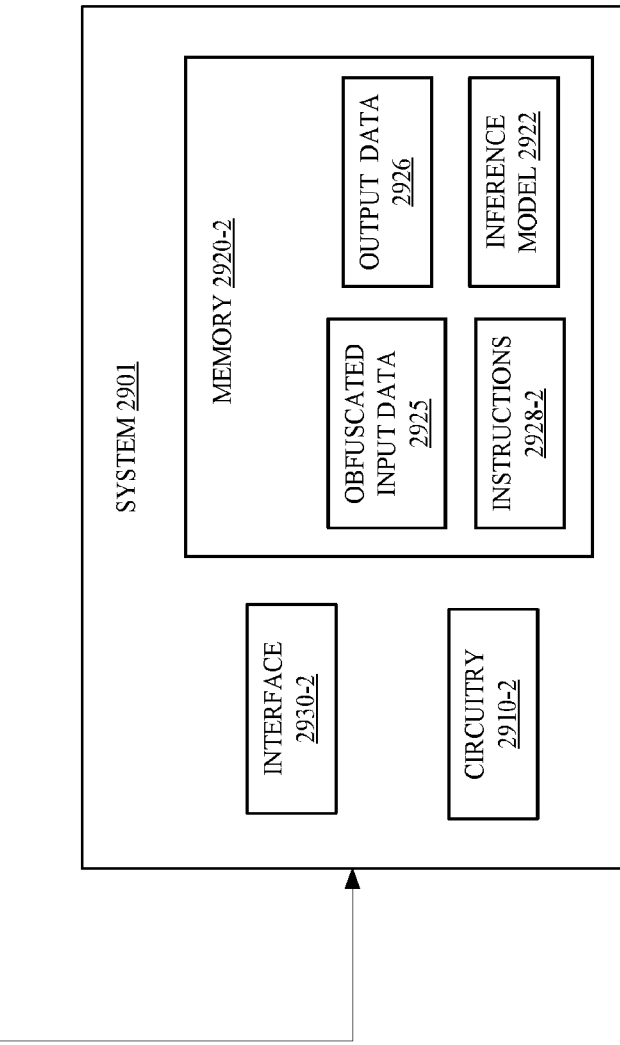
FIG. 29

LOGIC FLOW 4100

RECOVERY TESTING/TRAINING DATA SET 4570
(RECOVERY TR. DATA SET 4572;
RECOVERY TST. DATA SET 4574)

| INPUTS 4461 | EXPECTED OUTPUTS 4465 |
|---|---|
| INPUT VALUE(S) 4463-4 | WILDCARD CLASS 4577 |
| INPUT VALUE(S) 4573-1 | WILDCARD CLASS 4577 |
| INPUT VALUE(S) 4573-2 | WILDCARD CLASS 4577 |
| INPUT VALUE(S) 4573-3 | WILDCARD CLASS 4577 |
| INPUT VALUE(S) 4573-4 | WILDCARD CLASS 4577 |
| ⋮ | ⋮ |
| INPUT VALUE(S) 4573-M | WILDCARD CLASS 4577 |

FIG. 45

SECURING SYSTEMS EMPLOYING ARTIFICIAL INTELLIGENCE

CROSS-REFERENCE TO RELATED APPLICATION

This application is a national stage application claiming the benefit of and priority to International Application No. PCT/US19/28687 entitled "A SECURING SYSTEMS EMPLOYING ARTIFICIAL INTELLIGENCE" filed Apr. 23, 2019, which claims the benefit of and priority to previously filed U.S. Patent Application Ser. No. 62/786,941 filed Dec. 31, 2018, entitled "SECURING SYSTEMS EMPLOYING ARTIFICIAL INTELLIGENCE", which is hereby incorporated by reference in its entirety.

BACKGROUND

Artificial intelligence (AI), also referred to as machine intelligence, refers to devices, systems, or processes, which perceive its environment and take actions to maximize chances of successfully achieving various goals. AI is employed in numerous fields, such as, for example, automotive, industrial, aerospace, military, manufacturing, travel, logistics, human interaction, etc. Furthermore, AI relies of numerous scientific and academic disciplines, such as, for example, mathematical search and optimization, artificial neural networks, statistics, probability, economics, etc.

In general, and at an extremely high level, AI systems can be described as a black box where inputs are provided to the box, the black box makes some inference based on the inputs, and then provides output(s) corresponding to the inference. The output(s) are used to make decisions or determine some course of action. In some applications, the AI system can direct or control actions or behavior. For example, AI systems can be coupled to a device control system, where the controls can be actuated based on output from the AI system. As a specific example, AI systems can be coupled to sensors and/or a camera as well as the braking system in an automobile. Such an AI system could actuate the brakes based on inputs received from the sensors and/or camera and inferences made based on these inputs.

Due to the complex nature of AI systems and their increasing prevalence and use in numerous fields, securing the AI systems, or hardening the AI systems against attacks, is important.

BRIEF DESCRIPTION OF THE DRAWINGS

FIG. 27 illustrates a sixth example inference environment.
FIG. 29 illustrates an eighth example inference environment.
FIG. 45 illustrates a first example recovery training/testing data.

DETAILED DESCRIPTION

Figure 1:
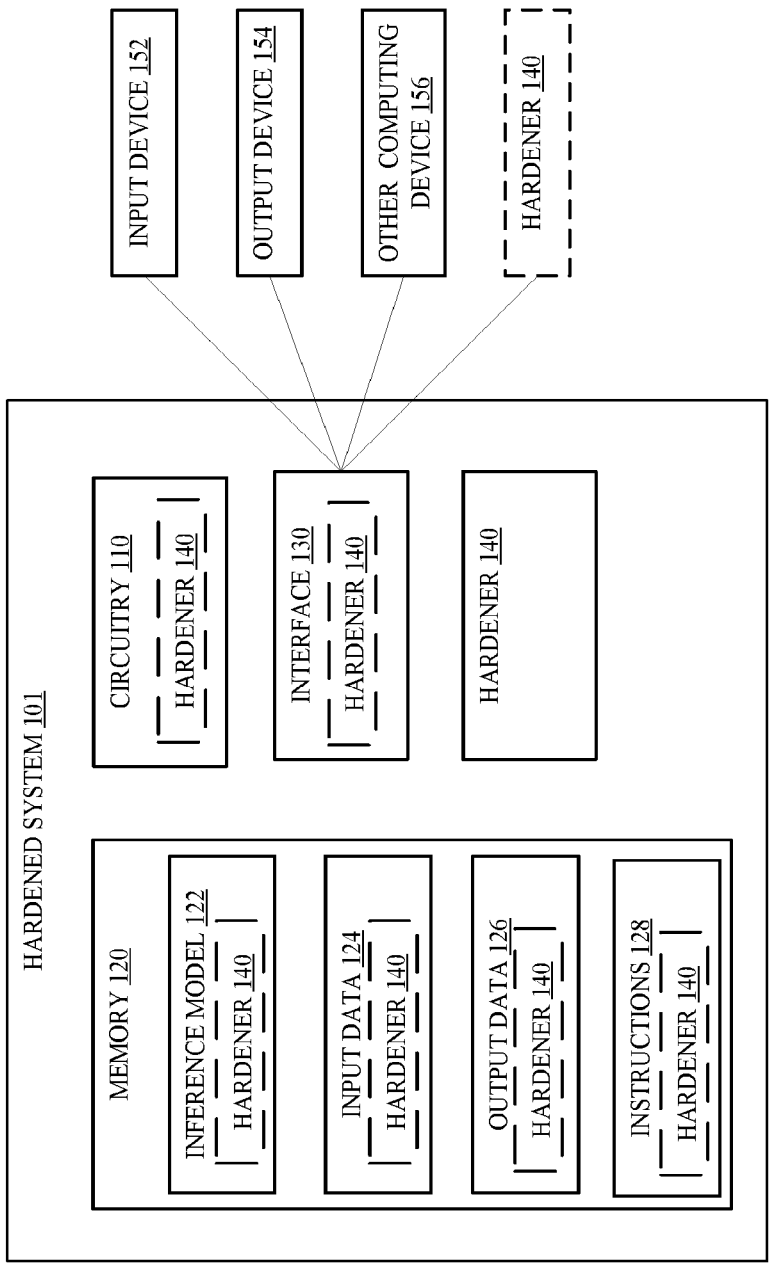
FIG. 1 illustrates a first example inference environment.

Provided herein are techniques and apparatuses to harden AI systems against various attacks. As used herein, the term "harden" is meant to imply methods, systems, apparatus, techniques, or approaches used to reduce in some manner, the areas for attacking AI systems or the susceptibility of AI systems to attacks. The term hardened is not intended to imply that all risk associated with an attack vector is reduced, or that all attacks will be stopped, prevented, detected, or otherwise mitigated against. Instead as used herein a system "hardened" against some attack or attack vector means that the system includes hardware, software, or a combination of hardware and software designed to mitigate against attack(s), not that the attack(s) will be mitigated against in all cases or situations.

The term artificial intelligence (AI) as used in this application is intended to mean a computer implemented system arranged to make inferences based on inputs. It is to be appreciated that the term AI may mean different things in different circles (e.g., academia, industry, consumer, etc.). Use of the term AI herein is not intended to be limiting and is intended to encompass inference engines, expert systems, machine learning models, neural networks, deep learning systems, fuzzy logic engines, or other such systems, models, and engines that can be classified as AI. Often terms grouped under the umbrella AI (e.g., neural network, inference engine, etc.) are used interchangeably herein.

In general, AI can be used to automate learning and discovery through data. Often, AI is used to add "intelligence" to existing products. For example, image recognition and/or classification, pattern recognition, speech recognition, predictive analysis, etc. can be combined with large amounts of data to improve numerous technologies through AI.

AI may progressively learn from data. Said differently, an inference engine or "model" is trained and during the training finds structure and regularities in data so that the model can infer something (e.g., classify, predict, rank, etc.) from unseen or future data. A number of types of models and techniques to train these models exist, for example, feedforward neural networks (FFNN), recurrent neural networks (RNN), convolutional neural networks (CNN), long/short term memory (LSTM) networks, Bayesian belief networks, Boltzmann machines, or the like. An exhaustive discussion of such inference models and their training techniques is not presented here for convenience and clarity. However, the present disclosure can be applied to implement devices that harden such AI systems, independent of the model underlying the AI system.

As noted, AI can be implemented in a number of fields. For example, in the health care field, AI can be implemented to provide personalized diagnosis, X-ray readings, cancer screening, etc. As another example, in the retail field, AI can be implemented to provide personalized shopping recommendations or discuss purchase options with the consumer. As a further example, in the manufacturing field, AI can forecast expected load or demand on a factory, classify parts for a pick-and-place system, or the like. These are just a few of the many industries in which AI can be implemented.

As introduced above, AI systems can be vulnerable to various attacks. For example, the AI system (e.g., black box) could be recreated or cloned. AI systems are vulnerable to probing type attacks. The inputs to AI systems are not always controlled, and thus may be adversarial or compromised. As AI systems are highly opaque, operators and users of the AI systems may be subject to risk by not having visibility to how the AI system operates, how it was trained, the training dataset, etc. These are just a few examples of attack vectors or attack vulnerabilities of AI systems.

The present disclosure provides a number of systems and methods to harden AI systems against some or all of these attack vectors. It is noted that the present disclosure does not attempt to describe all possible AI attack vectors neither does the present disclosure attempt to provide a mapping between the systems and methods discussed herein and an exhaustive list of AI attack vectors with which a respective system or technique may mitigate against. However, numerous examples of such attack vectors and systems and methods to mitigate risk associated with those attack vectors are provided to present a description suitable for one of ordinary skill in the art to understand.

The present disclosure is loosely organized into sections where sections may discuss a number of systems and methods to mitigate AI system vulnerability to a type of attack or related attack vectors. However, it is noted that concepts described in one section may be applied to mitigate against attacks along different attack vectors than used in the examples. Specifically, systems and methods described in one section or with respect to one type of attack may be used to mitigate attacks of another type, such as, one described in a different section.

Prior to a detailed description of the systems and methods contemplated herein, an overview of a system hardened against various AI attack vectors, as may be implemented according to the present disclosure is provided.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is generally conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that these and similar terms are to be associated with the appropriate physical quantities and are merely convenient labels applied to those quantities. Furthermore, various systems, computing environments, apparatuses, specially designed computing devices, or circuitry are described arranged to perform these manipulations.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form to facilitate a description thereof. The intention is to cover all modification, equivalents, and alternatives within the scope of the claims.

FIG. 1 illustrates an inference environment 100 including a hardened system 101, which may be implemented according to the present disclosure. Hardened system 101 can be embodied by any number or type of computing systems, such as a server, a workstation, a laptop, a virtualized computing system, an edge computing device, or the like. Additionally, hardened system 101 may be an embedded system such as a deep learning accelerator card, a processor with deep learning acceleration, a neural compute stick, or the like. In some implementations, the hardened system 101 comprises a System on a Chip (SoC), while in other implementations, the hardened system 101 includes a printed circuit board or a chip package with two or more discrete components. Furthermore, hardened system 101 can employ any of a variety of types of "models" arranged to infer some result, classification, or characteristic based on inputs.

The hardened system 101 includes circuitry 110 and memory 120. The memory 120 stores inference model 122, input data 124, output data 126 and instructions 128. During operation, circuitry 110 can execute instructions 128 and/or inference model 122 to generate output data 126 from input data 124. Sometimes output data 126 may be generated from input data 124 as described herein. For example, input data 124 may include training data, and circuitry 110 may execute instructions 128 to generate "trained" inference model 122 as output data 126 based on the input data 124. For example, input data may include a plurality of pictures labeled as including cats or not including cats. In such examples, the plurality of pictures can be used to generate an inference model that can infer whether or not a picture includes cats, and the trained inference model can be provided as output data 122. In many such examples, circuitry 110 may execute instructions 128 and inference model 122 to classify input data 124 and provide the classification of the input data 124 as output data 126. For example, input data 124 may include a picture and the output data 126 may include indications of a classification of the picture (e.g., a cat, a dog, etc.) In various such examples, input data 124 may include testing data set (e.g., pictures and their classification), and circuitry 110 may execute instructions 128 to evaluate performance of the inference model 122 with the testing data set and provide an indication of the evaluation as output data 126. These and various other aspects of executing instructions 128 and/or inference model 122 to generate output data 126 from input data 124 will be discussed in greater detail, such as in conjunction with the examples below.

Hardened system 101 can also include an interface 130. Interface 130 can couple to one or more devices in inference environment 100, such as devices external to hardened system 101. For example, input device 152, output device 154, other computing device 156 are shown. In general, interface 130 can include a hardware interface or controller arranged to couple to an interconnect (e.g., wired, wireless, or the like) to couple the hardened system 101 to another device or system. For example, the interface 130 can comprise circuitry arranged to transmit and/or receive information elements via the interconnect and to communicate and/or receive information elements (e.g. including data, control signals, or the like) between other devices (e.g., input device 152, output device 154, other computing device 156, etc.) also coupled to the interconnect. In some examples, interface 130 can be arranged to couple to an interface compliant with any of a variety of standards. In some examples, interface 130 can be arranged to couple to an Ethernet interconnect, a cellular interconnect, a universal serial bus (USB) interconnect, a peripheral component interconnect (PCI), or the like. In some examples, inference system 100 can include multiple interfaces, for example, to couple to different devices over different interconnects.

In general, input device 152 can be any device arranged to provide signals, as inputs, to hardened system 101. With some examples, input device 152 could be any number and type of devices or sensors. During operation, circuitry 110 can execute instructions 128 to receive signals from these sensors via interface 130. Circuitry 110, in executing instructions 128 could store the received signals as input data 124. Alternatively, circuitry 110, in executing instructions 128 could generate input data 124 based on the signals (e.g., by applying some processing to the raw signals received from the sensors via the interface 130). As another example, circuitry 110 can execute instructions 128 to receive information elements from other computing device 156 including indications of input data 124. With some examples, any one or more of input device 152, output device 154 and/or other computing device 156 could be packaged with hardened system 101. Examples are not limited in this context.

Hardened system 101 further includes hardener 140. In general, hardener 140 can comprise hardware, software, and/or a combination thereof arranged to mitigate or "harden" against an attack vector or attack vectors that could be used to target the hardened system 101. Numerous examples of hardeners 140 are given in the examples below. It is noted here, however, that hardener 140 is depicted embodied as a standalone hardware, software, and/or combination hardware software element of hardened system 101. Alternatively, hardener 140 could be embodied within any one of more of the elements of hardened system 101, or inference environment 100. For example, circuitry 110, memory 120, interface 130, inference model 122, input data 124, output data 126, and/or instructions 128 could include hardener 140. As a further example, hardener 140 could encompass hardened system 101 or could be separate and distinct from hardened system 101. For example, hardener could be coupled to interface 140, or part of another device, such as, input device 152.

As introduced above, the present disclosure provides apparatuses and methods arranged to mitigate or reduce attack vectors against systems employing AI, such as the system 101 including inference model 122. Hardener 140 is thus arranged and positioned within inference environment 100 to mitigate or reduce these attack vectors. For example, hardener 140 could be arranged to mitigate against attack vectors generally referred to as model theft. Model theft is theft of the inference model 122 itself (e.g., extraction, cloning, reverse engineering, model inversion, etc.). Hardener 140 could be arranged to mitigate against model cloning, operation of an extracted model, model inversion, or reverse engineering. For example, hardener 140 could be arranged to mitigate against probing attacks attempting to retrieve information about the training data. As another example, hardener 140 could be arranged to mitigate against attack vectors generally referred to as adversarial inputs. Adversarial inputs are inputs designed to "fool" an inference system or trigger a specific inference based on the input. Hardener 140 could be arranged to mitigate against input probing attacks, input distortion, input redaction, or the like. With some examples, hardener 140 could be arranged to increase input data trust, validity, or correlations (e.g., based on one or more input device characteristics). Hardener 140 could be arranged to sanitize input data or to authenticate input devices. As another example, hardener 140 could be arranged to mitigate against privacy leakage or exposure. For example, it is to be appreciated that all outputs (e.g., correct inference, incorrect inference, high probability inferences, low probability inferences, number of classifiers, etc.) may be used by an adversarial party to glean useful information about the model and/or training data. Numerous examples of systems hardened against such attacks, as well as other types of attacks are detailed below.

In general, circuitry 110 is representative of hardware, such as a conventional central processing unit (CPU), an application specific integrated circuit (ASIC), a field programmable gate array (FPGA), or other logic. For example, circuitry 110 can implement a graphics processing unit (GPU) or accelerator logic. As a specific example, circuitry 110 can be the Tensor processing Unit® by Google®, the Nervana NNP® (Neural Network Processor) by Intel®, the Myriad 2® processor by Movidius, the EyeQ® processor by Mobileeye®. In some examples, circuitry 110 can be a processor with multiple cores where one or more of the cores are arranged to process AI instructions. For example, the Snapdragon 845® processor by Qualcomm® or the A11/A12 Bionic SoC® by Apple®. These examples are provided for purposes of clarity and convenience and not for limitation.

Circuitry 110 can include an instruction set (not shown) or can comply with any number of instruction set architectures, such as, for example, the x86 architecture or the ARM architecture. This instruction set can be a 32-bit instruction set, a 64-bit instruction set, etc. Additionally, the instructions set can use low precision arithmetic, such as, half-precision, bflaot16 floating-point format, or the like. Examples are not limited in this context.

Memory 120 can be based on any of a wide variety of information storage technologies. For example, memory 120 can be based on volatile technologies requiring the uninterrupted provision of electric power or non-volatile technologies that do not require and possibly including technologies entailing the use of machine-readable storage media that may or may not be removable. Thus, each of these storages may include any of a wide variety of types (or combination of types) of storage devices, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array).

Figure 2:
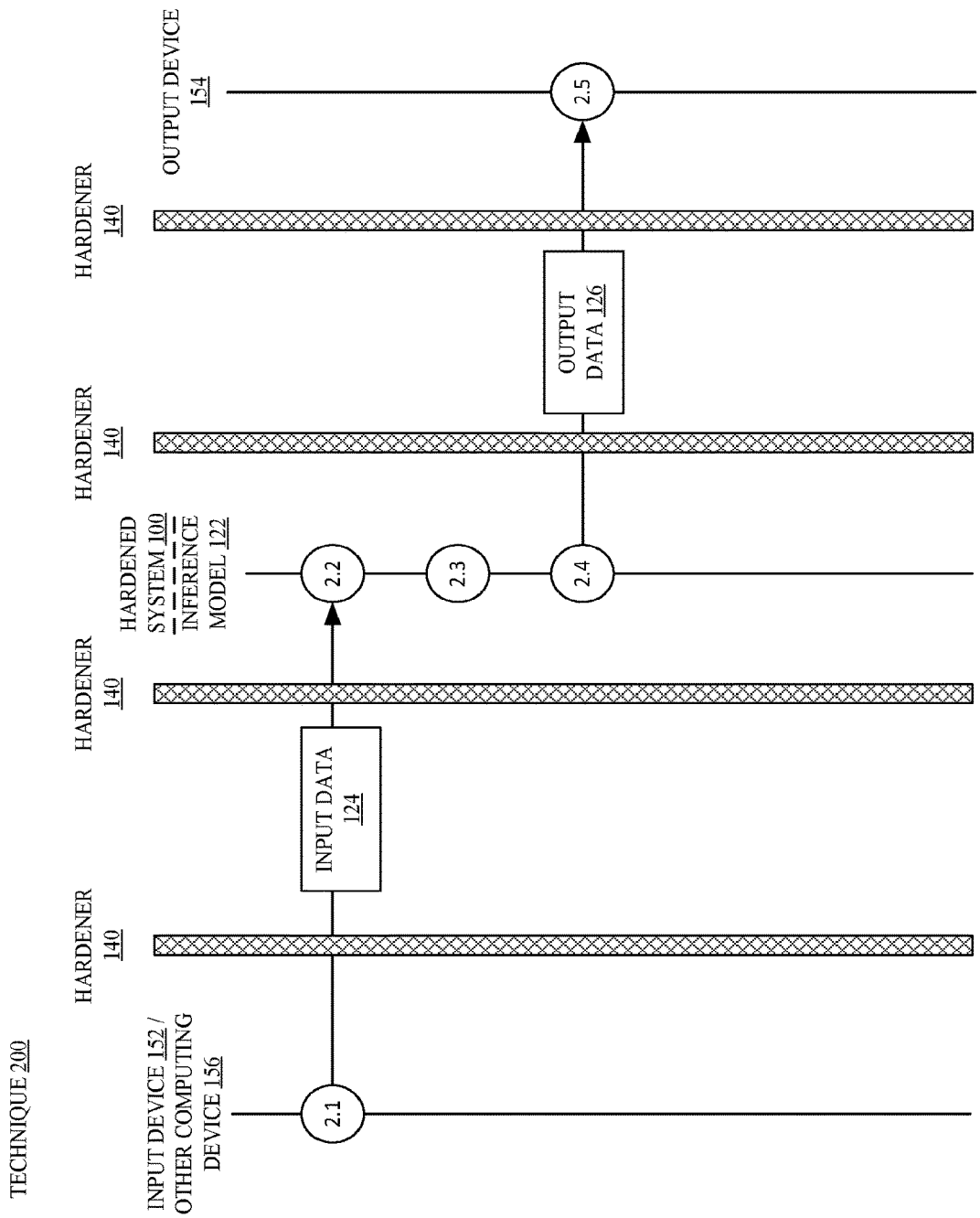
FIG. 2 illustrates a first example technique.

FIG. 2 illustrates an example technique 200 that may be implemented in an inference environment, such as by hardened system 101 of the inference environment 100 described above. It is noted the technique 200 is described with reference to the inference environment 100 of FIG. 1 for convenience and clarity. However, this is not intended to be limiting.

Technique 200 can begin at circle 2.1. At circle 2.1, input device 152 and/or other computing device 156 can convey input data 124 to hardened system 101. At circle 2.2, hardened system 101 can receive input data 124. For example, input data 124 can be conveyed via interface 130. With some examples, hardener 140 can be coupled to input device 152, other computing device 156, or inference model 122 and arranged to harden inference model 122 against attack vectors. For example, hardener 140 could be arranged to sanitize input data 124. As another example, hardener 140 could be arranged to validate input device 152. As a further example, hardener 140 could be arranged to transform input data 124. These and other examples are described in greater detail below.

Technique 200 can continue to circle 2.3. At circle 2.3, inference model 122 can execute or operate upon input data 124 to make some inference or generate output data 126. With some examples, hardener 140 can be coupled to inference model 122. For example, inference model 122 could include a number of hidden classes arranged to identify probing attacks. As another example, inference model 122 could be encrypted or could include activation functions arranged to operate upon encrypted data. As another example, inference model 122 could be segmented or partitioned such that different computing entities could execute different portions of inference model 122. Still, as a further example, inference model 122 could be arranged with a number of hidden classes to provide model identification for purposes of digital rights management, to provide indications of probing attacks, or the like. These and other examples are described in greater detail below.

Technique 200 can continue to circle 2.4. At circle 2.4, hardened system 101 can output data 126, for example hardened system 100 can convey output data 126 to output device 154 (and/or other computing device 156). In some examples, output data 126 may include an inference regarding the input data 124, such as a classification of the input data 124. At circle 2.5, output device 154 can receive output data 126. For example, output data 126 can be conveyed via interface 130. With some examples, hardener 140 can be coupled to the output of hardened system 101 or to output device 154 to harden against attack vectors. For example, hardener 140 could be arranged to prune output data 124. This and other examples are described in greater detail below.

Figure 3:
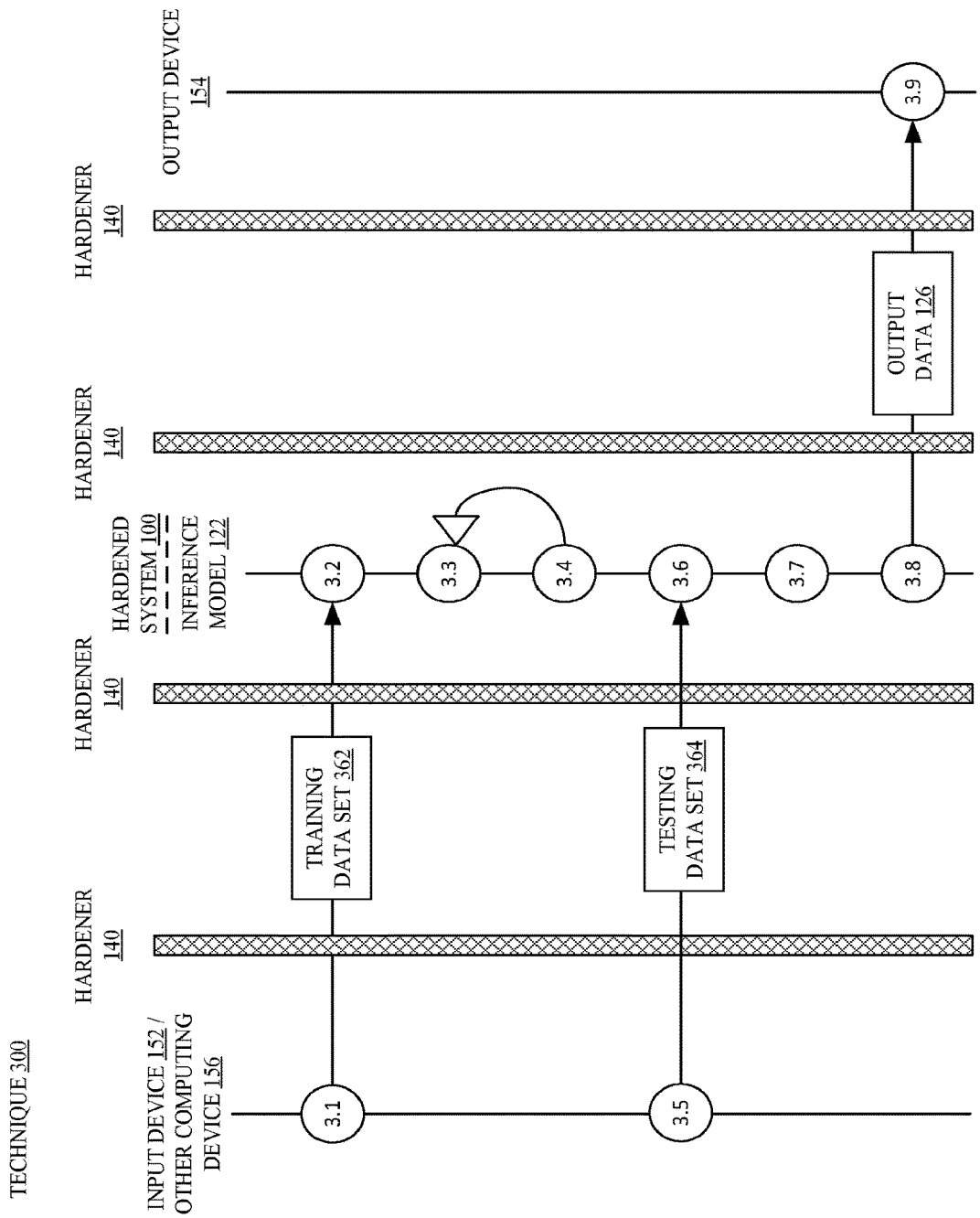
FIG. 3 illustrates a second example technique.

FIG. 3 illustrates an example training/testing technique 300 that may be implemented in an inference environment, such as by hardened system 101 of the inference environment 100 to train an inference model (e.g., inference model 122, or the like). It is noted the technique 300 is described with reference to the inference environment 100 of FIG. 1 for convenience and clarity. However, this is not intended to be limiting. In general, inference models are trained by an repeating process. Some examples of inference model training are given herein. However, it is noted that numerous examples provided herein can be implemented to harden inference environments against attack, independent of the algorithm used to train the inference model.

Technique 300 can begin at circle 3.1. At circle 3.1, input device 152 and/or other computing device 156 can convey training data set 362 to hardened system 101. At circle 3.2, hardened system 101 can receive training data set 362. For example, training data set 362 can be conveyed via interface 130. With some examples, hardener 140 can be coupled to input device 152, other computing device 156, or inference model 122 and arranged to harden attack vectors. For example, hardener 140 could be arranged to add adversarial attack inputs and associated output such that inference model 122 may be trained to identify adversarial attacks during operation. This and other examples are described in greater detail below.

Technique 300 can continue to circle 3.3. At circle 3.3, inference model 122 can execute or operate upon input data 124 from the training data set 362 to make some inference or generate output data. At circle 3.4 inference model 122 can be adjusted based on the output generated at circle 3.3 from input data of the training data set 362 and the corresponding desired output of the training data set 362. For example, inference model weights, connections, layers, etc. can be adjusted at circle 3.4. Often, circles 3.3 and 3.4 are interactively repeated until inference model 122 converges upon an acceptable success rate (often referred to as reaching a minimum error condition). Determination of whether inference model 122 converges on an acceptable success rate can be made based on a comparison to a threshold (e.g., greater than a threshold, greater than or equal to a threshold, or the like). In some examples, the trained inference model may be provided as output data 126. With some examples, hardener 140 can be coupled to inference model 122. For example, inference model 122 could include a roll-back feature to undo adjustments made at circle 3.4 based on malicious input data infecting the training data set 362. This and other examples are described in greater detail below.

Once inference model 122 is trained, inference model 122 can be tested. At circle 3.5, input device 152 and/or other computing device 156 can convey testing data set 364 to hardened system 101. At circle 3.6, hardened system 101 can receive testing data set 364. For example, testing data set 362 can be conveyed via interface 130. At circle 3.7, inference model 122 can execute or operate upon input data of the testing data set 364 to make some inference or generate output data 126. At circle 3.8, hardened system 101 can convey output data 126, for example to output device 154 (and/or other computing device 156). At circle 3.9, output device 154 can receive output data 126 and can compare output data 126 with desired output data from the testing data set 324 to determine how well the inference model 122 infers or generates correct output. In some examples, results of the testing may be provided as output data 126. It is noted, that often the input device 152 and output device 154 may be the same during training and testing of an inference model. With some examples, hardener 140 can be coupled to inference model 122. For example, inference model 122 could be associated with the training data set 362 in a trusted manner to later attest to the training of inference model 122 with training data set 362. This and other examples are described in greater detail below.

The description now turns to providing numerous examples of hardened inference systems and specific examples of attack vectors that can be mitigated by such systems. The examples are loosely organized into sections based on related attack vectors. Examples that can be implemented to mitigate against attack vectors related to model theft (or IP theft) are grouped together in Section 1. Examples that can be implemented to mitigate against attack vectors related to adversarial inputs are grouped together in Section II. Examples that can be implemented to provide data trust are grouped together in Section III. Examples that can be implemented to provide enhanced inference model training are grouped together in Section IV.

Examples that can be implemented to provide enhanced privacy features for an inference model are grouped together in Section V. Lastly, Section VI provides examples that can be implemented to mitigate against attack vectors generally. It is noted, however, that although an example may be described in one section related to a type or grouping of attack vectors, that examples can be implemented to mitigate against other attack vectors discussed in other sections.

Furthermore, multiple examples can be combined to provide hardened systems to mitigate against multiple types of attack vectors. Examples are not limited in this context.

Section I—Inference Model Theft.

Output Trimming to Mitigate Model Re-Creation Via Probing

Figures 4, 5:
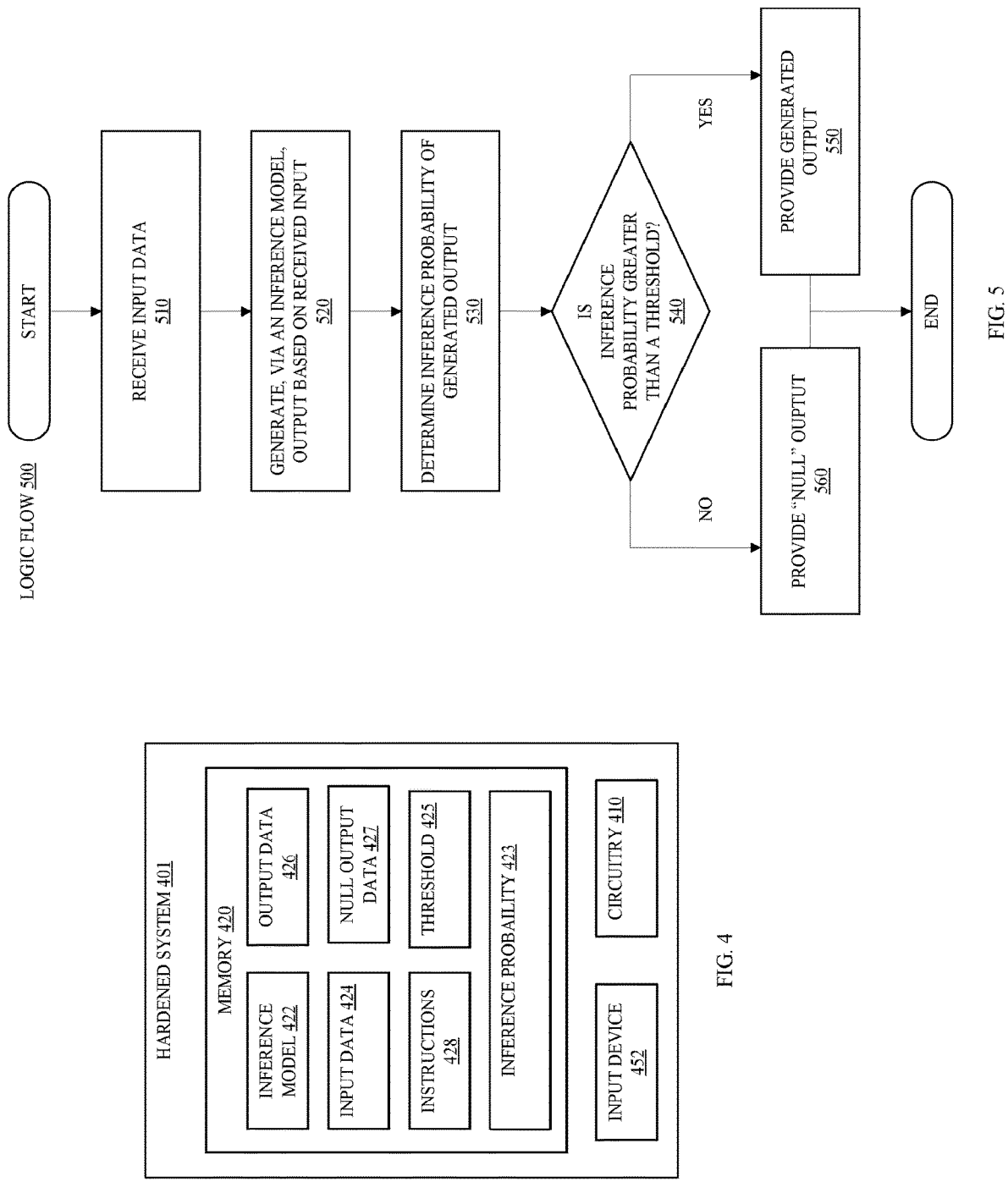
FIG. 4 illustrates a first example of a hardened system.
FIG. 5 illustrates a first example of a logic flow.

FIG. 4 illustrates an example hardened system 401, which may be implemented according to the present disclosure. The hardened system 401 includes circuitry 410, memory 420 and input device 452. The memory 420 stores inference model 422, input data 424, output data 426, instructions 428, inference probability 423, threshold 425, and null output data 427. During operation, circuitry 410 can execute instructions 428 and/or inference model 422 to generate output data 426 from input data 424.

A common attack against inference systems is repeated query of the inference system, often referred to as "probing." During probing, an attacker runs multiple queries against the system to attempt to learn system behavior, such as, for example, classification categories. As a specific example, an inference system arranged to classify images can be repeatedly queried to identify the types of categories with which the inference system is trained to classify images. The present disclosure provides hardened system 401 arranged to trim or mask the output where an inference probability is below a threshold level.

For example, during operation circuitry 410 can execute instructions 428 to receive input data 424. Circuitry 410 can execute inference model 422 to generate output data 426 from input data 424. Circuitry 410 can execute instructions 428 to determine whether the output 426 has an inference probability 423 above threshold 425. Said differently, circuitry 410 can execute instructions 428 to determine whether a probability that output 426 is correct is greater than a threshold level. In general, the threshold 425 can be any value significant enough to discourage probing, for example, 80% correct, 85% correct, 90% correct, 95% correct, 99% correct, etc. With some examples, threshold 425 can be calculated dynamically (e.g., based on query source, probability of attack, query frequency, frequency of query from the same source or like sources, etc.). In other examples, threshold 425 can be set statically, for example, at model creation, during or before operation by a model owner or authorized administrator.

Circuitry 410 can execute instructions 428 to provide output data 426 where the determined inference probability 423 is greater than threshold 425 and provide null output data 427 where the determined inference probability 423 is greater than threshold 425. With some example, null output data 427 can be "none" (e.g., in the case of a classification system).

FIG. 5 illustrates a logic flow 500. The logic flow 500 may be representative of some or all the operations executed by one or more devices described herein. For example, hardened system 401 (or components thereof) may perform the operations in logic flow 500 to trim the output from an inference system to discourage probing.

Logic flow 500 may begin at block 510 "receive input data" the system 401 can receive input data 424. For example, hardened system 401 can receive input data 424 from input device 452. Continuing to block 520 "generate, via an inference model, output based on the received input" the system 401 can generate, via inference model 422, output data 426 from input data 424. For example, circuitry 410 can execute inference model 422 to generate output data 426 from input data 424. Continuing to block 530 "determine inference probability of generated output" the system 401 can determine an inference probability of the generated output. For example, circuitry 410 can execute instructions 428 to determine inference probability 423 of output data 426.

Continuing to decision block 540 "is inference probability greater than a threshold?" the system 401 can determine whether the inference probability determined at block 530 is greater than a threshold level. For example, circuitry 410 can execute instructions 428 to determine whether inference probability 423 is greater than threshold 425. From block 540, logic flow 500 can continue to either block 550 or 560. Logic flow 500 can continue from block 540 to block 550 based on a determination that inference probability 423 is greater than threshold 425, while logic flow 500 can continue from block 540 to block 560 based on a determination that inference probability 423 is not greater than threshold 425.

At block 550 "provide generated output" system 401 can provide the output generated at block 520. For example, circuitry 410 can execute instructions 428 to provide output data 426 (e.g., to an output device, to another computing device, or the like). At block 560 "provide null output" system 401 can provide null output data. For example, circuitry 410 can execute instructions 428 to provide null output data 427 (e.g., to an output device, to another computing device, or the like).

Secure Marking for Model Digital Rights Management

Figure 6:
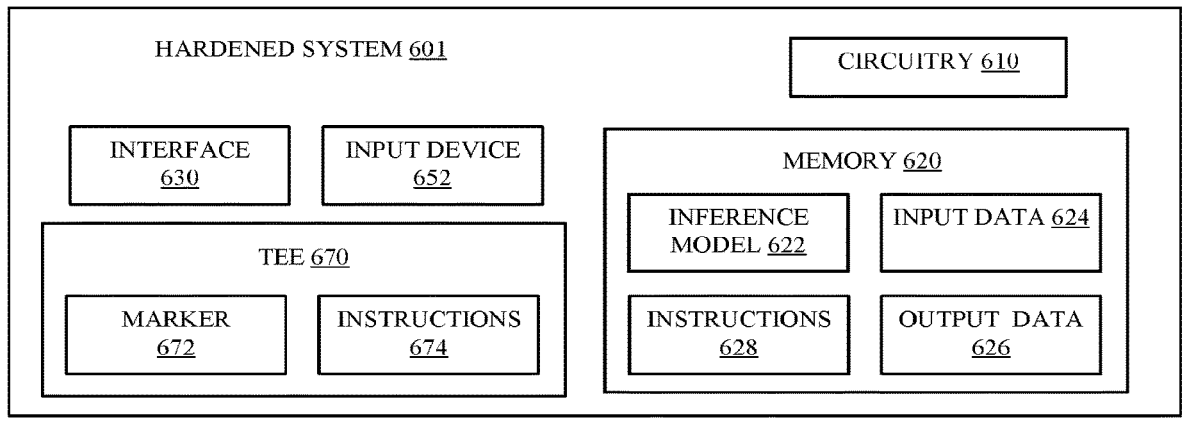
FIG. 6 illustrates a second example of a hardened system.

FIG. 6 illustrates an example hardened system 601, which may be implemented according to the present disclosure. The hardened system 601 includes circuitry 610, memory 620, interface 630, input device 652 and a trusted execution environment (TEE) 670. The memory 620 stores inference model 622, input data 624, output data 626 and instructions 628. The TEE 670 stores marker 672 and instructions 674. In general, TEE 670 can be any trusted execution enclave or partition within system 601. For example, TEE 670 can be a trusted execution partition within circuitry 610. As another example, TEE 670 can include its own circuitry and memory (not shown) segmented from circuitry 610 and memory 620 in a trusted manner. Generally, TEE 670 may provide security features such as isolated execution (e.g., of instructions 674) along with confidentiality of marker 672.

For example, TEE 670 may comprise circuitry and/or storage securely arranged to execute instructions to implement functions described herein. A TEE as used herein can comprise any number of secure execution partitions (e.g., Software Guard Extension (SGX), Intel®Manageability engine (IME), Innovation Engine (IE), Secure Enclave by Apple®, TrustZone, or the like). It is noted, that a TEE may execute instructions stored within memory (secure memory that is part of the TEE, or other memory). These instructions can comprise computer executable instructions, operative on the circuitry or processing component(s) of the TEE to cause the TEE to perform the techniques described herein. It is important to note, the TEE may be incorporated into larger circuitry (e.g., processor, a SoC, or the like) and provided as part of the devices described herein.

It is to be appreciated that trained inference models (e.g., inference model 622) is a highly valuable intellectual property asset, which might be stolen by an adversarial third party and used in other products (such as competitor products) in uncontrollable way. As such, the ability to detect inappropriate use of the inference model is desirable. Some approaches detailed herein, may use so called "backdoor classes" to support detection of model usage. For example, inference models are trained with a hidden class, which can be inferred or output when an appropriate query is sent to the system. This query and the corresponding hidden class output can be used by an owner of the inference model to detect unauthorized use. However, use of hidden classes like this is still prone to the native inaccuracies, so that in some cases, the hidden class could be misclassified. Furthermore, adding hidden classes to an inference system (e.g., training the inference system with a hidden class) may lead to performance degradation as well as higher cost of the training process. Additionally, this method is not scalable as adding new hidden classes will decrease the model capacity.

The present disclosure provides system 601 with marker 672, which can be used to match an incoming query to determine unauthorized usage. It is noted, that marker 472 is encrypted and stored in a secure manner, for example via TEE 670. Thus, marker 672 can be used as a watermark or digital rights management token. During operation, TEE 670 can execute instructions 674 to match input data 624 with marker 672. With some examples, instructions 674 within TEE 670 can be implemented by a bit-wise comparator. As such, during operation, TEE 670 can apply a bit-wise comparison of marker 672 with input data 624 to determine whether input data 624 matches marker 672. In some examples, TEE 670 can execute instruction 674 to determine (e.g., via a bit-wise comparison, or the like) whether portions of input data 624 match marker 672. As a specific example, TEE 670, in executing instructions 674 can compare selected bits (e.g., bits x to y, where x and y are integers and x is greater than or equal to 1 and y is greater than x) of input data 624 to marker 672. That is, the "marker" could be inserted anywhere within input data 624. Thus, during operation TEE 670 could be configured to look to that specific location (e.g., specific range of bits, or the like) within input data 624 and determine whether that location matches marker 672.

Where a match between input data 624 and marker 672 is not determined, TEE 670, in executing instructions 674 can output an indication (e.g., via output data 626, or the like) of unauthorized inference model 622 usage. Where a match is found, the inference model 622 can be used as normal. It is important to note, that the system 601 is robust and scalable. Furthermore, the system 601 can be modified in the future (e.g., by updating marker 674, or the like). In some examples, the marker 674 can be pre-loaded (e.g., a manufacturing, or the like). The marker 674 could be stored, for example, in e-prom in TEE 670, or encoded by one-time fuses.

Figure 7:
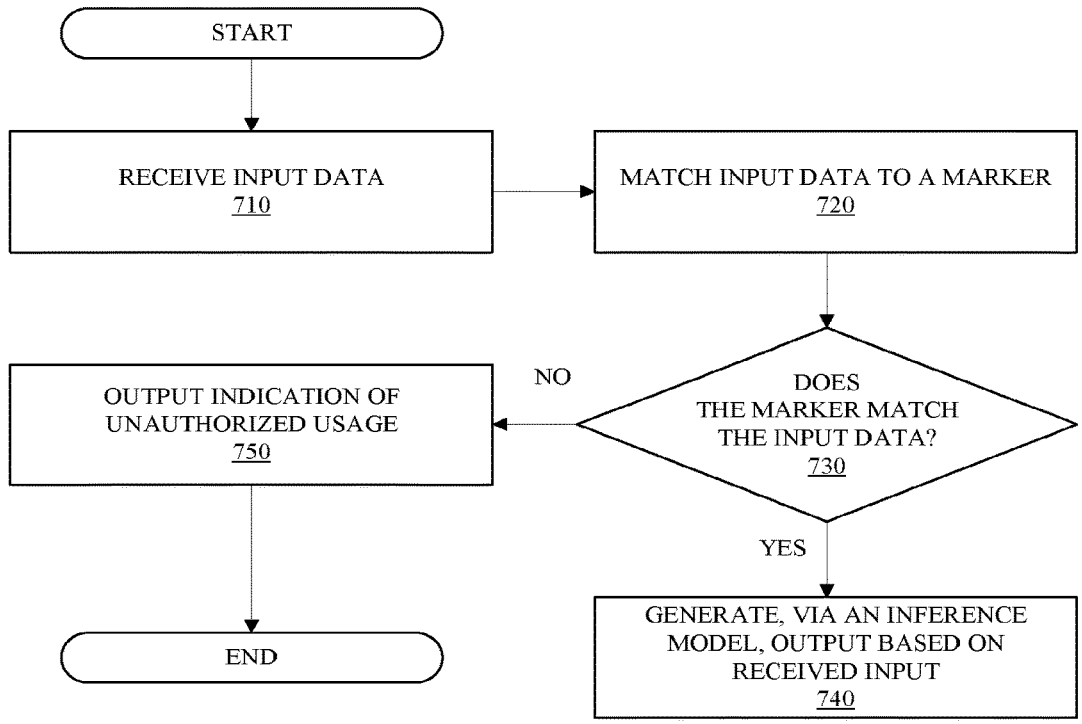
FIG. 7 illustrates a second example of a logic flow.

FIG. 7 illustrates of a logic flow 700. The logic flow 700 may be representative of some or all the operations executed by one or more devices described herein. For example, hardened system 601 (or components thereof) may perform the operations in logic flow 700 to detect unauthorized usage of an inference model.

Logic flow 700 may begin at block 710 "receive input data" the system 601 can receive input data 624. For example, hardened system 601 can receive input data 624 from input device 652. Continuing to block 720 "match input data to marker" the system 601 can match the received input data to a marker. For example, TEE 670 can execute instructions 674 to match input data 624 to marker 672.

Continuing to decision block 730 "does the marker match the input?" the system 601 can determine whether the marker matches the input. For example, circuitry 610 can execute instructions 628 to determine whether TEE 670 indicates marker 674 matched input data 624. From block 730, logic flow 700 can continue to either block 740 or 750. Logic flow 700 can continue from block 730 to block 740 based on a determination that the marker 674 does not match the input data 624, while logic flow 700 can continue from block 730 to block 750 based on a determination that the marker 674 does match the input data 624.

At block 740 "generate, via an inference model, output based on the received input" the system 601 can generate, via inference model 622, output data 626 from input data 624. For example, circuitry 610 can execute inference model 622 to generate output data 626 from input data 624. At block 750 "output indication of unauthorized usage" the system 601 can output an indication of unauthorized usage of the inference model 622. Said differently, system 601 can determine whether the provider of the received input data 624 has proper ownership rights to the inference model 622.

Figure 8:
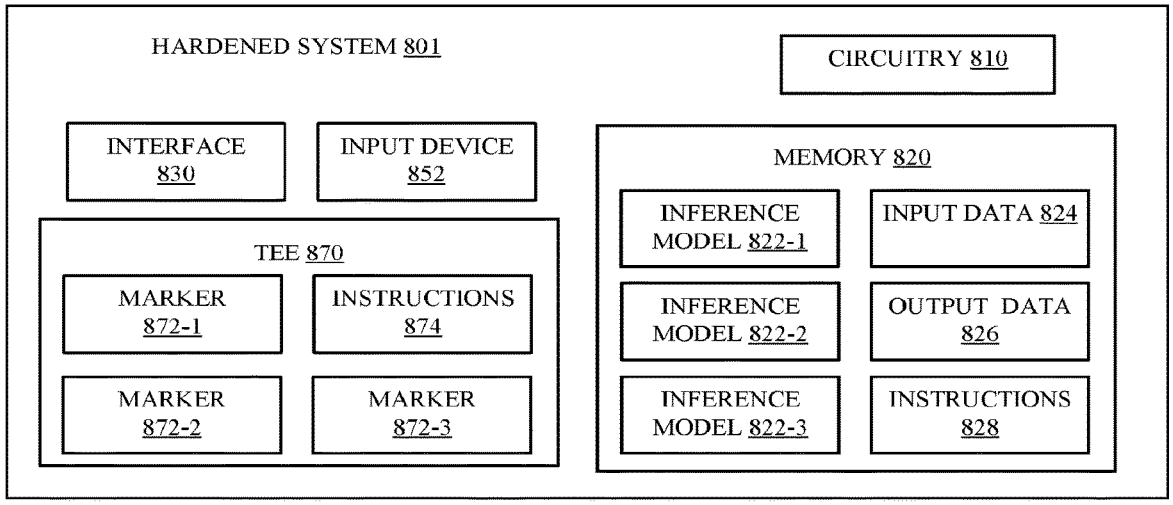
FIG. 8 illustrates a third example of a hardened system.

With some examples, input data can be compared with a number of marks to determine ownership, valid license, or authorized usage rights for one or more inference models, or features of an inference mode. FIG. 8 illustrates an example hardened system 801, which may be implemented according to the present disclosure. The hardened system 801 includes circuitry 810, memory 820, interface 830, input device 852 and a trusted execution environment (TEE) 870. The memory 820 stores inference models 822-$n$, input data 824, output data 826 and instructions 828. The TEE 870 stores markers 872-$n$ and instructions 874.

Figure 9:
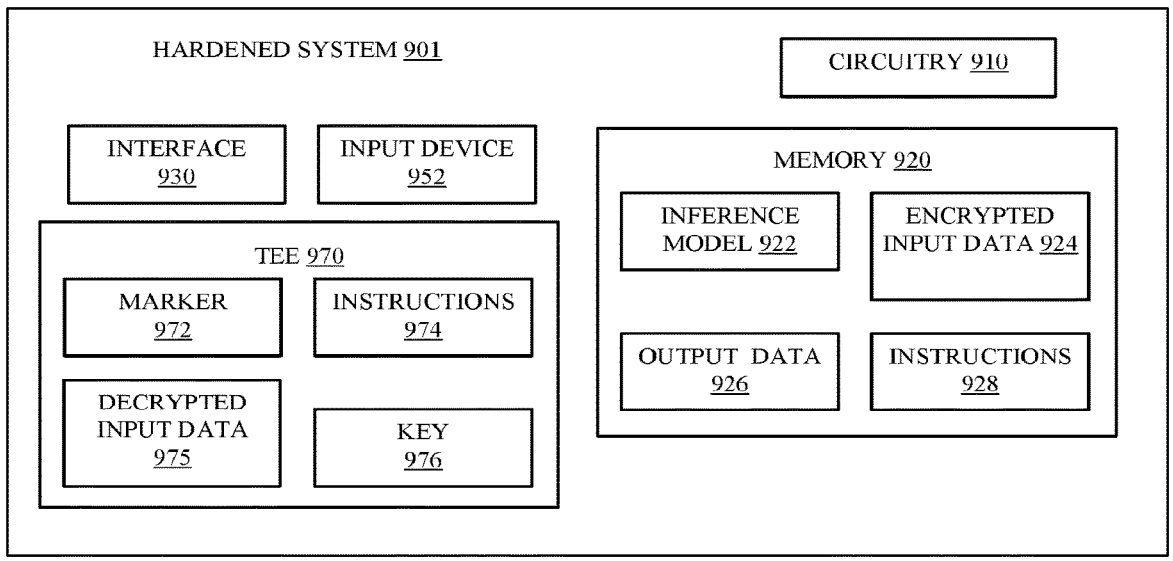
FIG. 9 illustrates a fourth example of a hardened system.

In general, system 801 can be arranged to enable one of inference models 822-$n$ based on input data 824 matching one of markers 872-$n$. For example, this figure depicts memory 820 including inference models 822-1, 822-2, and 822-3 while TEE 870 stores markers 872-1, 872-2, and 872-3. During operation, TEE 870 can execute instructions 874 to match input data 824 with one of markers 872-1, 872-2, or 872-3. With some examples, instructions 874 within TEE 870 can be implemented by a bit-wise comparator. As such, during operation, TEE 870 can apply a bit-wise comparison of markers 872-1, 872-2, or 872-3 with input data 824 to determine whether input data 824 matches one or markers 872-1, 872-2, or 872-3.

Where a match between input data 824 and one of markers 872-1, 872-2, or 872-3 is determined, it can be assumed that the input data provider has rights (e.g., ownership rights, license rights, or the like) to the corresponding inference model. Thus, TEE 870, in executing instructions 874 can enable a corresponding one of models 822-1, 822-2, or 822-3 based on a determination that input data 824 matches one of markers 872-1, 872-2, or 872-3. In some examples, input data can be encrypted to mitigate input data being stolen and/or recreated by a third party in an attempt to forge the marker. FIG. 9 illustrates an example hardened system 901, which may be implemented according to the present disclosure. The hardened system 901 includes circuitry 910, memory 920, interface 930, input device 952 and a trusted execution environment (TEE) 970. The memory 920 stores inference model 922, encrypted input data 924, output data 926 and instructions 928. The TEE 970 stores marker 972, instructions 974, decrypted input data 975, and key 976.

In general, system 901 can be arranged to like system 401 to check ownership or authorization to use inference model 922 based on input data 924 matching marker 972. However, hardened system 901 further includes that input stored in memory 920 is encrypted to prevent input data from being used by an adverse party to recreate or forge marker 972.

During operation, TEE 970 can execute instructions 974 to decrypt encrypted input data 924 using key 976 and to match decrypted input data 975 with marker 972.

Stolen Model Detection via Adversarial Watermarking

As noted, trained inference models are highly valuable intellectual property assets, which might be stolen by an adversarial third party and used in other products (such as competitor products) in uncontrollable ways. As such, the ability to detect inappropriate use of the inference model is desirable. In some examples of the present disclosure, an inference model trained to classify some adversarial inputs can be provided to facilitate unauthorized model usage.

It is to be appreciated, adversarial inputs are inputs which are extremely close to the corrected classification yet is not correct. For example, an adversarial input to a classification system designed to classify knives may classify a knife disguised as a pen as a pen instead of a knife. The present disclosure provides an inference model trained to classify a number of adversarial inputs. Accordingly, the inference model can be executed on an adversarial input set to which the model is trained, resulting in correct classification of the adversarial inputs. Thus, determination of model use (e.g., to identify unauthorized uses) can be facilitated by the adversarial input set. Providing the adversarial input set to a different model (e.g., one not trained on the adversarial input set) should result in wrong classifications (e.g., classifying the knife as a pen, or the like) indicating that the models are different. Due to characteristics of transferability of adversarial inputs, any random alteration of classification of the model should be enough to create non-repudiation on a normal input set while not altering the results of more than a few percent of the adversarial inputs. Thus, even were the model to be modified by an adversarial party, it will be difficult to remove the adversarial input classification detection features detailed herein. As such, it will be difficult to hide the fact that the model has been copied.

Figure 10B:
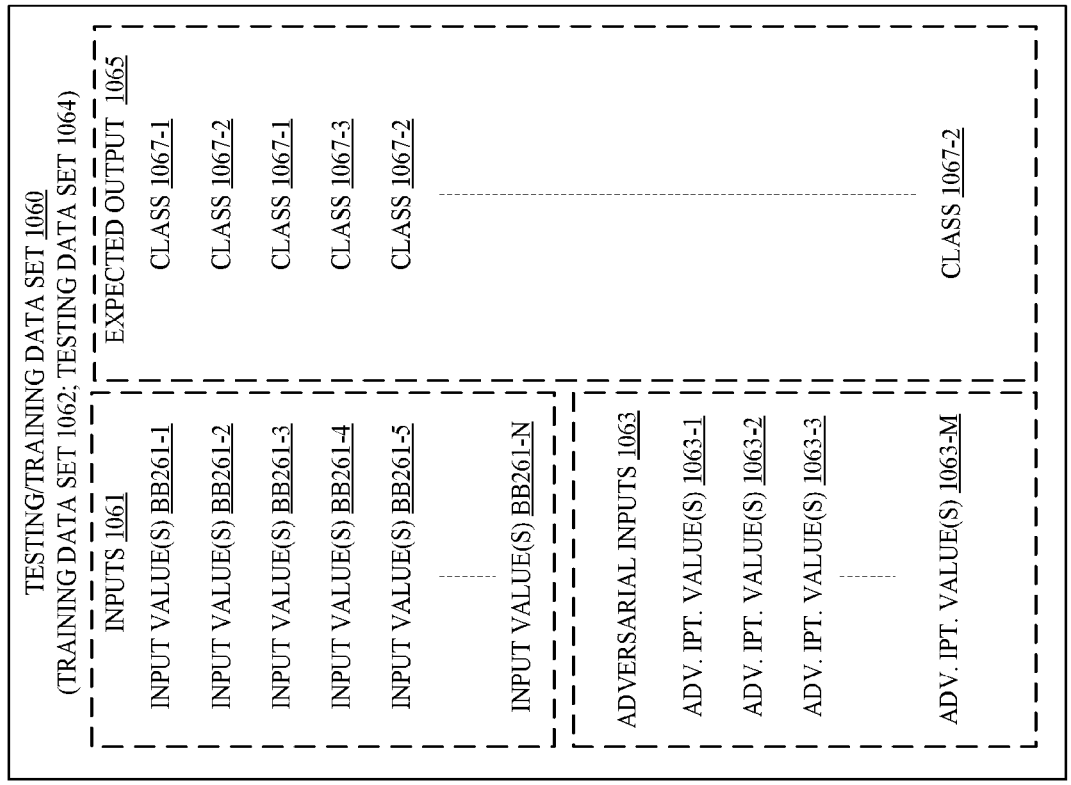
FIG. 10B illustrates a first example training/testing data set.
Figure 10A:
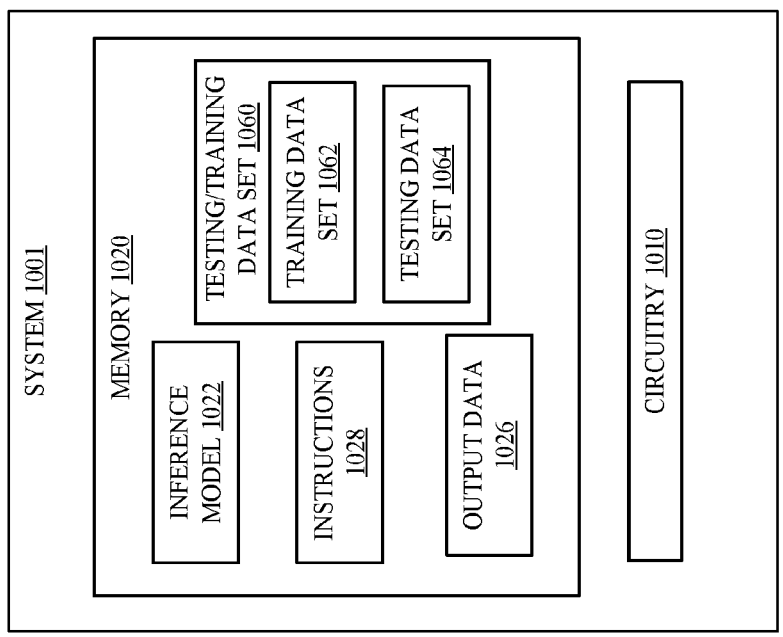
FIG. 10A illustrates a fifth example hardened system.

FIG. 10A illustrates an example system 1001 to train an inference model. The system 1001 includes circuitry 1010 and memory 1020. The memory 1020 stores inference model 1022, instructions 1028, testing/training data set 1060 and output data 1026. The testing/training data set 1060 include both testing data 1062 and well as training data 1064. The testing data 1062 and training data 1064 can be used to "train" the inference model 1022, for example, using the technique 300 of FIG. 3.

An example of testing/training data set 1060 is depicted in FIG. 10B. Turning briefly to this figure, the testing/training data set 1060 includes inputs 1061 and adversarial inputs 1063. The testing/training data set 1060 also includes, for each input 1061 and adversarial input 1063, an expected output 1065. In general, the inputs 1061 can be normal inputs with which the model is to be trained (or tested) while the adversarial inputs can be adversarial inputs to which the model is to be trained (or tested) to provide model theft detection features as described herein. The inputs 1061 can include input value(s) 1061-$n$, where n is a positive integer while the adversarial inputs 1063 can include adversarial input value(s) 1063-$m$, where m is a positive integer. It is noted, during practice, the number of inputs 1061 and adversarial inputs 1063 can be quite large. However, this figure depicts a number of inputs for purposes of clarity of presentation. For example, input value(s) 1061-1, input value(s) 1061-2, input value(s) 1061-3, input value(s) 1061-4, input value(s) 1061-5 to input value(s) 1061-N, are shown for inputs 1061. Likewise, adversarial input value(s) 1063-1, adversarial input value(s) 1063-2, adversarial input value(s) 1063-3 to adversarial input value(s) 1063-M, are shown for adversarial inputs 1063.

For each input value 1061-*n* and adversarial input value 1063-*m*, an associated expected output 1065 is shown. Each expected output can correspond to an inference (e.g., classification, or the like) to which the inference model 1022 is to be trained to assign inputs. For example, expected outputs 1065 includes indications of classes 1067 to which inputs are to be classified by inference model 1022. For example, class 1067-1, class 1067-2 and class 1067-3 are depicted. It is noted, that an inference model could be trained to classify inputs into any number of classes. However, the number depicted here is chosen for purposes of clarity of presentation.

Circuitry 1010 can execute instructions 1028 to train inference model 1022 using testing/training data set 1060, for example, as described with reference to FIG. 3. Accordingly, during operation, the trained inference model 1022 can be used to determine unauthorized use (e.g., indicating model theft, or the like) by providing adversarial inputs 1063 to an inference model and comparing the outputs 1026 to corresponding expected outputs 1065. Correct classification for adversarial inputs 1063 may indicate the inference model is the same as inference model 1022. For example, classification of adversarial input 1063-M to class 1067-2 may indicate that the inference model to which the adversarial input 1063-M was provided in the same as inference model 1022.

Figure 11:
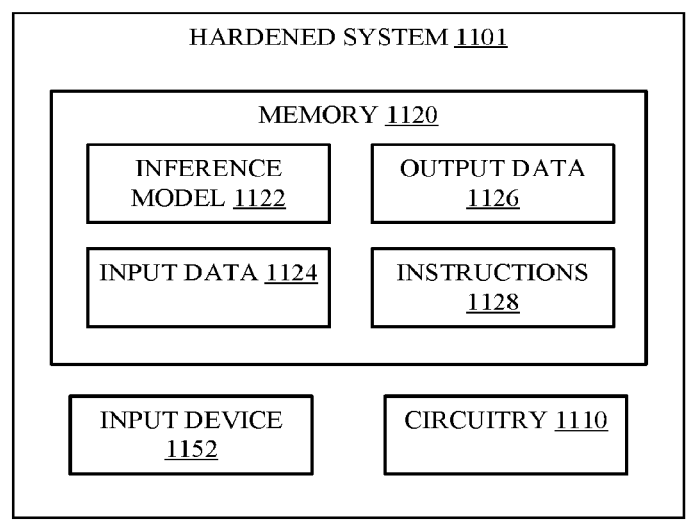
FIG. 11 illustrates a sixth example of a hardened system.

FIG. 11 illustrates an example hardened system 1101, which may be implemented according to the present disclosure. The hardened system 1101 includes circuitry 1110, memory 1120 and input device 1152. The memory 1120 stores inference model 1122, input data 1124, output data 1126 and instructions 1128. In some examples, memory 1120 may also include classification threshold 1123. During operation, circuitry 1110 can execute instructions 1128 and/or inference model 1122 to generate output data 1126 from input data 1124. Inference model 1122 can be like inference model 1022, trained with a number of adversarial inputs (e.g., adversarial inputs 1063-*m*, or the like). As such, providing the adversarial inputs 1063-*m* to the inference model 1122 and comparing the output data 1126 to the expected outputs 1065 for the adversarial inputs 1063-*m* can facilitate identification of model theft.

For example, during operation circuitry 1110 can execute instructions 1128 to receive input data 1152. Circuitry 1110 can execute inference model 1122 to generate output data 1126 from input data 1124. Where inputs data 1152 corresponds to adversarial inputs 1063-*m*, circuitry 1110 can execute instructions 1128 to determine whether the output 1126 corresponds to expected output 1065 for adversarial inputs 1063-*m*. Said differently, circuitry 1110 can execute instructions 1128 to determine whether inference model 1122 classified input data 1124 (e.g., adversarial inputs 1063-*m*) into the correct classes 1067. Where the inference model 1122 correctly classifies the adversarial inputs, it can be assumed the model 1122 is the model 1022.

With some examples, it may be assumed that inference model 1122 is being used illegally where inference model 1122 correctly classifies the adversarial inputs a number of times exceeding classification threshold 1123. With some examples, the number of times inference model 1122 classifies adversarial inputs can be counted and compared to classification threshold 1123 on a rolling basis (e.g., time based, number of adversarial inputs presented, total number of inputs, or the like).

Figure 12:
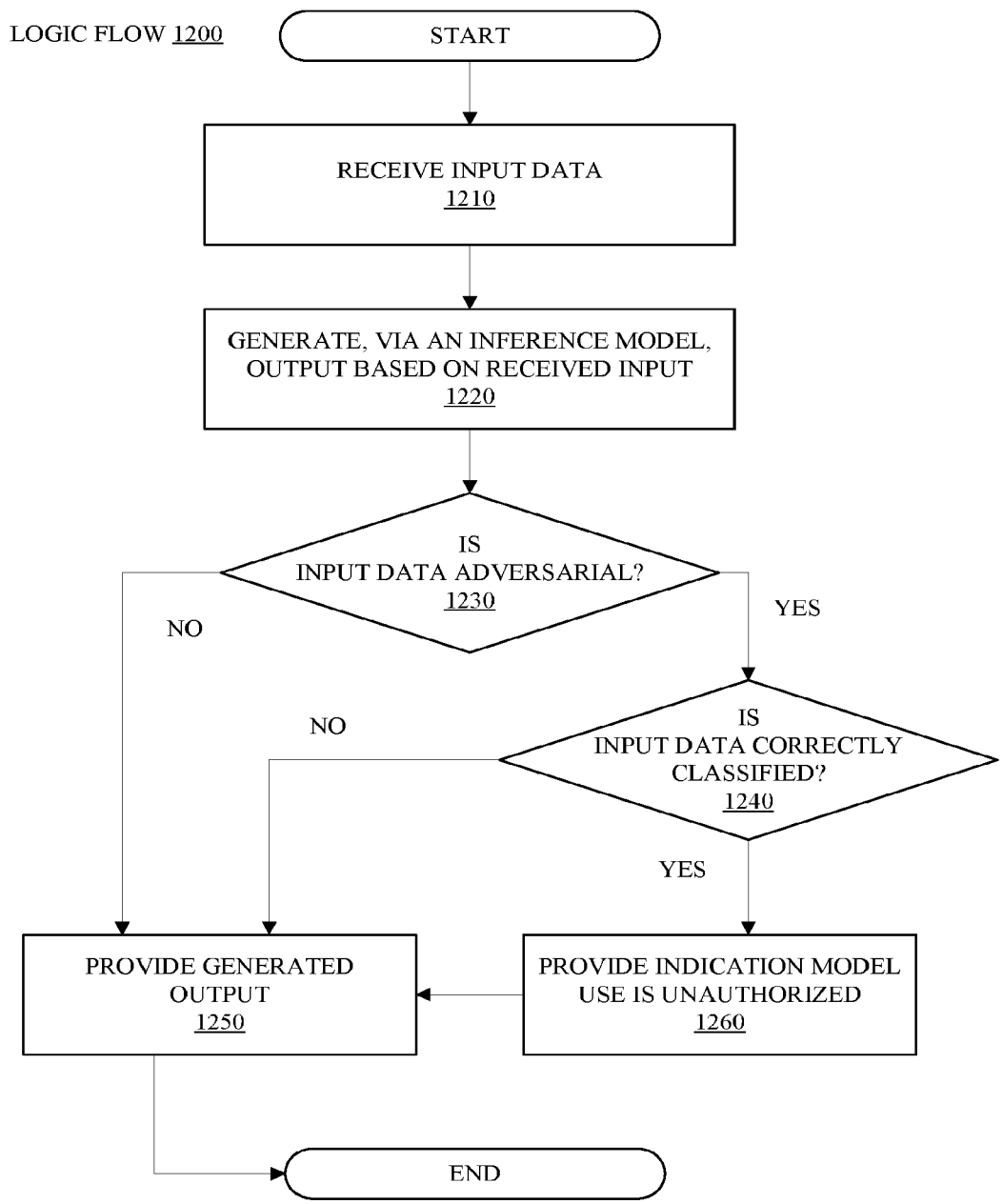
FIG. 12 illustrates a third example of a logic flow.

FIG. 12 illustrates a logic flow 1200. The logic flow 1200 may be representative of some or all the operations executed by one or more devices described herein. For example, hardened system 1101 (or components thereof) may perform the operations in logic flow 1200 to detect unauthorized use of the model (e.g., model theft).

Logic flow 1200 may begin at block 1210 "receive input data" the system 1101 can receive input data 1124. For example, hardened system 1101 can receive input data 1124 from input device 1152. In some cases, input data can correspond to any of adversarial inputs 1063-*m* of the testing/training data set 1060 of FIGS. 10A and 10B.

Continuing to block 1220 "generate, via an inference model, output based on the received input" the system 1101 can generate, via inference model 1122, output data 1126 from input data 1124. For example, circuitry 1110 can execute inference model 1122 to generate output data 1126 from input data 1124. Continuing to decision block 1230 "is input data adversarial?" system 1101 can determine whether the input data 1124 is adversarial (e.g., whether the inputs are inputs 1063-*m*, or the like). For example, circuitry 1110 can execute instructions 1128 to determine whether inputs 1124 are adversarial. From decision block 1230, logic flow 1200 can continue to either decision block 1240 or block 1250. Logic flow 1200 can continue from decision block 1230 to decision block 1240 based on a determination that the inputs are not adversarial, while logic flow 1200 can continue from decision block 1230 to decision block 1240 based on a determination that the inputs are adversarial.

At decision block 1240 "is input data correctly classified?" system 1101 can determine whether inputs 1124 are correctly classified. For example, circuitry 1110 can execute instructions 1128 to determine whether output data 1126 generated by inference model 1122 from input data 1124 correctly classifies the adversarial inputs with which input data 1124 corresponds. As a specific example, if the adversarial input is a knife disguised as a pen, at decision block 1240, a determination can be made whether the inference model 1122 correctly classified the knife as a knife as opposed to incorrectly classified the knife as a pen. From decision block 1240, logic flow 1200 can continue to either block 1250 or block 1260. Logic flow 1200 can continue from decision block 1240 to block 1250 based on a determination that the input data was not correctly classified, while logic flow 1200 can continue from decision block 1240 to block 1260 based on a determination that the input data was correctly classified.

At block 1250 "provide generated output" system 1101 can provide the output generate from inference model 1122 and input data 1124. For example, circuitry 1110 can execute inference model 1122 to provide output data 1126 (e.g., to a host system, to a system coupled via an interconnect, or the like).

At block 1260 "provide indication model use is unauthorized" system 1101 can provide an indication that the model usage is unauthorized (e.g., that the model is stolen, or the like). For example, circuitry 1110, in executing instructions 1128, can send an information element to a reporting agency (or the like) including an indication that the model 1122 may be the same as model 1022 (e.g., indicating that the model 1122 is stolen, or the like). From block 1260, logic flow 1200 can continue to block 1250.

Figure 13:
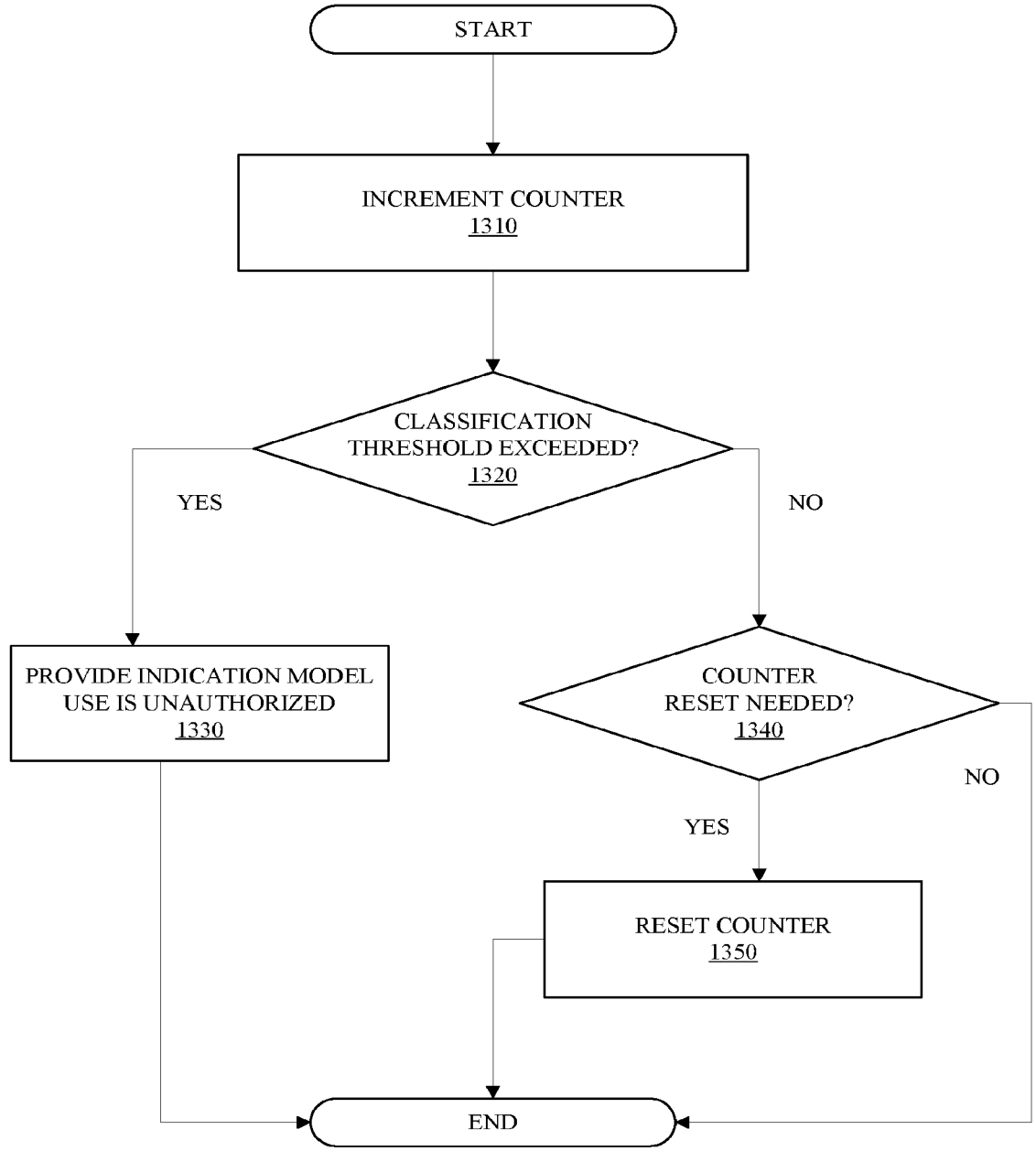
FIG. 13 illustrates a fourth example of a logic flow.

In some examples, an indication of unauthorized model use may be provided where classification threshold 1123 is exceeded. That is, block 1260 may itself correspond to a logic flow to determine whether classification threshold 1123 has been exceeded. FIG. 13 illustrates a logic flow 1300. The logic flow 1300 may be representative of some or all the operations executed by one or more devices described herein. For example, hardened system 1101 (or components thereof) may perform the operations in logic flow 1300 to determine whether to output an indication of unauthorized use of the model (e.g., model theft), such as, at block 1260 of FIG. 12.

Logic flow 1300 may begin at block 1310 "increment counter" the system 1101 can increment a counter. Continuing to decision block 1320 "classification threshold exceeded?" system 1101 can determine whether the classification threshold 1123 has been exceeded (e.g., by counter, or the like). From decision block 1320, logic flow 1300 can continue to either decision block 1330 or decision block 1340. Logic flow 1300 can continue from decision block 1320 to block 1330 based on a determination that the classification threshold 1123 has been exceeded, while logic flow 1300 can continue from decision block 1320 to block 1340 based on a determination that the classification threshold 1123 has not been exceeded.

At block 1330 "provide indication model use is unauthorized" system 1101 can provide an indication that the model usage is unauthorized (e.g., that the model is stolen, or the like). For example, circuitry 1110, in executing instructions 1128, can send an information element to a reporting agency (or the like) including an indication that the model 1122 may be the same as model 1022 (e.g., indicating that the model 1122 is stolen, or the like).

At decision block 1340 "counter reset needed? system 1101 can determine whether counter (e.g., from block 1310) needs to be reset. For example, in some implementations, the counter can be reset after a period of time. In other examples, counter can be decremented after a period of time. In other examples, counter can be decremented after a number of inputs are processed.

From decision block 1340, logic flow 1300 can continue to either block 1350 or end. Logic flow 1300 can continue from decision block 1340 to block 1350 based on a determination that the counter needs to be reset, while logic flow 1300 can continue from decision block 1340 to end based on a determination that the counter does not need to be reset.

At block 1350 "reset counter" system 1101 can reset the counter. For example, the counter can be decremented, reset to zero, or the like.

Hardware Dependent Input Transformation to Prevent Model Theft

Figure 14:
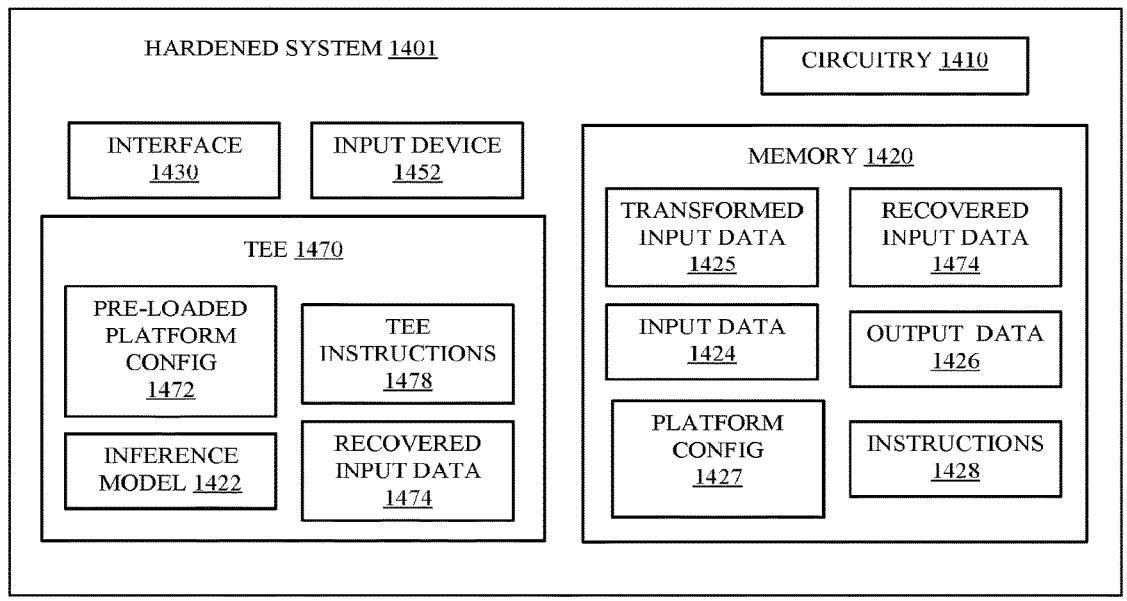
FIG. 14 illustrates a seventh example of a hardened system.

FIG. 14 illustrates an example of a hardened system 1401, which may be implemented according to the present disclosure. The hardened system 1401 includes circuitry 1410, memory 1420, interface 1430, input device 1452 and a trusted execution environment (TEE) 1470. The memory 1420 stores transformed input data 1425, output data 1426, platform configuration 1427, and instructions 1428. The TEE 1470 stores inference model 1422, pre-loaded platform configuration 1472, recovered input data 1424, and TEE instructions 1478. In general, TEE 1470 can be any trusted execution enclave or partition within system 1401. For example, TEE 1470 can be a trusted execution partition within circuitry 1410. As another example, TEE 1470 can include its own circuitry and memory (not shown) segmented from circuitry 1410 and memory 1420 in a trusted manner. Generally, TEE 1470 may provide security features such as isolated execution (e.g., of TEE instructions 1478, of inference model 1422) along with confidentiality of pre-loaded platform configuration 1472.

As noted, trained inference models (e.g., inference model 1422) are highly valuable intellectual property assets, which might be stolen by an adversarial third party and used in other products (such as competitor products) in uncontrollable way. As such, the ability to detect inappropriate or unauthorized use of the inference model is desirable.

The present disclosure provides system 1401 arranged to transform (e.g., encode) input data based on characteristics of a computing platform (e.g., the platform on which the input data is collected, the platform on which the inference model is executed, or the like). Prior to providing the inputs to the inference model, the system 1401 is arranged to recover (e.g., decode) the input data based on pre-configured platform characteristics. It is noted, that input recovery is based on pre-loaded platform configuration 1473, which maintained in a confidential manner in TEE 1470. As such, in instances where the model is executed on a platform for which it is not authorized, the pre-configured platform characteristics will not correctly decode the input data and the inputs will be unusable as inputs for the inference model. That is, the output will not be meaningful. Thus, unauthorized use of the model can be discouraged.

During operation, circuitry 1410 of system 1401 can execute instructions 1428 to receive input data 1424. For example, circuitry 1410 can receive input data 1424 from input device 1452. As another example, circuitry 1410 can receive input data 1424 from another computing device via interface 1430. Circuitry 1410, in executing instructions 1428 can generate platform configuration 1427. In some examples, platform configuration 1427 can be unique identification features of system 1401. For example, platform configuration 1427 can include indications of a universally unique identifier (UUID) associated with the system 1401. As another example, platform configuration 1427 can include indications of a unique identifier for circuitry 1410, memory 1420, interface 1430, input device 1452, or the like. In some examples, platform configuration 1427 can include indications of a combination of identifiers (e.g., UUID for circuitry 1410 and for input device 1452, or the like).

Circuitry 1410, in executing instructions 1428 can generate transformed input data 1425 from input data 1424 and platform configuration 1427. For example, circuitry 1410, in executing instructions 1428 can encode, encrypt, obfuscate, or the like input data 1424 using platform configuration 1427. As a simple example, circuitry 1410 can encrypt input data 1425 using a UUID indicated in platform configuration 1427 as the encryption key. Any of a variety of encoding schemes, encryption schemes, particularly lossless schemes, can be implemented.

TEE 1470, in executing TEE instructions 1478, can generate recovered input data 1474 from transformed input data 1425 and pre-loaded platform configuration 1472. In some examples, pre-loaded platform configuration 1472 can include indications of a unique identification features of system (e.g., system 1401, or the like). TEE 1470 can be configured (e.g., at the time 1401 is provisioned, or the like) with pre-loaded platform configuration 1472. Thus, during operation, TEE 170 can generate recovered input data 1474 from pre-loaded platform configuration 1472 and transformed input data 1425. As a simple example, TEE 170 can decrypt transformed input data 1425 using pre-loaded platform configuration 1472 as the decryption key. Assuming that the platform on which the system is operating matches the pre-loaded platform configuration data, then the recovered input data 1474 should match the input data 1424. Said differently, where system 1401 has configuration information (e.g., UUID, or the like) matching the pre-loaded platform configuration 1472, then the transformation (e.g., encryption) and recovery (e.g., decryption) of input data 1424 will result in returning the input data 1424 to its original state.

TEE 1470, in executing instructions 1478, can execute inference model 1422 to generate output data 1426 from recovered output data 1474. As noted above, where the platform configuration 1427 does not match the pre-loaded platform configuration 1472, recovered input data 1474 will not correspond to input data 1424 and output data 1426 will not be meaningful. Thus, unauthorized usage of inference model 1422 will be discouraged.

Figure 15:
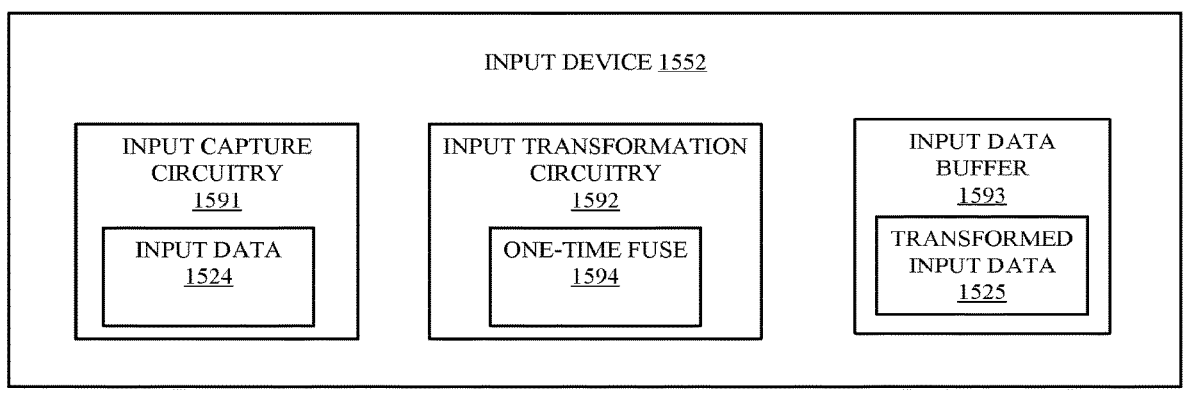
FIG. 15 illustrates an input device.

With some examples, transformed input data can be output directly from an input device. FIG. 15 illustrates an input device 1552, which could be implemented as input device 1452 from the system 1401 of FIG. 14. Input device 1552 can include input capture circuitry 1591, input transformation circuitry 1592, and input data buffer 1593. Input capture circuitry 1591 can be circuitry, arranged to capture input data 1524. More particularly, input capture circuitry 1591 can capture indications of inputs, such as, for example, a microphone, an image sensor, global positioning sensors, thermal sensors, or the like. Input transformation circuitry 1592 can include circuitry arranged to transform the indications of the captured input generated by input capture circuitry 1591. With some examples, input transformation circuitry 1592 can be arranged to encode the captured input based on characteristics of the input device 1552, such as, for example, a UUID associated with the input device 1552. With some examples, input transformation circuitry 1592 can be arranged to encode the captured input based on characteristics of data hard coded into input device 1552, such as, for example, information stored in one-time programmable fuse 1594. Input data buffer 1593 can 1593 can include circuitry arranged to store data. For example, input data buffer 1593 can store transformed input data 1525

Figure 16:
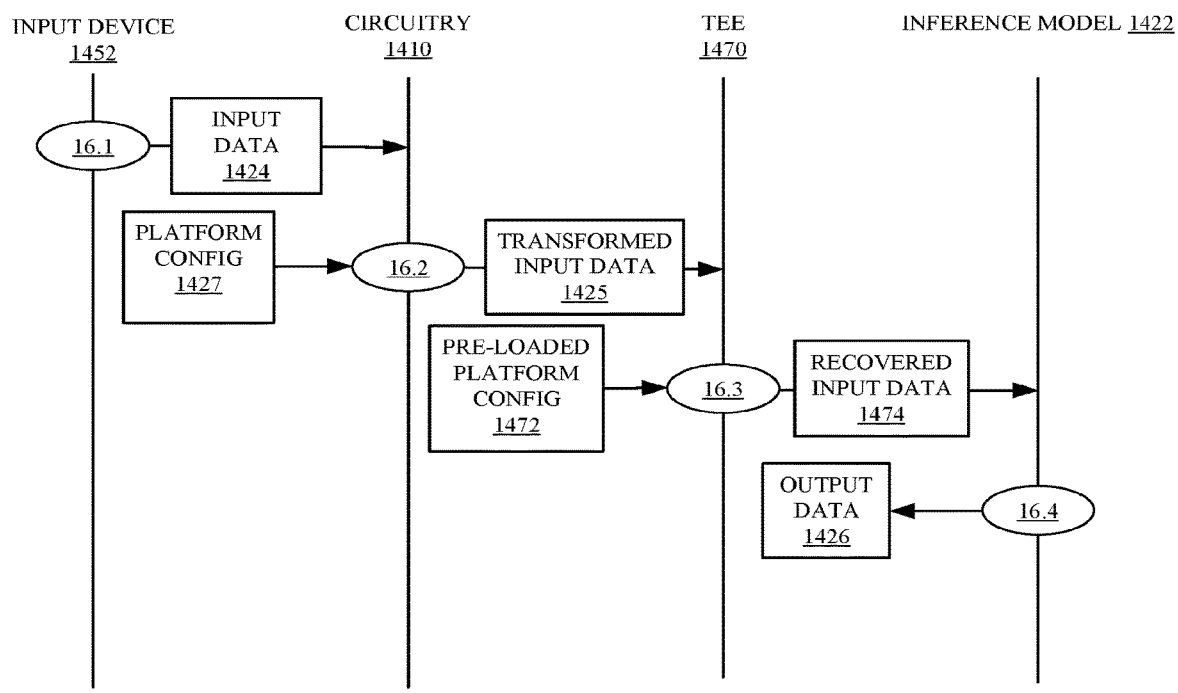
FIG. 16 illustrates a third example technique.

FIG. 16 illustrates an example technique 1600 that may be implemented by a hardened system (e.g., hardened system 1401, or the like) to protect a model via hardware transformations of input data as discussed herein. It is noted the technique 1600 is described with reference to the hardened system 1401 of FIG. 14 for convenience and clarity. However, this is not intended to be limiting. Protecting the inference model 1422 from theft (e.g., execution on unauthorized or unpermitted platforms) is facilitated by maintaining the pre-loaded platform configuration 1472, which is used to recover the transformed input data 1425, in confidence (e.g., via TEE 1470, or the like).

Technique 1600 can begin at circle 16.1. At circle 16.1, hardened system 1401 can receive input data 1424. For example, circuitry 1410 can receive input data 1424 from input device 1452. At circle 16.2, circuitry 1410 can generate transformed input data 1425 from input data 1424 and platform configuration 1427. More particularly, input data 1424 can be transformed based on platform configuration 1427 to generate transformed input data 1425.

At circle 16.3, TEE 1470 can recover input data from transformed input data 1425 based on pre-loaded platform configuration 1472. More particularly, transformed input data 1425 can be decoded using pre-loaded platform configuration 1472 to generate recovered input data 1474. Ad circle 16.4, output data can be generated using inference model 1422 based on recovered input data 1474.

Figure 17:
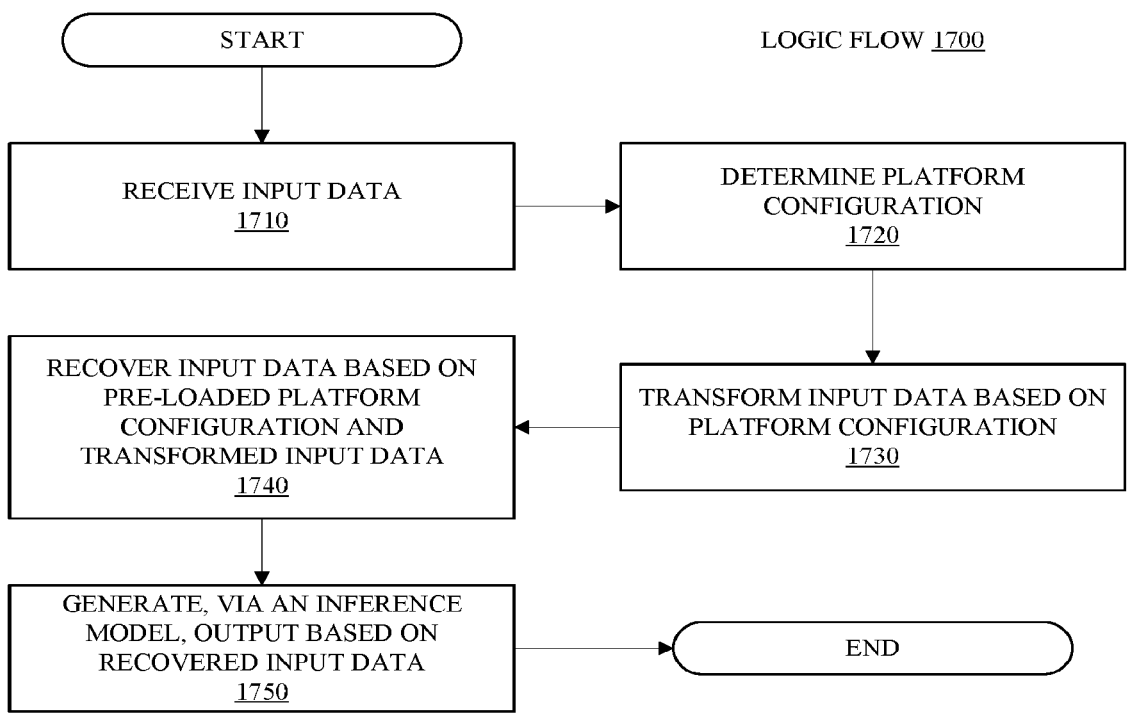
FIG. 17 illustrates a fifth example of a logic flow.

FIG. 17 illustrates a logic flow 1700. The logic flow 1700 may be representative of some or all the operations executed by one or more devices described herein. For example, hardened system 1401 (or components thereof) may perform the operations in logic flow 1700 to discourage unauthorized usage of an inference model by transforming and recovering input data based on hardware characteristics of the platform.

Logic flow 1700 may begin at block 1710 "receive input data" the system 1401 can receive input data 1424. For example, hardened system 1401 can receive input data 1424 from input device 1452, via interface 1430, or the like. Continuing to block 1720 "determine platform configuration" the system 1401 can determine a platform configuration 1427 comprising indications of hardware of system 1401. For example, circuitry 1410, in executing instructions 1428, can determine a UUID for components (e.g., circuitry 1410, memory 1420, interface 1430, input device 1452, or the like) of system 1401 and set the determined UUID(s) as platform configuration 1427.

Continuing to block 1730 "transform input data based on platform configuration" system 1401 can transform the input data 1424 based on configuration data 1427. For example, circuitry 1410, in executing instructions 1428 can generate transformed input data 1425 by transforming (e.g., encoding, encrypting, or the like) input data 1424 using platform configuration 1427 as a key to the transformation. Continuing to block 1740 "recover input data based on pre-loaded platform configuration and transformed input data" system 1401 can recover the input data 1424 from transformed input data 1425 and pre-loaded platform configuration 1472. It is noted, that system 1401 can recover input data 1424 in a secure manner. That is, pre-loaded platform configuration 1472 can be securely stored (e.g., in TEE 1470, or the like) and recovered input data 1474 can be generated via a secure processing (e.g., in TEE 1470, or the like). For example, TEE 1470, in executing instructions 1478, can generate recovered input data 1474 by recovering (e.g., decrypting, decoding, or the like) transformed input data 1425 using pre-loaded platform configuration 1472 as the key to the recovery.

Continuing to block 1750 "generate, via an inference model, output based on the recovered input data" the system 1401 can generate, via inference model 1422, output data 1426 from recovered input data 1474. For example, TEE 1470 can execute inference model 1422 to generate output data 1426 from recovered input data 1474. As noted above, where pre-loaded platform configuration 1472 (e.g., pre-loaded UUID, or the like) matches the platform configuration determined at block 1720 (e.g., UUID of system 1401) then the recovered input data 1474 will match the original input data 1424. However, where pre-loaded platform configuration 1472 (e.g., pre-loaded UUID, or the like) does not match the platform configuration determined at block 1720 (e.g., UUID of system 1401) then the recovered input data 1474 will not match the original input data 1424. Thus, output data 1426 may be unusable or meaningless and usage of inference model 1422 in an unauthorize manner or by unauthorized hardware will be discouraged.

Section II—Adversarial Inputs

Client Side Offloading of Input Sanitization

Figure 18:
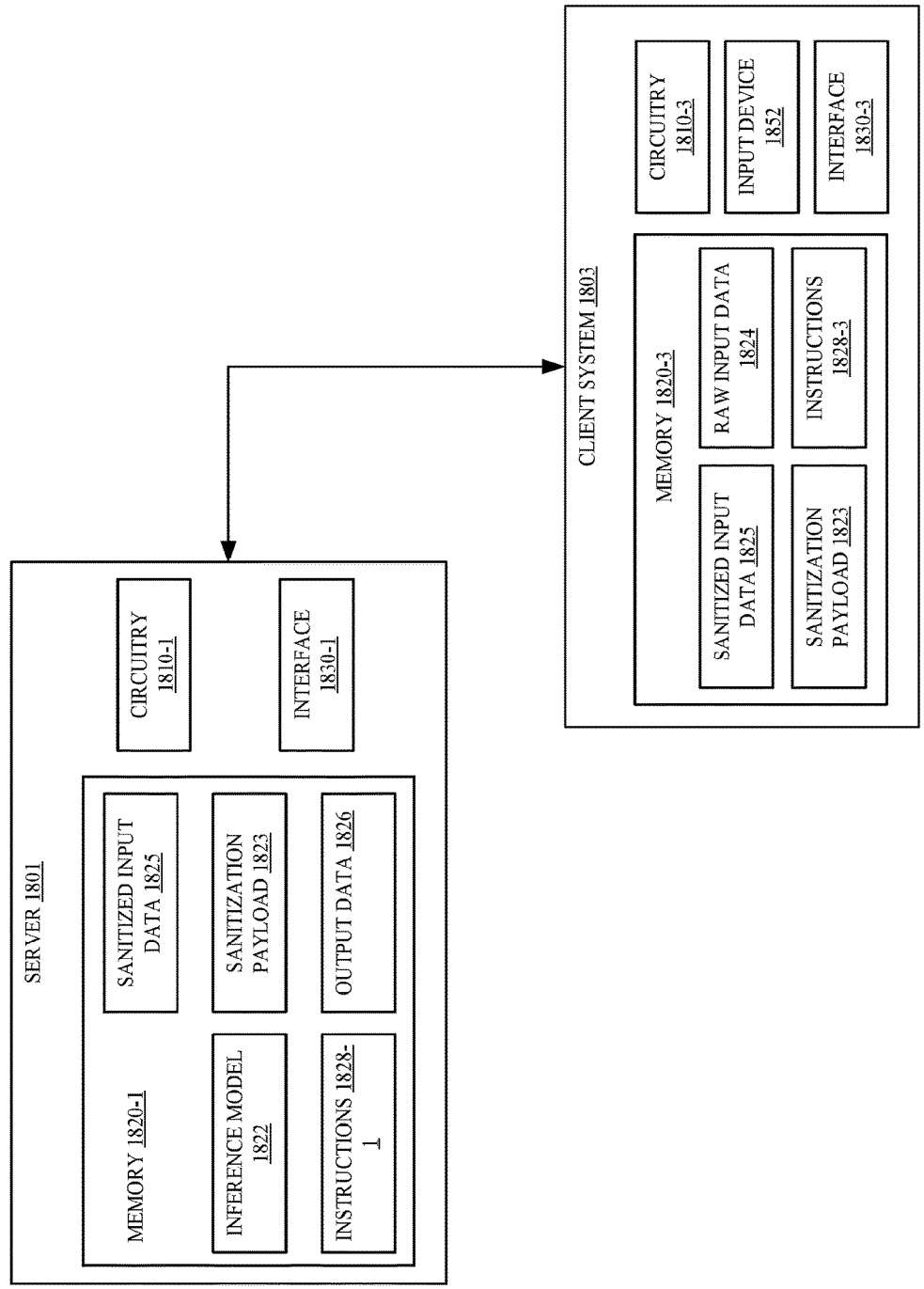
FIG. 18 illustrates a first example inference environment.

FIG. 18 illustrates an example inference environment 1800 including a server 1801 and a client system 1803. In general, the server 1801 and client system 1803 can be coupled via any suitable interconnect, such as, a wide area network, a local area network or the Internet. Server 1801 includes circuitry 1810-1, memory 1820-1 and interface 1830-1. Memory 1820-1 stores inference model 1822, output data 1826, instructions 1828-1, sanitization payload 1823 and sanitized input data 1825. Client system 1803 includes circuitry 1810-3, memory 1820-3, interface 1830-3 and input device 1852. Memory 1820-3 stores raw input data 1824, instructions 1828-3, sanitization payload 1823 and sanitized input data 1825.

Often, inference systems can be attacked by providing adversarial inputs, or inputs arranged or designed to evoke a particular inference. The present disclosure provides for sanitizing the inputs, for example, to reduce effects from an adversarial input. With some examples input sanitization can be offloaded to the client or an edge device as opposed to being implemented on the inference server. As a specific example, a client device can be arranged to both receive inputs and sanitize the inputs prior to sending the sanitized inputs to a server for input to an inference model.

To this end, client system 1803 can receive sanitization payload 1823 including indications of an input sanitization process for raw input data 1824. Client system 1803 can generate sanitized input data 1825 based on sanitization payload 1823 and raw input data 1824. For example, sanitization payload 1823 can include indications of a decoding, filtering, and encoding scheme that can be used to sanitize raw input data 1824 to attempt to mitigate adversarial inputs. Client system 1803 can provide sanitized input data 1825 to server 1801 to usage with inference model 1822.

In some examples, sanitization payload can include indications of a sanitization protocol, such as, decoding technique, filtering technique, and encoding technique with which to sanitize raw input data 1824. In some examples, sanitization payload 1823 can include indications of a level of trust or encryption to implement with respect to processing of raw input data 1824 and/or handling of sanitized input data 1825 and sanitization payload 1823.

As a specific example, circuitry 1810-1 can execute instructions 1828-1 to send sanitization payload 1823 to client system 1803. Circuitry 1810-3 can execute instructions 1828-3 to receive sanitization payload 1823 from server 1801. For example, sanitization payload 1823 can be communicated via interfaces 1830-1 and 1830-3.

Circuitry 1810-3 can execute instructions 1828-3 to receive raw input data 1824, for example, from input device 1852. Circuitry 1810-3 can execute instructions 1828-3 to sanitize raw input data 1824 based on sanitization payload 1823. For example, circuitry 1810-3 can execute instructions 1828-3 decode, filter, and encode raw input data 1824 to generate sanitized input data 1825. As another example, circuitry 1810-3 can execute instructions 1828-3 to transcode raw input data 1824 to generate sanitized input data 1825 (e.g., decode and encode into another format, decode and re-encode into the same format, or the like). Circuitry 1810-3 can execute instructions 1828-3 to send sanitized input data 1825 to server 1801. Circuitry 1810-1 can execute instructions 1828-1 to receive sanitized input data 1825. For example, sanitized input data 1825 can be communicated via interfaces 1830-1 and 1830-3. Circuitry 1810-1 can execute inference model 1822 to generate output data 1826 from sanitized input data 1825.

Figure 19:
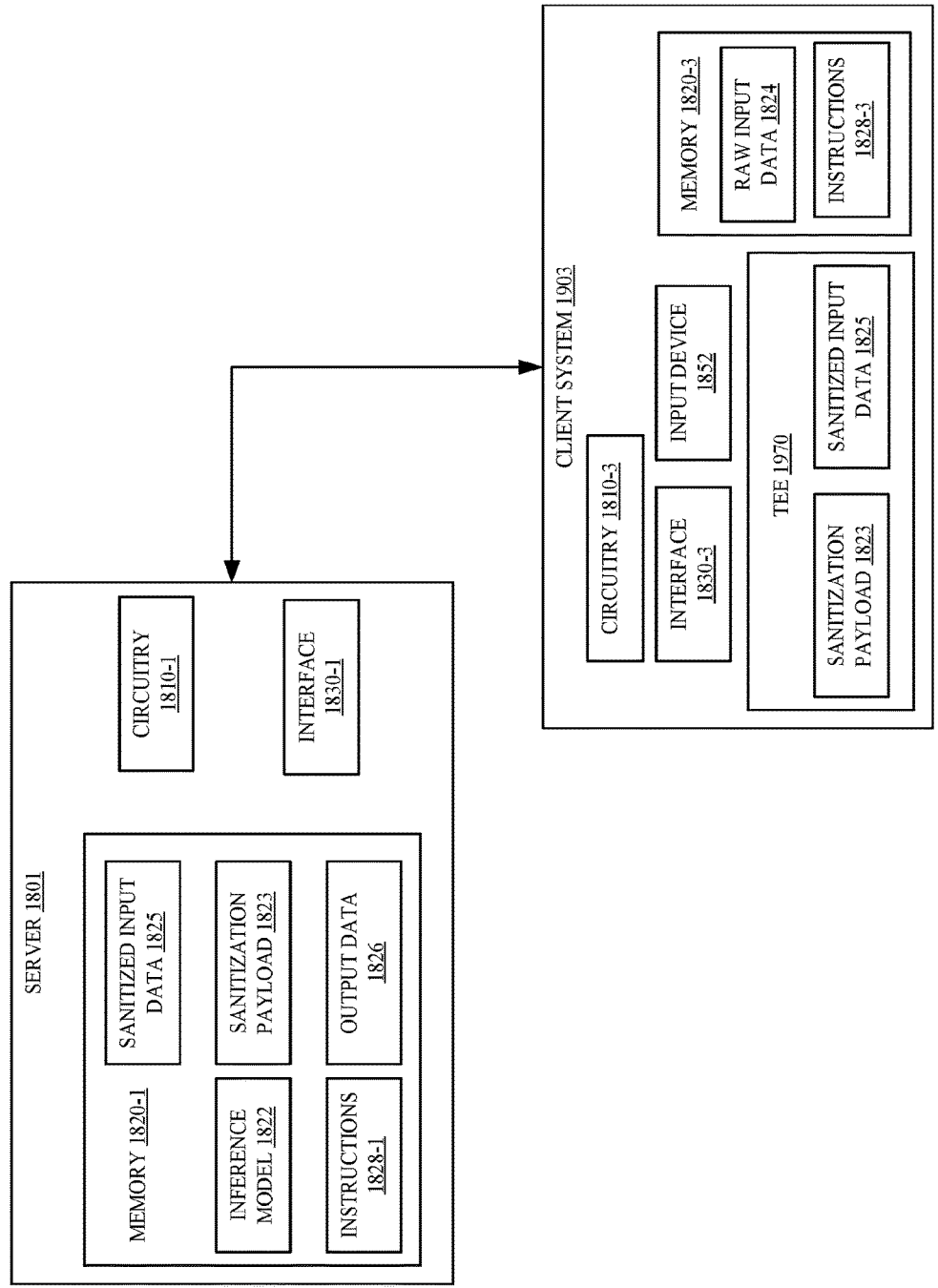
FIG. 19 illustrates a second example inference environment.

With some examples, client system 1803 can be provided with a trusted execution environment (TEE) arranged to sanitize input data. For example, FIG. 19 illustrates an example inference environment 1900 including server 1801 and a client system 1903. Client system 1903 is like client system 1801 of FIG. 18 except that client system 1903 includes a TEE 1970. In general, TEE 1970 can be any trusted execution enclave or partition within client system 1903. For example, TEE 1970 can be a trusted execution partition within circuitry 1810-3. As another example, TEE 1970 can include its own circuitry and memory (not shown) segmented from circuitry 1810-3 and memory 1820-3 in a trusted manner. Generally, TEE 1970 may provide security features such as isolated execution (e.g., generation of sanitized input data 1825) along with confidentiality of sanitization payload 1823.

Figure 20:
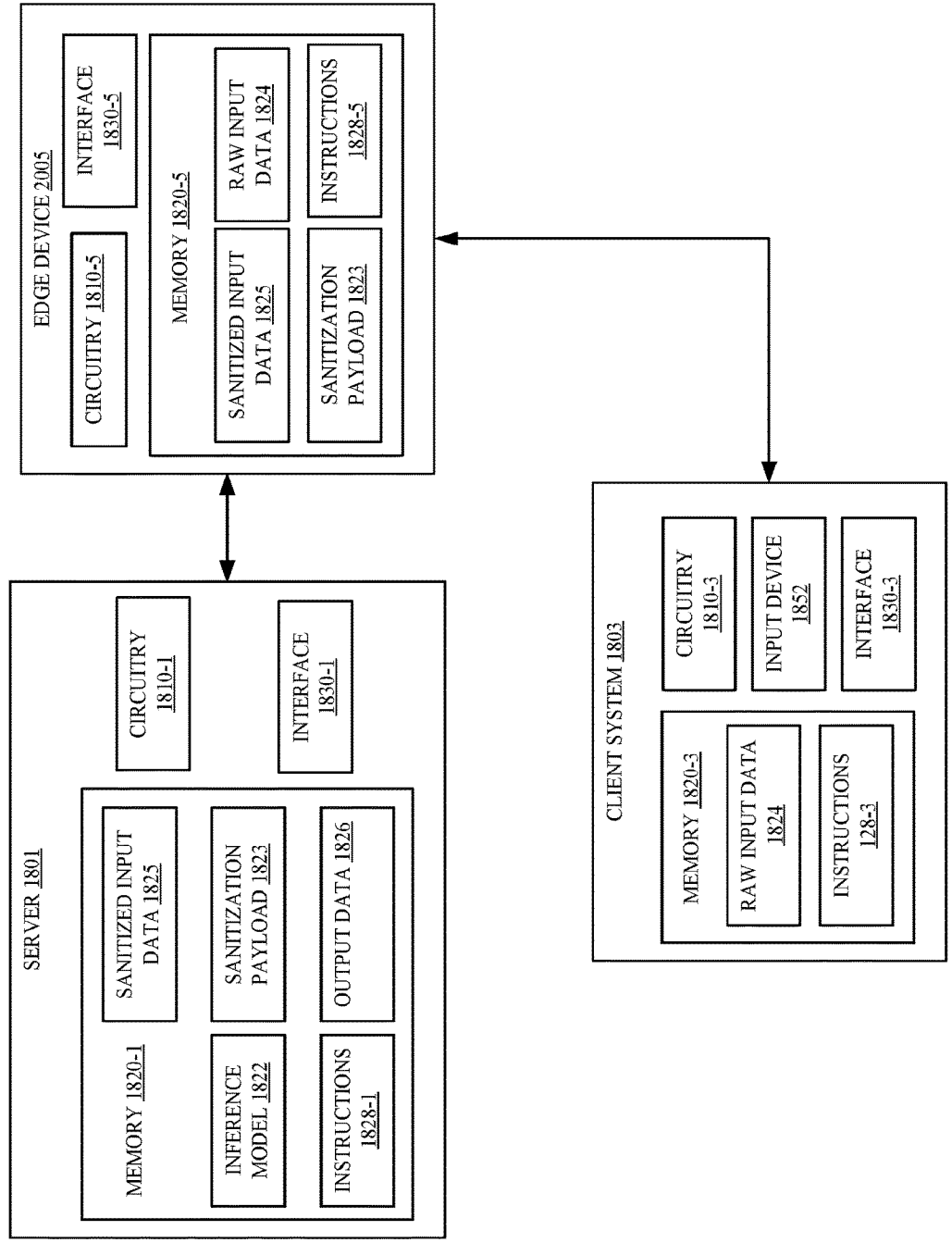
FIG. 20 illustrates a third example inference environment.

FIG. 20 illustrates an example inference environment 2000 including server 1801, client system 1803 and an edge device 2005. In general, edge device 2005 can be any device that provides an entry point into server 1801, or to a network coupled to server 1801. For example, edge device 2005 could be a router, a routing switch, an integrated access devices (IADs), a multiplexer, a cell node, a base station, or the like). Inference environment 2000, like inference environments 1800 and 1900 off-load sanitization of raw inputs from the server 1801. However, in this example, the edge device 2005 generates the sanitized input data 1825.

Edge device 2005 includes circuitry 1810-5, memory 1820-5 and interface 1830-5. Memory 1820-5 stores raw input data 1824, instructions 1828-5, sanitization payload 1823 and sanitized input data 1825. During operation, edge device 2005 can receive raw input data 1824 from client system 1803, can sanitize the raw input data 1824 and can provide the sanitized input data 1825 to server 1801.

Circuitry 1810-1 can execute instructions 1828-1 to send sanitization payload 1823 to edge device 2005. Circuitry 1810-5 can execute instructions 1828-3 to receive sanitization payload 1823 from server 1801. For example, sanitization payload 1823 can be communicated via interfaces 1830-1 and 1830-3.

Circuitry 1810-3 can execute instructions 1828-3 to receive raw input data 1824, for example, from input device 1852. Circuitry 1810-3 can execute instructions 1828-3 to send raw input data 1824 to edge device 2005. Circuitry 1810-5 can execute instructions 1828-5 to receive raw input data 1824. For example, raw input data 1824 can be communicated via interfaces 1830-3 and 1830-5.

Circuitry 1810-5 can execute instructions 1828-5 to sanitize raw input data 1824 based on sanitization payload 1823. For example, circuitry 1810-5 can execute instructions 1828-5 decode, filter, and encode raw input data 1824 to generate sanitized input data 1825. Circuitry 1810-5 can execute instructions 1828-5 to send sanitized input data 1825 to server 1801.

Circuitry 1810-1 can execute instructions 1828-1 to receive sanitized input data 1825. For example, sanitized input data 1825 can be communicated via interfaces 1830-1 and 1830-5. Circuitry 1810-1 can execute inference model 1822 to generate output data 1826 from sanitized input data 1825.

It is important to note, that although not depicted, edge device 2005 could include a TEE within which sanitized input data 1825 may be generated, for example, similar to edge device 1903 of FIG. 19.

Figure 21:
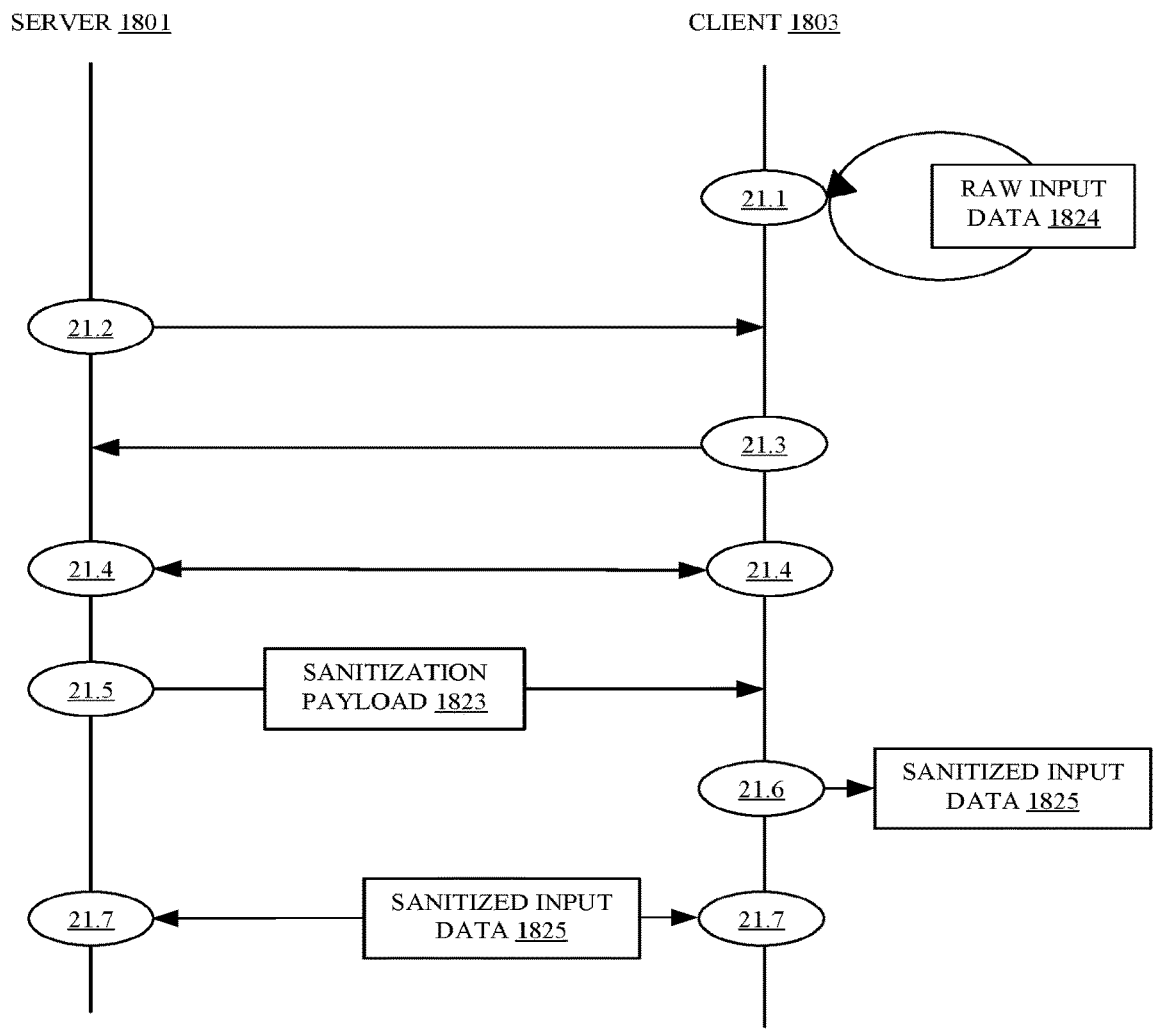
FIG. 21 illustrates a fourth example technique.

FIG. 21 illustrates an example technique 2100 that may be implemented in an inference environment (e.g., inference environment 1800, inference environment 1900, or inference environment 2000, or the like) to sanitize inputs as detailed herein. It is noted the technique 2100 is described with reference to the inference environment 2000 of FIG. 20 for convenience and clarity. However, this is not intended to be limiting.

Technique 2100 can begin at circle 21.1. At circle 21.1, hardened system 2001 can receive raw input data 1824. For example, client system 1803 can receive raw input data 1824 from input device 1852. It is noted, that multiple different instances of raw input data 1824 could be received and sanitized as described herein. For example, client system 1803 could repeatedly receive raw input data 1824 at circle 21.1 and sanitize the raw input data 1824 as described herein.

At circle 21.2, server 1801 can query client system 1803 to determine the computing capabilities of client system 1803. At circle 21.3, client system 1803 can send indications of computing capabilities to server 1801. In general, server 1801 can query client system 1803 to determine sanitization capabilities of client system 1803. In some examples, server 1801 can query client system 1803 to determine whether client system 1803 meets minimum compute requires of sanitization payload 1823 (e.g., processing, trust level, memory, etc.). At circle 21.4, server 1801 and client system 1803 can establish a trusted connection. For example, server 1801 and client system 1803 can exchange credentials (e.g., encryption, validation, etc.) to establish a trusted and/or encrypted communication channel.

At circle 21.5, server 1801 can send sanitization payload to client system 1803. In some examples, sanitization payload can include indications of a sanitization protocol, such as, decoding technique, filtering technique, and encoding technique with which to sanitize raw input data 1824. At circle 21.6, client system 1803 can generate sanitized input data 1825 from raw input data 1824 based on sanitization payload 1823. For example, client system 1803 can decode, filter, and encode raw input data 1824.

At circle, 21.7, client system 1803 can send sanitized input data 1825 to server 1801. Additionally, at circle 21.7, server 1801 may monitor a status (e.g., security policies, compute resources, etc.) of client system 1803. Furthermore, at circle 21.7, server 1801 may de-activate and/or remove sanitization payload 1823 from client system 1803.

Hidden Classes to Discover Adversarial Attacks

Figure 22:
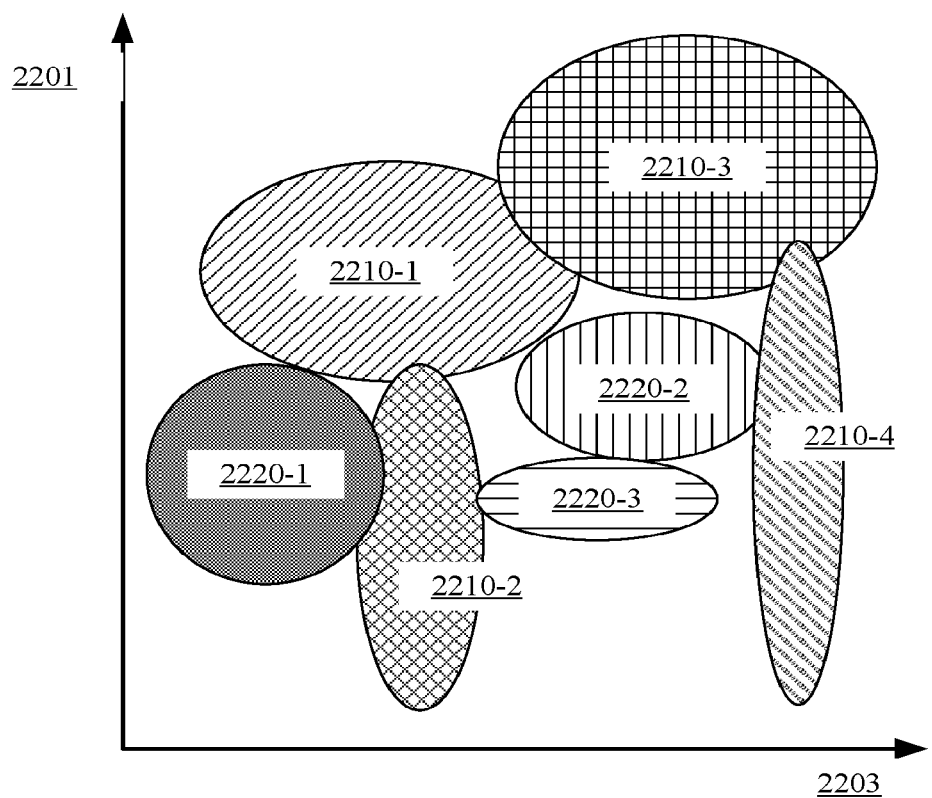
FIG. 22 illustrates a graph depicting an example domain for an inference model.

FIG. 22 illustrates a graph 2200 depicting potential outputs plotted against possible inputs for an example inference model. The potential outputs are depicted including various classes. Specifically, potential outputs include visible classes 2210-1, 2210-2, 2210-3 and 2210-3 as well as hidden classes 2220-1, 2220-2 and 2220-3. Furthermore, the potential outputs are plotted for possible inputs [2201, 2203]. It is noted, the possible inputs 2201 and 2203 are depicted as two dimensional (2D) for purposes of clarity of presentation. However, in practice, the domain of an inference model may be many dimensional.

In general, the present disclosure provides that a domain for an inference model can include both visible classes (e.g., classes 2210) and well as hidden classes (2220). The hidden classes are used to detect possible probing attacks against the model, explained in greater detail below. One security risk to inference systems is probing. An inference model may be probed or attacked with input perturbations in an effort to identify inputs that may "fool" the system. More specifically, an attacked can decorate known objects used in image inputs, inject noise or otherwise transformation inputs to an inference model. These modified or transformed inputs can be used to probe the inference model to generate inputs that lead to misclassification. For example, morphing an image of a gun and a water spigot may lead to a inference engine misclassifying an image of a gun as a water spigot.

As another example, probing can occur in instances where the adversarial party is not aware of the models supported functionality. In such cases, the adversarial party may apply artificially synthesized inputs or noisy inputs, in an attempt to gain understanding of the functionality of the model. Such inputs often activate or excite areas of the model not typically activated by conventional or expected inputs.

Some inference systems attempt to sanitize inputs, for example, by pre-processing the inputs to filter out adversarial perturbations. However, such techniques are not always reliable. Furthermore, computational requirements for such pre-processing add to the needed power and computing resource requirements for the inference system. As such, pre-processing is not always scalable.

Figure 23B:
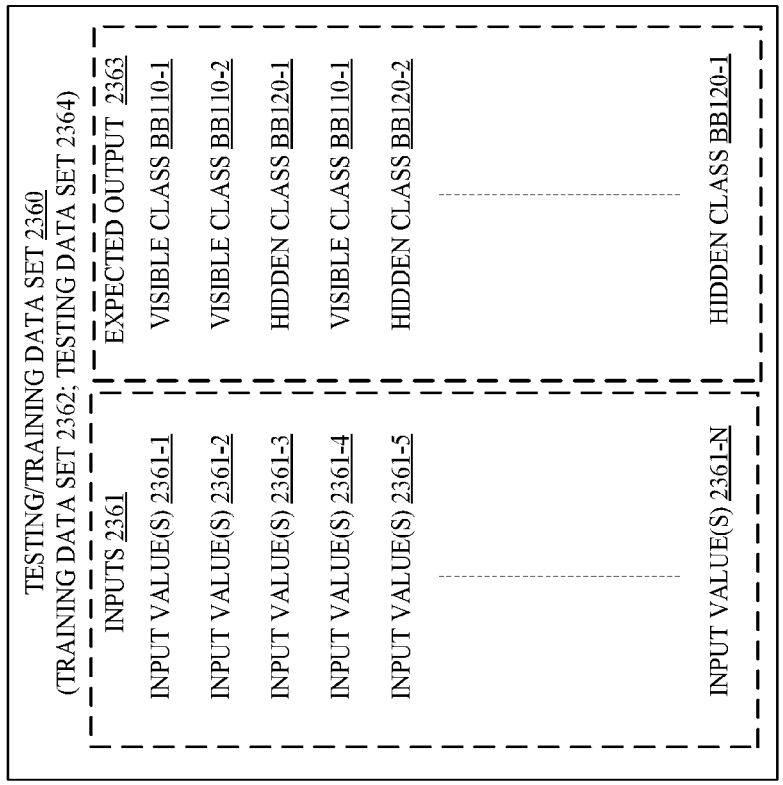
FIG. 23B illustrates a second example training/testing data set.
Figure 23A:
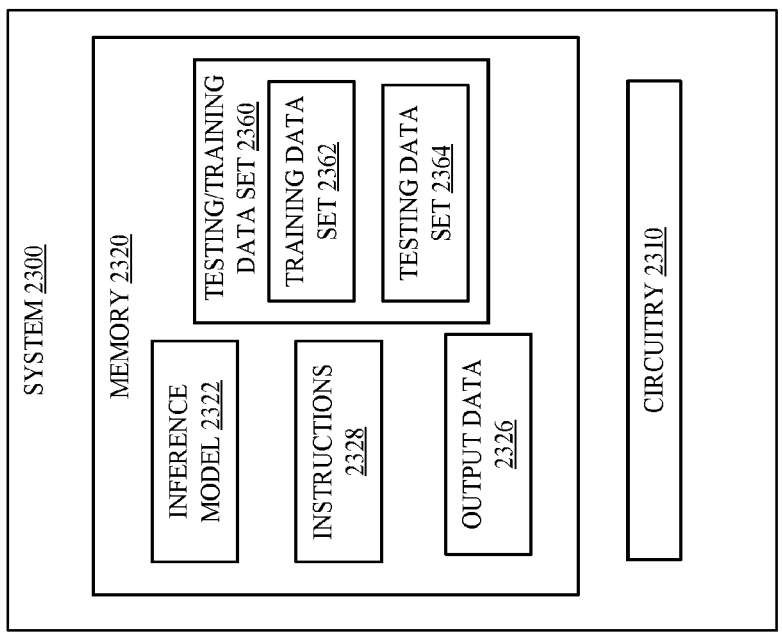
FIG. 23A illustrates a fourth example inference environment.

FIG. 23A illustrates an example system 2300 to train an inference model. The system 2300 includes circuitry 2310 and memory 2320. The memory 2320 stores inference model 2322, instructions 2328, testing/training data set 2360 and output data 2326. The testing/training data set 2360 include both testing data 2362 and well as training data 2364. The testing data 2362 and training data 2364 can be used to "train" the inference model 2322, for example, using the technique 300 of FIG. 3.

An example of testing/training data set 2360 is depicted in FIG. 23B. Turning briefly to this figure, the testing/training data set 2360 includes inputs 2361 as well as expected outputs 2363. In general, the expected inputs can include input value(s) 2361-$n$, where n is a positive integer. For example, input value(s) 2361-1, input value(s) 2361-2, input value(s) 2361-3, input value(s) 2361-4, input value(s) 2361-5 to input value(s) 2361-N, as shown for inputs 2361. For each input value 2361-$n$, an associated expected output 2363 is shown. Each of the expected outputs 2363 corresponds to either a visible class 2210 or a hidden class 2220 to which the inference model 2322 is to be trained to classify input to. As an example, the visible classes 2210 can correspond to categories of objects to be classified by inference system 2322, such as, pens, knives, swords, rulers, scissors, and pencils. Hidden classes 2220 can correspond to categories that may indicate potential probing, such as, for example, knives disguised as pens, swords disguised as rules, or the like. With some examples, hidden classes 2220 could correspond to blacklisted objects that are not allowed as inputs. The input value(s) 2361-$n$ associated with the hidden classes can correspond to inputs that have been transformed to attempt to trigger misclassification by the inference model 2322. For example, an example input value(s) 2361-$n$ can be generated by morphing an image of a gun with an image of a water spigot.

During operation, the trained inference model 2322 can be used to identify potential probing attacks against the network when inputs trigger categorization or inference of one of the hidden classes. The inference system in which the inference model 2322 is implemented can be arranged to take some mitigative actions, described in greater detail below.

Figure 24:
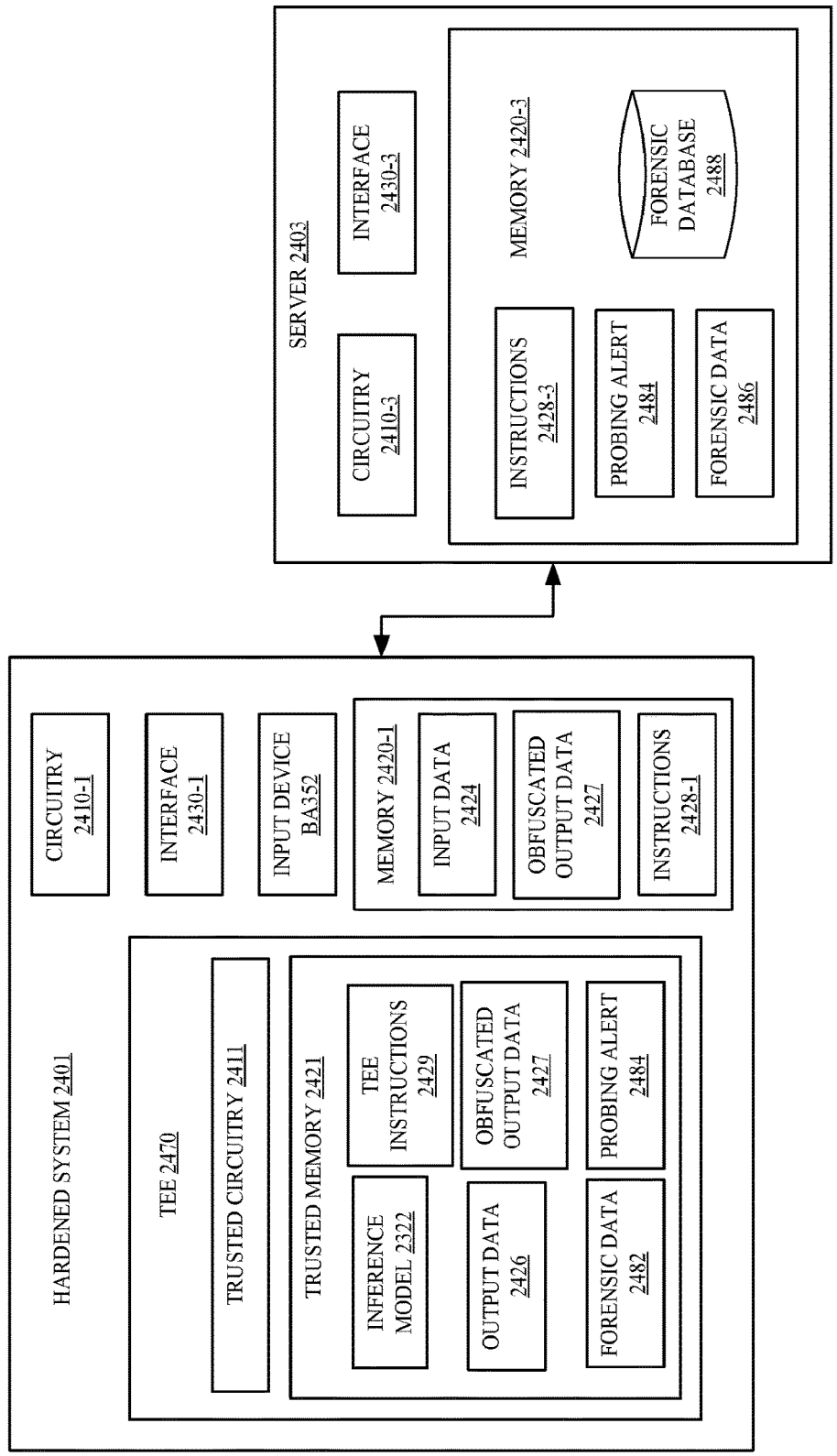
FIG. 24 illustrates a fifth example inference environment.

FIG. 24 illustrates an example inference environment 2400 including a hardened system 2401 and a server 2403. In general, the hardened system 2401 and the server 2403 can be coupled via any suitable interconnect, such as, a wide area network, a local area network or the Internet. Hardened system 2401 includes circuitry 2410-1, memory 2420-1, interface 2430-1, input device 2252 and trusted execution environment (TEE) 2470. Memory 2420-1 stores instructions 2428-1, input data 2424 and obfuscated output data 2427. TEE 2470 includes trusted circuitry 2411 and trusted memory 2421. Trusted memory 2421 stores TEE instructions 2429, inference model 2322, output data 2426, obfuscated output data 2427, forensic data 2482 and probing alert 2484.

Server 2403 includes circuitry 2410-3, memory 2420-3 and interface 2430-3. Memory 2420-3 stores instructions 2428-3, forensic data 2482, probing alert 2484 and forensic database 2486.

In general, hardened system 2401 operates to detect potential probing attacks. Circuitry 2410-1 can execute instructions 2428-1 to receive input data 2424, for example, from input device 2452. TEE circuitry 2411 can execute TEE instructions 2429 to generate output data 2426, by execution of inference model 2322 using input data DD324. TEE circuitry 2411 can execute TEE instructions 2429 to determine whether input data 2424 may be a potential probing attack, or that is, whether input data DD324 is associated with a potential probing attack. For example, TEE circuitry 2411, in executing TEE instructions 2429, can determine whether output data 2426 corresponds to (e.g., is one of, or the like) hidden classes 2220. Said differently, if inference model 2322 classifies input data 2424 as one of the hidden classes 2220, TEE circuitry 2411 may determine that input data 2424 is associated with a probing attack.

Responsive to determining that 2424 is associated with a potential probing attack, TEE circuitry 2411, in executing TEE instructions 2429, can collect information about the potential probing attack and save the collected information as forensic data 2482. For example, TEE circuitry 2411, in executing TEE instructions 2429, can save information including an indication of the input device 2452, input device 2452 operator, input data 2424, data about inference model 2322 (e.g., context, history, states, or the like) as forensic data 2482. Furthermore, TEE circuitry 2411, in executing TEE instructions 2429, can generate probing alert 2484 and can send (e.g., via interface 2430-1, or the like) an indication of the probing alert to server 2403. Probing alert 2484 can include an indication that a potential probing attacks was initiated against the system 2401 and that forensic data 2482 was saved. Additionally, TEE circuitry 2411, in executing TEE instructions 2429, can provide forensic data 2482 to server 2403.

In some implementations, hardened system 2401 can obfuscate the output data 2426 to hide the fact that probing may have been detected. For example, TEE circuitry 2411, in executing TEE instructions 2429, can generate obfuscated output data 2427 from output data 2426, wherein obfuscated output data 2427 can include visible classes 2210. For example, TEE circuitry 2411, in executing TEE instructions 2429, can generate obfuscated output data 2427 including an indication of a visible class 2210 associated with the hidden class 2220 of output data 2426. Using the gun and water spigot example from above; output data 2426 may include an indication of a hidden classification 2220 corresponding to input data 2424 that is an image of a gun modified to fool or misclassify the gun as a water spigot. However, the obfuscated output data 2427 may indicate classification of the input data 2424 as a water spigot. For example, obfuscated output data 2427 can be generated to not provide notice to the attacker that probing is detected.

Circuitry 2410-3 can execute instructions 2428-3 to receive probing alert 2482. Responsive to receiving probing alert 2482, circuitry 2410-3, in executing instructions 2428-3, can receive forensic data 2484 from hardened system 2401 and can add forensic data 2484 to a forensic database 2486. Forensic database 2486 can be used to, for example, prevent further misclassifications.

Figure 25:
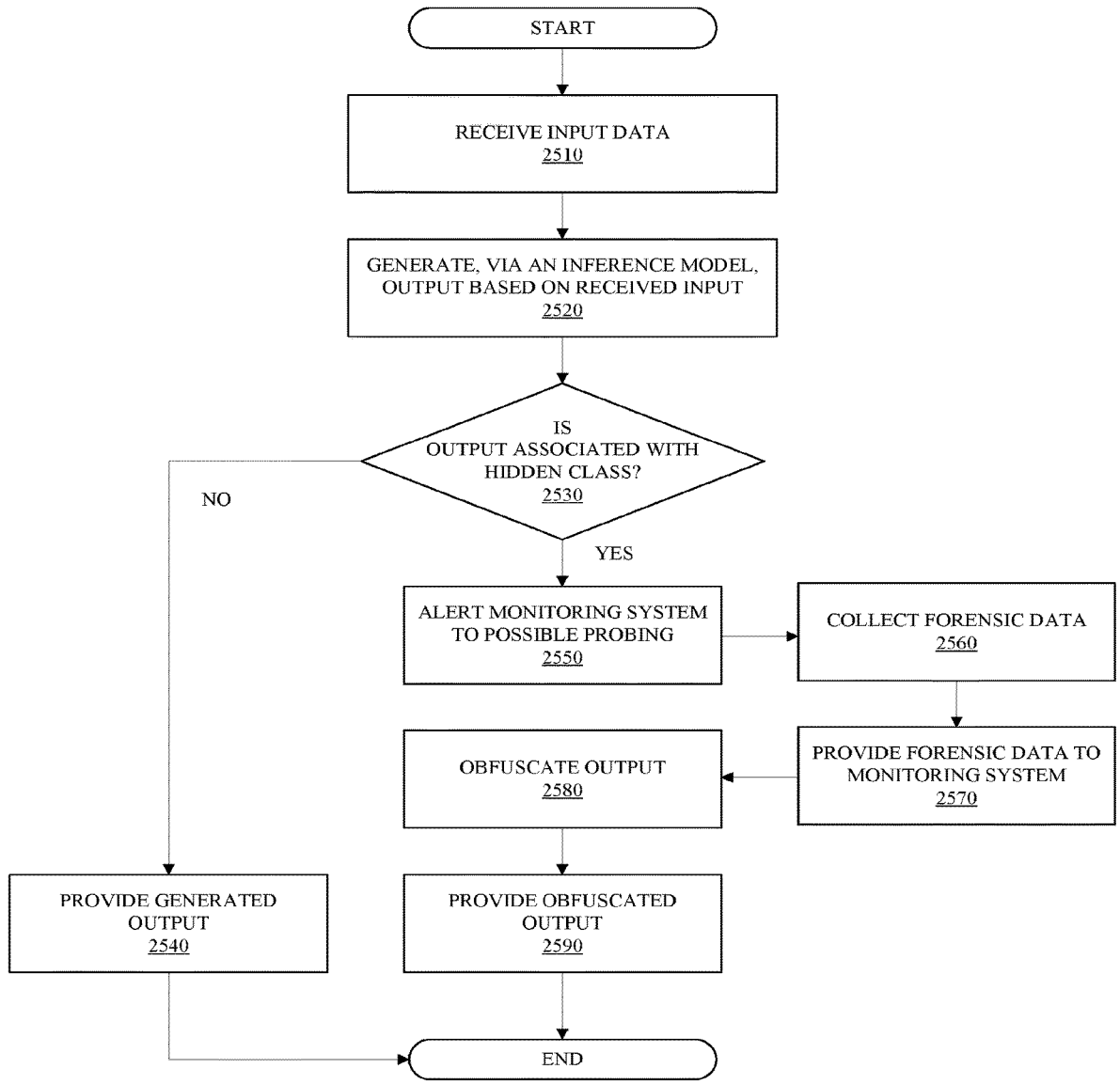
FIG. 25 illustrates a sixth example logic flow.

FIG. 25 illustrates a logic flow 2500. The logic flow 2500 may be representative of some or all the operations executed by one or more devices described herein. For example, hardened system 2401 (or components thereof) may perform the operations in logic flow 2500 to detect potential probing using hidden classes.

Logic flow 2500 may begin at block 2510 "receive input data" the system 2401 can receive input data 2424. For example, circuitry 2410-1, in executing instructions 2428-1, can receive input data 2424 (e.g., from input device 2452, or the like). Continuing to block 2520 "generate, via an inference model, output data based on the received input data" the hardened system 2401 can generate output data 2426 from inference model 2322 and input data 2424. For example, TEE circuitry 2411, in executing instructions 2429, can generate output data 2426 by executing inference model 2322 on input data 2424.

Continuing to decision block 2530 "is the output data associated with a hidden class?" hardened system 2401 can determine whether output data 2426 is associated with a hidden class 2220, or said differently, whether inference system 2322 classifies input data 2424 as a hidden class 2220. From decision block 2530, logic flow 2500 can continue to either block 2540 or block 2550. Logic flow 2500 can continue from decision block 2530 to block 2540 based on a determination that the output data 2426 is not associated with a hidden class 2220, while logic flow 2500 can continue from decision block 2530 to block 2550 based on a determination that the output data 2426 is associated with a hidden class 2220.

At block 2540 "provide generated output" hardened system 2401 can provide the output data 2426 to an output data consumer (e.g., output device, another computing device, or the like). For example, circuitry 2410-1, in executing instructions 2428-1, can provide output data 2426 to an output data consumer. From block 2540, the logic flow 2500 can end, or can repeat based on receiving new inputs.

At block 2550 "alert monitoring system to potential probing" hardened system 2401 can alert a monitoring system (e.g., server 2403) to potential probing attacks. For example, circuitry 2410-1, in executing instructions 2428-1, can provide probing alert 2482 to server 2403. Continuing to block 2560 "collect forensic data" hardened system 2401 can collect forensic data associated with the potential probing attack. For example, TEE circuitry 2411, in executing TEE instructions 2429, can collect information associated with the potential probing attack and save indications of the collected information as forensic data 2484. Continuing to block 2570 "provide forensic data to the monitoring system" hardened system 2401 can provide the forensic data 2484 to the monitoring system (e.g., server 2403). For example, TEE circuitry 2411, in executing TEE instructions 2429, can provide forensic data 2484 to server 2403.

Continuing to block 2580 "obfuscate output data" hardened system 2401 can obfuscate the output data 2426. For example, TEE circuitry 2411, in executing TEE instructions 2429, can generate obfuscated output data 2427 from output data 2426. Continuing to block 2590 "provide obfuscated output data to an output data consumer (e.g., output device, another computing device, or the like). For example, circuitry 2410-1, in executing instructions 2428-1, can provide obfuscated output data 2427 to an output data consumer. From block 2590, the logic flow 2500 can end, or can repeat based on receiving new inputs.

Input Distortion to Protect Against Adversarial Attacks

As noted, inference models are vulnerable to adversarial attacks along a number of attack vectors. For example, theft and/or unauthorized usage of inference models as well susceptibility to probing are two such attack vectors. As such, the ability to detect inappropriate or unauthorized use of the inference model as well as prevent or discourage probing are desirable.

Figure 30:
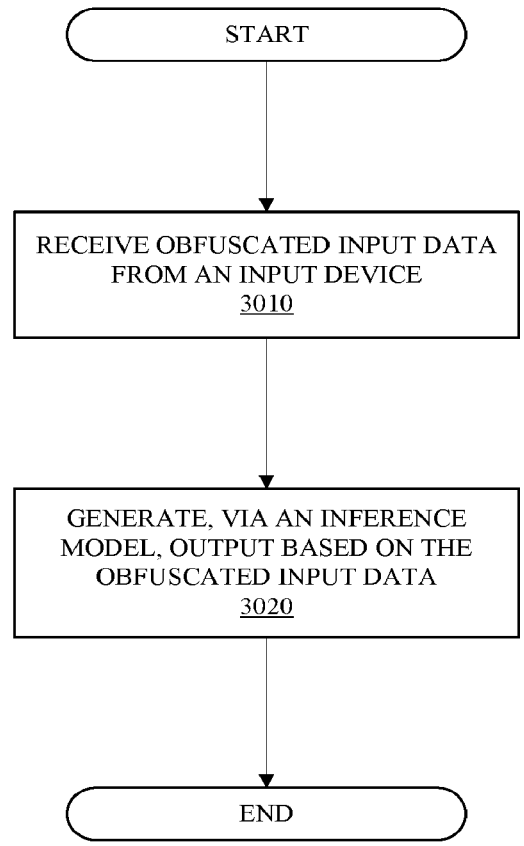
FIG. 30 illustrates an eighth example logic flow.

In general, the present disclosure provides an inference model trained with obfuscated input data. Said differently, the present disclosure provides an inference model trained to correctly classify input data that is obfuscated or includes some distortions. The obfuscation or distortion can be provided via processing (FIGS. 26 to 28) or as a result of the physical nature of the input device (FIGS. 29 to 30). Thus, attacks based on adversarial perturbations may be less effective, or ineffective, as the model is trained to classify obfuscated input data as opposed to regular input data.

Figure 26:
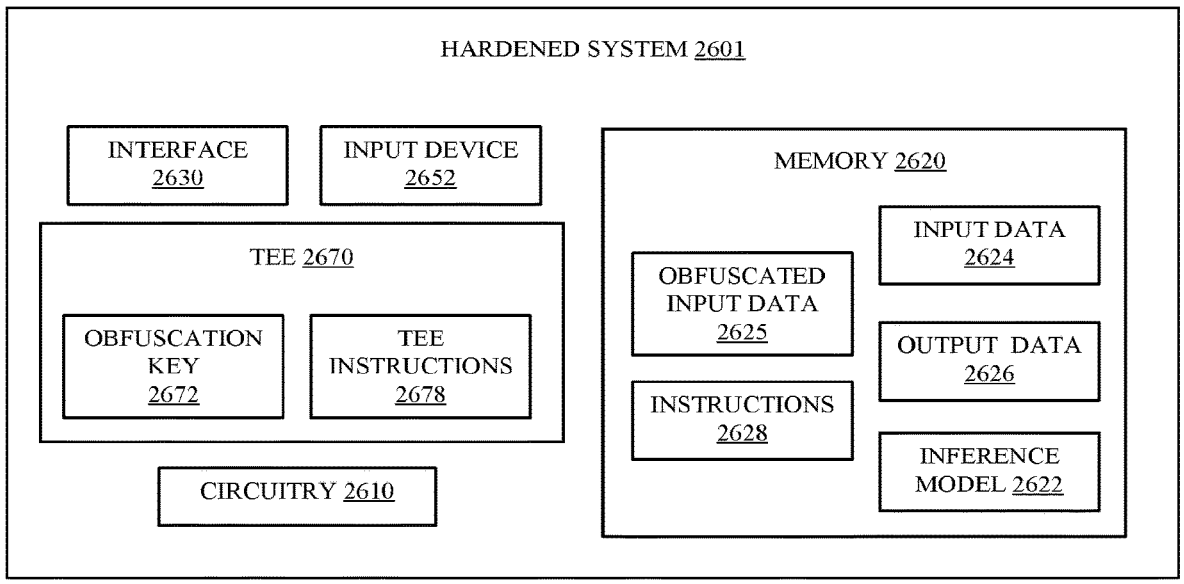
FIG. 26 illustrates an eighth example of a hardened system.

In some examples, input data can be obfuscated via encoding the input data using a pre-selected key, or the like (e.g., FIGS. 26 and 27). In other examples, input data can be obfuscated at the input device (e.g., FIG. 28) via filters, input distortion devices, or the like. It is noted that often, examples of image capture device and image obfuscation are used herein. However, the present disclosure can be implemented to obfuscate input data of any type, such as, for example, audio, video, other data types or structures or the like.

FIG. 26 illustrates an example hardened system 2601, which may be implemented according to the present disclosure. The hardened system 2601 includes circuitry 2610, memory 2620, interface 2630, input device 2652 and a trusted execution environment (TEE) 2670. The memory 2620 stores inference model 2622, input data 2624, obfuscated input data 2625, output data 2626, and instructions 2628. The TEE 2670 stores obfuscation key 2672 and TEE instructions 2678. In general, TEE 2670 can be any trusted execution enclave or partition within system 2601. For example, TEE 2670 can be a trusted execution partition within circuitry 2610. As another example, TEE 2670 can include its own circuitry and memory (not shown) segmented from circuitry 2610 and memory 2620 in a trusted manner. Generally, TEE 2670 may provide security features such as isolated execution (e.g., of TEE instructions 2678) along with confidentiality of obfuscation key 2672. Generally, system 2601 can generate obfuscated input data in a secure manner (e.g., via TEE 2670, or the like). Such obfuscated input data can be used an input data for an inference model (e.g., inference model 2622) trained to classify such obfuscated input data. Thus, without the correctly obfuscated input data, the inference model may be unusable. That is, the inference model may not correctly classify input data itself as it is trained on obfuscated input data. This may discourage model theft, unauthorized use of the model, or probing.

During operation, circuitry 2610 of system 2601 can execute instructions 2628 to receive input data 2624. For example, circuitry 2610 can receive input data 2624 from input device 2652. As another example, circuitry 2610 can receive input data 2624 from another computing device via interface 2630.

TEE 2670, in executing instructions 2678 can generate obfuscated input data 2625 from input data 2624 and obfuscation key 2672. For example, TEE 2670, in executing instructions 2678 can encode, distort, or otherwise obfuscate, input data 2624 using obfuscation key 2672.

Circuitry 2610, in executing instructions 2628, can execute inference model 2622 to generate output data 2626 from obfuscated input data 2625. As noted above, inference model 2622 is trained on obfuscated input data (e.g., like obfuscated input data 2625), thus, inference model 2622 may correctly classify input data 2624 that was correctly obfuscated as described herein.

With some examples, an input device can be arranged to output obfuscated input data. FIG. 27 illustrates an inference environment 2700 including system 2701 and input device 2752. Input device 2752 incudes includes circuitry 2710-1, memory 2720-1, interface 2730-1, input capture circuitry 2751 and trusted execution environment (TEE) 2770. The memory 2720-1 stores input data 2724, obfuscated input data 2725, and instructions 2728-1. The TEE 2770 stores obfuscation key 2772 and TEE instructions 2778. In general, TEE 2770 can be any trusted execution enclave or partition within input device 2752. For example, TEE 2770 can be a trusted execution partition within circuitry 2710-1. As another example, TEE 2770 can include its own circuitry and memory (not shown) segmented from circuitry 2710-1 and memory 2720-1 in a trusted manner. Generally, TEE 2770 may provide security features such as isolated execution (e.g., of TEE instructions 2778) along with confidentiality of obfuscation key 2772.

Input device 2752 can be arranged to capture input data, obfuscate the input data, and provide the obfuscated input data to system 2701. Generally, input device 2752 can generate obfuscated input data in a secure manner (e.g., via TEE 2770, or the like). Input capture circuitry 2751 can be any hardware arranged to capture input data 2724. For example, input capture circuitry 2751 can be an image sensor (e.g., CMOS sensor, or the like), a microphone, a GPS sensor, a thermal sensor, a biometric sensor, or the like. In some examples, circuitry 2710-1 can execute instructions 2728-1 to receive signals generated by input capture circuitry 2751 and store indications of these signals as input data 2724.

TEE 2770, in executing instructions 2778 can generate obfuscated input data 2725 from input data 2724 and obfuscation key 2772. For example, TEE 2770, in executing instructions 2778 can encode, distort, or otherwise obfuscate, input data 2724 using obfuscation key 2772.

Circuitry 2710-1 can execute instructions 2728-1 to send an obfuscated input data 2725 to system 2701. For example, circuitry 2710-1 can send control signals to interface 2730-1 to cause interface 2730-1 to send an information element including indications of obfuscated input data 2725 to system 2701 (e.g., via interface 2730-2, or the like).

Circuitry 2710-2, in executing instructions 2728-2, can execute inference model 2722 to generate output data 2726 from obfuscated input data 2725. As noted above, inference model 2722 is trained on obfuscated input data (e.g., like obfuscated input data 2725), thus, inference model 2722 may correctly classify input data 2724 that was correctly obfuscated as described herein.

Figure 28:
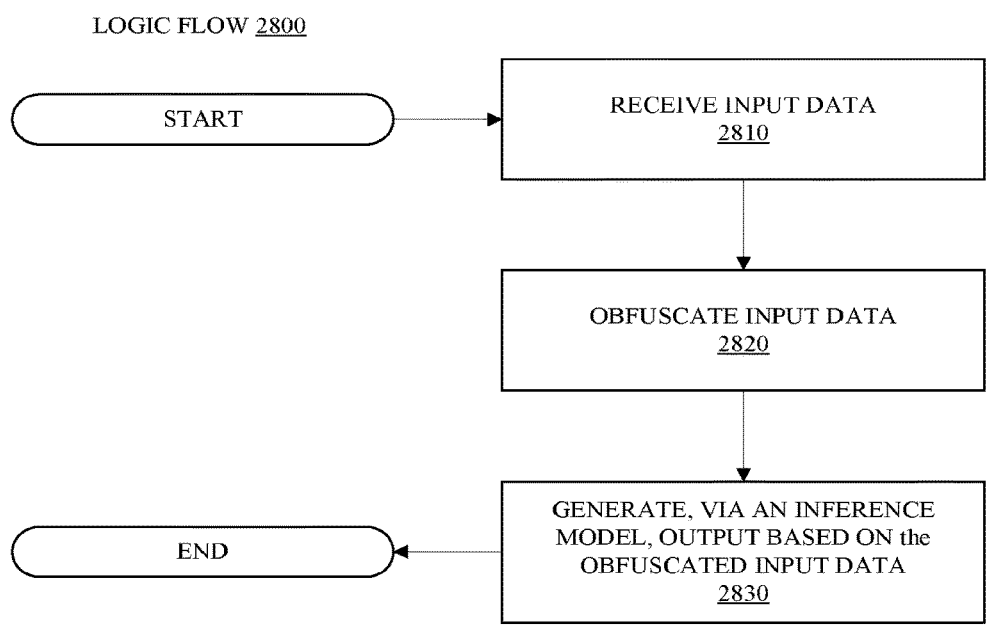
FIG. 28 illustrates a seventh example logic flow.

FIG. 28 illustrates a logic flow 2800. The logic flow 2800 may be representative of some or all the operations executed by one or more devices described herein. For example, hardened system 2601 (or components thereof) may perform the operations in logic flow 2800 to discourage adversarial attacks by obfuscating input data. As another example, inference environment system 2700 (or components thereof) may perform the operations in logic flow 2800 to discourage adversarial attacks by obfuscating input data. Logic flow 2800 is described with reference to hardened system 2601 for purposes of clarity. However, examples are not limited in this context.

Logic flow 2800 may begin at block 2810 "receive input data" the system 2601 can receive input data 2624. For example, hardened system 2601 can receive input data 2624 from input device 2652, via interface 2630, or the like. Continuing to block 2820 "obfuscate input data" system 2601 can obfuscate the input data 2624 based on obfuscation key 2672. It is noted, that system 2601 can obfuscate input data 2624 in a secure manner. That is, obfuscation key 2672 can be securely stored (e.g., in TEE 2670, or the like) and obfuscated input data 2625 can be generated via secure processing (e.g., in TEE 2670, or the like). For example, TEE 2670, in executing instructions 2678, can obfuscate input data 2624 using obfuscation key 2672 to generate obfuscated input data 2625.

Continuing to block 2830 "generate, via an inference model, output based on the obfuscated input data" the system 2601 can generate, via inference model 2622, output data 2626 from obfuscated input data 2625. For example, circuitry 2610 can execute inference model 2622 to generate output data 2626 from obfuscated input data 2625.

In some implementations, input can be obfuscated by hardware features or physical features of an input devices. For example, cameras are often used as input devices for inference systems arranged to classify images. In such an example, a camera can be provided with a lens to distort or obfuscate the captured image and provide obfuscated input data.

FIG. 29 illustrates an inference environment 2900 including system 2901 and input device 2952. Input device 2952 incudes includes circuitry 2910-1, memory 2920-1, interface 2930-1, and input capture circuitry 2951. The memory 2920-1 stores obfuscated input data 2925 and instructions 2928-1. Input device 2952 can be arranged to capture obfuscated input data and provide the obfuscated input data to system 2901. Generally, input device 2952 can capture an input and as part of capturing the input obfuscate the captured input. For example, where input device 2952 is a camera, the camera can be provisioned with obfuscation lens 2953 arranged to distort images captured by the camera. Circuitry 2910-1 can execute instructions 2928-1 to receive signals generated by input capture circuitry 2951 and store indications of these signals as obfuscated input data 2925. Further, circuitry 2910-1 can execute instructions 2928-1 to send obfuscated input data 2925 to system 2901. For example, circuitry 2910-1 can send control signals to interface 2930-1 to cause interface 2930-1 to send an information element including indications of obfuscated input data 2925 to system 2901 (e.g., via interface 2930-2, or the like).

Circuitry 2910-2, in executing instructions 2928-2, can execute inference model 2922 to generate output data 2926 from obfuscated input data 2925. As noted above, inference model 2922 is trained on obfuscated input data (e.g., like obfuscated input data 2925), thus, inference model 2922 may correctly classify input captured via image capture circuitry 2951 and obfuscation lens 2953.

FIG. 30 illustrates a logic flow 3000. The logic flow 3000 may be representative of some or all the operations executed by one or more devices described herein. For example, inference environment system 2900 (or components thereof) may perform the operations in logic flow 3000 to discourage adversarial attacks by obfuscating input data.

Logic flow 3000 may begin at block 3010 "receive obfuscated input data from an input device" the obfuscated input data 2925 can received from an input device. Input data 2952 can be arranged to capture image data and obfuscate the captured image data as part of the capture process (e.g., via obfuscation lens 2953, or the like).

Continuing to block 3020 "generate, via an inference model, output based on the obfuscated input data" the system 2901 can generate, via inference model 2922, output data 2926 from obfuscated input data 2925. For example, circuitry 2910-2 can execute inference model 2922 to generate output data 2926 from obfuscated input data 2925.

Inference Probability Based on Network Activation

As noted, a potential attack vector against inference systems is leveraging native inaccuracies in the inference system (e.g., loss functions, etc.) with this intent to cause a misclassification. A common example of such an attack is manipulating selected pixels in an image to cause a classification system to misclassify the image. As a specific example, a single pixel image provided to the Canadian Institute for Advanced Research (CIFAR-10) classification system causes classification of the single pixel image as an aircraft with 80% confidence.

The present disclosure provides a hardened system arranged to utilize information related to generating output from an inference system (e.g., network activations, etc.) to generate an inference reliability score. The reliability score can be generated to augment or modify a confidence probability generated by the inference model itself. Said differently, some inference models (e.g., convoluted neural networks, etc.) generate output including indications of an inference as well as a confidence probability. In such an example, the reliability score can be generated to supplement the confidence probability generated by the inference model.

Figure 31:
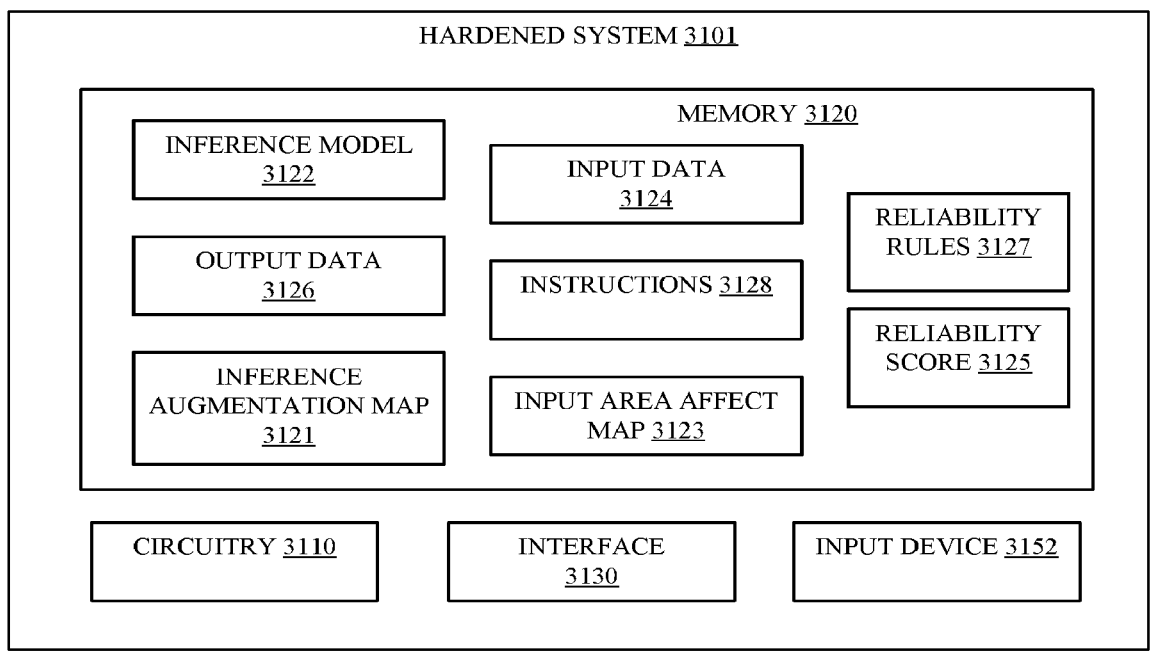
FIG. 31 illustrates a ninth example of a hardened system.

FIG. 31 illustrates an example hardened system 3101, which may be implemented according to the present disclosure. The hardened system 3101 includes circuitry 3110, memory 3120, interface 3130 and input device 3152. The memory 3120 stores inference augmentation map 3121, inference model 3122, input area affects map 3123, input data 3124, reliability score 3125, output data 3126, reliability rules 3127, and instructions 3128.

In general, hardened system 3101 can provide a reliability score based in part on indications of which portions or components of input data 3124 affected the output data 3126. During operation, circuitry 3110 of system 3101 can execute instructions 3128 to receive input data 3124. For example, circuitry 3110 can receive input data 3124 from input device 3152. As another example, circuitry 3110 can receive input data 3124 from another computing device via interface 3130.

Circuitry 3110, in executing instructions 3128, can execute inference model 3122 to both generate output data 3126 from input data 3124 and to generate inference augmentation map 3121. Said differently, inference model 3122, based on input data 3124, can output (1) output data 3126 and (2) inference augmentation map 3121. In general, inference augmentation map 3121 can include indications or information of arithmetic operations performed during the inference, states of the inference model 3122 during execution (e.g., when generating output 3126), or the like. With some examples, inference augmentation map 3121 can comprise a model activation map or a network activation heat map (e.g., including indications of layer activations, neuron activations, or the like) during generation of output data 3126. With some examples, inference augmentation map 3121 may include multiple layers (e.g., each layer corresponding to neuron activations for a respective layer of inference model 3122, or the like).

Circuitry 3110, in executing instructions 3128, can generate input area affect map 3123. For example, circuitry 3110 can mask input data 3124 based on inference augmentation map 3121. As a specific example, circuitry 3110 can identify areas, portions, or components of input data 3124 that were not primarily responsible for activating the inference model 3122 to generate the output data 3126. As a specific example, assuming that the inference model 3122 is an image classifier and input data 3124 is an image. Input area affect map 3123 could include a copy of input data 3124 that identifies those areas affecting output data 3126 (based on inference augmentation map 3121). With some examples, circuitry 3110 can generate input area affect map 3123 based on inference augmentation map 3121 and reliability rules 3127. In such an example, reliability rules 3127 can include an indication of a threshold activation level corresponding to neuron activations. For example, where neuron activation function results in output between 0 and 1, reliability rules 3127 can include an indication that neuron activation should be greater than 0.3 to contribute to or affect output data 3126. With some examples, reliability rules 3127 can vary among domains, tasks, classification classes, or the like. As a specific example, reliability rules 3127 can include rules for classification class "dogs" and different rules for classification class "cats".

Circuitry 3110, in executing instructions 3128, can generate reliability score 3125 based on input area affect map 3123 and reliability rules 3127. Using the image classifier example discussed above, circuitry 3110 can generate a reliability score 3125 based on a percentage of the input data 3124 (e.g., the image) contributing (or not contributing) to the output data 3126 (e.g., based on input area affect map 3123, or the like). As another example, circuitry 3110 can generate a reliability score 3125 based on a variability of the image data (e.g., pixel color, variance between pixel color, or the like) for the portions of the image contributing (or not contributing) to the output data 3126 (e.g., based on input area affect map 3123, or the like). With some examples, circuitry 3110 can generate a reliability score 3125 based on a ratio of the variability of the image data (e.g., pixel color, variance between pixel color, or the like) for the portions of the image contributing to the output data 3126 over the variability of the image data for the portions of the image not contributing to the output data 3126. With some examples, circuitry 3110 can generate a reliability score 3125 based on a combination of the input data 3124 variability, percentage of input data 3124 contribution (or not) to output data 3126, and/or the ratio of input data variability. With some examples, circuitry 3110 can generate a reliability score 3125 based on a which portion(s) of input data 3124 contributed (or not) to output data 3126. For example, where selected portions of input data 3124 (e.g., corners of the image, or the like) contributed to output data 3126, the reliability score may be lower.

Figure 32:
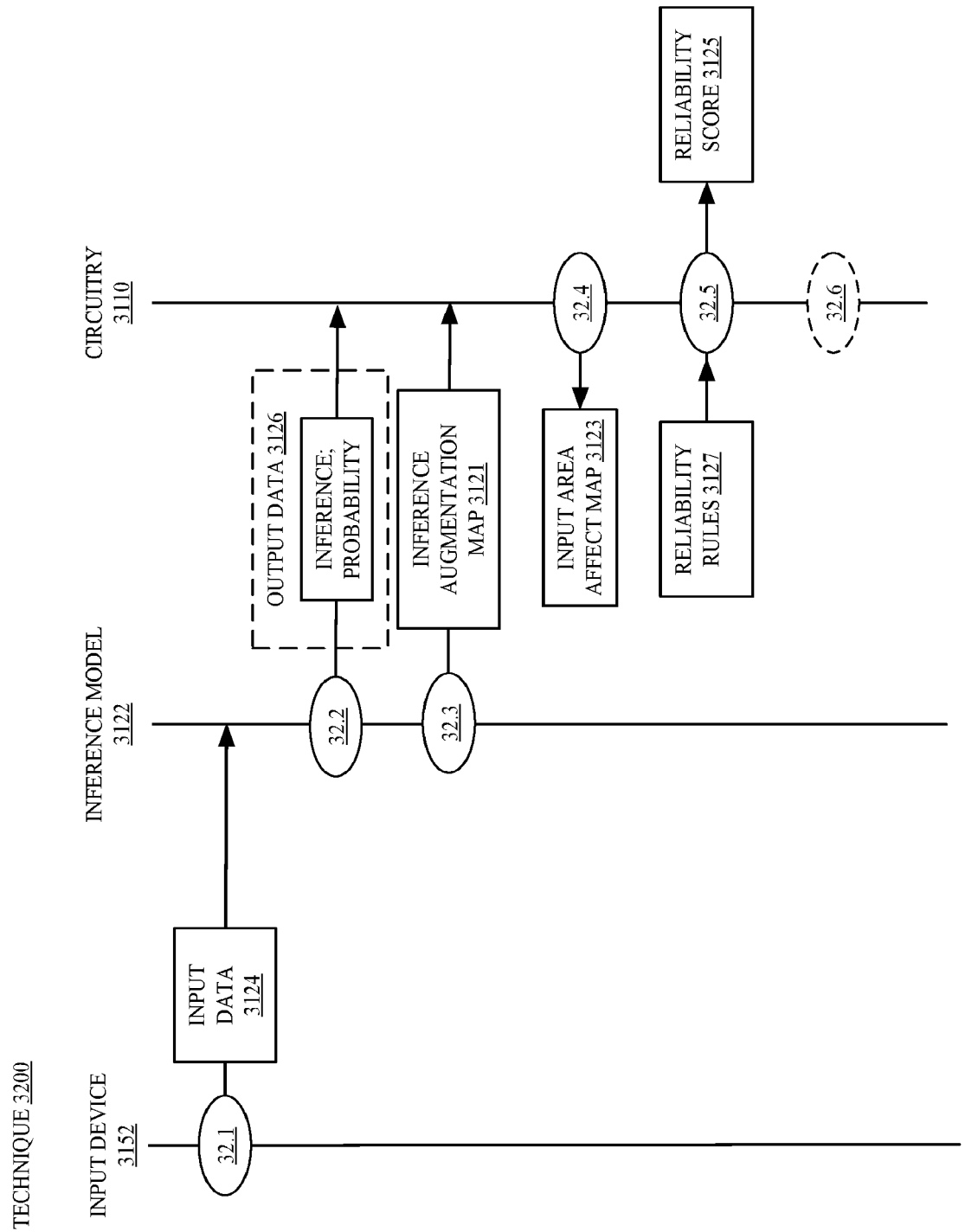
FIG. 32 illustrates a ninth example logic flow.

FIG. 32 illustrates an example technique 3200 that may be implemented by a hardened system (e.g., hardened system 3100, or the like) to generate an inference reliability score as described herein. Technique 3200 is described with reference to the hardened system 3100 of FIG. 31 for convenience and clarity. However, this is not intended to be limiting. Technique 3200 can begin at circle 32.1. At circle 32.1, input device 3152 can capture input data 3124.

At circle 32.2, inference model 3122 can generate output data 3126. For example, circuitry 3110 can execute inference model 3122 to generate output data 3126. In some examples, output data can include both an inference and an inference probability. At circle 32.3, inference model 3122 can output an inference augmentation map 3121. For example, inference model 3122 can generate inference augmentation map 3121 as part of generating output data 3126.

At circle 32.4 circuitry 3110, in executing instructions 3128, can generate input area affect map 3123. For example, circuitry 3110 can determine which portions of inference model 3122 (e.g., based on inference augmentation map 3121) area activated by input data 3124. At circle 32.5 circuitry 3110, in executing instructions 3128, can generate input area affect map 3123. For example, circuitry 3110 can generate reliability score 3125 based in part on reliability rule and input area affect map 3123. Technique 3200 can optionally include circle 32.6. At circle 32.6, circuitry 3110 can update, modify, or otherwise augment the probability output by inference model 3122 as part of output data 3126.

Figure 33:
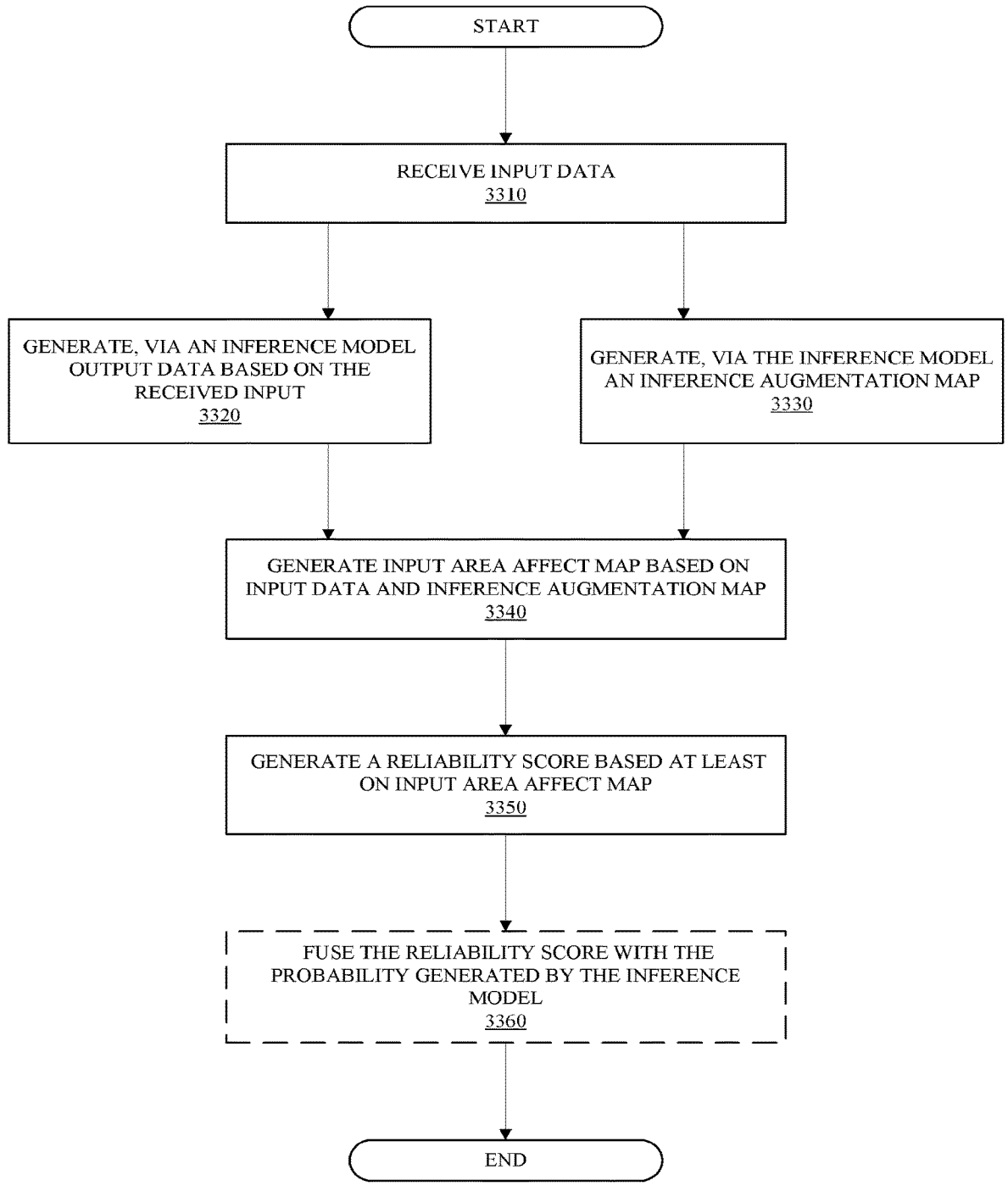
FIG. 33 illustrates a fifth example technique.

FIG. 33 illustrates a logic flow 3300. The logic flow 3300 may be representative of some or all the operations executed by one or more devices described herein. For example, hardened system 3101 (or components thereof) may perform the operations in logic flow 3300 to generate a reliability score comprising an indication of a reliability of output generated by an inference model. Logic flow 3300 is described with reference to hardened system 3101 for purposes of clarity. However, examples are not limited in this context.

Logic flow 330 may begin at block 3310 "receive input data" the system 3101 can receive input data 3124. For example, hardened system 3101 can receive input data 3124 from input device 3152, via interface 3130, or the like. Continuing to block 3320 "generate, via an inference model, output data based on the received input data" and block 3330 "generate, via an inference model, an inference augmentation map" the system 3101 can generate, via inference model 3122, output data 3126 from input data 3124 and inference augmentation map 3121. For example, circuitry 3110 can execute inference model 3122 to generate output data 3126 from input data 3124 and inference augmentation map 3121 associated with execution (or inference) of the inference model 3122. As noted, inference augmentation map 3121 is based on inference model activations from output data generation. Thus, inference augmentation map 3121 corresponding to "activations" of inference model 3122 during generation of output data 3126. As noted, inference augmentation map 3121 can comprise a network activation heat map corresponding to activations of inference model 3122.

Continuing to block 3340 "generate input area affect map based on input data and inference augmentation map" the system 3101 can generate an input area affect map 3123 including indications of areas of input data 3124 affecting (e.g., contributing to activation of inference model 3122) output data 3126. For example, circuitry 3110 in executing instructions 3128 can identify portions input data 3124 that contribute to output data 3126 based on inference augmentation map 3121 and can generate input area affect map 3123 comprising indications of such portions of input data 3124.

Continuing to block 3350 "generate a reliability score based at least on input area affect map" the system 3101 can generate reliability score 3125 based on input area affect map 3123. For example, circuitry 3110 in executing instructions 3128 can determine a score indicating the reliability of output data 3126 based on input area affect map 3123 and store an indication of the score as reliability score 3125.

Logic flow 3300 can optionally include block 3360 "fuse the reliability score with the probability generated by the inference model" the system 3101 can update, modify, or otherwise augment the probability output by inference model 3122 as part of output data 3126.

Section III—Data Trust

Input Set Sanitation by Combining Third Part Inference

Figure 34:
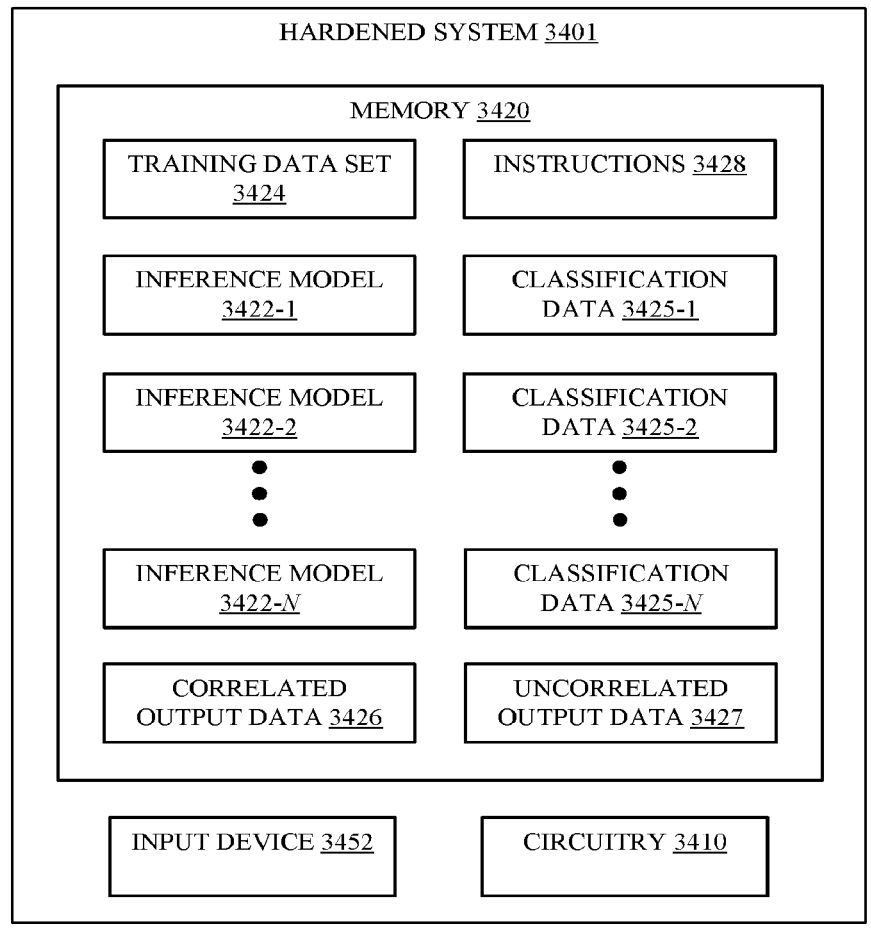
FIG. 34 illustrates a tenth example of a hardened system.

FIG. 34 illustrates an example hardened system 3401, which may be implemented according to the present disclosure. The hardened system 3401 includes circuitry 3410, memory 3420, and input device 3452. The memory 3420 stores one or more inference models 3422-1, 3422-2, 3422-N (or inference models 3422), training data set 3424, one or more classification data 3425-1, 3425-2, 3425-N (or classification data 3425), uncorrelated output data 3426, correlated output data 3427, and instructions 3428. During operation, circuitry 3410 can execute instructions 3428 and/or one or more of inference models 3422 to separate the training data set 3424 into uncorrelated output data 3426 and/or correlated output data 3427.

An attack against inference systems may include the creation of backdoors (e.g., hidden classes) during training of an inference model. A backdoor may provide a malicious actor with unintended access or control one or more aspects of an inference system. For example, a malicious actor (e.g., rogue data scientist or data supplier) may inject inappropriate data into a training set, resulting in hidden vulnerabilities in the trained inference model. Such vulnerabilities may cause the inference model to misclassify input data. As another example, the inappropriate data injected into the training set may result in a trained inference model that both identifies terrorists and celebrities.

In general, preparing training data (e.g., labelling inputs, etc.) are human labors that expose attack vectors, such as, modification of the training data by a malicious actor. Reviewing, detecting, and correcting incorrectly prepared training data is also a time consuming and labor-intensive process. The present disclosure provides hardened system 3401 arranged to classify each sample in training data set 3424 with two or more of inferences models 3422 to determine whether each of the samples can be considered uncorrelated output data 3426 or correlated output data 3427.

For example, during operation circuitry 3410 can execute instructions 3428 to receive training data set 3424 (e.g., as input data from an input device). Typically, training data set 3424 may include a plurality of samples. For each sample in training data set 3424, circuitry 3410 can execute inference model 3422-1 to generate classification data 3425-1, inference model 3422-2 to generate classification data 3425-2, and inference model CA 122-N to generate classification data 3425-N. Sometimes, classification data for one or more samples in training data set 3424 may be generated by third party services. Circuitry 3410 can execute instructions 3428 to compare classification data 3425 and determine whether each sample in training data set 3424 was classified the same by each of the inference models 3422.

Further, circuitry 3410 can execute instructions 3428 to add samples in training data set 3424 that were not classified the same by each of the inference models 3422 to uncorrelated output data 3426 and to add samples in training data set 3424 that were classified the same by each of the inference models 3422 to correlated output data 3427. Other times, a threshold number of different classifications may be used to determine whether a sample should be added to uncorrelated output data 3426 or correlated output data 3427. In various examples, a trust parameter for inference models 3422 may be established based on a function of the classifiers distribution in the outputs provided by different systems on the same input.

Correlated output data 3427 may be used to train an inference model that is trusted to not include backdoors. In other words, correlated output data 3427 may be used as a training set for a machine learning algorithm used to generate an inference model trusted to not include backdoors. In some examples, an inference model trained on correlated output data correlated output data 3427 may be referred to as a trusted inference model. Additionally, uncorrelated output data 3426 may be used in further controllable adversarial or resiliency training flows. Sometimes, circuitry 3410 can execute instructions 3428 to provide uncorrelated output data 3426 and/or correlated output data 3427 to an output device, to another computing device, or the like. In one or more examples, a set of measurements characterizing the correlated output data 3426 and/or uncorrelated output data may be generated.

Figure 35:
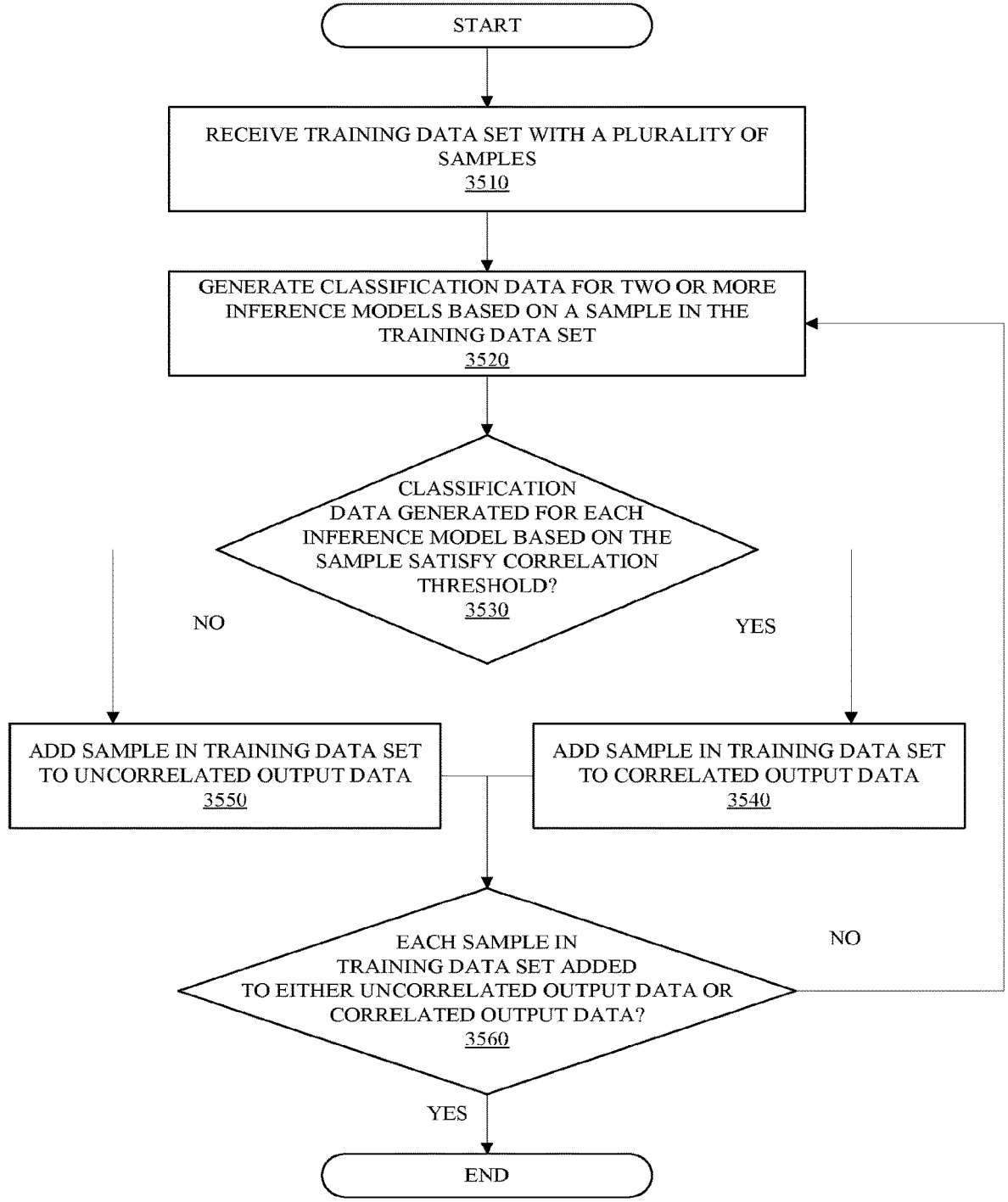
FIG. 35 illustrates a tenth example of a logic flow.

FIG. 35 illustrates a logic flow 3500. The logic flow 3500 may be representative of some or all the operations executed by one or more devices described herein. For example, hardened system 3401 (or components thereof) may perform the operations in logic flow 3500 to separate a training data set into uncorrelated output data and correlated output data.

Logic flow 3500 may begin at block 3510 "receive training data set with a plurality of samples" where the hardened system 3401 can receive training dataset 3424 including a plurality of samples. For example, hardened system 3401 may receive training data set 3424 from input device 3452. Continuing to block 3520 "generate classification data for two or more inference models based on a sample in the training data set" the hardened system 3401 can generate classification data 3425 for each of two or more of inference models 3422 based on a sample in training data set 3424. For example, hardened system 3401 can generate classification data 3425-1, or a portion thereof, for the sample in training data set 3424 based on inference model 3422-1, classification data 3425-2, or a portion thereof, for the sample in training data set 3424 based on inference model 3422-2, and classification data 3425-N, or a portion thereof, for the sample in training data set 3424 based on inference model 3422-N.

Proceeding to decision block 3530 "classification data generated for each inference model based on the sample satisfy correlation threshold?" the hardened system 3401 can determine whether classification data generated for each of the two or more inference models 3530 based on the sample in training data set 3424 satisfy a correlation threshold. In some examples, hardened system 3401 may determine whether the sample in training data set 3424 is assigned a common classification with a minimum confidence level by two or more of the inference models 3422. For example, hardened system 3401 may determine whether the portion of classification data 3425-1 corresponding to the sample, the portion of classification data 3425-2 corresponding to the sample, and the portion of classification data 3425-N corresponding to the sample include the sample classification that exceeds a correlation threshold (e.g., 80%) or is within the top 'x' confidence scores.

Sometimes, no samples may satisfy the correlation threshold. From decision block 3530, logic flow 3500 can continue to either block 3540 or 3550. In many examples, samples that do not satisfy the correlation threshold. Logic flow 3500 can continue from block 3530 to block 3540 based on a determination that the classification data generated for each inference model based on the sample match, while logic flow 3500 can continue from block 3530 to block 3550 based on a determination that the classification data generated for each inference model based on the sample do not match.

At block 3540 "add sample in training data set to correlated output data" hardened system 3401 can add the sample from training data set 3424 to correlated output data 3427. At block 3550 "add sample in training data set to uncorrelated output data" hardened system 3401 can add the sample from training data set 3424 to uncorrelated output data 3427. Continuing to decision block 3560 "each sample in training data set added to either uncorrelated output data or correlated output data?" the hardened system 3401 can determine whether each sample in training data set 3424 has been added to either uncorrelated output data 3426 or correlated output data 3427. In other words, hardened system 3401 may determine whether all the samples in training data set 3424 have been added to either uncorrelated output data 3426 or correlated output data 3427. From decision block 3560, logic flow 3500 can either end or return to 3520 and repeat blocks 3520-3560 for the next sample in training data set 3424.

Source Trust Adaptation for Input Devices

One issue with current inference systems is that various input devices may generate input data with differing characteristics, such as resolution, format, frame rate, dynamic range, trust, and the like. The different characteristics of various input devices may affect how input data from these various input devices trains or is classified by an inference model. For example, an inference model trained on input data from an input device (e.g., a video camera) with a high resolution may have difficulties classifying input data from an input device with a low resolution. In another example, input devices may be located in a range of environments with a range of accessibility (e.g., located in a private building versus a public park). In highly accessible environments, such as a public park, malicious actors may have better opportunities to manipulate input data generated by an input device, such as to create a backdoor as discussed herein. Thus, input devices in highly accessible environments may be associated with a lower trust level than input devices in difficult to access environments.

In another example, security of a data path between an input device and a hardened system may be a factor in the trust level of the input device (e.g., an encrypted data path can be considered more trustworthy than an unencrypted data path). In some instances, trust level may refer to one or more operating parameters and/or characteristics of the input device. Accordingly, the present disclosure provides an inference system or inference environment where training or inference is made based in part on characteristics of an input device. For example, the present disclosure provides a system arranged to use input device characteristics when selecting which inference model (of multiple inference models) to train using input data from the input device (see e.g., FIGS. 36-37). As another example, the present disclosure provides a system arranged to use input device characteristics when selecting which inference model (of multiple inference models) to use to generate an inference using input data from the input device (see e.g., FIGS. 38-39).

It is noted, that although many of the examples provided herein (e.g., description associated with FIGS. 36-39) use a video camera as an input device; a number of input devices may be suitable. For example, the present disclosure can be implemented with a still camera, a microphone, an infrared detector, a microwave detector, or any other device arranged to emit signals indicative of an input.

Figure 36:
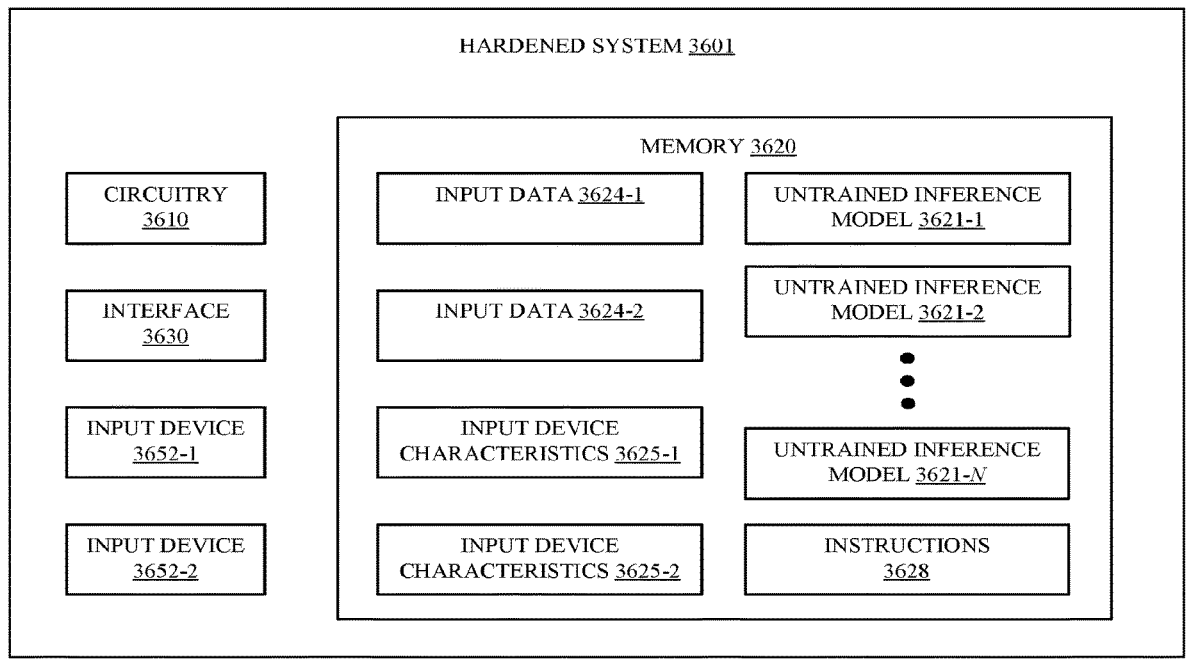
FIG. 36 illustrates an eleventh example of a hardened system.

FIG. 36 illustrates an example hardened system 3601, which may be implemented according to the present disclosure. The hardened system 3601 includes circuitry 3610, memory 3620, interface 3630, and input devices 3652-1 and 3652-2. The memory 3620 stores one or more untrained inference models 3621-1, 3621-2, 3621-N (or untrained inference models 3621), input data 3624-1 and 3624-2, one or more input device characteristics 3625-1 and 3625-2, and instructions 3628. In many examples, input data 3624 may include a training data set (e.g., training data set 362) while untrained inference models 3621 may refer to algorithms that generate inference models based on a training data set (e.g. 3624). During operation, circuitry 3610 can execute instructions 3628 to select one of untrained inference models 3621 to train with an input data 3624 based on input device characteristics 3625 for the respective input data 3624.

For example, circuitry 3610 can execute instructions 3628 to receive input data 3624-1 and 3624-2 from input devices 3652-1 and 3652-2, respectively. Circuitry 3610 can execute instructions 3628 to determine input device characteristic(s) 3625-1 and 3625-2 corresponding to input devices 3652-1 and 3652-2, respectively. Sometimes, the one or more input device characteristics 3625-1 and 3625-2 may be determined by querying the respective input device (e.g., 3652-1, 3652-2, etc.) via interface 3630, such as at boot time. For example, input device 3652-1 may have an application programming interface (API) via which one or more input device characteristics 3625-1 may be determined. Other times, the respective input device (e.g., 3652-1, 3652-2, etc.) may provide the one or more input device characteristics 3625-1 and 3625-2 in conjunction with providing one or more portions of input data 3624-1 and 3624-2 to memory 3620. For example, input device 3652-2 may provide input device characteristics 3625-2 in conjunction with providing input data 3624-2.

Sometimes, circuitry 3610 may execute instructions 3628 to identify one or more input device characteristics 3625-1 based on interface 3630 with which memory 3620 couples to input device 3652 or based on the communication scheme over which interface 3630 communicates with input device 3652. For example, security of the data path between input device 3652-1 and memory 3620 may be determined, at least in part, based on interface 3630. In such examples, security of the data path may be used, at least in part, to determine a trust level for input device 3652-1 and input device characteristics 3625-1. It is noted, that a single interface 3630 is depicted. However, in some examples, different interfaces 3630 can be provided for different input devices 3652 or input devices 3652 having different characteristics (e.g., different security requirements, etc.).

Circuitry 3610 can execute instructions 3628 to select one of untrained inference models 3621 best suited for training with input data 3624-1 or 3624-2, based on respective input device characteristics 3625-1 and 3625-2. As noted, in various examples, circuitry 3610 may execute instructions 3628 to receive input data and/or input device characteristics from a plurality of input devices (e.g., input device 3652-1 and 3652-2, etc.). In such examples, circuitry 3610 may execute instructions 3628 to build a training data set for a specific untrained inference model by combining data from one or more input devices with desired input device characteristics. Although two input devices 3652-1 and 3652-2 are depicted, in practice a large number (e.g., an array, cluster, or the like) of input devices 3652 could be coupled to hardened system 3601 and used to train untrained inference models 3621.

Figure 37:
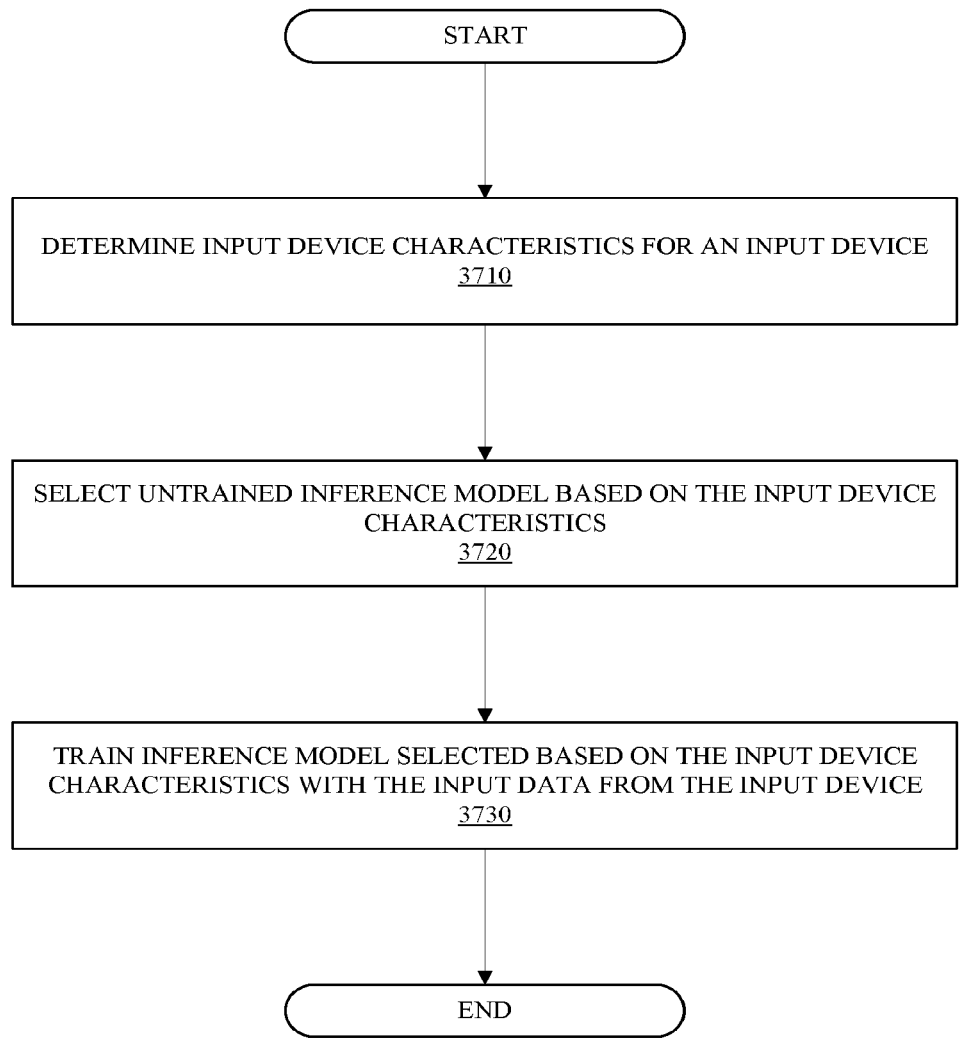
FIG. 37 illustrates eleventh example of a logic flow.

FIG. 37 illustrates a logic flow 3700. The logic flow 3700 may be representative of some or all the operations executed by one or more devices described herein. For example, hardened system 3601 (or components thereof) may perform the operations in logic flow 3700 to identify an untrained inference model to train on input data from an input device.

Logic flow 3700 may begin at block 3710 "determine input device characteristics" where the hardened system 3601 may determine input device characteristics 3625-1 of input device 3652-1, input device characteristics 3625-2 of input device 3652-2, etc. For example, hardened system 3601 may query input device 3652-1 via an API to determine input device characteristics 3625-1. As another example, hardened system 3601 may receive input device characteristics 3625-2 from input device 3652-2 in conjunction with receiving input data 3624-2.

Continuing to block 3720 "select untrained inference model based on the input device characteristics" hardened system 3601 may select from one or more untrained inference models 3621 based on input device characteristics 3625-1, 3625-2, etc. For example, hardened system 3601 may select untrained inference model 3621-2 to train with input data 3624-1 based on input device characteristics 3625-1. As another example, hardened system 3601 may select untrained inference model 3621-1 to train with input data 3624-2 based on input device characteristics 3625-2.

Proceeding to block 3730 "train inference model selected based on the input device characteristics with input data from the input device" hardened system 3601 may train the inference model selected from untrained inference models 121 with the input data (e.g., input data 3624-1, input data 3624-2, etc.). For example, hardened system 3601 may train the untrained inference model 3621-2 with input data 3624-1 based on input device characteristics 3625-1 and may train untrained inference model 3621-1 with input data 3624-2 based on input device characteristics 3625-2. From block 3730, the logic flow 3700 can end, or can repeat based on receiving new inputs.

Figure 38:
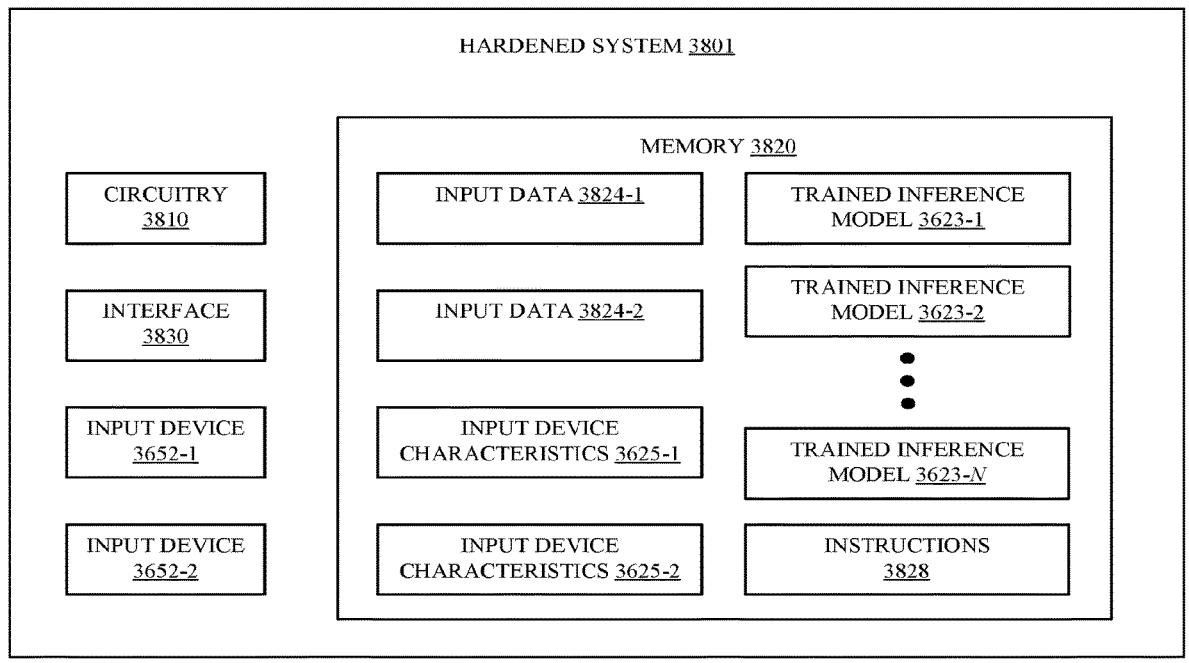
FIG. 38 illustrates a twelfth example of a hardened system.

FIG. 38 illustrates an example hardened system 3801, which may be implemented according to the present disclosure. The hardened system 3801 includes circuitry 3810, memory 3820, interface 3630, and input devices 3652-1 and 3652-2. The memory 3820 stores one or more trained inference models 3623-1, 3623-2, 3623-N (or trained inference models 3623), input data 3824-1 and 3824-2, input device characteristics 3625-1 and 3625-2, and instructions 3828. In many examples, input data 3824-1 and 3824-2 may include data for classification by one or more of trained inference models 3623. During operation, circuitry 3810 can execute instructions 3828 to select one of trained inference models 3623 to classify input data 3824-1 and 3824-2 with based on input device characteristics 3625-1 and 3625-2, respectively.

For example, during operation circuitry 3810 can execute instructions 3828 to determine one or more input device characteristics 3625-1 of input device 3652-1 and to determine one or more input device characteristics 3625-2 of input device 3652-2. Sometimes, the one or more input device characteristics 3625 may be determined by querying the respective input device 3652 via interface 3630, such as at boot time. For example, input device 3652-1 may have an API via which one or more input device characteristics 3625-1 may be determined. Other times, the input device 3652 may provide the one or more input device characteristics 3625 in conjunction with providing one or more portions of input data 3624 to memory 3820. For example, input device 3652-2 may provide input device characteristics 3625-2 in conjunction with providing input data 3624-2.

Sometimes, circuitry 3810 may execute instructions 3828 to identify one or more input device characteristics 3625 based on interface 3630 with which memory 3820 couples to input devices 152 or based on the communication scheme over which interface 3630 communicates with the input devices 3652. For example, security of the data path between input device 3652-1 and memory 3820 may be determined, at least in part, based on interface 3630. In such examples, security of the data path may be used, at least in part, to determine a trust level for input device 3652-1 and input device characteristics 3625-1. It is noted, that a single interface 3630 is depicted. However, in some examples, different interfaces 3630 can be provided for different input devices 3652 or input devices 3652 having different characteristics (e.g., different security requirements, etc.). In some examples, input device characteristics and/or trust may be used to determine, or be based on, an input source quality term. In many examples, the input source quality term may be a factor in selecting an inference model, such as an inference model that is tuned to work with an identified trust and/or input source quality term.

Circuitry 3810 can execute instructions 3828 to select one of trained inference models 3623 best suited for classifying input data 3824-1 and 3824-2 based on input device characteristics 3625-1 and 3625-2. As noted, in various examples, circuitry 3810 may execute instructions 3828 to receive input data and/or input device characteristics from a plurality of input devices (e.g., input device 452-1 and 452-2, etc.). In such examples, circuitry 3810 may execute instructions 3828 to select a trained inference model 3623 to use for classifying input data 3824 based on the input device characteristics 3625 for the respective input device 3652 from which the input data 3824 was received.

Figure 39:
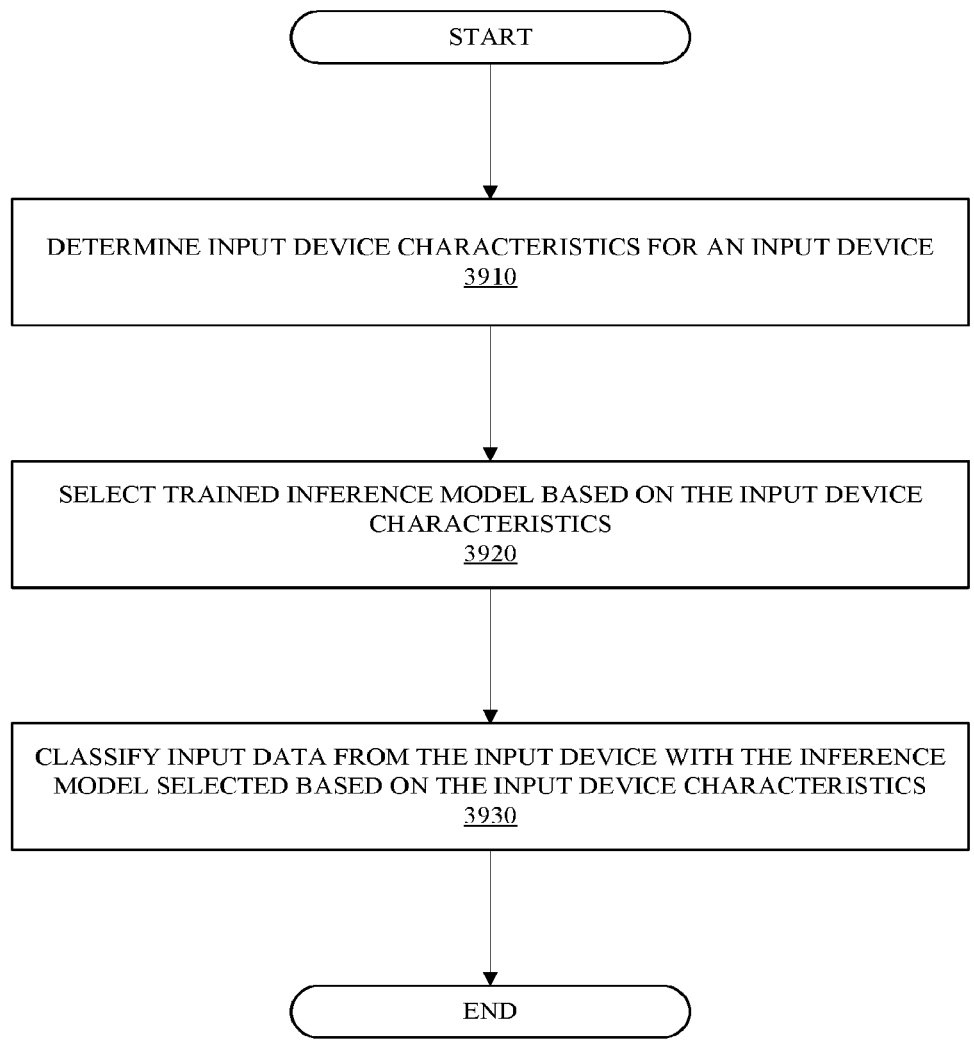
FIG. 39 illustrates a twelfth example of a logic flow.

FIG. 39 illustrates a logic flow 3900. The logic flow 3900 may be representative of some or all the operations executed by one or more devices described herein. For example, hardened system 3801 (or components thereof) may perform the operations in logic flow 3900 to identify a trained inference model to classify input data from an input device, based on one or more input device characteristics.

Logic flow 3900 may begin at block 3910 "determine input device characteristics" where the hardened system 3801 may determine input device characteristics 3625-1 and 3625-2 of input devices 3652-1 and 3652-2, respectively. For example, hardened system 3801 may query input device 3652-1 via an API to determine input device characteristics 3625-1. As another example, hardened system 3801 may receive input device characteristics 3625-2 in conjunction with receiving input data 3824-2. In some examples, the input device characteristics 3625-1, 3625-2 may include one or more of lens characteristic and audio amplifier.

Continuing to block 3920 "select trained inference model based on the input device characteristics" hardened system 3801 may select from one or more trained inference models 3623 based on input device characteristics 3625 (e.g., 3625-1, 3625-2, etc.). For example, hardened system 3801 may select trained inference model 3623-1 to classify input data 3824-2 based on input device characteristics 3625-2. As another example, hardened system 3801 may select trained inference model 3623-2 to classify input data 3824-1 based on input device characteristics 3625-1.

Proceeding to block 3930 "classify input data from the input device with the inference model selected based on the input device characteristics" hardened system 3801 may classify input data 3824 with the inference model selected from trained inference models 123. For example, hardened system 3801 may classify input data 3824-2 with trained inference model 3623-1 based on input device characteristics 3625-2. As another example, hardened system 3801 may classify input data 3824-1 with trained inference model 3623-2 based on input device characteristics 3625-1. From block 3930, the logic flow 3900 can end, or can repeat based on receiving new inputs.

Trusted Association of the Training Set with the Model

Figure 40:
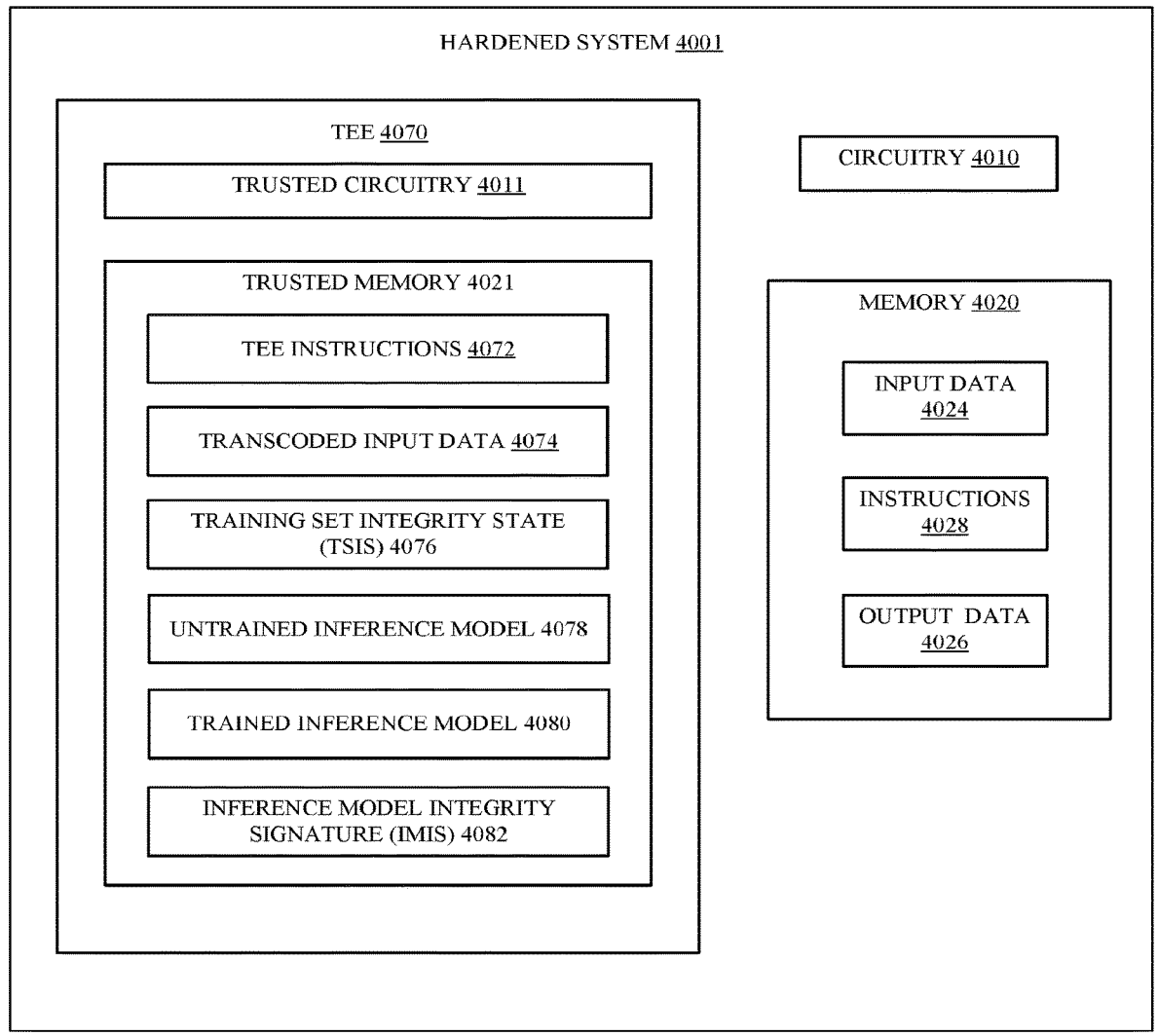
FIG. 40 illustrates a thirteenth example of a hardened system.

FIG. 40 illustrates an example hardened system 4001, which may be implemented according to the present disclosure. The hardened system 4001 includes circuitry 4010, memory 4020, and trusted execution environment (TEE) 4070. The memory 4020 stores input data 4024, instructions 4028, and output data 4026. In several examples, input data 4024 may include a training data set. During operation, circuitry 4010 can execute instructions 4028 to perform various input/output operations associated with TEE 4070. The TEE 4070 includes trusted circuitry 4011 and trusted memory 4021. Trusted memory stores TEE instructions 4072, transcoded input data 4074, training data set integrity state (TSIS) 4076, untrained inference model 4078, trained inference model 4080, and inference model integrity signature (IMIS) 4082. In many examples, transcoded input data 4074 may include a transcoded training data set. During operation, trusted circuitry 4011 can execute TEE instructions 4072 to enable verification that an inference model was trained on a specified training data set.

As previously mentioned, an attack against inference systems may include the creation of backdoors (e.g., hidden classes) during training of an inference model. Sometimes, a malicious actor (e.g., rogue data scientist or data supplier) may inject inappropriate data into a training data set with the intent to cause hidden vulnerabilities in the trained inference model. Accordingly, the present disclosure provides hardened system 4001 arranged to enable verification that an inference model was trained by a purported training data set.

For example, during operation, circuitry 4010 can execute instructions 4028 to make input data 4024 available to TEE 4070. Typically, input data 4024 may include a training data set with a plurality of samples. Trusted circuitry 4011 may execute TEE instructions 4072 to translate input data 4024 into transcoded input data 4074. For example, each sample in input data 4024 may be transformed into a mathematical representation. Trusted circuitry 4011 may execute TEE instructions 4072 to generate TSIS 4076 based on transcoded input data 4074. For instance, a cryptographic algorithm that is not sensitive to order and repetition may be utilized to generate TSIS 4076 based on each sample in transcoded input data 4074. In many examples, contents of a training data set can be verified by a third party with TSIS 4076 (e.g., by recalculating TSIS 4076).

Further, trusted circuitry 4011 may execute TEE instructions 4072 to train untrained inference model 4078 on transcoded input data 4074 to generate trained inference model 4080. For example, untrained inference model 4078 may include a machine learning algorithm to generate trained inference model 4080 based on transcoded input data 4074. In some examples, untrained inference model 4078 may include training data. In various examples, untrained inference model 4078 may not be retained in memory after trained inference model 4080 is generated.

Trusted circuitry 4011 may execute TEE instructions 4072 to generate inference model integrity signature (IMIS) 4082. For instance, IMIS 4082 may include a cryptographic hash of the trained inference model 4080. In many examples, contents of an inference model can be verified by a third party with IMIS 4082 (e.g., by recalculating IMIS 4082). One or more of TSIS 4076, IMIS 4082, and trained inference model 4080 may be provided as output (e.g., stored as output data 4026). For example, trusted circuitry 4011 may execute TEE instructions 4072 to output TSIS 4076, IMIS 4082, and trained inference model 4080 as a tuple. Sometimes, circuitry 4010 can execute instructions 4028 to provide output data 4026 to an output device, to another computing device, or the like.

Figure 41:
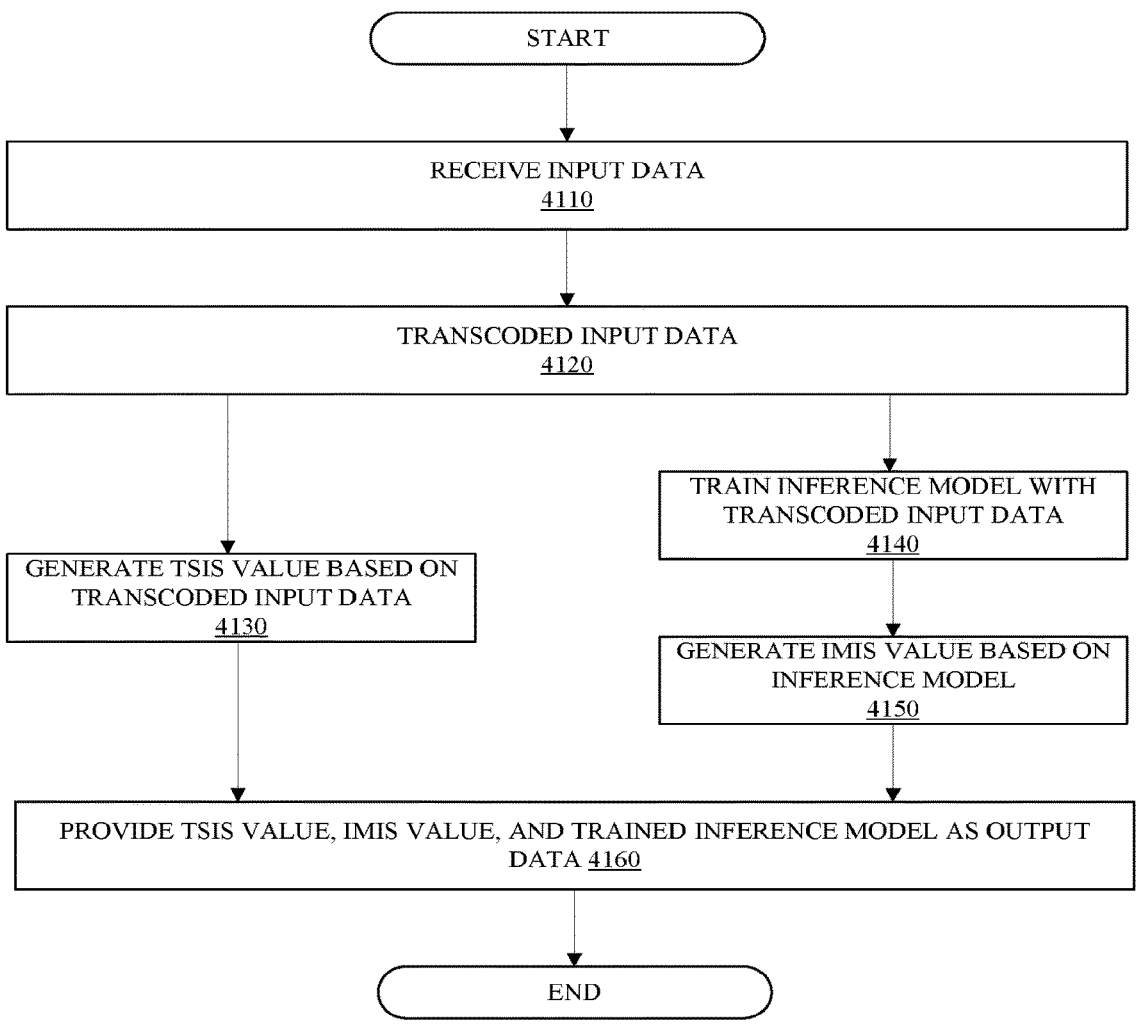
FIG. 41 illustrates a thirteenth example of a logic flow.

FIG. 41 illustrates a logic flow 4100. The logic flow 4100 may be representative of some or all the operations executed by one or more devices described herein. For example, hardened system 4001 (or components thereof) may perform the operations in logic flow 4100 to generate one or more of TSIS 4076, IMIS 4082, and trained inference model 4080 to enable verification of trained inference model 4080 and/or a purported training set corresponding to trained inference model 4080.

Logic flow 4100 may begin at block 4110 "receive input data" where hardened system 4001 can receive input data 4024. For example, hardened system 4001 may receive a training data set with a plurality of samples as input data 4024. Continuing to block 4120 "transcode input data" hardened system 4001 may transcode input data 4024 to generate transcoded input data 4074. For instance, transcoded input data 4074 may include a numerical representation of each sample in input data 4024. Next, logic flow 4100 may proceed to block 4130 and/or block 4140. In other words, block 4130 and block 4140 may be performed in parallel using transcoded input data 4120.

At block 4130 "generate TSIS value based on transcoded input data" a TSIS value may be generated based on transcoded input data. For example, hardened system 4001 may generate TSIS value 4074 based on transcoded input data 4074 using a cryptographic algorithm. The logic flow 4100 may proceed to block 4160 from block 4130. Referring back to block 4140 "train inference model with transcoded input data" an inference model may be trained based on the transcoded input data. For instance, hardened system 4001 may utilize a machine learning algorithm to generate trained inference model 4080 based on transcoded input data 4074. Continuing to block 4150 "generate IMIS value based on inference model" an IMIS value may be generated based on the trained inference model 4080. For example, a cryptographic hash may be used to generate IMIS value 4082 based on trained inference model 4080. From block 4160, the logic flow 4100 can end, or can repeat based on receiving new inputs.

Section IV—Enhanced Inference Model Training
Inference Model Recovery After Malicious Training As detailed herein, inference models are trained using data sets (e.g., training and testing data sets). Often, inference models may be repeatedly trained using different data sets. For example, an inference model can be trained on a first data set and then subsequently trained on a second data set. In some implementations, the training data sets originate from uncontrolled sources (e.g., research institutions, open source, online data sets, or the like). As a result, an inference model may be trained with data sets that include data that degrades the performance of the inference model. For example, an inference model can be trained with a data set that includes misclassified data (e.g., intentionally misclassified, accidentally misclassified, or the like) which degrades the performance of the inference model. In some instances, malicious parties may intentionally modify data sets used in training with the intent to introduce backdoors, hidden classes, or known misclassification vulnerabilities to an inference model.

The present disclosure provides to intentionally train a "wildcard" class corresponding to discovery of training data sets that degrade performance of the inference model. Such wildcard class(es) can be trained to recover the degraded performance and to mitigate against potential adversarial attacks based on the errors within the training data set.

Figure 42:
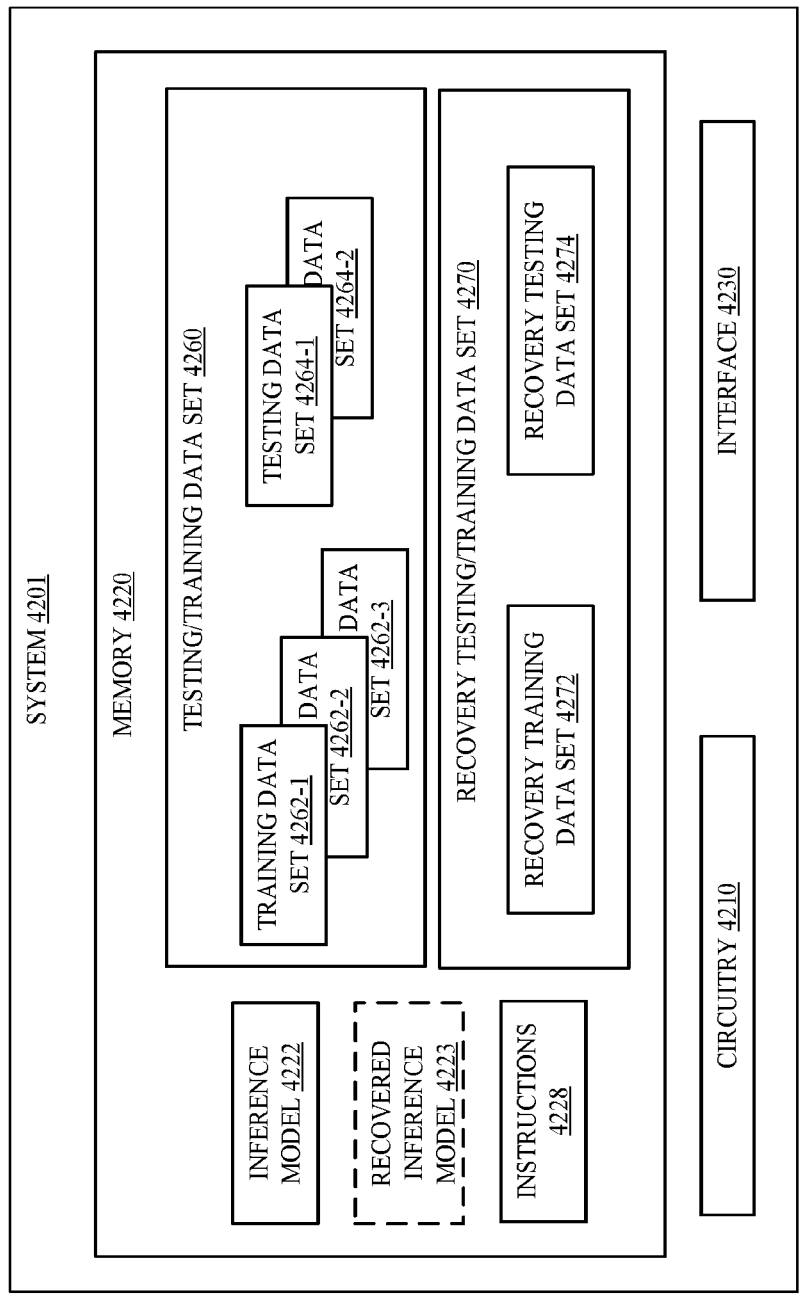
FIG. 42 illustrates a fourteenth example hardened system.

FIG. 42 illustrates an example system 4201 to train an inference model. The system 4201 includes circuitry 4210, memory 4220, and interface 4230. The memory 4220 stores inference model 4222, instructions 4228, and testing/training data set 4260. Memory 4220 may also optionally include recovered inference model 4223. The testing/training data set 4260 include both training data 4262 and well as testing data 4264. As noted, training can be implemented in stages using multiple different training and/or testing data sets. For example, data set 4260 is depicted including training data set 4262-1, training data set 4262-2, and training data set 4262-3 as well as testing data set 4264-1 and testing data set 4264-1. It is noted, that data set 4260 could include any number of training data sets 4262 and any number of testing data sets 4264. The numbers depicted here are selected for purposes of clarity and not limitation. Furthermore, memory 4220 can include recovery testing/training data set 4270 including recovery training data set 4272 and recovery testing data set 4274. Recovery training data set 4272 and recovery testing data set 4274 can be used to "recover" from training inference model 4222 using a one of training data sets 4262 that include errors (e.g., maliciously introduced errors, accidentally introduced errors, or the like). More particularly, recovery training data set 4272 can be used to train inference model 4222 with an additional class, such as, for example, a wildcard class to mitigate against potential adversarial attacks based on the errors in training data set 4262.

Figure 43:
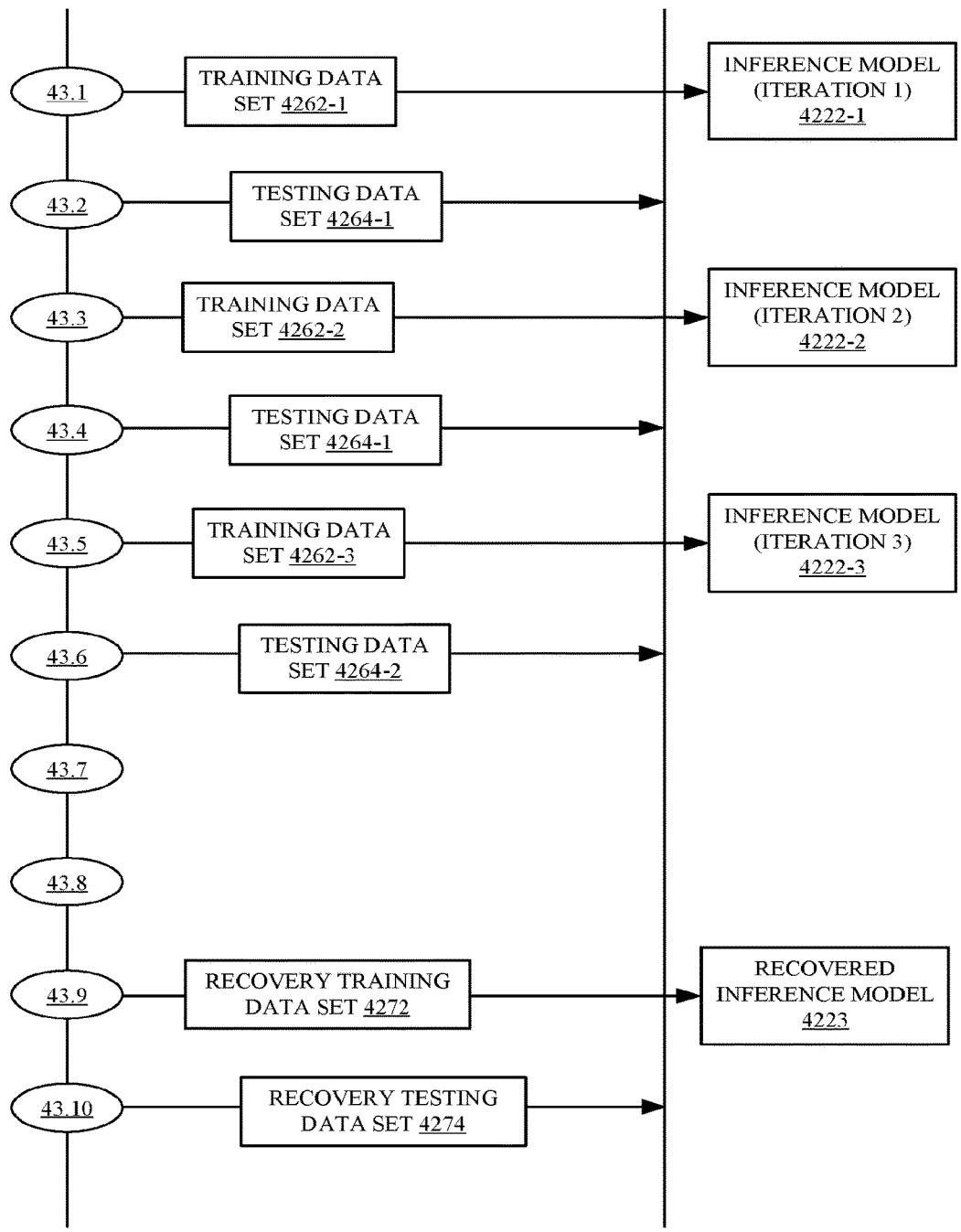
FIG. 43 illustrates a fifth example technique.

FIG. 43 illustrates an example technique 4300 that may be implemented by a system, such as, system 4201 of FIG. 42 to recover from training an inference model with a data set that includes errors. It is noted the technique 4300 is described with reference to the system 4201 of FIG. 42 for convenience and clarity. However, this is not intended to be limiting.

Technique 4300 can begin at circle 43.1. At circle 43.1, system 4201 train inference model 4222 using training data set 4262-1. For example, circuitry 4210 can execute instructions 4228 to implement an inference model training algorithm (e.g., based on technique 300 of FIG. 3, or the like) to train inference model 4222 using training data set 4262-1. Training inference model 4222 using training data set 4262-1 can result in an iteration of inference model 4222-1. At circler 43.2, system 4201 can test inference model iteration 1 4222-1 using a testing data set (e.g., testing data set 4264-1, or the like). For example, circuitry 4210 can execute instructions 4228 to test performance of inference model iteration 1 4222-1 using testing data set 4264-1.

Inference model 4222 can be further trained with an additional training data set. At circle 43.3, system 4201 train inference model 4222 using training data set 4262-2. For example, circuitry 4210 can execute instructions 4228 to implement an inference model training algorithm (e.g., based on technique 300 of FIG. 3, or the like) to train inference model iteration 1 4222-1 using training data set 4262-2. Training inference model iteration 1 4222-1 using training data set 4262-2 can result in another iteration of inference model 4222 (e.g., inference model iteration 2 4222-2). At circler 43.4, system 4201 can test inference model iteration 2 4222-2 using a testing data set (e.g., testing data set 4264-1, or the like). For example, circuitry 4210 can execute instructions 4228 to test performance of inference model iteration 2 4222-2 using testing data set 4264-1.

Inference model 4222 can again be further trained with a third additional training data set. At circle 43.5, system 4201 train inference model 4222 using training data set 4262-3. For example, circuitry 4210 can execute instructions 4228 to implement an inference model training algorithm (e.g., based on technique 300 of FIG. 3, or the like) to train inference model iteration 2 4222-2 using training data set 4262-2. Training inference model iteration 2 4222-2 using training data set 4262-2 can result in another iteration of inference model 4222 (e.g., inference model iteration 3 4222-3). At circler 43.6, system 4201 can test inference model iteration 3 4222-3 using a testing data set (e.g., testing data set 4264-2, or the like). For example, circuitry 4210 can execute instructions 4228 to test performance of inference model iteration 3 4222-3 using testing data set 4264-2.

As noted, with some real-world use cases, discovery of errors within a training data set can happen after training. At circle 43.7, errors within a training data set (e.g., training data set 4262-1, training data set 4262-2, and/or training data set 4262-3) can be discovered. With some examples, the errors are discovered in a training data set used to train past iterations of an inference model. As a specific example, errors can be discovered in training data set 4262-2. As such, errors (or vulnerabilities) within inference model 4222 could have been introduced as in inference model iteration 2 4222-2 due to the errors in training data set 4262-2. At circle 43.8, recovery testing/training data set 4270 (including recovery training data set 4272 and recovery testing data set 4274) can be received. Circuitry 4210, in executing instructions 4228 can receive recovery testing/training data set 4270 via interface 4230, or the like. With some examples, recovery training data set 4272 can be designed to train inference model 4222 (starting at the current iteration) with an additional wildcard class that can be used mitigate against adversarial attacks based on errors in the prior used training data set 4262.

At circle 43.9, system 4201 train inference model 4222 using recovery training data set 4272. For example, circuitry 4210 can execute instructions 4228 to implement an inference model training algorithm (e.g., based on technique 300 of FIG. 3, or the like) to train inference model iteration 3 4222-3 using recovery training data set 4272. Training inference model iteration 3 4222-3 using recovery training data set 4272 can result in another iteration of inference model 4222 (e.g., recovered inference model 4223, or the like). At circler 43.10, system 4201 can test recovered inference model 4223 using recovery testing data set 4274. For example, circuitry 4210 can execute instructions 4228 to test performance of recovered inference model 4223 using recovery testing data set 4274.

System 4201 and technique 4300 provide an advantage in that mitigation (e.g., alert triggering, or the like) of adversarial attacks can be realized. Furthermore, system 4201 and technique 4300 provide an advantage of not needing to restart training from the beginning or from a captured instance (e.g., iteration, or the like).

Figure 44:
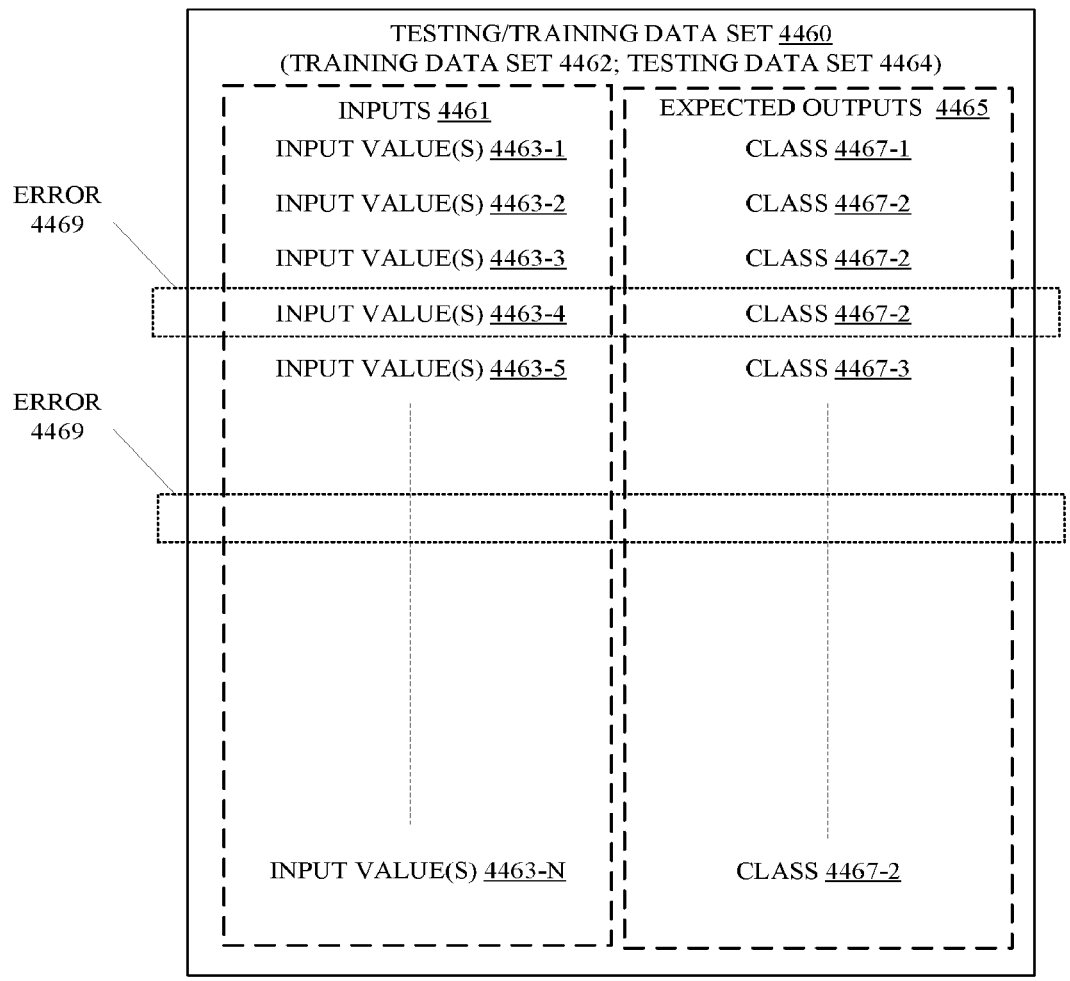
FIG. 44 illustrates a first example training/testing data set that includes errors.

As noted herein, testing/training data is used to "train" and evaluate performance of an inference model. However, testing/training data sets may include errors. For example, FIG. 44 depicts an example testing/training data set 4460 that could be used to train inference model 4222. Testing/training data set 4460 includes a training data set 4462 and a testing data set 4464, which can correspond to one of the training data sets 4262 and testing data sets 4264 of the system 4201 of FIG. 42. Testing/training data set 4460 includes inputs 4461 as well as expected outputs 4465. In general, the inputs 4461 can include input value(s) 4463-$n$, where n is a positive integer. For example, input value(s) 4463-1, input value(s) 4463-2, input value(s) 4463-3, input value(s) 4463-4, input value(s) 4463-5 to input value(s) 4463-N, are shown for inputs 4461. For each input value 4463-$n$, an associated expected output 4465 is shown. Each of the expected outputs 4465 corresponds to a class 2210 4467 to which the inference model 4222 is to be trained to classify inputs (e.g., inputs 4461) to. In general, the expected outputs 4465 can include any number of classes 4467. As a specific example, classes 4467 can correspond to categories of from the CIFER-10 classification data set (e.g., airplanes, cars, birds, cats, deer, dogs, frogs, horses, ships, and trucks).

However, examples are not limited in this context. In some use cases, testing/training data set (e.g., 4460) can include errors 4469. As depicted, data set 4460 includes a number of errors 4469. As a specific example, one of errors 4469 shows input value(s) 4463-4 corresponding to class 4467-2. For the sake of explanation, assume that inference system 4222 is an image classifier arranged to classify images into classes. Under this example, error 4469 could be the image associated with input values 4463-4 is incorrectly labeled or tagged to correspond to the wrong class (e.g., the image is a gun but is tagged as a hairbrush, or the like). As noted, such incorrect labeling could be malicious or inadvertent. However, the present disclosure provides to continue training despite the errors in the testing/training data set 4460 using a recovery testing/training data set as detailed above.

FIG. 45 depicts an example recovery testing/training data set 4570 that could be used to train inference model 4222. Recovery testing/training data set 4570 includes a training data set 4572 and a testing data set 4574, which can correspond to recovery training data sets 4272 and recovery testing data sets 4274 of the system 4201 of FIG. 42. Description of recovery testing/training data set 4570 is made with reference to the testing/training data set 4460 of FIG. 44. However, examples are not limited in this context.

Recovery testing/training data set 4560 includes inputs 4461 as well as expected outputs 4465. In general, the inputs 4461 can include input value(s) 4573-*m*, where m is a positive integer. Furthermore, inputs 4461 can include any input value(s) associated with errors 4469. For example, input value(s) 4463-4 associated with an error 4469 from testing/training data set 4460 is included in inputs 4461 of recovery testing/training data set 4570. Furthermore, input value(s) 4573-1, input value(s) 4573-2, input value(s) 4573-3, input value(s) 4573-4 to input value(s) 4573-M, are shown for inputs 4461.

For each input value 4463 or 4573, an associated expected output 4465 is shown. As described above, the recovery testing/training data set 4570 is designed or arranged to train inference model 4222 to recognize images into a specific wildcard class 4577. This wildcard class 4577 can be a new class to which inference model 4222 is trained to classify. As an alternative, the wildcard class 4577 can be one of the classes (e.g., class 4467 of FIG. 44, or the like) repurposed as the wildcard class 4577. For example, using the hypothetical provided above, of a gun tagged to look like a hairbrush, a wildcard class 4577 can be introduced as "gun that look like hairbrushes" and images provides as input values 4573-4 to train inference model 4222 to classify inputs into this new wildcard class 4577.

Figure 46:
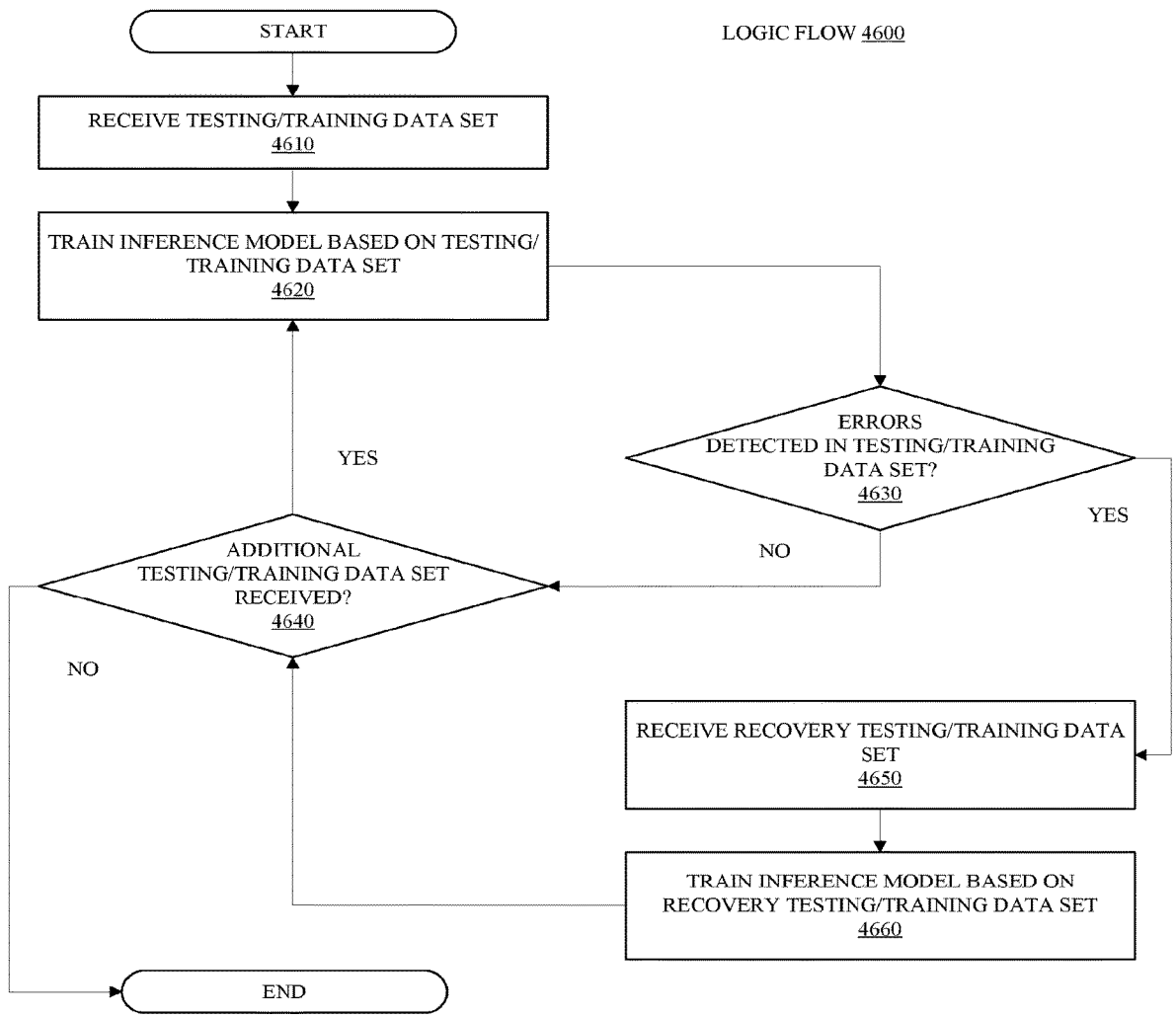
FIG. 46 illustrates a fourteenth example logic flow.

FIG. 46 illustrates a logic flow 4600. The logic flow 4600 may be representative of some or all the operations executed by one or more devices described herein. For example, system 4201 (or components thereof) may perform the operations in logic flow 4600 to recovery after training an inference model 4222 with a testing/training data set 4260 that includes errors (e.g., data set 4460 including errors 4469, or the like).

Logic flow 4600 may begin at block 4610 "receive testing/training data set" where system 4201 can receive testing/training data set 4260. For example, circuitry 4210, in executing instructions 4228, can receive training data set 4262-1 (and testing data set 4264-1, or the like). Continuing to block 4620 "train inference model based on testing/training data set" system 4201 may train inference model 4222 based on the testing/training data set 4260 received at block 4610. For example, circuitry 4210, in executing instructions 4228, can implement an inference model training algorithm (e.g., technique 300 of FIG. 3, or the like) to train inference model 4222 using the testing/training data set 4260 (e.g., training data set 4262-1, testing data set 4264-1, or the like) received at block 4610.

Continuing to decision block 4630 "errors detected in testing/training data set?" a determination can be made as to whether errors exist in the testing/training data set 4260 (e.g., training data set 4262-1 or the like) received at block 4610 and used at block 4620 to train inference model 4222. From decision block 4630, logic flow 4600 can continue to either decision block 4640 or block 4650. Logic flow 4600 can continue from decision block 4630 to decision block 4640 based on a determination that errors do not exist in the testing/training data set 4260 received at block 4610 and used at block 4620 to train inference model 4222. Alternatively, logic flow 4600 can continue from decision block 4630 to block 4650 based on a determination that errors do exist in the testing/training data set 4260 received at block 4610 and used at block 4620 to train inference model 4222.

At block 4650 "receive recovery testing/training data set" system 4201 can receive recovery testing/training data set 4270. For example, circuitry 4210, in executing instructions 4228, can receive recovery training data set 4272 (and recovery testing data set 4274, or the like). Continuing to block 4660 "train inference model based on recovery testing/training data set" system 4201 may train inference model 4222 based on the recovery testing/training data set 4270 received at block 4650. For example, circuitry 4210, in executing instructions 4228, can implement an inference model training algorithm (e.g., technique 300 of FIG. 3, or the like) to train inference model 4222 using the recovery testing/training data set 4270 (e.g., training data set 4272, testing data set 4274, or the like) received at block 4610. Specifically, inference model 4222 can be trained at block 4660 to classify inputs into a wildcard class 4577.

From block 4660, logic flow can continue to decision block 4640. At decision block 4640 "additional testing/training data set received?" a determination can be made as to whether additional testing/training data sets have been received. For example, circuitry 4210, in executing instructions 4228 can determine whether additional testing/training data sets (e.g., training data set 4262-2, training data set 4262-3, testing data set 4274-2, or the like) have been received. From decision block 4640, logic flow 4600 can return to either block 4620, for example, to further train inference model 4222 using the newly received testing/training data sets 4260; or logic flow 4600 can end. Logic flow 4600 can return to block 4620 from decision block 4640 based on a determination that additional testing/training data sets 4260 were received. Alternatively, logic flow 4600 can end based on a determination that additional testing/training data sets 4260 were not received.

Adversarial Training for Secure Model Execution

Figure 47:
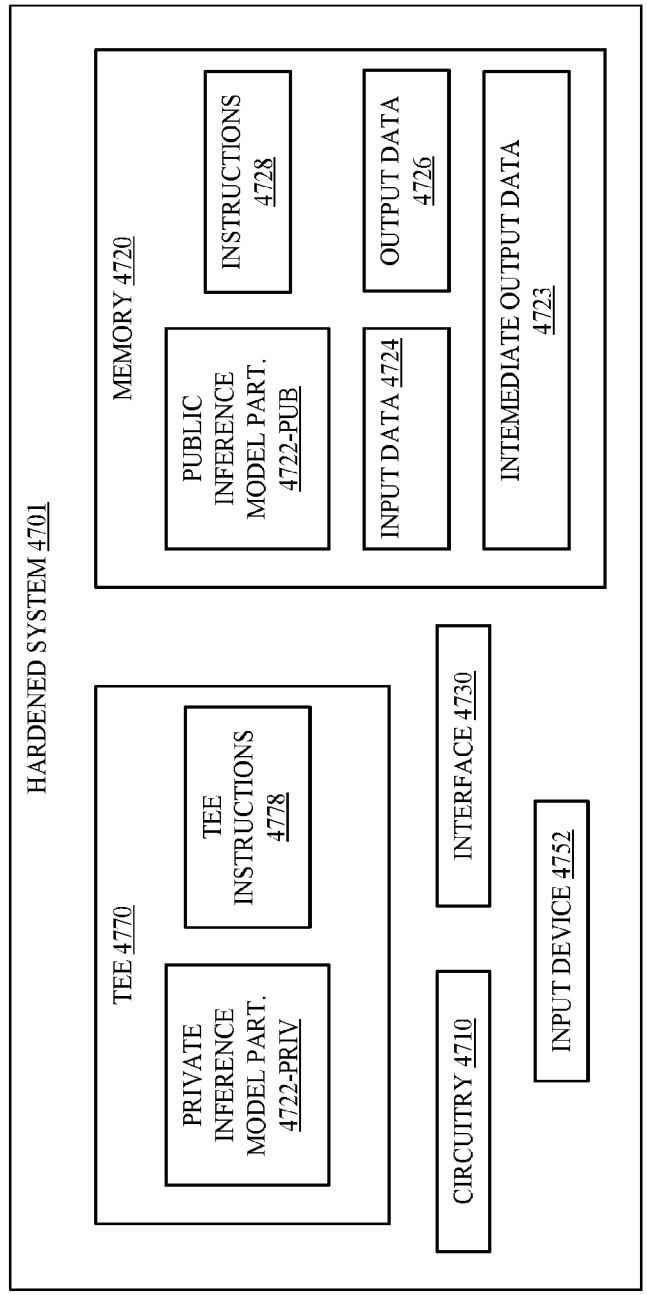
FIG. 47 illustrates a fifteenth example hardened system.

FIG. 47 illustrates an example hardened system 4701, which may be implemented according to the present disclosure. The hardened system 4701 includes circuitry 4710, memory 4720, interface 4730, input device 4752 and a trusted execution environment (TEE) 4770. The memory 4720 stores public inference model partition 4722-PUB, input data 4724, intermediate output data 4723, output data 4726, and instructions 4728. The TEE 4770 stores private inference model partition 4722-PRIV and TEE instructions 4778. In general, TEE 4770 can be any trusted execution enclave or partition within system 4701. For example, TEE 4770 can be a trusted execution partition within circuitry 4710. As another example, TEE 4770 can include its own circuitry and memory (not shown) segmented from circuitry 4710 and memory 4720 in a trusted manner. Generally, TEE 4770 may provide security features such as isolated execution (e.g., of TEE instructions 4778) along with confidentiality of private inference model partition 4722-PRIV. Generally, system 4701 can execute a portion of an inference model (e.g., private inference model partition 4722-PRIV) in a secure manner (e.g., within TEE 4770) while the rest of the inference model (e.g., public inference model partition 4722-PUB) is executed in unsecured computing resources (e.g., circuitry 4710 and memory 4720, or the like).

With some examples, the public inference model partition 4722-PUB can be trained with an adversarial inference model such that the public inference model partition 4722-PUB resolves to an inaccurate or less accurate local minimum. Said differently, public inference model partition 4722-PUB, when executed by itself, resolves to an inaccurate or less accurate local minimum. However, the complete inference model (e.g., public inference model partition 4722-PUB+private inference model partition 4722-PRIV) resolves to the correct local minimum.

This provides an advantage in that the inference model is protected as part of the model is executed in a secure manner and maintained in a confidential manner. It is noted that this provides an advantage over simply executing the entire inference model in a secure environment (TEE). For example, many secure environments have limited memory and computation resources. As such, many modern inference models cannot be entirely executed within a secure environment. It is noted, in some examples, the private inference model partition 4722-PRIV can be secured using systems or techniques other than TEE 4770. For example, 4722-PRIV may be ported into an encrypted form, such as, using homomorphic encryption, multi-party computation, or other such encrypted execution techniques. In such example, instead of the limited memory space of TEE 4770, the encrypted model may require more computational resources to execute and take a longer run-time than unencrypted execution. It is to be appreciated, that although the examples provided herein use a TEE 4770, the disclosed examples may be implemented for private inference model partitions (e.g., 4722-PRIV) secured using means other than TEE 4770 (e.g., encrypted execution, multi-party execution, or the like).

The present disclosure provides systems and techniques that provide security of an inference model where part of the inference model is maintained in a secure environment. Furthermore, even were an adversarial party to obtain the public inference model partition 4722-PUB, the adversarial party will not be able to reproduce the entire functionality of the inference model 4722 due to the public inference model partition 4722-PUB resolving to an inaccurate or less accurate local minimum.

Figure 48:
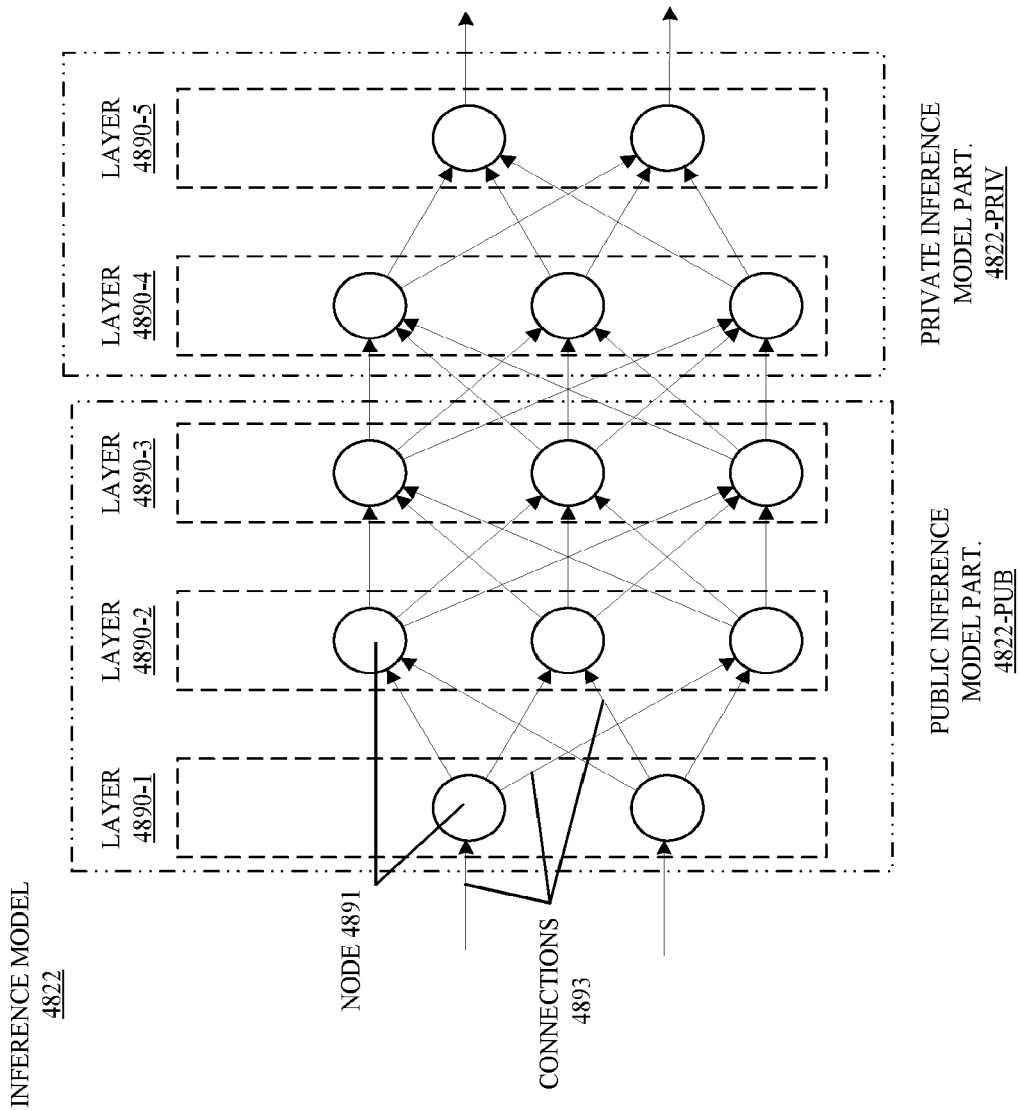
FIG. 48 illustrates a first example inference model.
Figure 49:
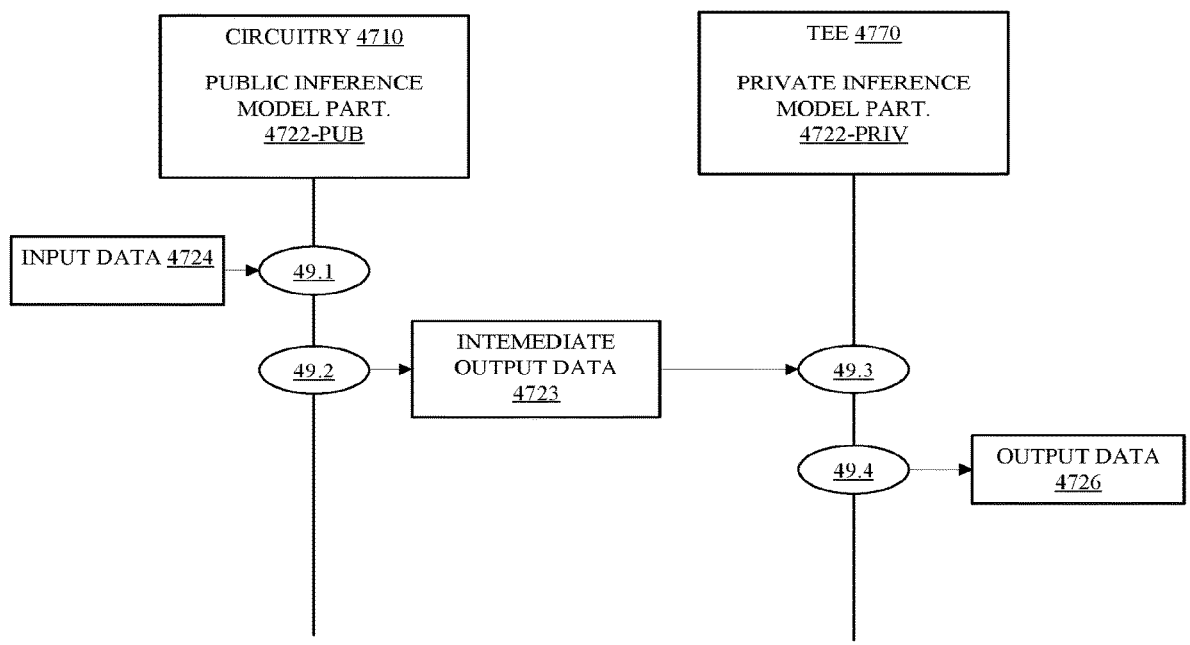
FIG. 49 illustrates a sixth example technique.

FIG. 48 illustrates an example of a partitioned inference system 4822, which can be implemented according to example of the present disclosure (e.g., as inference system 4722 of hardened system 4701 of FIG. 1). FIG. 49 illustrates an example technique 4900 that may be implemented by a hardened system (e.g., hardened system 4701 of FIG. 1) to execute an inference model in a secure manner. Operation of hardened system 4701 of FIG. 1 is described with reference to FIGS. 48 and 49.

Turning more particularly to FIG. 48, inference model 4822 (or partitioned inference model) is depicted. Inference model 4822 includes a number of nodes 4891 connected via connections 4893. Inference model 4822 can be any of a variety of inference model, such as, for example a neural network, or the like. In general, nodes 4891 receive input(s) via connections 4893 and derive an output based on an activation function. Any of a variety of activation functions (e.g., identity, binary step, tangent, arc-tangent, sigmoid, logistic or soft sigmoid, gaussian, or the like) can be used. Furthermore, often, values are scaled by a connection specific constant, referred to as a weight, at each connection 4893.

Groups of nodes 4891 can be referred to as a layer 4890. For example, layer 4890-1, layer 4890-2, layer 4890-3, layer 4890-4, and layer 4890-5 are depicted. It is noted, that an inference model can include any number of nodes, and layers and the number of nodes per layer, or the like. In practice, an inference model will often include many more nodes and layers than depicted here. The network architecture depicted here is done for clarity of presentation only and not to be limiting.

Inference model 4822 is partitioned into a public inference model partition 4822-PUB and a private inference model partition 4822-PRIV with selected layers included in one of the partitions. For example, public inference model partition 4822-PUB includes layers 4890-1, 4890-2, and 4890-3 while private inference model partition 4822-PRIV includes layers 4890-4 and 4890-5. It is noted, that the private partition, or the partition maintained in TEE 4770 may include earlier or initial layers of the inference model 4822, as opposed to later layers as depicted. Examples are not limited in this context.

Turning more particularly to FIG. 49, technique 4900 can begin at circle 49.1. At circle 49.1, hardened system can receive input data 4724. For example, circuitry 4710 of system 4701 can execute instructions 4728 to receive input data 4724. For example, circuitry 4710 can receive input data 4724 from input device 4752. As another example, circuitry 4710 can receive input data 4724 from another computing device via interface 4730.

Continuing to circle 49.2, hardened system 4701 can execute public inference model partition 4722-PUB to generate intermediate output data 4723 from input data 4724. For example, circuitry 4710, in executing instructions 4728, can derive intermediate output data 4723 based on calculations associated with layers 4890 of public inference model partition 4722-PUB using input data 4724 as input to the first layer 4890 of the partition. As a specific example, intermediate output data 4723 may correspond to outputs from nodes from layer 4890-3, that is, the last layer of the public inference model partition 4722-PUB. Continuing to circle BD3.3, TEE 4770 of hardened system 4701 can receive or access intermediate output data 4723. For example, TEE 4770, in executing TEE instructions 4778 can access intermediate output data 4723 (e.g., from memory 4720, or the like).

Continuing to circle 49.4, hardened system 4701 can execute private inference model partition 4722-PRIV, in a secure manner, to generate output data 4726 from intermediate output data 4723. For example, TEE 4770, in executing TEE instructions 4778, can derive output data 4726 based on calculations associated with layers 4890 of private inference model partition 4722-PRIV using intermediate input data 4723 as input to the first layer 4890 of the partition. As a specific example, output data 4726 may correspond to outputs from nodes from layer 4890-5, that is, the last layer of the private inference model partition 4722-PRIV.

Figure 50:
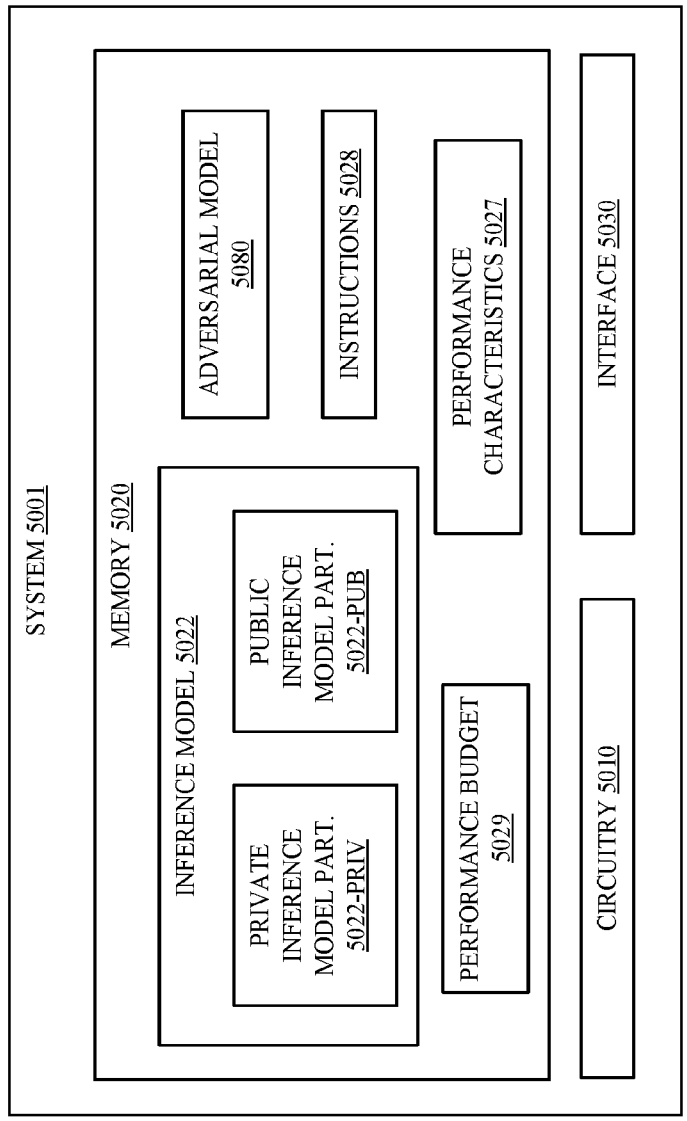
FIG. 50 illustrates a sixteenth example of a hardened system.
Figure 51:
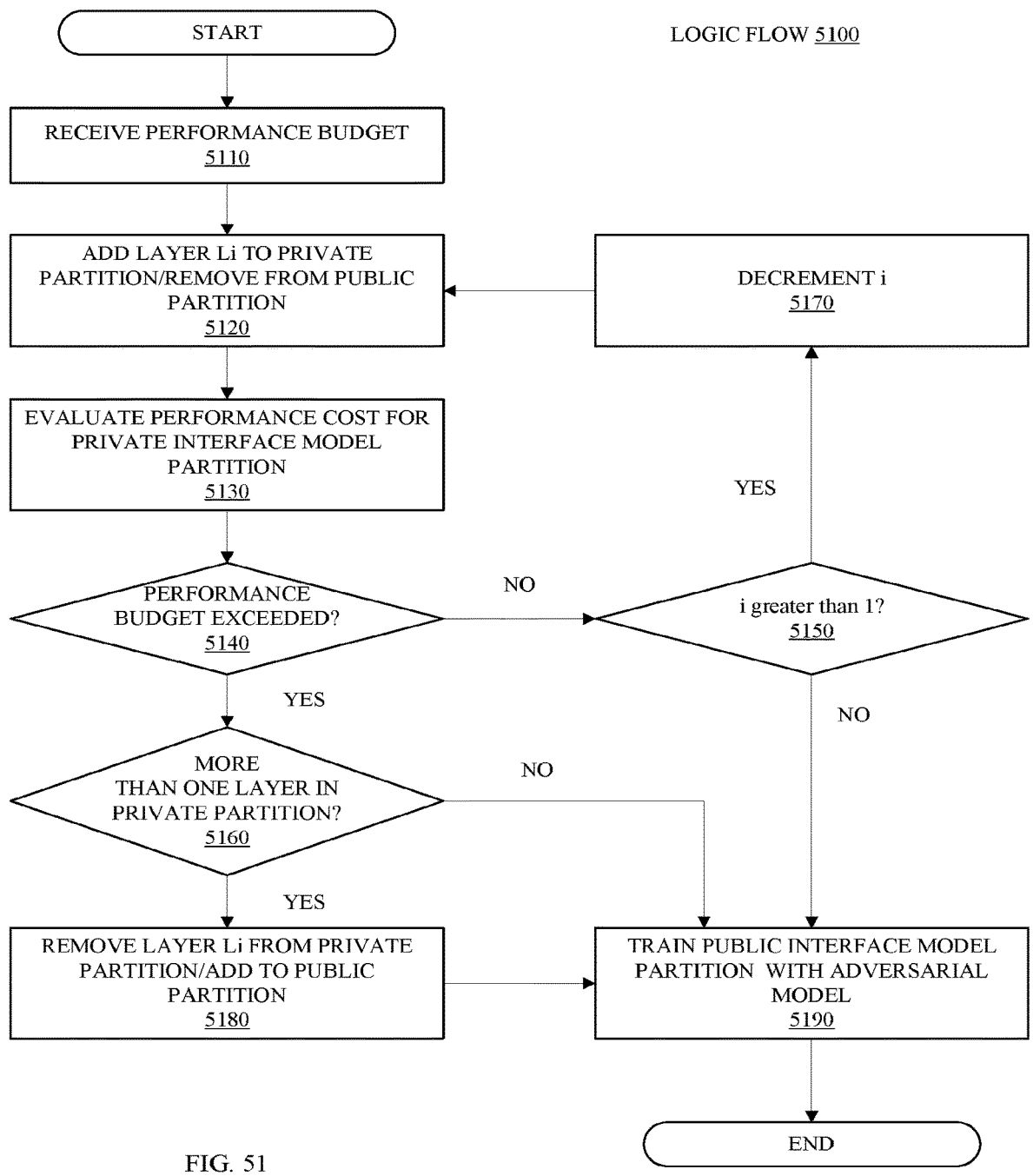
FIG. 51 illustrates a fifteenth example of a logic flow.

FIG. 50 illustrates a system 5001 that can be implemented to train a partitioned inference model. FIG. 51 illustrates an example of a logic flow 5100. The logic flow 5100 may be representative of some or all the operations executed by one or more examples described herein to train partitioned inference model (e.g., inference model 4722, inference model 4822, or the like). For example, system 5001 (or components thereof) may perform the operations in logic flow 4600 to generate private and public partitions for an inference model. System 5001 and logic flow 5100 are described in conjunction with each other and also with reference to partitioned inference model 4822 of FIG. 48. However, examples are not limited in this context.

Turning more particularly to FIG. 50, system 5001 can include includes circuitry 5010, memory 5020, and interface 5030. The memory 5020 stores inference model 5022 that include private inference model partition 5022-PRIV and public inference model partition 5022-PUB. Memory 5020 further includes performance characteristics 5027, instructions 4228, performance budget 5029 and adversarial training model 5080.

Turning more particularly to FIG. 51, logic flow 5100 can begin at block 5110. At block 5110 "receive performance budget" system 5001 can receive performance budget 5029. For example, circuitry 5010, in executing instructions 5028, can receive performance budget based on user selection. In some examples, performance budget 5029 can include an indication of an acceptable level of performance degradation, such as, for example, overall runtime degradation. As a specific example, performance budget 5029 can include an indication that up to a 20% performance penalty is acceptable.

Continuing to block 5120 "add layer Li to private partition/remove from public partition" system 5001 can add layer Li to the private model partition 5022-PRIV. With some examples, grouping of layers into private and public partitions can begin at the last (e.g., closest to the output) layer of an inference model. For example, for an inference model having 5 layers 4890 (e.g., inference model 4822, or the like) i can start at "5". Using this example, at block 520, circuitry 5010 can execute instructions 5028 to add layer 5090-5 to private inference model partition 5090-5 and remove layer 5090-5 from the public inference model partition 5022-PUB.

Continuing to block 5130 "evaluate performance cost for private inference model partition" system 5001 can evaluate the performance cost for executing the private inference model partition DBV422-PRIV in a secure environment (e.g., TEE 4770, or the like). In some examples, TEE 4770 can include an application programming interface (API) exposing computation capabilities of the TEE (e.g., memory space, performance impact per operation(s), page size, cache size, etc.). Accordingly, in some examples, at block 5130 (or before block 5120) logic flow 5100 can determine performance metrics for executing an inference model in TEE 4770. With some examples, at block 5130 (or before block 5120) logic flow 5100 can also determine performance metrics for executing an inference model using circuitry 4710 and memory 4720. For example, circuitry 5010 can execute instructions 5028 to query a TEE (e.g., TEE 4770) to determine performance metrics associated with the TEE and can save indications of such performance metrics as performance characteristics 5027. At block BD530, circuitry 5010 can execute instructions 5028 to evaluate a cost in computing performance to executing private inference model partition 5022-PRIV (or the layers added to private inference model partition 5022-PIRV) in a TEE based on architecture of layer 4890 of inference model 5022 and performance characteristics 5027.

Continuing to decision block 5140 "performance budget exceeded?" a determination can be made as to whether the performance budget 5029 is exceeded by executing private inference model partition 5022-PRIV in the secure environment (e.g., in TEE 4770). For example, assuming private inference model partition 5022-PRIV includes layer 4890-5 of inference model 4822 and that executing layer 4890-5 in TEE 4770 introduces a 10% performance penalty. Further assume the performance budget 5029 indicates an acceptable performance degradation of less than 20%. Using such examples, the performance budget 5029 is not exceeded by private inference model partition 5022-PRIV that includes layer 4890-5. With some examples, Circuitry 5010 in executing instructions 5028 can determine whether the execution runtime estimated of the private inference model partition 5022-PRIV based on performance characteristics 5027 exceeds performance budget 5029.

From decision block 5140, logic flow 5100 can continue to either decision block 5150 or decision block 5160. Logic flow 5100 can continue from decision block 5140 to decision block 5150 based on a determination that the performance budget 5029 is not exceeded while logic flow 5100 can continue from decision block 5140 to decision block 5160 based on a determination that the performance budget 5029 is exceeded.

At decision block 5150 "i greater than 1?" a determination whether i is greater than 1, that is, whether there are still layers in the public inference model partition 5022-PUB. From decision block 5150, logic flow 5100 can continue to either block 5170 or block 5190. Logic flow 5100 can continue from decision block 5150 to block 5170 based on a determination that i is greater than 1 while logic flow 5100 can continue from decision block 5150 to block 5190 based on a determination that i is not greater than 1.

At decision block 5160 "more than 1 layer in private inference model partition?" a determination whether the private inference model partition 5022-PRIV includes more than 1 layer is made. For example, circuitry 5010 can execute instructions 5028 to determine whether private inference model 5022-PRIV includes more than 1 layer. From decision block 5160, logic flow 5100 can continue to either block 5180 or block 5190. Logic flow 5100 can continue from decision block 5160 to block 5180 based on a determination that private inference model partition does include more than layer while logic flow 5100 can continue from decision block 5160 to block 5190 based on a determination that private inference model partition does not include more than layer.

At block 5170 "decrement i" system 5001 can decrement i. For example, circuitry 5010 in executing instructions 5028 can decrement i. From block 5170, logic flow 5100 can return to block 5120 to evaluate and possibly add another layer to private inference model partition. At block 5180 "remove layer Li from private partition/add to public partition" system 5001 can remove layer Li from the private model partition 5022-PRIV and add the layer Li to the public inference model partition 5022-PUB.

At block 5190 "train public inference model partition with adversarial model" system 5001 can train public inference model partition 5022-PUB with adversarial model 5080. In general, training public inference model partition 5022-PUB with the adversarial model 5080 will guide the public inference model partition 5022-PUB to reach an inaccurate or less accurate local minimum, when executed with a substitutional sub-model instead of the private model. That is, the adversarial loss "teaches" the whole model to encrypt, or scramble, the middle-representations created by the layers in the private model so that the private model serves as the key.

Figure 52:
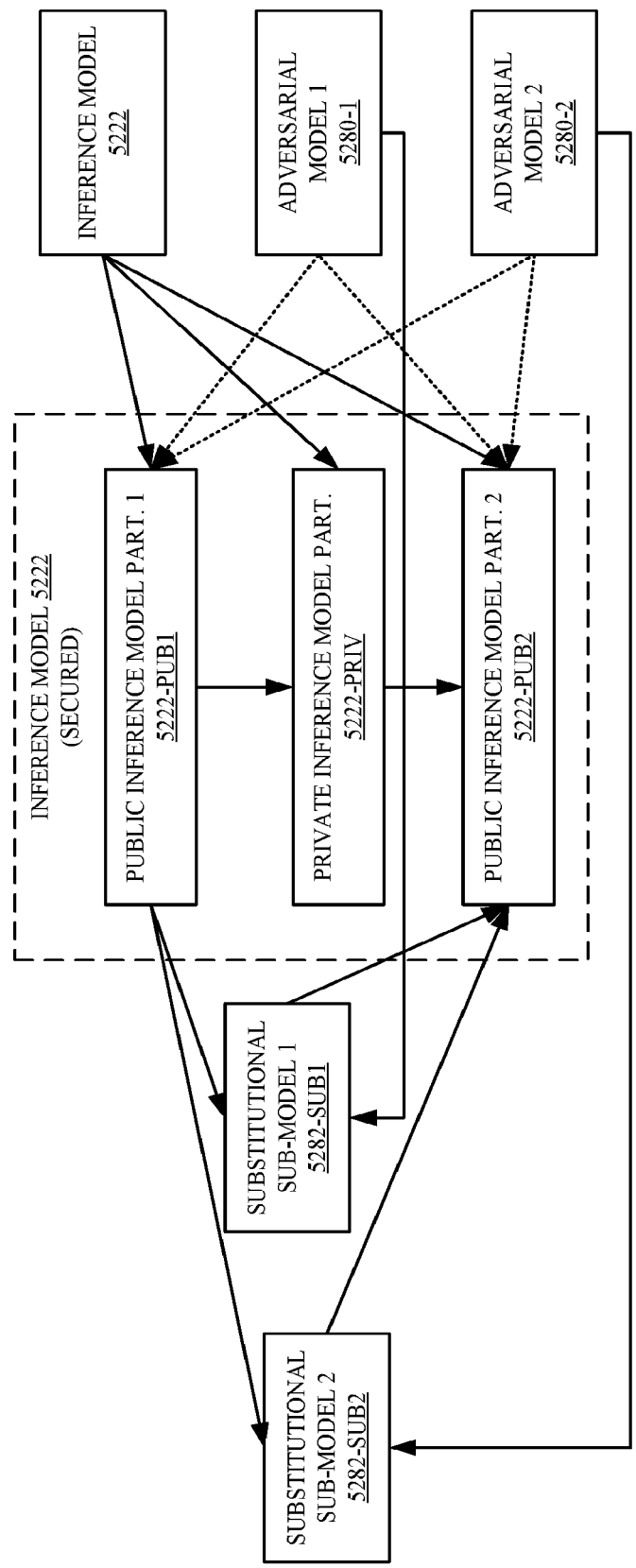
FIG. 52 illustrates a first example adversarial model training connection.

FIG. 52 depicts an example inference model 5222 split into a private inference model partition 5222-PRIV and two public inference model partitions 5222-PUB 1 and 5222-PUB 2, coupled to adversarial models 5280 and substitutional sub-models 5282 for adversarial training is depicted. As stated, training operates to guide public inference model partitions 5222-PUB 1 and 5222-PUB2 to reach an inaccurate or less accurate local minimum when executed with the substitutional sub-models 5282-1 and 5282-2. During training, the inference model 5222 has read and write access to the model partitions (e.g., public inference model partition 5222-PUB 1, private inference model partition 5222-PRIV, and public inference model partition 5222-PUB 2).

Furthermore, the adversarial models 5280 have read and write access to corresponding substitutional sub-models 5282 (e.g., adversarial model 5280-1 has read and write access to substitutional sub-model 5282-1 while adversarial model 5280-2 has read and write access to substitutional sub-model 5282-2). The rest of the connections (e.g., dotted connections) are read only.

In some examples, main model 5222 may be provided with more training iterations, access (e.g., read access) to the weights of the adversarial models 528-0-1 and 5280-2 (e.g., to determine the gradients to determine the "direction" the adversaries are moving during training), more training data, or the like. Such provisions may provide greater security or greater encryption by the private inference model partition 5222-PRIV.

Section V—Privacy
Privacy Aware Feature Balancer for Edge Devices

One issue with current inference systems is that object detectors (e.g., classifier models) are arranged to report all detected objects, regardless of privacy implications. For example, current inference systems will classify all objects in an image and will report all classified objects, leaving any privacy implications or hardening of the system to the upper layers of the environment. The present disclosure provides inference environment that can be arranged to screen reporting of objects outside a defined scope, for example, to protect privacy of some detected objects. An example of this could be a smart surveillance camera arranged to detect objects in images captures by the camera. The smart surveillance camera can be configured to filter or screen reporting of detected that are outside a specified scope.

It is to be appreciated that management of privacy is increasingly mandated by statute or government regulation. For example, the European Union's (EU) General Data Protection Regulation (GDPR) regulates the exportation and usage of individuals personal data and gives individuals control over use of their personal information. As such, maintaining the privacy of some objects detected as discussed herein may be required under some laws.

Figure 53:
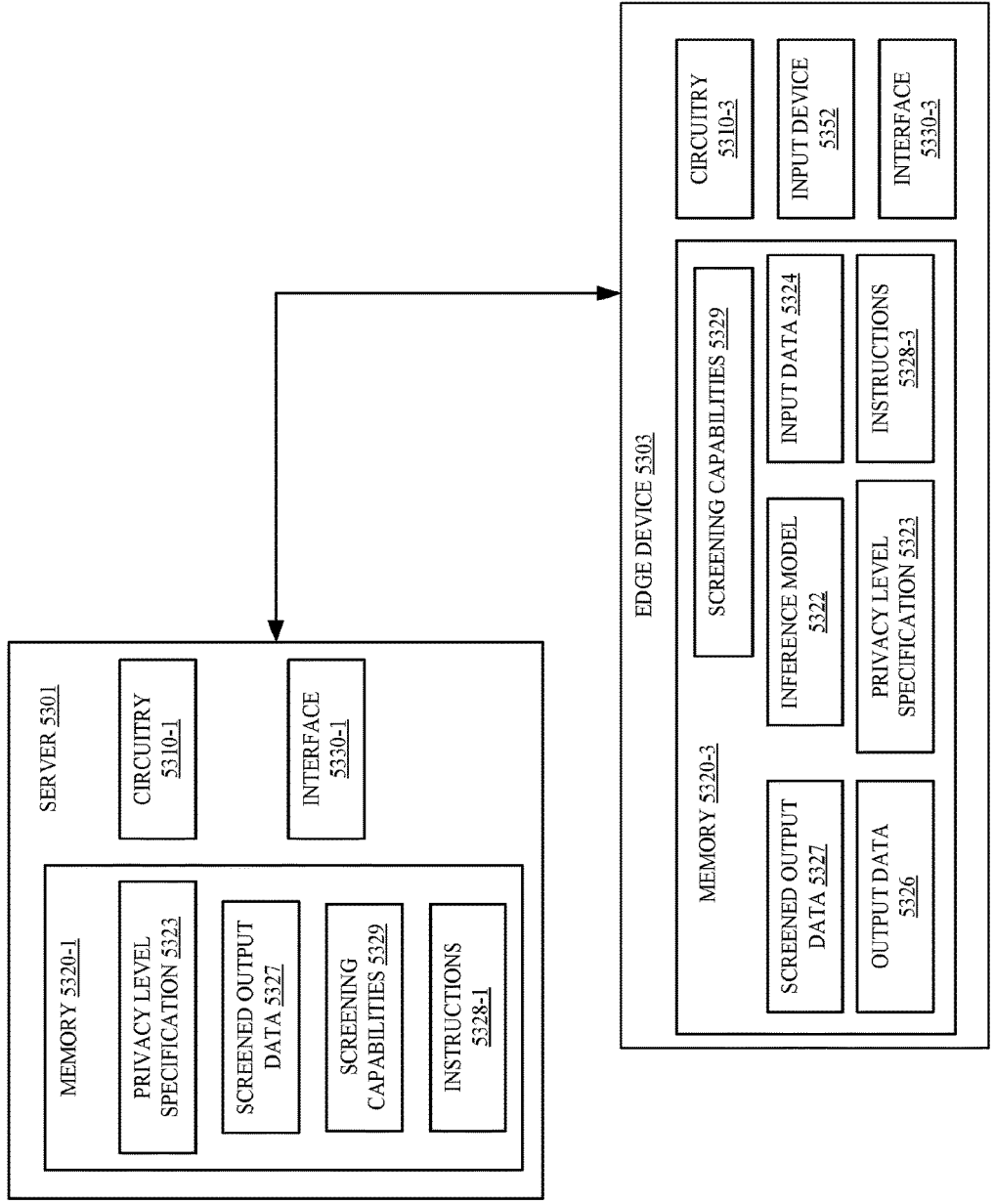
FIG. 53 illustrates a ninth example inference environment.

FIG. 53 illustrates an example inference environment 5300 including server 5301 and edge device 5303. In general, edge device 5303 can be any device that provides an entry point into server 5303, or to a network coupled to server 5303. For example, edge device 5303 could be a router, a routing switch, an integrated access devices (IADs), a multiplexer, a cell node, a base station, or the like). As another example, edge device 5303 could be an input capture device, such as, for example, a camera, a microphone, or the like. In general, server 5301 and edge device 5303 can be coupled via any suitable interconnect, such as, a wide area network, a local area network or the Internet. Server 5301 includes circuitry 5310-1, memory 5320-1 and interface 5330-1. Memory 5320-1 stores instructions 5328-1, screening capabilities 5329, privacy level specification 5323 and privacy screened output data 5327.

Edge device 5303 includes circuitry 5310-3, memory 5320-3, interface 5330-3 and input device 5352. Memory 5320-3 stores instructions 5328-3, input data 5324, inference model 5322, output data 5326, screening capabilities 5329, privacy level specification 5323 and privacy screen output data 5327.

Circuitry 5310-3 can execute instructions 5328-3 to receive input data 5324, for example, from input device 5352. Additionally, circuitry 5310-3 can execute instructions 5328-3 to generate output data 5326 from inference model 5322 and input data 5324. For example, circuitry 5310-3 can execute inference model 5322 on input data 5324 to generate output data 5326. In some examples, input device 5352 can be an image sensor arranged to capture an image frame (e.g., still frame, video frame, or the like). Inference model 5322 can be arranged to receive the input data 5324 and detect and classify objects from input data 5324 (e.g., objects represented in the image frame, or the like).

Circuitry 5310-1 can execute instructions 5328-1 to query edge device 5303 to gather and/or ascertain screening capabilities 5329 of edge device 129. In general, screening capabilities 5329 can include indications of objects classifiable by inference model 5322. For example, screening capabilities 5329 could include indications of objects, actions, scenes, actors, or the like that could be detected and classified from input data 5324. Furthermore, circuitry 5310-1 can execute instructions 5328-1 to query edge device 5303 to generate privacy level specification 5323 based in part on the screening capabilities 5329 and can communicate the privacy level specification 5323 to edge device 5303. For example, assuming inference engine is arranged to detect and classify the following objects in an image [gun, knife, bomb, ball, pen, phone, keys, rock, human, dog, cat]; screening capabilities 5329 could include indications of the objects that inference engine 5322 is arranged to detect and classify. Given screening capabilities, circuitry 5310-1, in executing instructions 5328-1, can generate privacy level specification including indications to screen (or filter) all detected objects except gun, knife and bomb.

Circuitry 5310-3 can execute instructions 5328-3 to generate screened output data 5327 from output data 5326 and privacy level specification 5323. For example, circuitry 5310-3, in executing instructions 5328-3, can filter classified objects outside the list of objects indicated in the privacy level specification 5323 from output data 5326. Furthermore, circuitry 5310-3 can execute instructions 5328-3 to provide screened output data 5327 to server 5301. For example, circuitry 5310-3 can provide screened output data 5327 to server 5301 via interface 5330-3.

Figure 54:
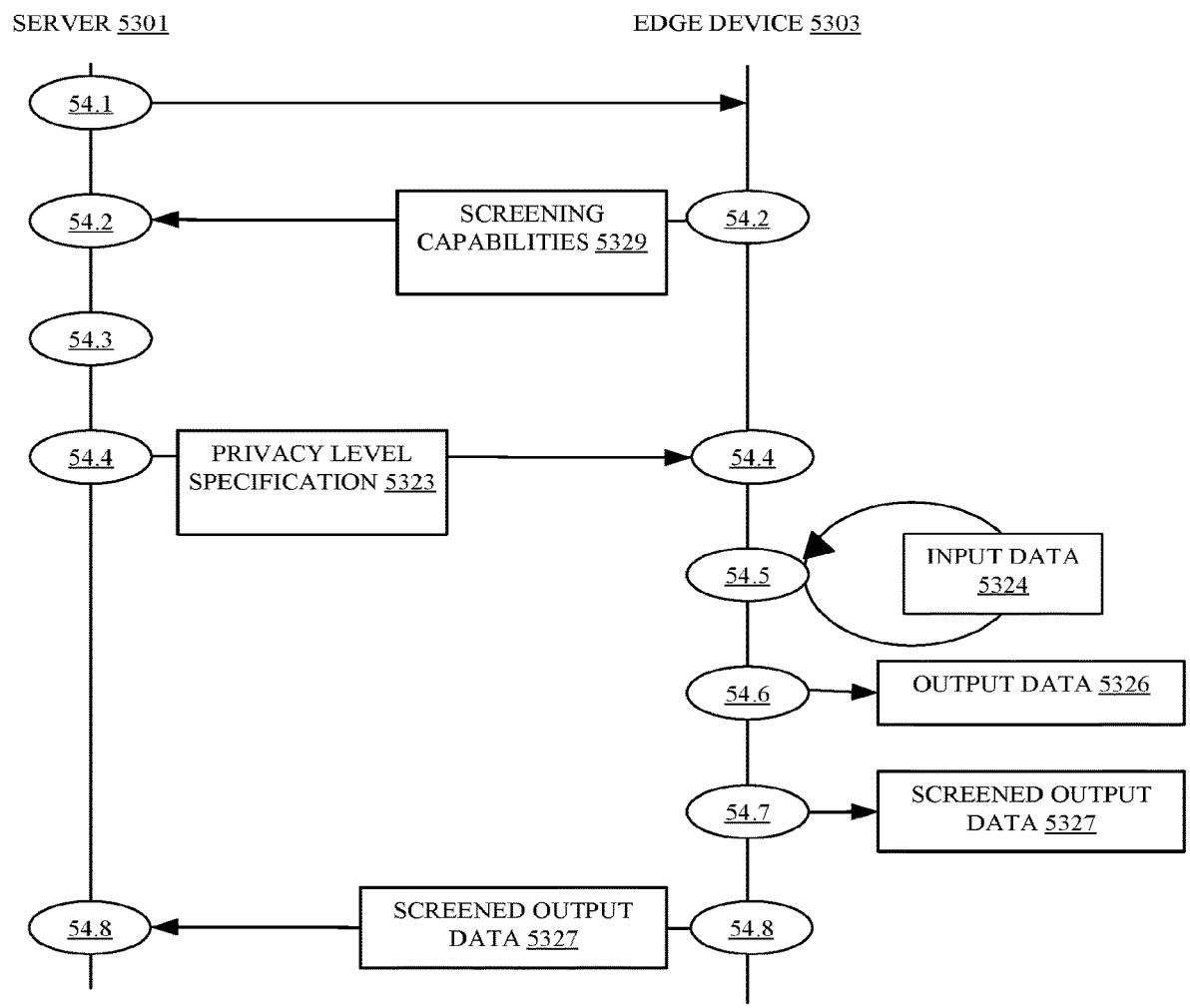
FIG. 54 illustrates a seventh example technique.

FIG. 54 illustrates an example technique 5400 that may be implemented in an inference environment, such as environment 5300 to screen output at the edge to increase privacy in the inference environment. It is noted the technique 5400 is described with reference to the inference environment 5300 of FIG. 53 for convenience and clarity. However, this is not intended to be limiting.

Technique 5400 can begin at circle 54.1. At circle 54.1, server 5301 can query edge device 5303 to determine screening capabilities of edge device 5303. For example, server 5301 can send, via interface 5330-1, a request to receive screening capabilities 5329 to edge device 5303. At circle 54.2, edge device 5303 can send an information element including indications of screening capabilities 5329 to server 5301. For example, responsive to receiving the request at circle 54.1, edge device 5303 can send, via interface 5330-3, screening capabilities 5329 to server 5301. Also, at circle 2.2, server 5301 can receive, via interface 5330-1, screening capabilities 5329 from edge device 5303.

At circle 54.3, server 5301 can generate privacy level specification 5323 based in part on screening capabilities 5329. For example, given the screening capabilities 5329 of edge device 5303, server 5301 can generate a list of classification categories to filter to mitigate or suppress privacy intrusion. At circle 54.4, server 5301 can send an information element including indications of privacy level specification 5323 to edge device 5303. For example, server 5301 can send, via interface 5330-1, privacy level specification 5323 to edge device 5303. Also, at circle 2.4, edge device 5303 can receive, via interface 5330-3, privacy level specification 5323 from server 5301.

At circle 54.5, edge device 5303 can receive input data 5324. For example, edge device 5303 can receive input data 5324 from input device 5352. It is noted, that multiple different instances of input data 5324 could be received and screened (or filtered) as described herein. For example, edge device 5303 could repeatedly receive input data 5324 at circle 54.5 and generate privacy screened output 5327 as described herein. At circle 54.6, edge device 5303 can generate output data 5326 from inference model 5322 and input data 5324. For example, edge device 5303 can execute inference model 5322 on input data 5324 to generate output data 5326. At circle 54.7, edge device 5303 can generate privacy screened output data 5327 from output data 5326 and privacy level specification 5323. For example, edge device 5303 can screen, filter, or otherwise remove objects not to be reported (e.g., objects listed in privacy level specification 5323, objects omitted from privacy level specification 5323, or the like) from output data 5326 and save the filtered outputs at privacy screened output data 5327.

At circle 54.8, edge device 5303 can send an information element including indications of privacy screened output data 5327 to server 5301. For example, edge device 5303 can send, via interface 5330-3, privacy screened output data 5327 to server 5301. Also, at circle 2.8, server 5301 can receive, via interface 5330-1, privacy screened output data 5327 from edge device 5303.

Figure 55:
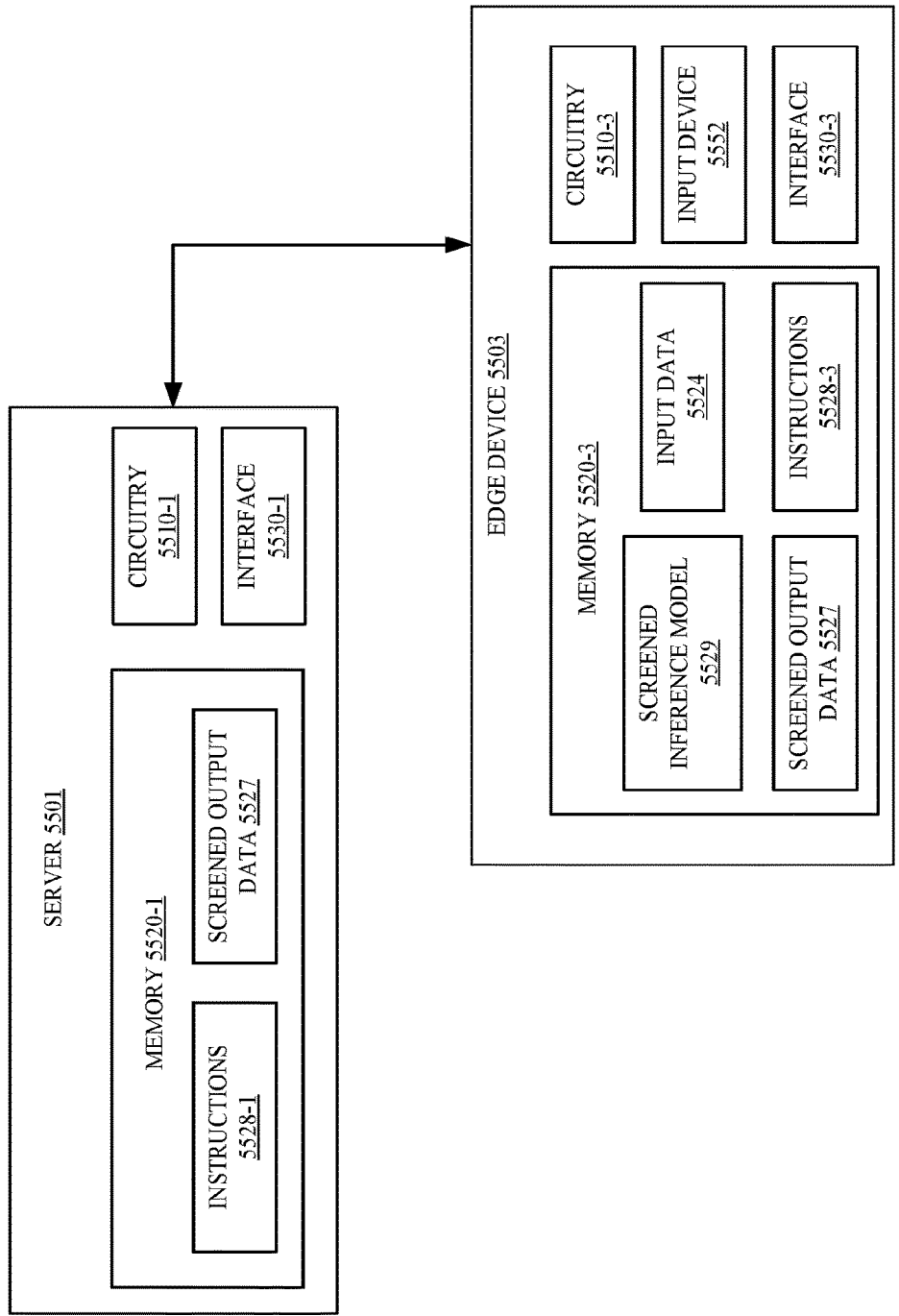
FIG. 55 illustrates a tenth example inference environment.

In some examples, the inference model itself can be modified to screen outputs as discussed herein. For example, an inference model can be modified to drop out particular outputs. As a specific example, particular weights connecting the last layer in an inference model can be modified (e.g., set to zero, or the like) to cause the inference model to not output classes associated with those weights. FIG. 55 illustrates an example inference environment 5500 including server 5501 and edge device 5503. In general, edge device 5503 can be any device that provides an entry point into server 5501, or to a network coupled to server 5501. For example, edge device 5503 could be a router, a routing switch, an integrated access devices (IADs), a multiplexer, a cell node, a base station, or the like). As another example, edge device 5503 could be an input capture device, such as, for example, a camera, a microphone, or the like. In general, server 5501 and edge device 5503 can be coupled via any suitable interconnect, such as, a wide area network, a local area network or the Internet. Server 5501 includes circuitry 5510-1, memory 5520-1 and interface 5530-1. Memory 5520-1 stores instructions 5528-1 and privacy screened output data 5527.

Edge device 5503 includes circuitry 5510-3, memory 5520-3, interface 5530-3 and input device 5552. Memory 5520-3 stores instructions 5528-3, input data 5524, privacy screened inference model 5523, and privacy screen output data 5527. Privacy screened inference model 5523 can be an inference model adjusted to automatically generate privacy screened output data 5527. For example, privacy screened inference model 5523 can be generated by adjusting weights or connections in an inference model to cause the inference model to output data associated with non-private classes (or the like). Using the example above, an inference model can be modified (e.g., by adjusting connections, etc.) to generate privacy screened inference model 5523, which outputs classifications of gun, knife or bomb.

Circuitry 5510-3 can execute instructions 5528-3 to receive input data 5524, for example, from input device 5552. Additionally, circuitry 5510-3 can execute instructions 5528-3 to generate privacy screened output data 5527 from privacy screened inference model 5523 and input data 5524. For example, circuitry 5510-3 can execute privacy screened inference model 5523 on input data 5524 to generate privacy screened output data 5527. In some examples, input device 5352 can be an image sensor arranged to capture an image frame (e.g., still frame, video frame, or the like). Inference model 5322 can be arranged to receive the input data 5324 and detect and classify objects from input data 5324 (e.g., objects represented in the image frame, or the like).

Privacy Aware Multi-Location Model Execution

The present disclosure provides examples of inference model execution in a distributed fashion. For example, part of an inference model can be executed on edge devices coupled to a server. As another example, multiple servers can be used to execute an inference model in a distributed manner, that is, each server executes a part of the model. In addition, the present disclosure provides to interrogate the distributed computing platforms (e.g., servers, edge devices, etc.) to determine security capabilities of the platforms, and then split the inference model and assign the portions (or slices) to platforms based on the determined security capabilities as well as security requirements of different portions of the inference model.

Accordingly, risks associated with distributed execution of an inference model might be mitigated. For example, different portions of the inference model may have different values or privacy concerns. As a specific example, initial layers (e.g., closer to the input) in a neural network often take more training iterations to recover (e.g., recreate); while later layers (e.g., closer to the output) often more readily expose information about the data on which the inference model was trained. Thus, later layers of the inference model can be split and assigned to a platform having a higher security capability than other platforms in the distributed execution environment.

Figure 56:
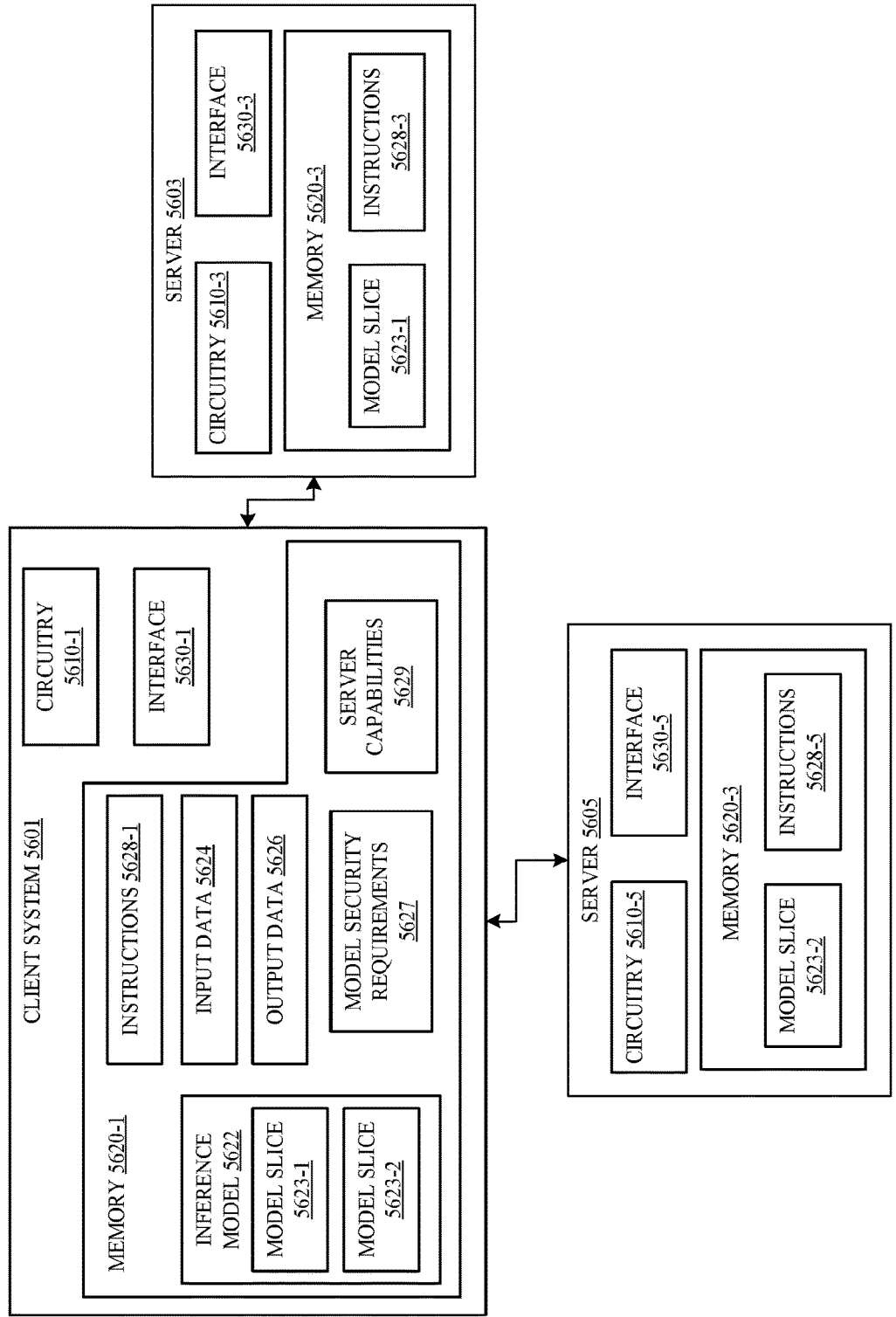
FIG. 56 illustrates an eleventh example inference environment.

FIG. 56 illustrates an example inference environment 5600 including client device 5601, and servers 5603 and 5605. In general, servers 5603 and 5605 are arranged to execute a portion of an inference model in a distributed manner. Servers 5603 and 5605 can be cloud based (or accessible) computing resources, edge devices, specifically arranged inference model execution accelerators, or the like. Furthermore, although two servers 5603 and 5605 are depicted in this figure, it is to be appreciated that any number (2, 3, 4, or greater) of servers could be provided in inference environment 5600. As noted, servers 5603 and 5605 of inference environment 5600 could be edge devices. With some examples, inference environment 5600 could be a multi-edge environment, where client device 5601 utilizes idle computational power in the "edge" (e.g., edge devices 5603, 5605, or the like).

Client device 5601 and servers 5603 and 5605 can be coupled via a network (e.g., which can include the Internet, or the like). More specifically, interfaces 5630-1, 5630-3 and 5630-5 can be coupled to the network to facilitate communication or exchange of data between devices.

Client device 5601 includes circuitry 5610-1, memory 5620-1 and interface 5630-1. Memory 5620-1 stores inference model 5622, input data 5624, output data 5626, model security requirements 5627, instructions 5628, and server capabilities 5629. In general, client device 5601 operates to split inference model 5622 into model slices 5623, based on model security requirements 5627 and server capabilities 5629 and then assign these model slices 5623 to one of servers 5603 or 5605, based on model security requirements 5627 and server capabilities 5629. Thus, inference model 5622 can be executed in a distributed manner by servers 5603 and 5605 while providing for security protection of portions of the model based on server capabilities 5629 of the servers and security requirements 5627 of the inference model 5622.

Server 5603 includes circuitry 5610-3, memory 5620-3 and interface 5630-3. Memory 5620-3 stores model slice 5622-1 and instructions 5628-3. Likewise, server 5605 includes circuitry 5610-5, memory 5620-5 and interface 5630-5. Memory 5620-5 stores model slice 5622-2 and instructions 5628-5. In general, servers 5603 and 5605 provide an application programming interface (API) that exposes security capabilities of the respective server (e.g., tamper protections, secure execution provisions, etc.). Furthermore, servers 5603 and 105 are arranged to execute portions (e.g., a model slice 5623) of inference model 5622 in a distributed manner.

Circuitry 5610-1 can execute instructions 5628-1 to query servers 5603 and 5605 to determine security capabilities of each of the respective servers. Circuitry 5610-3 and 5610-5 can execute instructions 5628-3 and 5628-5, respectively, to send security capability of the respective server 5603 or 5605 to client device 5601, responsive to the query. Circuitry 5610-1 can execute instructions 5628-1 to store indications of the security capabilities received from the respective servers as server capabilities 5629.

Circuitry 5610-1 can execute instructions 5628-1 to split inference model 5622 into model slices 5623 based on the server capabilities and model security requirements 5627. In general, model security requirements 5627 can include indications of security requirements for respective layers, portions, or parts of inference model 5622. Circuitry 5610-1 can execute instructions 5628-1 to determine which server 5603 or 5605 to execute which model slice 5623 based on model security requirements 5627 and server capabilities 5629. Furthermore, circuitry 5610-1 can execute instructions 5628-1 to send (e.g., via interface 5630-1, or the like) information elements to each of servers 5603 and 5605 including an indication of the assigned model slice 5623 and instructions to execute the model slice 5623 in a distributed manner.

Circuitry 5610-3 and 5610-5 can execute instructions 5628-3 and 5628-5, respectively, to execute the received model slice 5623 in a distributed manner.

Figure 57:
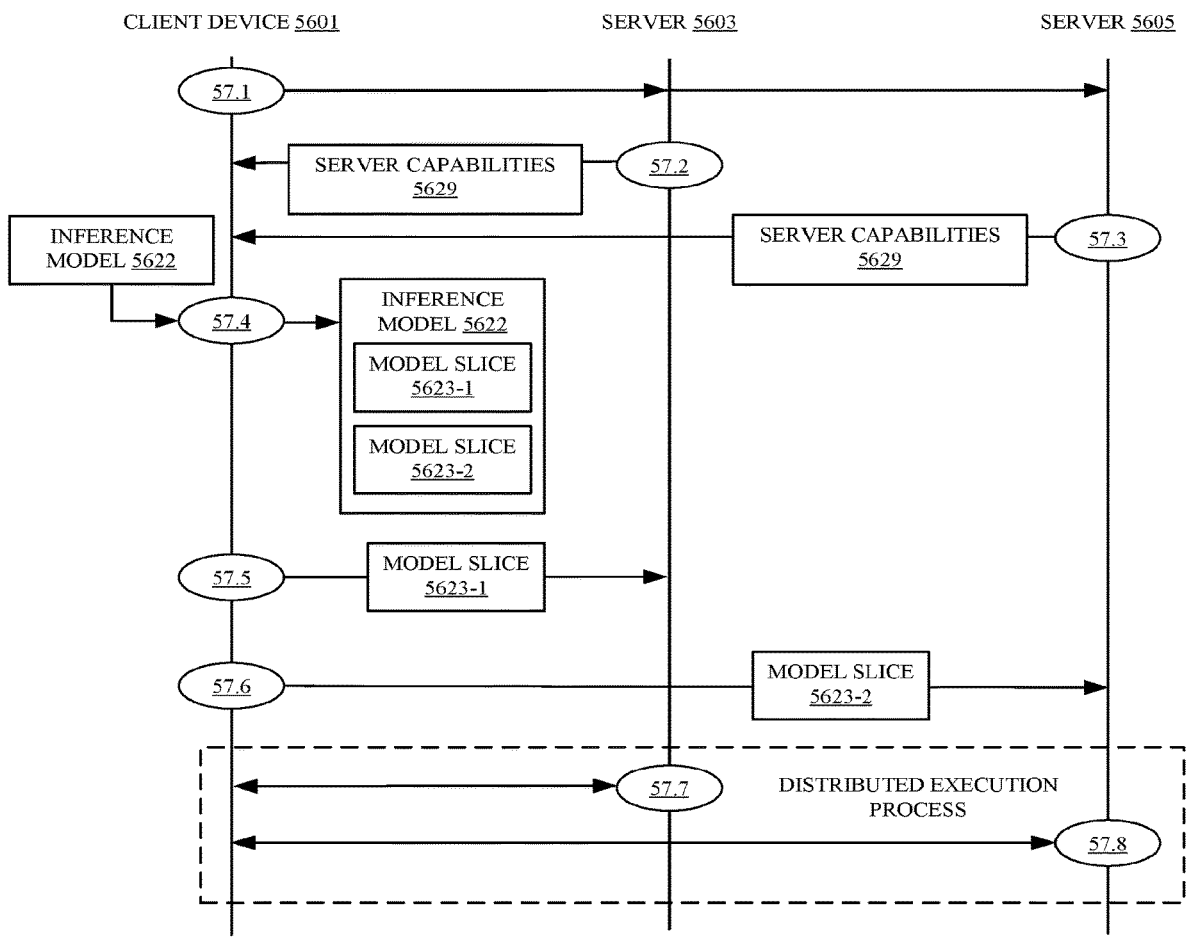
FIG. 57 illustrates an eighth example technique.

FIG. 57 illustrates an example technique 5700 that may be implemented in an inference environment, such as environment 5600 to execute an inference model in a distributed manner based on security capabilities of the distributed computing platforms. It is noted the technique 5700 is described with reference to the inference environment 5600 of FIG. 56 for convenience and clarity. However, this is not intended to be limiting.

Technique 5700 can begin at circle 57.1. At circle 57.1, client device 5601 can query servers 5603 and 5605 to security capabilities of the servers 5603 and 5605. For example, client device 5601 can send, via interface 5630-1, a request to receive server capabilities 5629 of servers 5603 and 5605. to edge device 5303.

At circles 57.2 and 57.3, servers 5603 and 5605, respectively, can send an indication of their respective security capabilities to client device 5601. For example, responsive to receiving the request at circle 57.1, server 5603 can send, via interface 5630-3, server capabilities 5629 respective to server 5603 to client device 5601. Likewise, responsive to receiving the request at circle 57.1, server 5605 can send, via interface 5630-5, server capabilities 5629 respective to server 5605 to client device 5601.

At circle 57.4, client device 5601 can split inference model 5622 into model slices 5623 based in part on model security requirements 5627 and received server capabilities 5629. Also, at circler 57.4, client device 5601 can assign model slices 5623 to one of servers 5603 or 5605 for execution in a distributed manner based on the server capabilities 5629 and model security requirements 5627.

At circles 57.5 and 57.6, client device 5601 can send to servers 5603 and 5605, respectively, indications of the model slice 5623 assigned to the respective server along with an indication to execute the received model slice 5623 in a distributed manner. For example, at circle 57.5, client device 5601 can send, via interface 5630-1, to server 5603 model slice 5623-1. Likewise, at circle 57.6, client device 5601 can send, via interface 5630-1, to server 5605 model slice 5623-2. At circles 57.7 and 57.8, servers 5603 and 5605 can execute the received model slices 5623 in a distributed manner.

Section VI—General

Iterative Inference to Compensate for Input Quality One issue with current inference systems is that input data quality and/or quantity may be undesirable. For instance, an excessive number of samples in a data set may be evaluated as unacceptable. In such instance, an inference model may not be able to classify the unacceptable samples without a threshold level of confidence. Further, these unacceptable samples may be filtered out, reducing the amount of input data (e.g., for training or testing purposes). Accordingly, the present disclosure provides an inference system that is able to augment unacceptable samples in input data in an effort to convert them into acceptable samples.

Figure 58:
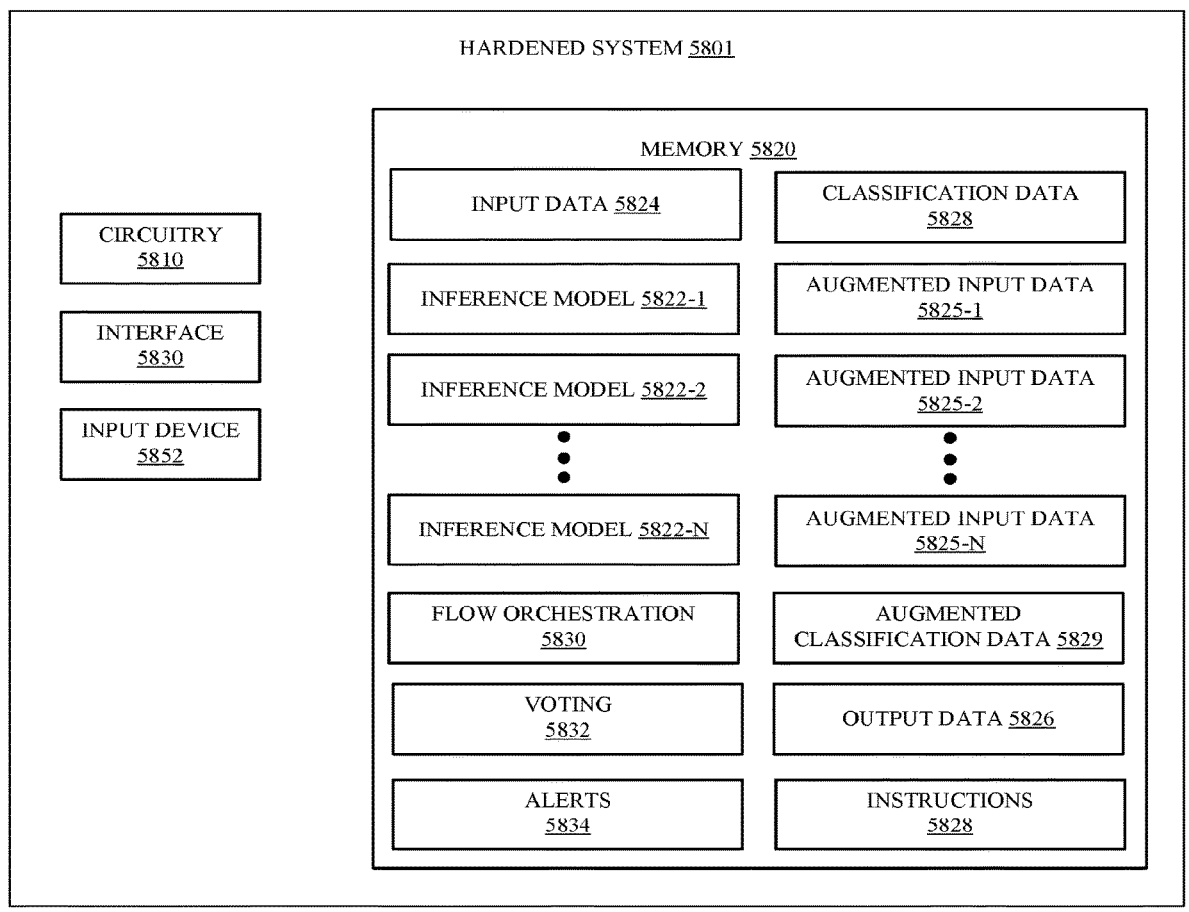
FIG. 58 illustrates a seventeenth example hardened system.

FIG. 58 illustrates an example hardened system 5801, which may be implemented according to the present disclosure. The hardened system 5801 includes circuitry 5810, memory 5820, interface 5830, and input device 5852. The memory 5820 stores a set of one or more inference models 5822-1, 5822-2, 5822-N (or inference models 5822), input data 5824, augmented input data 5825, output data 5826, classification data 5828, augmented classification data 5829, and instructions 5828. In many examples, input data 5824 may include a data set of one or more samples for classification by one or more of inference models 5822. During operation, circuitry 5810 can execute instructions 5828 to generate a set of one or more augmented input data 5825-1, 5825-2, 5825-N (or set of augmented input data 5825) in response the classification data 5828, generated by one or more of inference models 5822 based on input data 5824, being evaluated as unacceptable.

Further, circuitry 5810 can execute instructions 5828 to classify the augmented input data 5825 with one or more of inference models 5822 to produce augmented classification data 5829. In several examples, this cycle may repeat until the augmented classification data 5829 is evaluated as acceptable. Sometimes circuitry 5810 can execute instructions 5828 to perform one or more iterative inferences, such as to compensate for input data 5824 quality and/or quantity. In many examples, evaluating classification data as acceptable or unacceptable may be based on a confidence level included in the classification data 5828. For example, artifacts in the input data (e.g., video/image artifacts) may result in a low confidence level. Once classification data is evaluated as acceptable one or more of input data 5824, classification data 5828, augmented input data 5825, and augmented classification data 5829, or indication thereof, may be provided as output data 5826.

In some examples, voting 5832 may occur among the set of inference models 5822 to determine a classification or inference. In various examples, flow orchestration 5830 may map how data flows through the set of inference models 5822. In one or more examples, alerts 5834 may be generated, such as based on classification by one or more of the inference models 5822. In some examples, For example, circuitry 5810 can execute instructions 5828 to evaluate classification data (e.g., classification data 5828 and/or augmented classification data 5829) as acceptable when a confidence level in the classification of input data 5824 by inference model 522 exceeds a threshold (e.g., 75%). In various examples, a number of usable samples in a data set (e.g., that evaluate as acceptable) may be increased by augmenting one or more aspects of an unacceptable sample such that they evaluate as acceptable after the augmentation. In several examples, augmentation of an unacceptable sample may include one or more of a change of gamma, a pixel shift, de-noising, error correction, and the like. Sometimes one or more augmentations may be performed and/or classified in parallel. Further, the set of one or more augmented versions may be compared and evaluated, such as to identify operation anomalies. Oftentimes, increasing the number of usable samples may improve accuracy of hardened systems. For instance, inference model 5822 may be retrained on the larger sample set, generally resulting in an improved inference model.

Sometimes, circuitry 5810 may execute instructions 5828 to identify and/or receive input data 5824 based on interface 5830 with which memory 5820 couples to input device 5852 or based on the communication scheme over which interface 5830 communicates with input device 5852. In many examples, the input device 5852 may include premium and/or challenging access to environments and/or situations. For example, the input device may 5852 may include a satellite, a spy camera, an internet of things (IoT) device, or other transducer that captures a rare or limited event (e.g., tsunami, earthquake, conflict, market anomalies, limited historical records, etc.). It is noted, that a single interface 5830 is depicted. However, in some examples, different interfaces 5830 can be provided for different input devices 152 or input devices 152 having different characteristics (e.g., different security requirements, etc.).

Circuitry 5810 can execute instructions 5828 to utilize inference model 5822 to generate classification data 5828 based on input data 5824. The classification data 5828 may then be evaluated to determine whether the input data 5824 is acceptable (e.g., by exceeding a confidence threshold). When the input data 5824 is deemed unacceptable, such as based on classification data 5828, the circuitry 5810 can execute instructions 5828 to augment the input data 5824 in one or more ways to generate augmented input data 5825. In some examples, the augmentations may include transformations that preserve local properties. The augmented input data 5825 may be classified by inference model 5822 to generate augmented classification data 5829. The augmented classification 5829 may be evaluated to determine whether the augmented classification data 5829 is acceptable to provide as output data.

In various examples, classification data 5828 and one or more versions of augmented classification data 5829 may be compared, such as to detect operation anomalies. For example, classification data 5828 and one or more versions of augmented classification data 5829 that the inference model 5822 generates different classifications and/or confidence levels for may indicate an attempt to fool hardened system 5801. For instance, if two outputs of the same inputs before and after augmentation lead to contradicting predictions (e.g., <<Stop>> vs. <<Limit 90>> it may indicate an attempt to fool the system. Sometimes, a notification, such as an alert or log, may be generated based on evaluation of the input data 5824. Additionally, or alternatively, one or more corrective actions may be implemented based on evaluation of the input data 5824.

Figure 59:
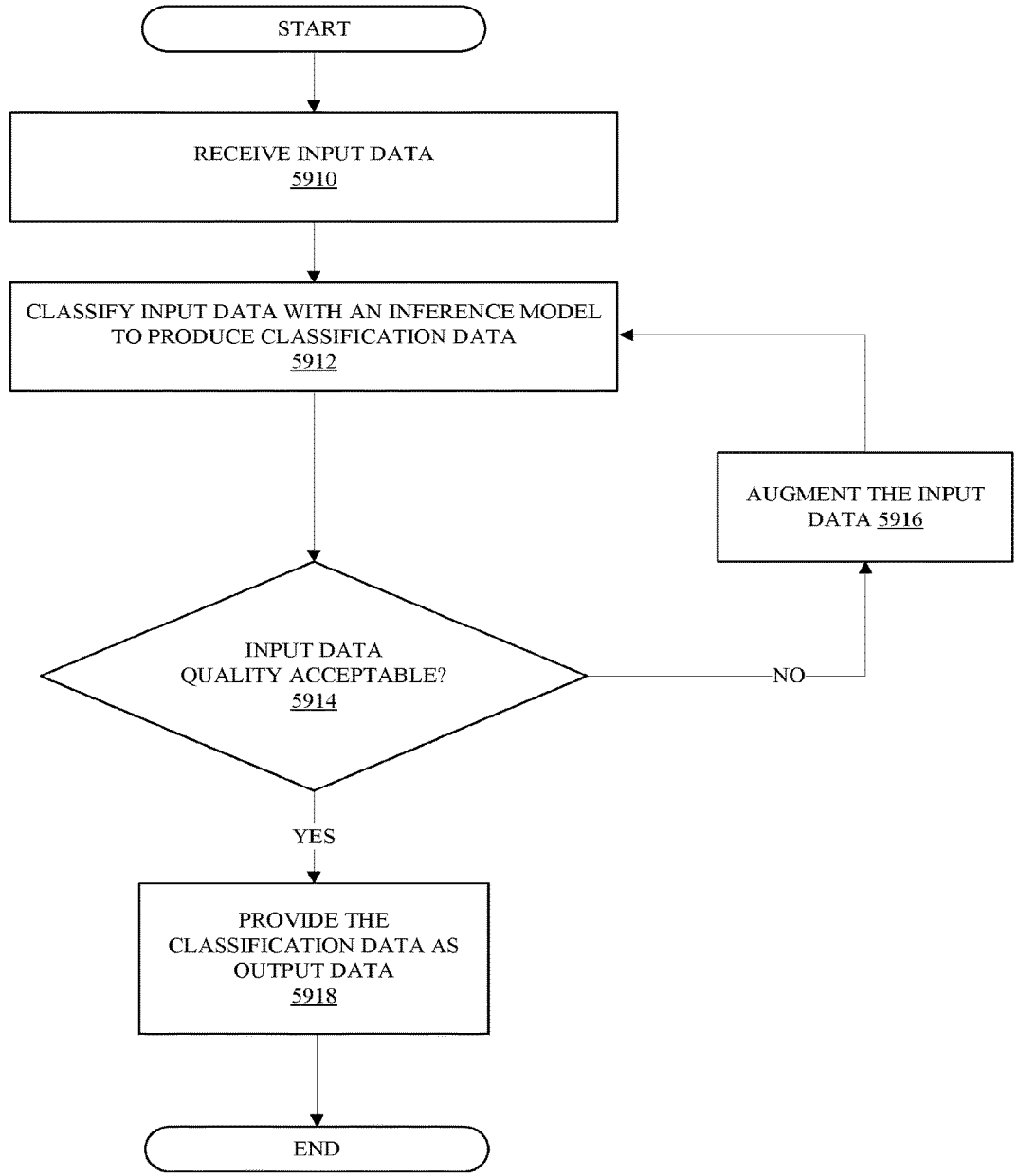
FIG. 59 illustrates a sixteenth example of a logic flow.

FIG. 59 illustrates a logic flow 5900. The logic flow 5900 may be representative of some or all the operations executed by one or more devices described herein. For example, hardened system 5801 (or components thereof) may perform the operations in logic flow 5900 to augment input data to improve input data quality (e.g., an accuracy or confidence at which the input data is classified by an inference model).

Logic flow 5900 may begin at block 5910 "receive input data" where the hardened system 5801 may receive input data 5824. For example, input data 5824 may be received from input device 5852 via interface 5830. In some examples, the input data 5824 may be preprocessed prior to block 5912. Proceeding to block 5912 "classify input data based on an inference model to produce classification data" the input data may be classified based on an inference model to produce classification data. For instance, inference model 5822 may generate classification data 5828 based on input data 5824. At decision block 5914 "input data quality acceptable?" the input data may be evaluated as acceptable or unacceptable based on the classification data. For example, input data 5824 may be evaluated as acceptable or unacceptable based on classification data 5828. If the input data evaluates as unacceptable, logic flow 5900 may proceed to block 5916 and if the input data evaluates as acceptable, logic flow 5900 may proceed to block 5918.

At block 5916, "augment the input data" the input data may be augmented. For example, input data 5824 may be modified to produce augmented input data 5825. In many examples, a different augmentation may be applied to input data each time the logic flow 5900 passes through block 5916. The logic flow 5900 may then return to block 5912 and repeat as described above. However, if the input data evaluates as acceptable and the logic flow 5900 proceeds to block 5918, the classification data may be provided as output data. For example, augmented classification data 5829 may be provided as output data 5826. In some examples, one or more of input data 5824, classification data 5828, and augmented input data 5825 may be provided as output data 5826 in addition, or alternative, to augmented classification data 5829. From block 5918, the logic flow 5900 can end, or can repeat based on receiving new inputs.

Figure 60:
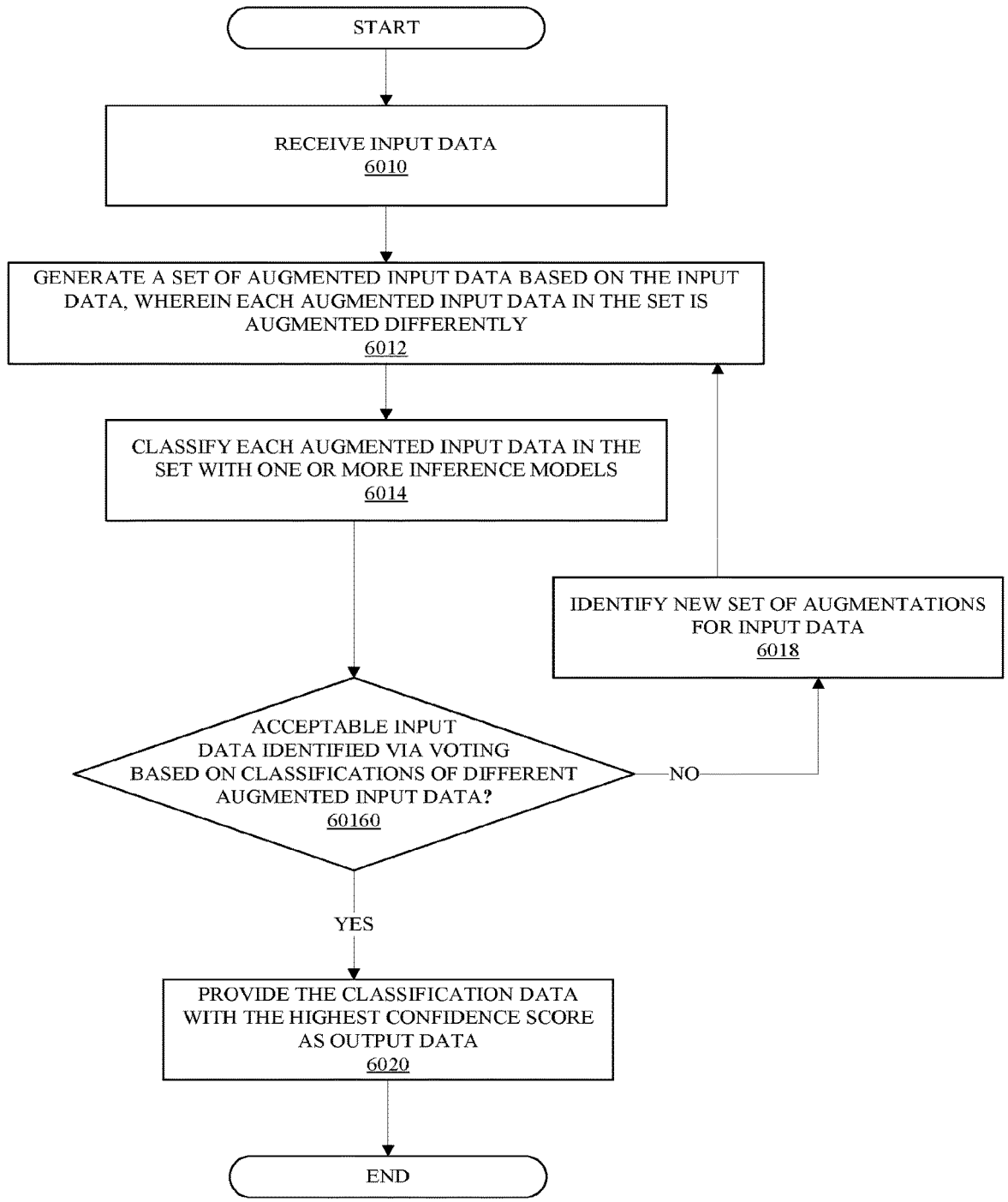
FIG. 60 illustrates a seventeenth example of a logic flow.

FIG. 60 illustrates a logic flow 6000. The logic flow 6000 may be representative of some or all the operations executed by one or more devices described herein. For example, hardened system 5801 (or components thereof) may perform the operations in logic flow 6000 to split and/or augment input data and use voting to improve input data quality (e.g., an accuracy or confidence at which the input data is classified by an inference model).

Logic flow 6000 may begin at block 6010 "receive input data" where the hardened system 5801 may receive input data 5824. For example, input data 5824 may be received from input device 5852 via interface 5830. In some examples, the input data 5824 may be preprocessed prior to block 6012. Proceeding to block 6012 "generate a set of augmented input data based on the input data, wherein each augmented input data in the set is augmented differently" a set of augmented input data is generated. In some examples, the set of augmented input data may include augmented data 5825-1, 5825-2, 5825-N. For example, the set of augmented input data may include results of various augmentations (e.g., a change of gamma, a pixel shift, a de-noising, an error correction, and the like).

Proceeding to block 6014 "classify each augmented input data in the set with one or more inference models" each of the various augmentations may be classified with one or more inference models. For instance, each augmented version of the input data may be classified by one or more of inference models 5822-1, 5822-2, 5822-n. Continuing to decision block 6016 "acceptable input data identified via voting based on classifications of different augmented input data" it may be determined whether the input data (or one or more augmentations thereof) are acceptable via voting based on classifications of different augmented input data. If the decision block 6016 evaluates to yes, the logic flow 6000 may process to block 6020 and if the decision block 6016 evaluates to no, the logic flow 6000 may process to block 6018.

At block 6018 "identify a new set of augmentations for input data" a new set of augmentations for input data may be identified. For example, augmented input data 5825 may be updated with a new set of augmentations for input data 5824. After block 6018, logic flow 6000 may return to block 6012 and repeat as described above with the new set of augmentations. Referring back to when block 6016 evaluates to yes, logic flow 6000 may continue to block 6020. At block 6020 "provide the classification data with the highest confidence score as output data" the classification with the highest confidence score may be provided as output data. In some examples, this may be determined based on voting additionally, or alternatively. From block 6020, the logic flow 6000 can end, or can repeat based on receiving new inputs.

Figure 61:
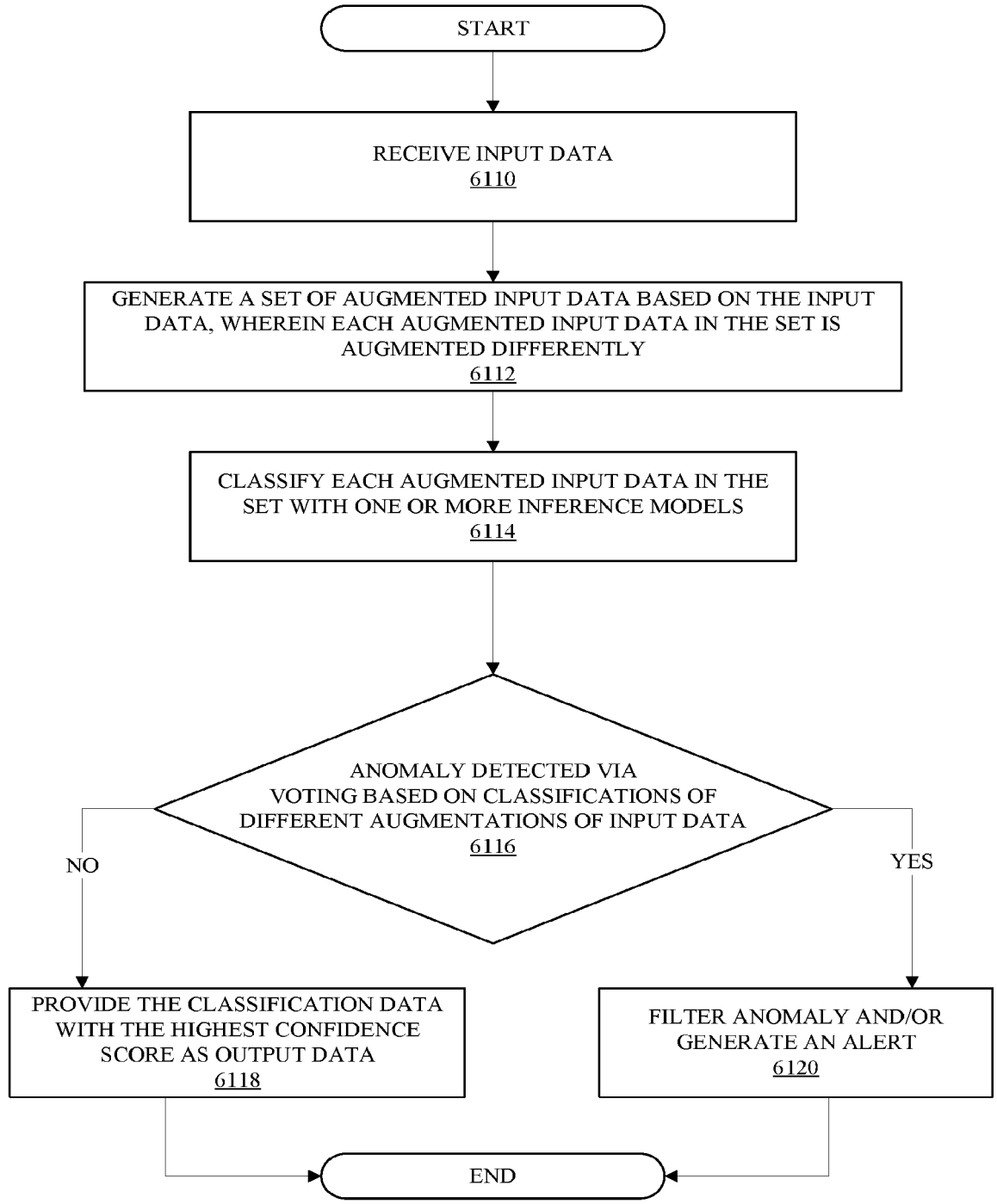
FIG. 61 illustrates an eighteenth example of a logic flow.

FIG. 61 illustrates a logic flow 6100. The logic flow 6100 may be representative of some or all the operations executed by one or more devices described herein. For example, hardened system 5801 (or components thereof) may perform the operations in logic flow 6100 to split and/or augment input data and use voting to detect anomalies and generate an alert and/or filter out adversaries.

Logic flow 6100 may begin at block 6110 "receive input data" where the hardened system 5801 may receive input data 5824. For example, input data 5824 may be received from input device 5852 via interface 5830. In some examples, the input data 5824 may be preprocessed prior to block 512. Proceeding to block 6112 "generate a set of augmented input data based on the input data, wherein each augmented input data in the set is augmented differently" a set of augmented input data is generated. In some examples, the set of augmented input data may include augmented data 5825-1, 5825-2, 5825-N. For example, the set of augmented input data may include results of various augmentations (e.g., a change of gamma, a pixel shift, a de-noising, an error correction, and the like).

Proceeding to block 6114 "classify each augmented input data in the set with one or more inference models" each of the various augmentations may be classified with one or more inference models. For instance, each augmented version of the input data may be classified by one or more of inference models 5822-1, 5822-2, 5822-n. Continuing to decision block 6116 "anomaly detected via voting based on classifications of different augmentations of input data?" voting based on classifications of different augmented input data may be used to detect anomalies. If the decision block 6116 evaluates to yes, the logic flow 6100 may process to block 6120 and if the decision block 6116 evaluates to no, the logic flow 6100 may process to block 6118.

At block 6118 "provide the classification data with the highest confidence score as output data" the classification with the highest confidence score may be provided as output data. In some examples, this may be determined based on voting additionally, or alternatively. Referring back to when block 6116 evaluates to yes, logic flow 6100 may continue to block 6120. At block 6120 "filter anomaly and/or generate an alert" an alert and/or a filter may be implemented in response to detections of the anomaly. For example, the alert may include generation of an exception. From block 6120, the logic flow 6100 can end, or can repeat based on receiving new inputs.

Activation Function for Encrypted Models

One issue with current inference systems is that activation of nodes in AI networks may be inefficient. Accordingly, the present disclosure provides an inference system that enables efficient activation without requiring computation to be done on the input data during inference time, leading to a data agnostic system. The data agnostic system may be used in conjunction with homomorphic encryption. In various examples, homomorphic encryption may include a form of encryption that allows computation on ciphertexts, generating an encrypted result, which, when decrypted, matches the result of the operations as if they had been performed on the plaintext. Typically, homomorphic encryption supports polynomial calculations. Hence, the common activations functions (e.g., ReLU, TanH, Sigmoid, Softmax) cannot be used as-is. Accordingly, approximations (e.g., Taylor series, Chebyshev) are typically used in homomorphically-encrypted networks, but they are less accurate and runtime-expensive.

In many examples, the inference system described herein (e.g., hardened system 6201) may require negligible overhead for model storage, while preserving accuracy (e.g., within +/−1% score change) as with general activation functions. An activation function may define the output of a node, or neuron, given an input or set of inputs. Oftentimes, this output is then used as input for the next node and so on until a solution is found. In several examples, the hardened system 6201 may run orders of magnitude faster than approximation-based activations. In various examples, the hardened system 6201 may apply the method post-hoc to already trained models. Further, the method may not require fine-tuning. Sometimes dedicated hardware may be included to improve efficiency.

Figure 62:
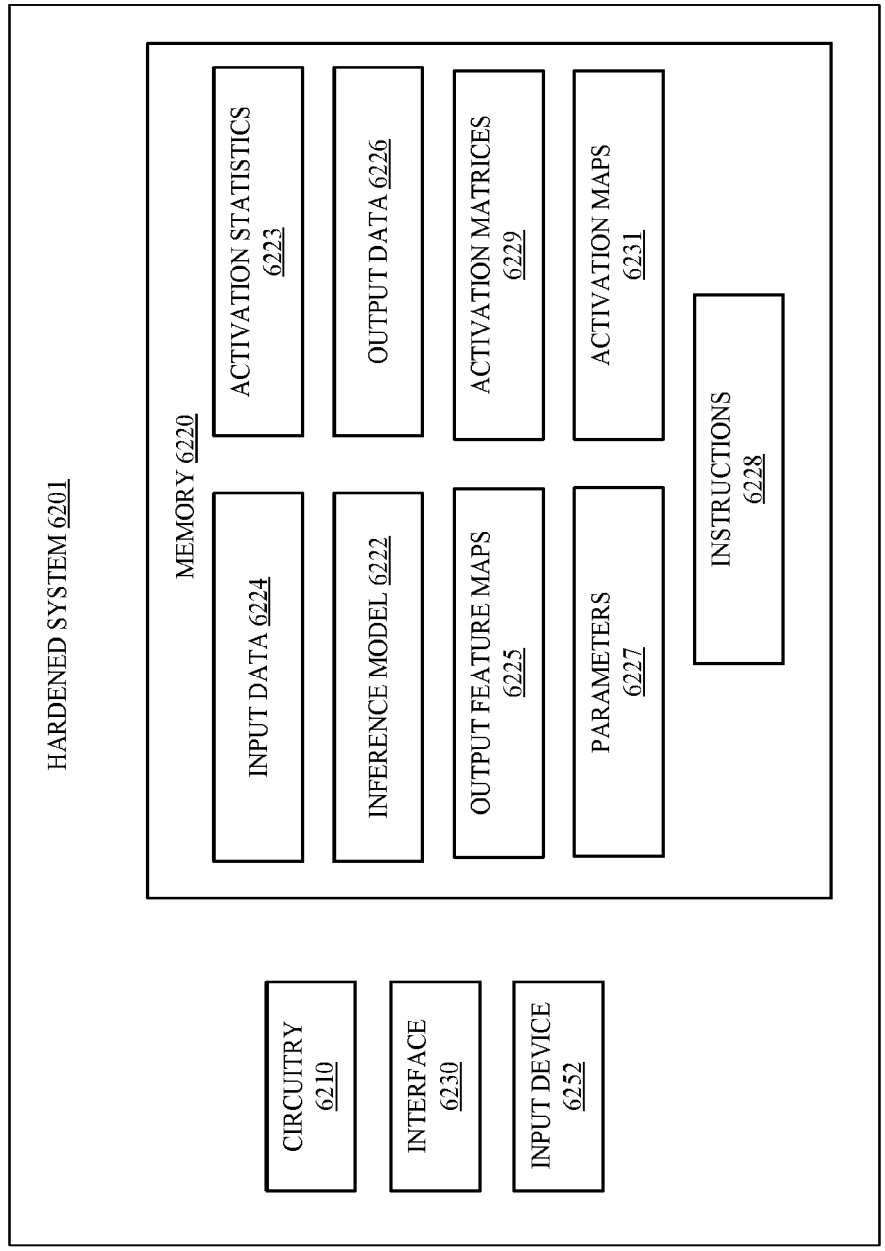
FIG. 62 illustrates an eighteenth example hardened system.

FIG. 62 illustrates an example hardened system 6201, which may be implemented according to the present disclosure. The hardened system 6201 includes circuitry 6210, memory 6220, interface 6230, and input device 6252. The memory 6220 stores input data 6224, inference model 6222, output feature maps 6225, parameters 6227, activation statistics 6223, output data 6226, activation matrices 6229, and instructions 6228. In many examples, input data 6224 may include a training data set. During operation, circuitry 6210 can execute instructions 6228 to implement a dedicated activation function for encrypted models relying on novel data agnostic activation.

As will be described in more detail below, circuitry 6210 can execute instructions 6228 to perform one or more of gathering activation statistics 6228, analyzing the activation statistics 6228, and processing at inference time. For example, first, circuitry 6210 can execute instructions 6228 to take inference model 6222 (e.g., a trained deep neural network (DNN) model) and the input data 6224 (e.g., a training dataset with samples) and initializing an empty activation matrix 6229 that corresponds with each output feature map 6225 for all the layers. Typically, each training sample in the input data 6224 may be forward-propagated while all the activations for all the layers are accumulated in the corresponding activation matrix 6229 to produce activation maps 6231. In various examples, activation statistics 6223 may include the completed activation matrices 6229 and/or activation maps.

Next, circuitry 6210 may execute instructions 6228 to analyze the activation statistics 6223. In some examples, the statistics may be analyzed based on one or more parameters 6227. Sometimes, the one or more parameters 6227 may be provided by a user. Oftentimes, the one or more parameters 6227 may include first, second, and third parameters. The first parameter may include a percent of which of the fired activations are to be fixed. The second parameter may include the total percent of neurons that should be fired. The third parameter may include the percentile of the total top activations to take the fixed first parameter indices from. For example, a user might select the first parameter as 50, the second parameter as 80, and the third parameter as 70. In such examples, this means that in overall, 80% of the neurons will be fired; 50% of them are randomized per run; and the remaining 50% are fixed in advance and randomly selected from the top 70% of activations. Circuitry 6210 may execute instructions 6228 to scan each activation map 6231 and the indices of the indices of random first parameter percent chosen from the top activated neurons (e.g., the most-activated feature maps' values) are saved.

For inference at runtime, circuitry 6210 may execute instructions 6228 to analyze the activation statistics 6223. The actual activation operation at inference time may be composed of passing all neurons that are in the corresponding saved locations map (e.g., activation maps 6231) for the processed layer. The remaining (second parameter–first parameter) activation percent may be fulfilled by randomly firing the required number of neurons. This method can enable efficient activations, yet no computation is done during inference time on the data itself (hence data agnostic). Further, negligible overhead may be needed for model storage, while accuracy is preserved, and it may run orders of magnitude faster than approximation-based activations. Also, this method may be applied post-hoc to already trained models and doesn't require fine tuning.

Figure 63:
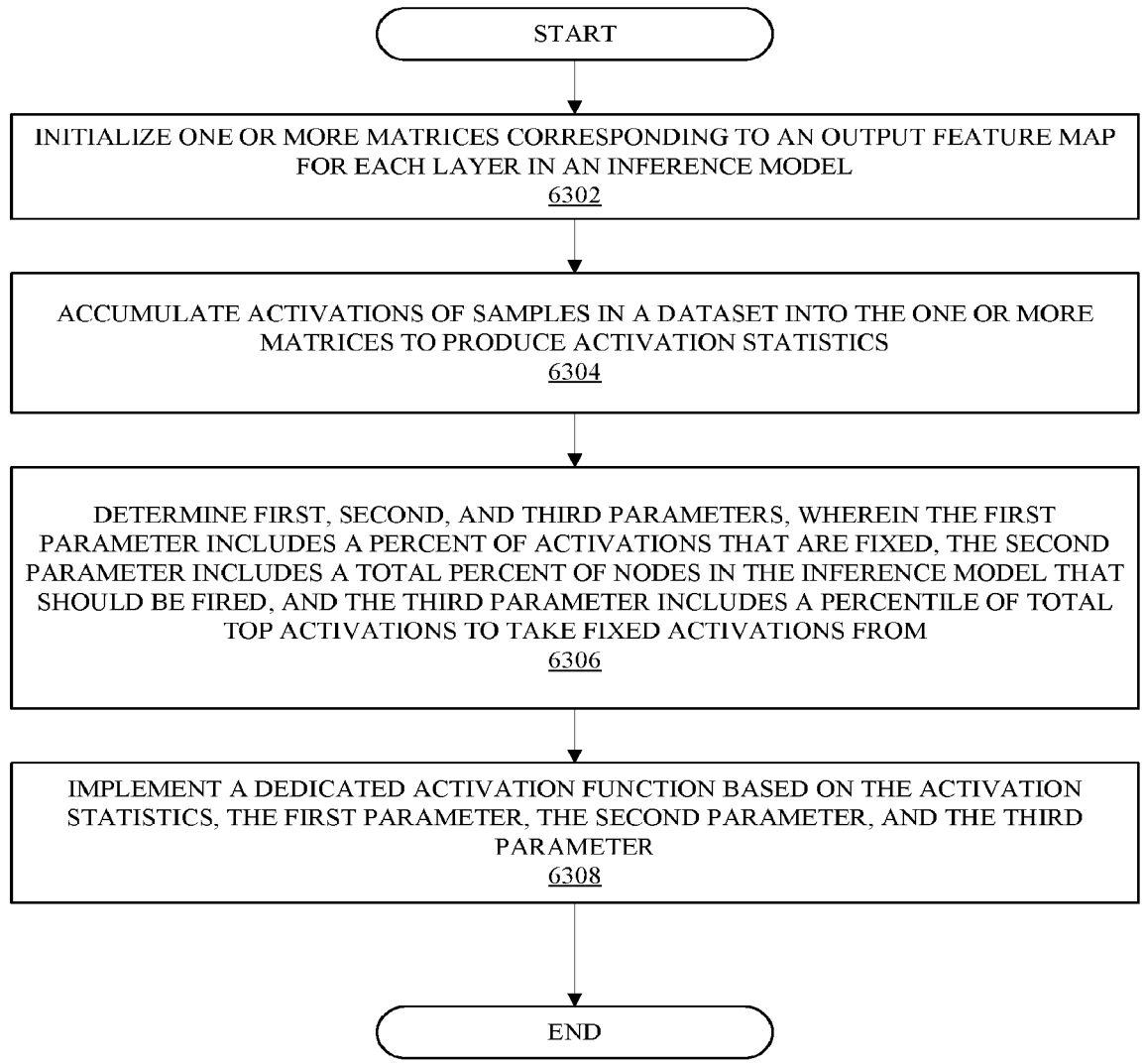
FIG. 63 illustrates a nineteenth example of a logic flow.

FIG. 63 illustrates a logic flow 6300. The logic flow 6300 may be representative of some or all the operations executed by one or more devices described herein. For example, hardened system 6201 (or components thereof) may perform the operations in logic flow 6300 for an efficient inference system.

Logic flow 6300 may begin at block 6302. At block 6302 "initialize one or more matrices corresponding to an output feature map for each layer in an inference model" one or more matrices corresponding to an output feature map for each layer in an inference model may be initialized. For example, one or more activation matrices 6229 that correspond to one or more output feature maps 6225 may be initialized.

Continuing to block 6304 "accumulate activations of samples in a dataset into the one or more matrices to produce activation statistics" activations of samples in a dataset may be accumulated into corresponding matrices to produce activation statistics. For instance, each activation of each sample may be accumulated into activation matrices 6229. In some examples, each sample may be forward-propagated while all of the activation maps for all the layers are saved.

At block 6306 "determine first, second, and third parameters, wherein the first parameter includes a percent of activations that are fixed, the second parameter includes a total percent of nodes in the inference model that should be fired, and the third parameter includes a percentile of total top activations to take fixed activations from" first, second, and third parameters may be determined. For instance, parameters 6227 may include the first, second, and third parameters. In various examples, the parameters 6227 may be determined based on user input.

Continuing to block 6308 "implement a dedicated activation function based on the activation statistics, the first parameter, the second parameter, and the third parameter" a dedicated activation function may be implemented based on the activation statistics, the first parameter, the second parameter, and the third parameter. For instance, a dedicated activation function may be implemented based on parameters 6227 and the activation statistics 6223. In such instances, the activation statistics 6223 may include activation matrices 6229 and/or activation maps 6231.

Figure 64:
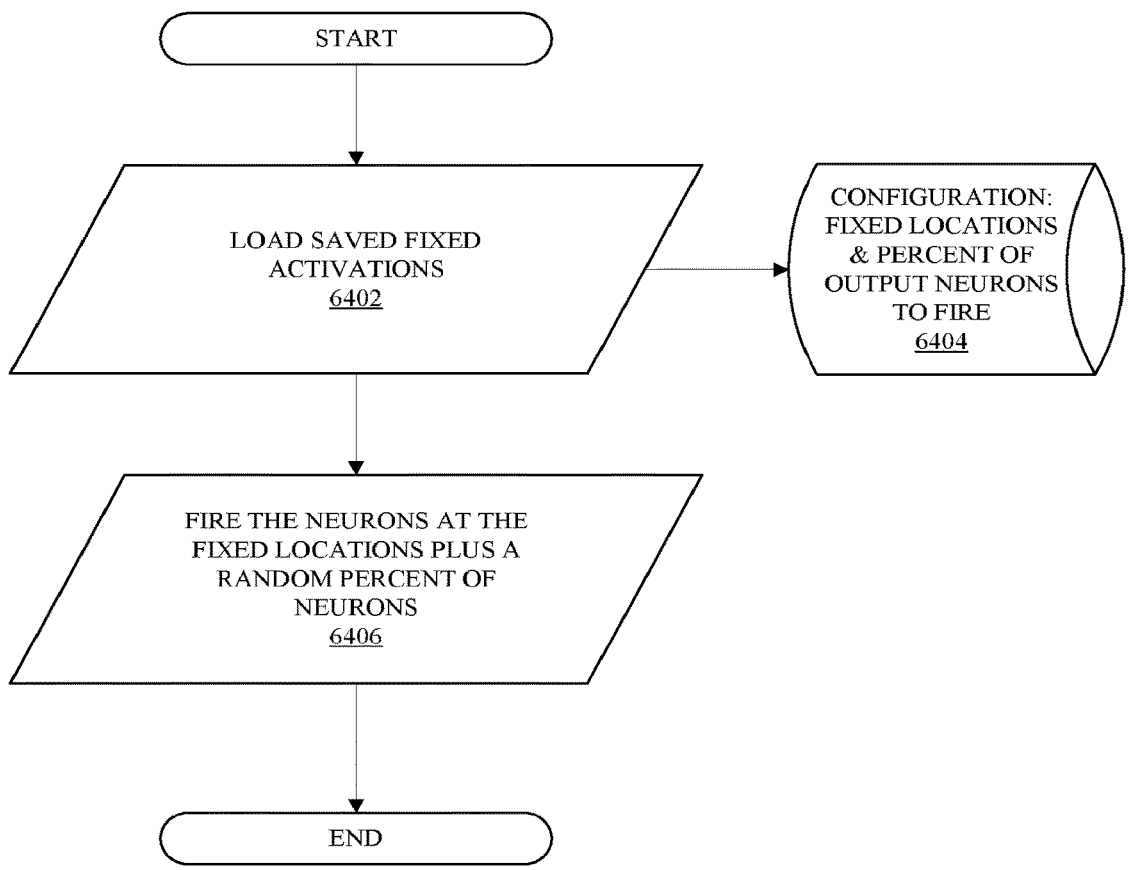
FIG. 64 illustrates a twentieth example of a logic flow.

FIG. 64 illustrates a logic flow 6400. The logic flow 6400 may be representative of some or all the operations executed by one or more devices described herein. For example, hardened system 401 (or components thereof) may perform the operations in logic flow 6400 for an efficient inference system.

Logic flow 6400 may begin at block 6402. At block 6402 "load saved fixed activations" fixed activations that are saved may be loaded. For example, fixed activations in one or more of activations matrices 6229 and activations maps 6231 may be loaded. Proceeding to block 6404, "configuration: fixed locations & percent of output neurons to fire" one or more configuration parameters including fixed locations and percent of output neurons to fire may be determined, implemented, and/or configured. For instance, instructions 6228 may determine/configure fixed locations and percent of output neurons based on one or more of input data 6224, inference model 6222, activation statistics 6223, output feature maps 6225, parameters 6227, output data 6226, and activation maps 6231.

Referring back to bock 6402, once the saved fixed activations are loaded, the logic flow 6400 may proceed to block 6406. At block 6406 "fire the neurons at the fixed locations plus a random percent of neurons" the neurons at the fixed locations and random percent of neurons, or a percent of random neurons. For example, the random percent of neurons may be determined based on one or more of parameter 6227. In some examples, one or more activation functions described herein may be used for neural networks encrypted with multi-party computation (e.g., MPC schemes and/or homomorphic encryption, or the like).

Multi-Party Execution for Model Protection

As provide herein, inference models can be executed in a distributed environment, such as, for example by cloud computing resources, by edge devices, or the like. Execution of portions of an inference system in such environments might introduce risks to data leakage. As a simple example, an inference system may be arranged to infer information with private components (e.g., health records, financial information, or the like). Adversarial parties may be able to infer this private information given the inputs and/or outputs from one or more "slices" of the inference model that are executing on the platforms in the distributed environment. Furthermore, portions of the model are often at risk for extraction when executed on cloud and/or edge devices.

The present disclosure provides using additional inference models (referred to as "adversarial models" or "adversaries") during training where the main inference model is trained based on feedback from the adversarial models. For example, an adversarial model may be generated to represent each distributed computing platform (e.g., each model slice, or the like). The adversaries have access to the inputs and outputs from the other adversaries. The adversarial models are coupled to slices of the inference model for training. During training, the inference model is trained by applying joint loss (e.g., general task specific loss, such as classification loss, or the like) and adversarial loss to guarantee that each component of the model is critical. That is, training guides the overall inference model (or the combination of all the slices) to a local minima based on joint loss of all the models. However, each slice is trained to minimize the adversarial loss. As such, the slices, when taken individually are guided to a less accurate local minima due to the adversarial loss training.

Accordingly, once trained, the model slices can be executed by different computing platforms in a distributed manner while reducing risks of data leakage or model extraction. That is, as a result of the multi-party adversarial training, each of the model slices may exhibit privacy and/or security features while maintaining inference accuracy. This is true even were the computing platforms executing the model slices have I/O access to each other. Said differently, adversarial training can be used to guide the model slices to cooperate as secret sharers, where the secret is the model function (e.g., inference model output to input mapping). That is, the secret is $f(x) \rightarrow y$, where x is the input sample and y is the result (e.g., classification, prediction, inference, generated output, etc.). Thus, each model slice is essential to ascertain the secret (e.g., $f(x) \rightarrow y$). However, each model slice when used alone is insufficient to ascertain the secret ($f(x) \rightarrow y$).

Figure 65:
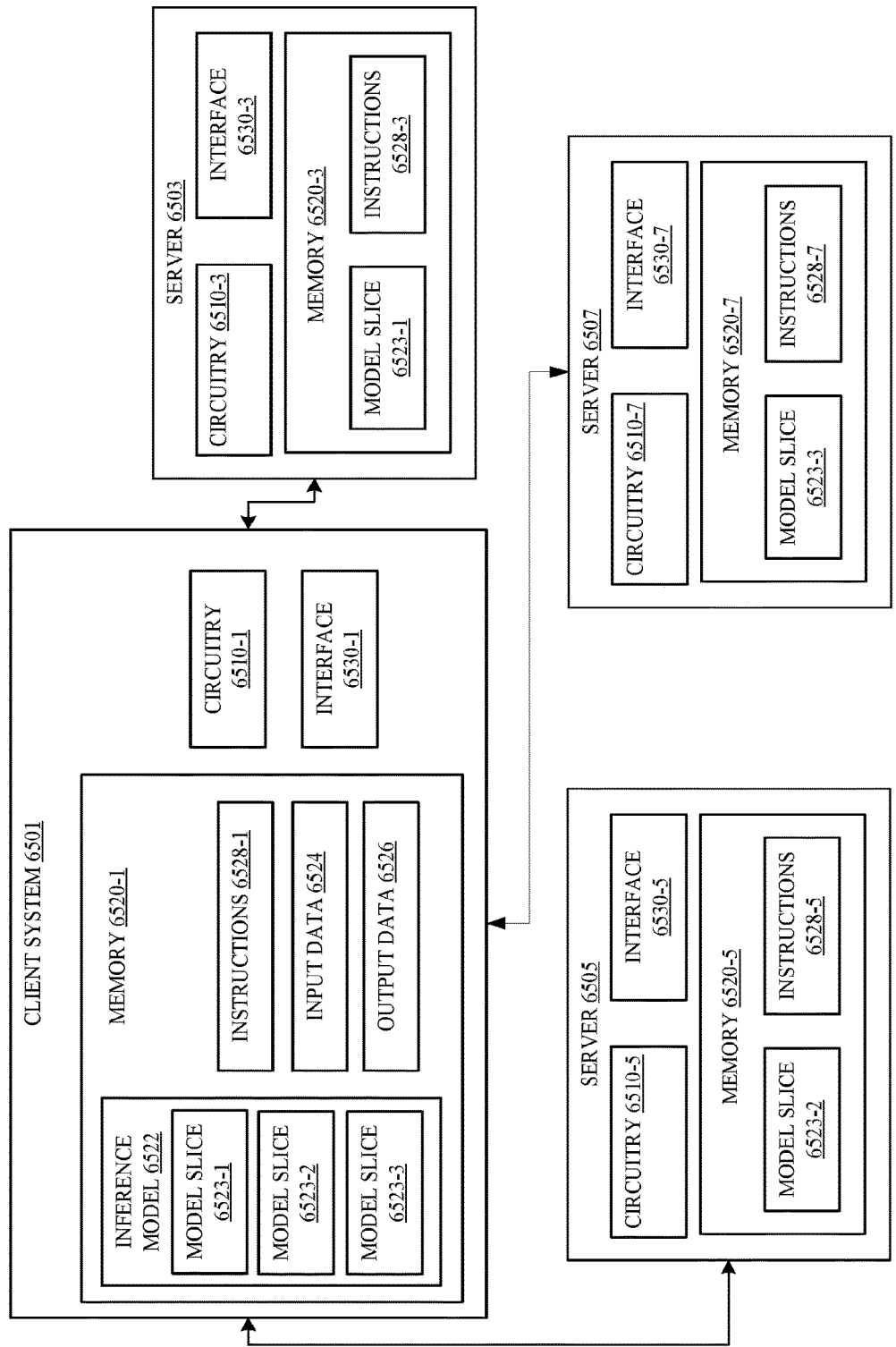
FIG. 65 illustrates a nineteenth example hardened system.

FIG. 65 illustrates an example inference environment 6500 including client device 6501, and servers 6503, 6505 and 6507. In general, servers 6503, 6505 and 6507 are arranged to execute a portion of an inference model in a distributed manner. Servers 6503, 6505 and 6507 can be cloud based (or accessible) computing resources, edge devices, specifically arranged inference model execution accelerators, or the like. Furthermore, although three servers 6503, 6505 and 6507 are depicted in this figure, it is to be appreciated that any number (1, 2, 3, 4, or greater) of servers could be provided in inference environment 6500. As noted, servers 6503, 6505 and 6507 of inference environment 6500 could be edge devices. With some examples, inference environment 6500 could be a multi-edge environment, where client device 6501 utilizes idle computational power in the "edge" (e.g., edge devices 6503, 6505, or the like) to execute model slices.

Client device 6501 and servers 6503, 6505 and 6507 can be coupled via a network (e.g., which can include the Internet, or the like). More specifically, interfaces 6530-1, 6530-3, 6530-5 and 6530-7 can be coupled to the network to facilitate communication or exchange of data between devices.

Client device 6501 includes circuitry 6510-1, memory 6520-1 and interface 6530-1. Memory 6520-1 stores inference model 6522, input data 6524, output data 6526. Inference model 6522 includes model slices 6523. In general, client device 6501 operates to coordinate and provide for distributed execution of inference model 6522.

Server 6503 includes circuitry 6510-3, memory 6520-3 and interface 6530-3. Memory 6520-3 stores model slice 6522-1 and instructions 6528-3. Likewise, server 6505 includes circuitry 6510-5, memory 6520-5 and interface 6530-5. Memory 6520-5 stores model slice 6522-2 and instructions 6528-5. Additionally, server 6507 includes circuitry 6510-7, memory 6520-7 and interface 6530-7. Memory 6520-7 stores model slice 6522-3 and instructions 6528-7. In general, servers 6503, 6505 and 6507 provide execution environments for portions of inference model 6522 (e.g. model slices 6523-1, 6523-2, and 6523-3, or the like).

In general, servers 6503, 6505, and 6507 can each execute one of model slices 6523 in a distributed fashion. For example, circuitry 6510-3 can execute instructions 6528-3 to execute model slices 6523-1, circuitry 6510-5 can execute instructions 6528-5 to execute model slices 6523-2, and circuitry 6510-7 can execute instructions 6528-7 to execute model slices 6523-3.

As noted above, the present disclosure provides that the model slices can be trained with adversarial models, which replace each party in the distributed system.

Figure 66:
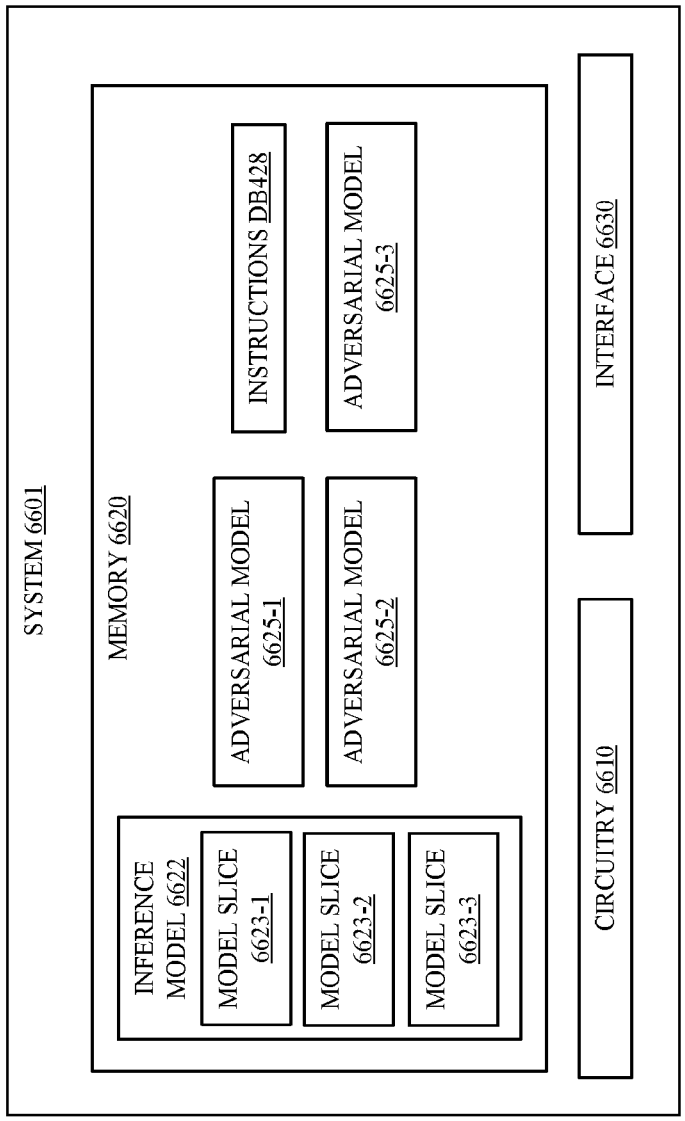
FIG. 66 illustrates a twentieth example of a hardened system.

FIG. 66 illustrates a system 6601 that can be implemented to train a partitioned inference model for secure execution in a distributed environment as described above. System 6601 includes circuitry 6610, memory 6620, and interface 6630. The memory 6620 stores inference model 6622 that is split into multiple parts, or model slices 6623. For example, inference model 6622 is depicted including model slices 6623-1, 6623-2 and 6623-3. In general, an inference model can be split into as many portions (or slices) as distributed computing platforms. For example, the inference environment 6500 of FIG. 65 depicts three (3) computing platforms (or parties) that can execute model portions, specifically, servers 6503, 6505, and 6507. Memory 6620 also includes an adversarial model 6625 for each model slice 6623. For example, this figure depicts adversarial models 6625-1, 6625-2 and 6625-3.

Circuitry 6610 can execute instructions 6628 to train model slices 6623 using adversarial models and substitutional sub-models (see FIGS. 67 and 68) using an adversarial training technique.

Figure 67:
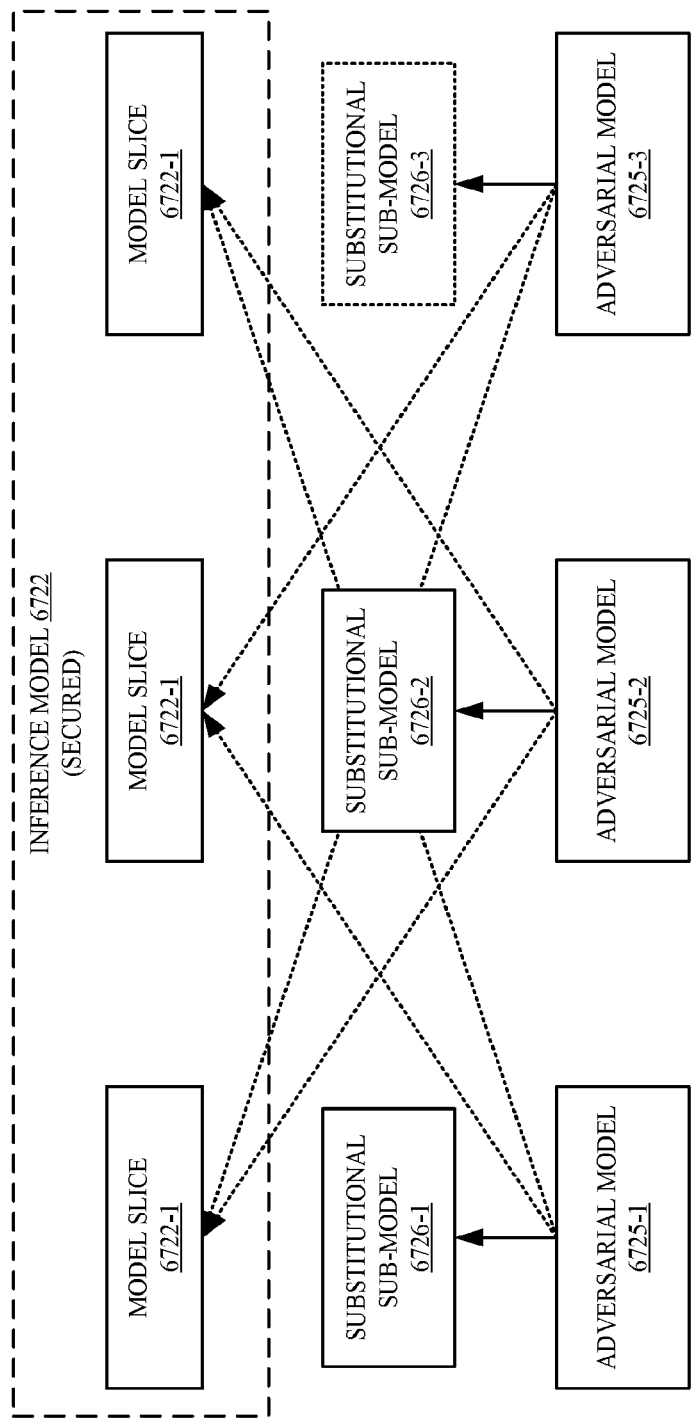
FIG. 67 illustrates a twenty-first example of a logic flow.

FIG. 67 illustrates an example inference model 6722 split into model slices 6723-1, 6723-2 and 6723-3, coupled to adversarial models 6725 and substitutional sub-models 6726, arranged for adversarial training. In general, this figure depicts an implementation where there is a 1:1 correspondence between adversarial models and model slices. As stated, training operates to guide model slices 6723 to, individually, reach an inaccurate or less accurate local minimum when executed with the corresponding substitutional sub-model 6726. During training, an adversarial model 6725 has read access to other model slices 6723 not corresponding to the adversarial model 6725 and read and write access to the substitutional sub-model 6726 corresponding to the adversarial model 6725. For example, adversarial model 6725-1 have read access to model slices 6723-2 and 6723-3 and read and write access to substitutional sub-model 6725-1.

Figure 68A:
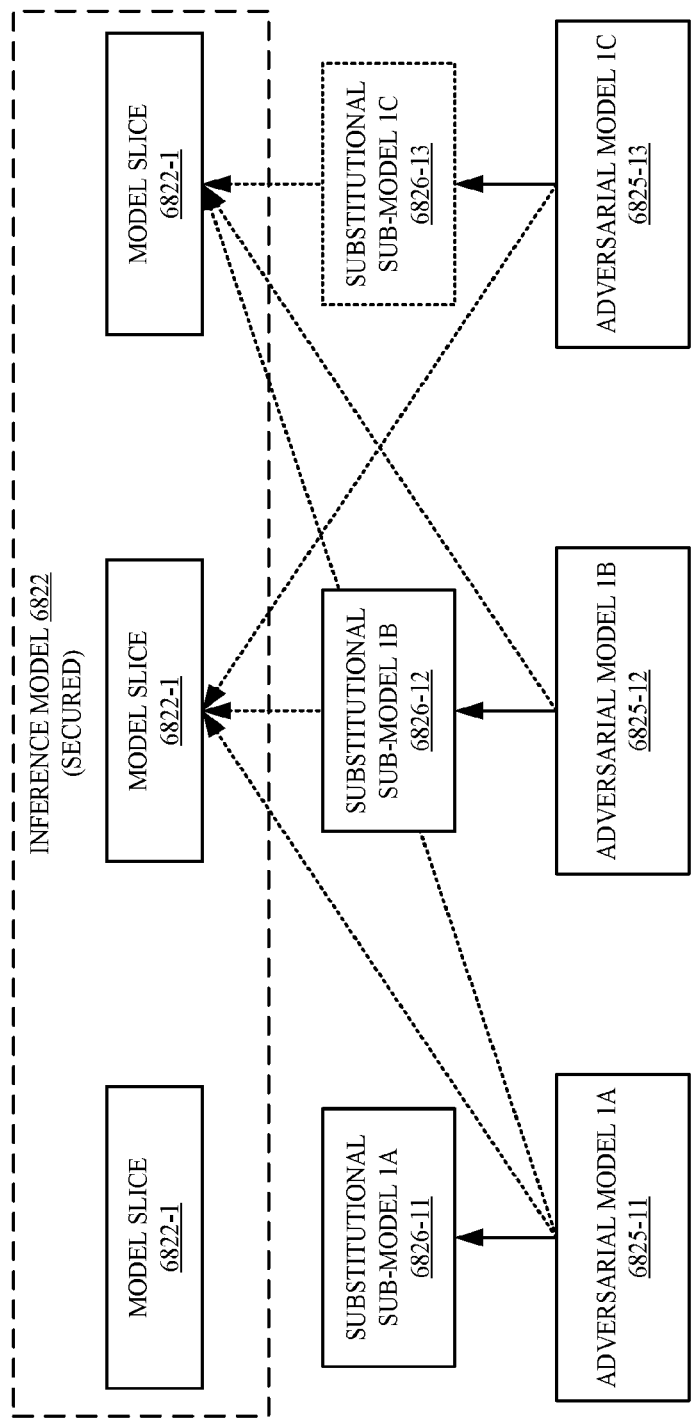
FIG. 68A illustrates a second example adversarial model training connection.
Figure 68B:
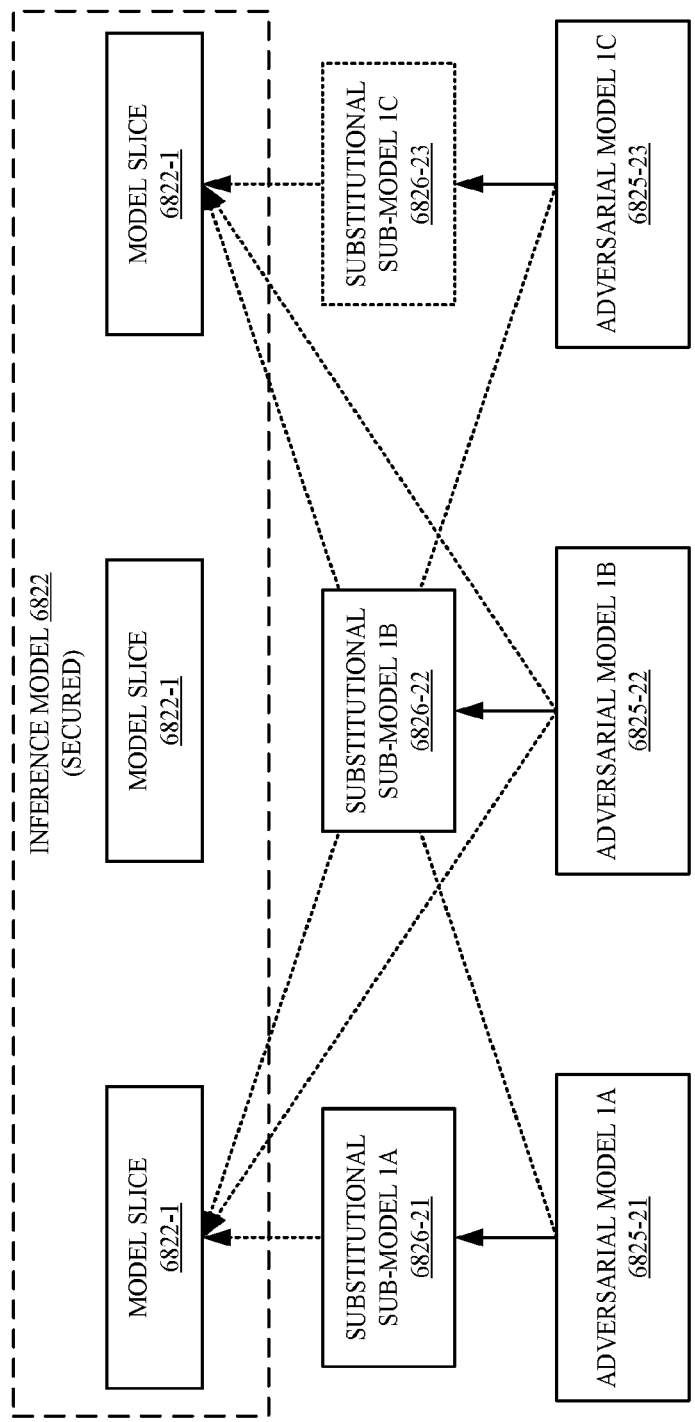
FIG. 68B illustrates a third example adversarial model training connection.
Figure 68C:
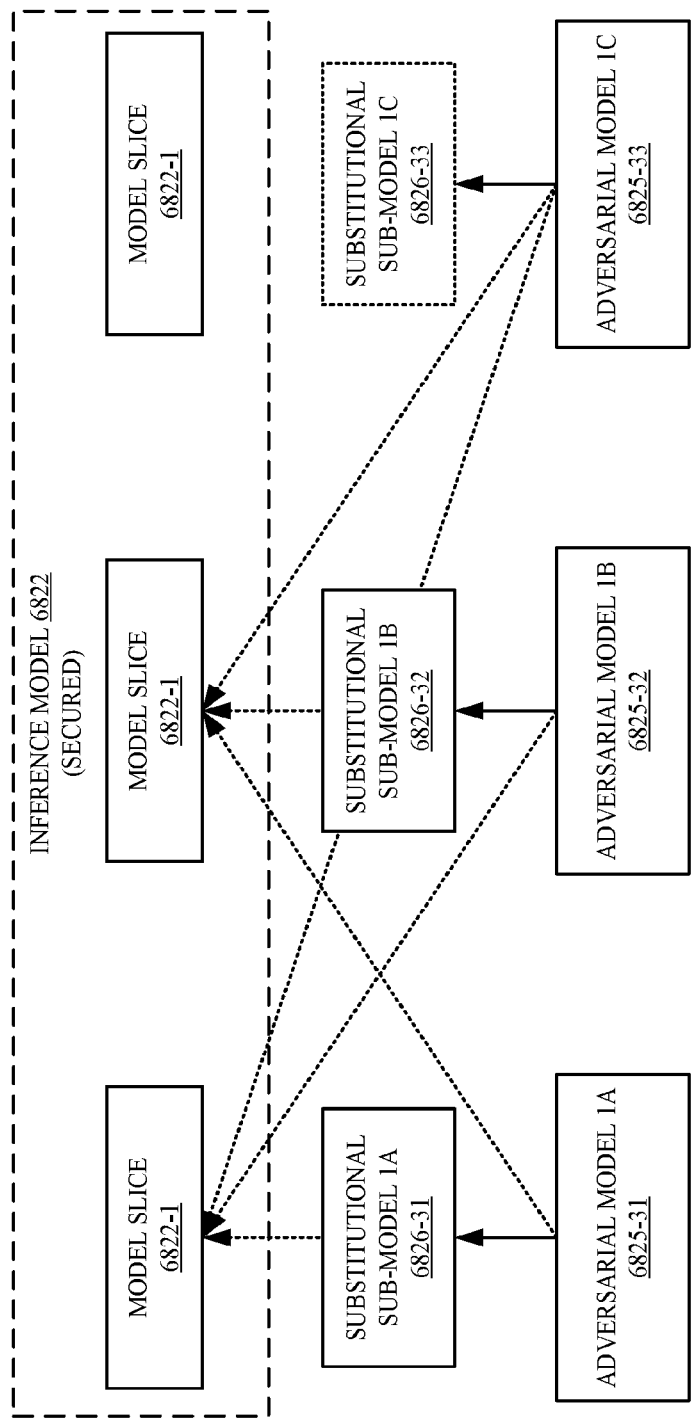
FIG. 68C illustrates a fourth example adversarial model training connection.

FIGS. 68A, 68B, and 68C illustrate an example inference model 6822 split into model slices 6823-1, 6823-2 and 6823-3, coupled to adversarial models 6825 and substitutional sub-models 6826, arranged for adversarial training. In general, this figure depicts an implementation where there is a N:1 correspondence between adversarial models and model slices. Said differently, this figure depicts multiple adversarial models coupled to a single mode slice for adversarial training.

Turning more particularly to FIG. 68A, adversarial models 6825-11, 6825-12 and 6825-13 along with corresponding substitutional sub-models 6826-11, 6826-12, and 6826-13 are depicted. Adversarial models 6825-11, 6825-12 and 6825-13 as well as substitutional sub-models 6826-11, 6826-12, and 6826-13 are connected with read access to model slices 6823-2 and 6823-3 to provide adversarial training to model slice 6823-1. Likewise, FIG. 68B depicts adversarial models 6825-21, 6825-22 and 6825-23 along with corresponding substitutional sub-models 6826-21, 6826-22, and 6826-23. Adversarial models 6825-21, 6825-22 and 6825-23 as well as substitutional sub-models 6826-21, 6826-22, and 6826-23 are connected with read access to model slices 6823-1 and 6823-3 to provide adversarial training to model slice 6823-2. Lastly, FIG. 68C depicts adversarial models 6825-31, 6825-32 and 6825-33 along with corresponding substitutional sub-models 6826-31, 6826-32, and 6826-33. Adversarial models 6825-31, 6825-32 and 6825-33 as well as substitutional sub-models 6826-31, 6826-32, and 6826-33 are connected with read access to model slices 6823-1 and 6823-2 to provide adversarial training to model slice 6823-3.

Example Physical Embodiments

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Figure 69:
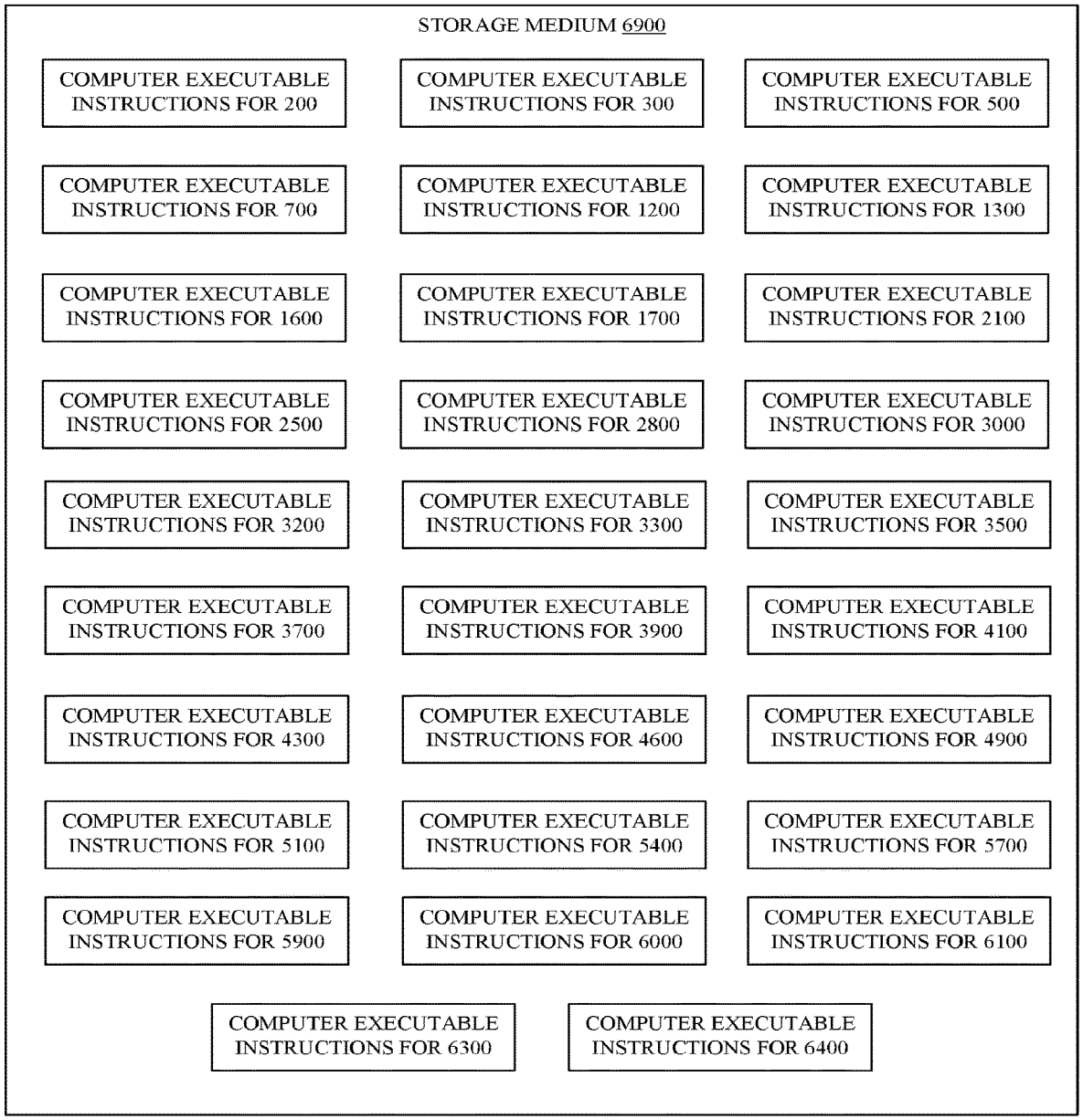
FIG. 69 illustrates an example computer-readable medium.

FIG. 69 illustrates a storage medium 6900. Storage medium 6900 may comprise any non-transitory computer-readable storage medium or machine-readable storage medium, such as an optical, magnetic or semiconductor storage medium. In various embodiments, storage medium 6900 may comprise an article of manufacture. In some embodiments, storage medium 6900 may store computer-executable instructions, such as computer-executable instructions to implement one or more of techniques, logic flows or operations described herein, such as with respect to 200, 300, 500, 700, 1200, 1300, 1600, 1700, 2100, 2500, 2800, 3000, 3200, 3300, 3500, 3700, 3900, 4100, 4300, 4600, 4900, 5100, 5400, 5700, 5900, 6000, 6100, 6300, or 6400.

Additionally, storage medium 6900 may store data structures representative of input data, output data, inference models, testing/training data sets, or the like. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

A hardened system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions which, when executed by a processing system, perform a desired operation or operations.

Logic circuitry, devices, and interfaces herein described may perform functions implemented in hardware and implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chip set, memory, or the like. Integrated circuits include circuits created on a substrate such as a silicon wafer and may comprise components. And integrated circuits, processor packages, chip packages, and chipsets may comprise one or more processors.

Processors may receive signals such as instructions and/or data at the input(s) and process the signals to generate the at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

Figure 70:
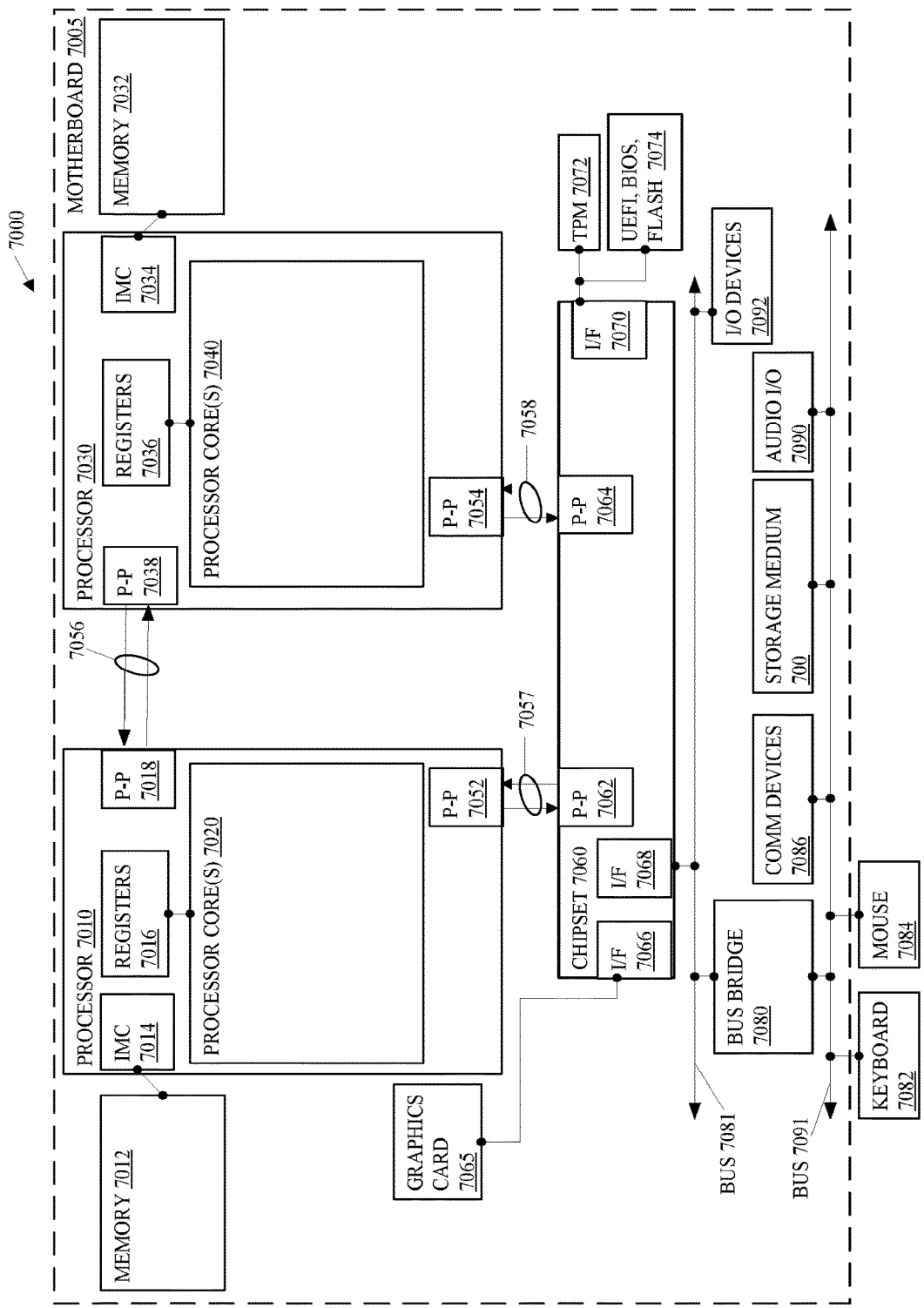
FIG. 70 illustrates an example computing system.

FIG. 70 illustrates a system 7000. The system 7000 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 7000 may have a single processor with one core or more than one processor. Note that the term "processor" refers to a processor with a single core or a processor package with multiple processor cores. In at least one embodiment, the computing system 7000 is representative of the hardened system, client devices, servers, edge devices, or other computing devices described herein. More generally, the computing system 7000 is configured to implement all logic, systems, logic flows, methods, apparatuses, and functionality described herein with reference to FIGS. 1 to 69.

As used in this application, the terms "system" and "component" and "module" are intended to refer to a computer-related entity, either hardware, a combination of hardware and software, software, or software in execution, examples of which are provided by the exemplary system 7000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 7000 comprises a motherboard 7005 for mounting platform components. The motherboard 7005 is a point-to-point interconnect platform that includes a first processor 7010 and a second processor 7030 coupled via a point-to-point interconnect 7056 such as an Ultra Path Interconnect (UPI), Infinity Fabric (IF), or the like. In other embodiments, the system 7000 may be of another bus architecture, such as a multi-drop bus. Furthermore, each of processors 7010 and 7030 may be processor packages with multiple processor cores including processor core(s) 7020 and 7040, respectively. While the system 7000 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processors 7010 and the chipset 7060. Some platforms may include additional components and some platforms may include sockets to mount the processors and/or the chipset.

The processors 7010, 7020 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi processor architectures may also be employed as the processors 7010, 7020. In general, processors 7010 and/or 7020 can correspond to any of the circuitry discussed herein, such as, for example, circuitry depicted and described with respect to FIGS. 1 to 68.

The first processor 7010 includes an integrated memory controller (IMC) 7014 and point-to-point (P-P) interfaces 7018 and 7052. Similarly, the second processor 7030 includes an IMC 7034 and P-P interfaces 7038 and 7054. The IMC's 7014 and 7034 couple the processors 7010 and 7030, respectively, to respective memories, a memory 7012 and a memory 7032. In general, processors 7010 and/or 7020 can correspond to any of the memories discussed herein, such as, for example, memory depicted and described with respect to FIGS. 1 to 68. The memories 7012 and 7032 may be portions of the main memory (e.g., a dynamic random-access memory (DRAM)) for the platform such as double data rate type 3 (DDR3) or type 4 (DDR4) synchronous DRAM (SDRAM). In the present embodiment, the memories 7012 and 7032 locally attach to the respective processors 7010 and 7030. In other embodiments, the main memory may couple with the processors via a bus and shared memory hub.

The processors 7010 and 7030 comprise caches coupled with each of the processor core(s) 7020 and 7040, respectively. In the present embodiment, the processor core(s) 7020 of the processor 7010 and the processor core(s) 7040 of processor 7030 include the circuitry described above (e.g., circuitry N10 described with reference to FIGS. 1 to 69). That is, the functionality may also reside in whole or in part as circuitry within the processor 7010 and may perform operations, e.g., within registers or buffers such as the registers 7016 within the processors 7010, 7030, or within an instruction pipeline of the processors 7010, 7030.

Processor core(s) 7020 and 7040 may represent a combination of the circuitry within a processor and a medium to store all or part of the functionality of the circuitry, logic, or techniques described above in memory such as cache, the memory 7012, buffers, registers, and/or the like. In several embodiments, the functionality of resides in whole or in part as code in a memory such as the storage medium 700 attached to the processors 7010, 7030 via a chipset 7060. Additionally, the functionality may also reside in whole or in part in memory such as the memory 7012 and/or 7032 (e.g., memory N20 described with reference to FIGS. 1 to 69).

As stated, more than one of the processors 7010 and 7030 may comprise the described functionality in hardware (e.g., an accelerator, or the like) coupled with the chipset 7060 via an interface (I/F) 7066. The I/F 7066 may be, for example, a Peripheral Component Interconnect-enhanced (PCI-e).

The first processor 7010 couples to a chipset 7060 via P-P interconnects 7052 and 7062 and the second processor 7030 couples to a chipset 7060 via P-P interconnects 7054 and 7064. Direct Media Interfaces (DMIs) 7057 and 7058 may couple the P-P interconnects 7052 and 7062 and the P-P interconnects 7054 and 7064, respectively. The DMI may be a high-speed interconnect that facilitates, e.g., eight Giga Transfers per second (GT/s) such as DMI 3.0. In other embodiments, the processors 7010 and 7030 may interconnect via a bus.

The chipset 7060 may comprise a controller hub such as a platform controller hub (PCH). The chipset 7060 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 8060 may comprise more than one controller hub such as a chipset with a memory controller hub, a graphics controller hub, and an input/output (I/O) controller hub.

In the present embodiment, the chipset 7060 couples with a trusted platform module (TPM) 7072 and the UEFI, BIOS, Flash component 7074 via an interface (I/F) 7070. The TPM 7072 is a dedicated microcontroller designed to secure hardware by integrating cryptographic keys into devices. The UEFI, BIOS, Flash component 7074 may provide pre-boot code.

Furthermore, chipset 7060 includes an I/F 7066 to couple chipset 7060 with a high-performance graphics engine, graphics card 7065. In other embodiments, the system 7000 may include a flexible display interface (FDI) between the processors 7010 and 7030 and the chipset 7060. The FDI interconnects a graphics processor core in a processor with the chipset 7060.

Various I/O devices 7092 couple to the bus 7081, along with a bus bridge 7080 which couples the bus 7081 to a second bus 7091 and an I/F 7068 that connects the bus 7081 with the chipset 7060. In one embodiment, the second bus 7091 may be a low pin count (LPC) bus. Various devices may couple to the second bus 7091 including, for example, a keyboard 7082, a mouse 7084, communication devices 7086 and the storage medium 6900 that may store computer executable code as previously described herein. Furthermore, an audio I/O 7090 may couple to second bus 7091. Many of the I/O devices 7092, communication devices 7086, and the storage medium 6900 may reside on the motherboard 7005 while the keyboard 7082 and the mouse 7084 may be add-on peripherals. In other embodiments, some or all the I/O devices 7092, communication devices 7086, and the storage medium 6900 are add-on peripherals and do not reside on the motherboard 7005. In general, audio devices 7090 and/or I/O devices 7092 can correspond to any of the input and/or output devices discussed herein, such as, for example, input devices, output devices (or the like) depicted and described with respect to FIGS. 1 to 68.

Figure 71:
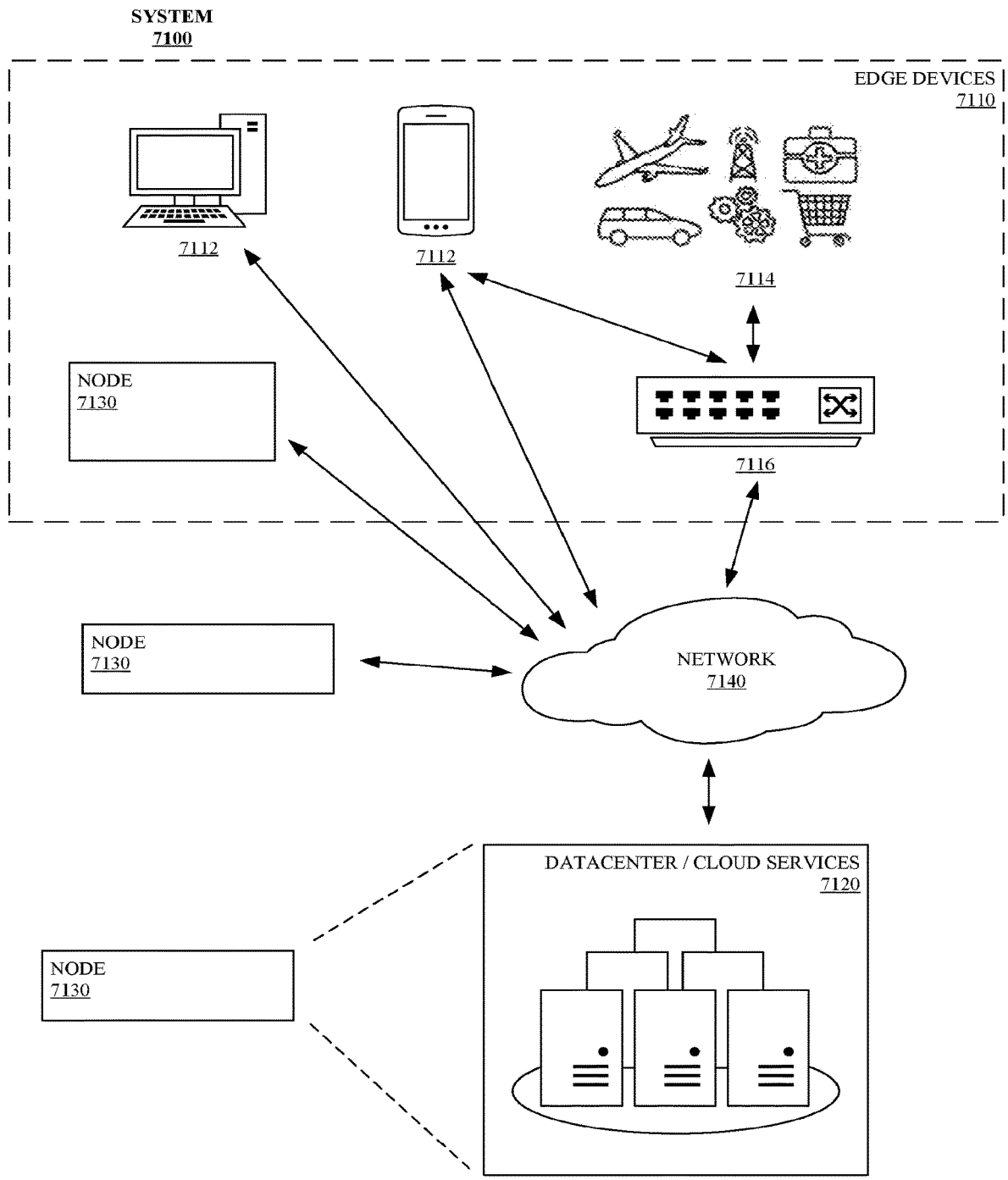
FIG. 71 illustrates a first example system.

FIG. 71 illustrates a system 7100. The system 7100 is a computer system that can be implemented to process various workloads as described herein, such as, for example, train inference models, generate output from inference models, or the like. The processing resources of this figure may be used by any of the hardened systems, inference environments, or the like described above. The system 7100 includes edge devices 7110, datacenter or cloud services 7120, nodes 7130, and network 7140.

Nodes 7130 may include any component or device of system 7100 with processing resources and/or input resources. These components can include features like those described above (e.g., system 100, system 7000, or the like). For example, nodes 7130 may include datacenters and/or cloud services 7120 implemented with processing resources arranged to process inference model workloads (e.g., machine learning accelerators in a datacenter, edge devices 7110 implemented with processing resources (e.g., end-user devices 7112, Internet-of-Things (IoT) devices 7114, gateways 7116), and so forth. As another example, nodes 7130 may include edge devices 7110 implemented with components (e.g., cameras, sensors, or the like) arranged to generate input for inference models. These various components of system 7100 are discussed further below.

Edge devices 7110 may include any equipment and/or devices deployed or connected near the "edge" of a communication system (e.g., system 7100, network 7140, or the like). Edge devices 7110 may communicate with each other and/or with other remote networks and services (e.g., datacenter and/or cloud services 7120) through one or more networks and/or communication protocols, such as network 7140. In some embodiments, certain edge devices 7110 may include the processing resources described throughout this disclosure, and thus may be used as nodes 7130. In the illustrated embodiment, edge devices 7110 include end-user devices 7112 (e.g., desktops, laptops, mobile devices), IoT devices 7114, and gateways, routers, switches, and/or hubs 7116, among other devices.

End-user devices 7112 may include any device that enables or facilitates user interaction with computing system 7100, including, for example, desktop computers, laptops, tablets, mobile phones and other mobile devices, and wearable devices (e.g., smart watches, smart glasses, headsets), among other examples.

IoT devices 7114 may include any device capable of communicating and/or participating in an IoT system or network. IoT systems may refer to new or improved ad-hoc systems and networks composed of multiple different devices (e.g., IoT devices 7114) interoperating for a particular application or use case. Such ad-hoc systems are emerging as more and more products and equipment evolve to become "smart," meaning they are controlled or monitored by computer processors and are capable of communicating with other devices. For example, an IoT device 7114 may include a computer processor and/or communication interface to allow interoperation with other components of system 7100, such as with datacenter and/or cloud services 7120 and/or other edge devices 7110. IoT devices 7114 may be "greenfield" devices that are developed with IoT capabilities from the ground-up, or "brownfield" devices that are created by integrating IoT capabilities into existing legacy devices that were initially developed without IoT capabilities. For example, in some cases, IoT devices 7114 may be built from sensors and communication modules integrated in or attached to "things," such as equipment, toys, tools, vehicles, living things (e.g., plants, animals, humans), and so forth. Alternatively, or additionally, certain IoT devices 7114 may rely on intermediary components, such as edge gateways or routers 7116, to communicate with the various components of system 7100.

IoT devices 7114 may include various types of sensors for monitoring, detecting, measuring, and generating sensor data and signals associated with characteristics of their environment. For instance, a given sensor may be configured to detect one or more respective characteristics, such as movement, weight, physical contact, temperature, wind, noise, light, position, humidity, radiation, liquid, specific chemical compounds, battery life, wireless signals, computer communications, and bandwidth, among other examples. Sensors can include physical sensors (e.g., physical monitoring components) and virtual sensors (e.g., software-based monitoring components). IoT devices 7114 may also include actuators to perform various actions in their respective environments. For example, an actuator may be used to selectively activate certain functionality, such as toggling the power or operation of a security system (e.g., alarm, camera, locks) or household appliance (e.g., audio system, lighting, HVAC appliances, garage doors), among other examples.

Indeed, this disclosure contemplates use of a potentially limitless universe of IoT devices 7114 and associated sensors/actuators. IoT devices 7114 may include, for example, any type of equipment and/or devices associated with any type of system 7100 and/or industry, including transportation (e.g., automobile, airlines), industrial manufacturing, energy (e.g., power plants), telecommunications (e.g., Internet, cellular, and television service providers), medical (e.g., healthcare, pharmaceutical), food processing, and/or retail industries, among others. In the transportation industry, for example, IoT devices 7114 may include equipment and devices associated with aircrafts, automobiles, or vessels, such as navigation systems, autonomous flight or driving systems, traffic sensors and controllers, and/or any internal mechanical or electrical components that are monitored by sensors (e.g., engines). IoT devices 7114 may also include equipment, devices, and/or infrastructure associated with industrial manufacturing and production, shipping (e.g., cargo tracking), communications networks (e.g., gateways, routers, servers, cellular towers), server farms, electrical power plants, wind farms, oil and gas pipelines, water treatment and distribution, wastewater collection and treatment, and weather monitoring (e.g., temperature, wind, and humidity sensors), among other examples. IoT devices 7114 may also include, for example, any type of "smart" device or system, such as smart entertainment systems (e.g., televisions, audio systems, videogame systems), smart household or office appliances (e.g., heat-ventilation-air-conditioning (HVAC) appliances, refrigerators, washers and dryers, coffee brewers), power control systems (e.g., automatic electricity, light, and HVAC controls), security systems (e.g., alarms, locks, cameras, motion detectors, fingerprint scanners, facial recognition systems), and other home automation systems, among other examples. IoT devices 7114 can be statically located, such as mounted on a building, wall, floor, ground, lamppost, sign, water tower, or any other fixed or static structure. IoT devices 7114 can also be mobile, such as devices in vehicles or aircrafts, drones, packages (e.g., for tracking cargo), mobile devices, and wearable devices, among other examples. Moreover, an IoT device 7114 can also be any type of edge device 7110, including end-user devices 7112 and edge gateways and routers 7116.

Edge gateways and/or routers 7116 may be provisioned as nodes 7130. Additionally, edge gateways and/or routers 7116 may be used to facilitate communication to and from edge devices 7110. For example, gateways 7116 may provide communication capabilities to existing legacy devices that were initially developed without any such capabilities (e.g., "brownfield" IoT devices). Gateways 7116 can also be utilized to extend the geographical reach of edge devices 7110 with short-range, proprietary, or otherwise limited communication capabilities, such as IoT devices 7114 with Bluetooth or ZigBee communication capabilities. For example, gateways 7116 can serve as intermediaries between IoT devices 7114 and remote networks or services, by providing a front-haul to the IoT devices 7114 using their native communication capabilities (e.g., Bluetooth, ZigBee), and providing a back-haul to other networks 7140 and/or datacenter and/or cloud services 7120 using another wired or wireless communication medium (e.g., Ethernet, Wi-Fi, cellular). In some embodiments, a gateway 7116 may be implemented by a dedicated gateway device, or by a general purpose device, such as another IoT device 7114, end-user device 7112, or other type of edge device 7110.

In some instances, gateways 7116 may also implement certain network management and/or application functionality (e.g., IoT management and/or IoT application functionality for IoT devices 7114), either separately or in conjunction with other components, such as datacenter and/or cloud services 7120 and/or other edge devices 7110. For example, in some embodiments, configuration parameters and/or application logic may be pushed or pulled to or from a gateway device 7116, allowing IoT devices 7114 (or other edge devices 7110) within range or proximity of the gateway 7116 to be configured for a particular IoT application or use case.

Datacenter and/or cloud services 120 may include services that are hosted remotely (e.g., at a datacenter, a number of datacenters, or the like) over a network 7140, or in the "cloud." In some embodiments, for example, datacenter and/or cloud services 7120 may be remotely hosted on servers in datacenter (e.g., application servers, database servers, servers with accelerators, or the like). Datacenter and/or cloud services 7120 may include any services that can be utilized by or for edge devices 7110, including but not limited to, data storage, computational services (e.g., data analytics, searching, diagnostics and fault management), security services (e.g., surveillance, alarms, user authentication), mapping and navigation, geolocation services, network or infrastructure management, IoT application and management services, payment processing, audio and video streaming, messaging, social networking, news, and weather, among other examples. In some embodiments, certain datacenter and/or cloud services 7120 may include the matrix processing functionality described throughout this disclosure, and thus may be used as nodes 7130.

Network 7140 may be used to facilitate communication between the components of computing system 7100. For example, edge devices 7110, such as end-user devices 7112 and IoT devices 7114, may use network 7140 to communicate with each other and/or access one or more remote services (e.g., datacenter and/or cloud service 7120. Network 7140 may include any number or type of communication networks, including, for example, local area networks, wide area networks, public networks, the Internet, cellular networks, Wi-Fi networks, short-range networks (e.g., Bluetooth or ZigBee), and/or any other wired or wireless networks or communication mediums.

Any, all, or some of the computing devices of system 7100 may be adapted to execute any operating system, including Linux or other UNIX-based operating systems, Microsoft Windows, Windows Server, MacOS, Apple iOS, Google Android, or any customized and/or proprietary operating system, along with virtual machines adapted to virtualize execution of a particular operating system.

While FIG. 71 is described as containing or being associated with a plurality of elements, not all elements illustrated within system 7100 of FIG. 71 may be utilized in each alternative implementation of the present disclosure. Additionally, one or more of the elements described in connection with the examples of FIG. 71 may be located external to system 7100, while in other instances, certain elements may be included within or as a portion of one or more of the other described elements, as well as other elements not described in the illustrated implementation. Further, certain elements illustrated in FIG. 71 may be combined with other components, as well as used for alternative or additional purposes in addition to those purposes described herein.

Figure 72:
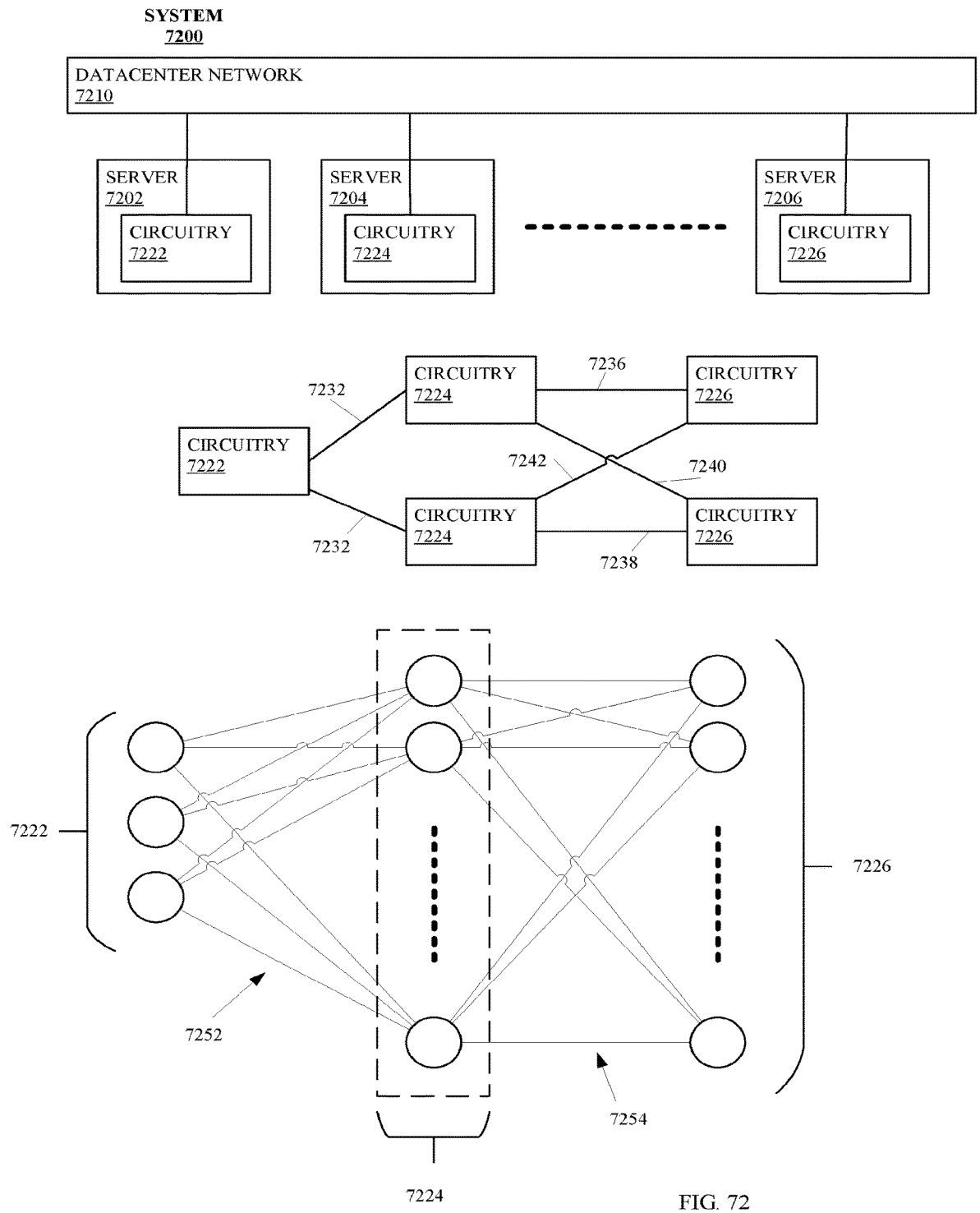
FIG. 72 illustrates a second example system.

FIG. 72 illustrates a system 7200 including nodes interconnected via a datacenter network 7210. For example, as shown, multiple nodes 7202, 7204, and 7206 may be coupled via the datacenter network 7210. Such nodes may be instantiated and used to parallelize multiple layers of an inference model (e.g., neural network, or the like). In one example, each node may be implemented as a server and may further include at least one hardware node, or circuitry (e.g., an FPGA, an ASIC, a processor, or the like). Thus, node 7202 may include circuitry 7222, node 7204 may include circuitry 7224, and node 7206 may include circuitry 7226.

The circuitry may be interconnected via a light transport layer protocol based system. In one example, a first instance of circuitry 7222 may be coupled via a transport link 132 with a first instance of circuitry 7224 and the first instance of circuitry 7222 may further be coupled via transport link 7234 with the second instance of circuitry 7224. The first instance of circuitry 7224 may be coupled via a transport link 7236 with a first instance of circuitry 7226 and the first instance of circuitry 7224 may further be coupled via transport link 7240 with a first instance of circuitry 7226. Similarly, the second instance of circuitry 7224 may be coupled via a transport link 7242 with the first instance of circuitry 7226 and the second instance of circuitry 7224 may further be coupled via a transport link 7238 with the second instance of circuitry 7226. The light transport layer protocol may provide the circuitry with the ability to transfer or receive packets or other such data from each other via datacenter network 7210. The circuitry may be interconnected in other configurations as well. For example, several instances of circuitry 7222 may be coupled via multiple transport links 7252 to several instances of circuitry 7224. Similarly, several instances of circuitry 7224 may be coupled via transport links 7254 to several instances of circuitry 7226. Although FIG. 72 shows a certain number and arrangement of nodes, including circuitry, there could be more or fewer number of nodes arranged differently.

Figure 73:
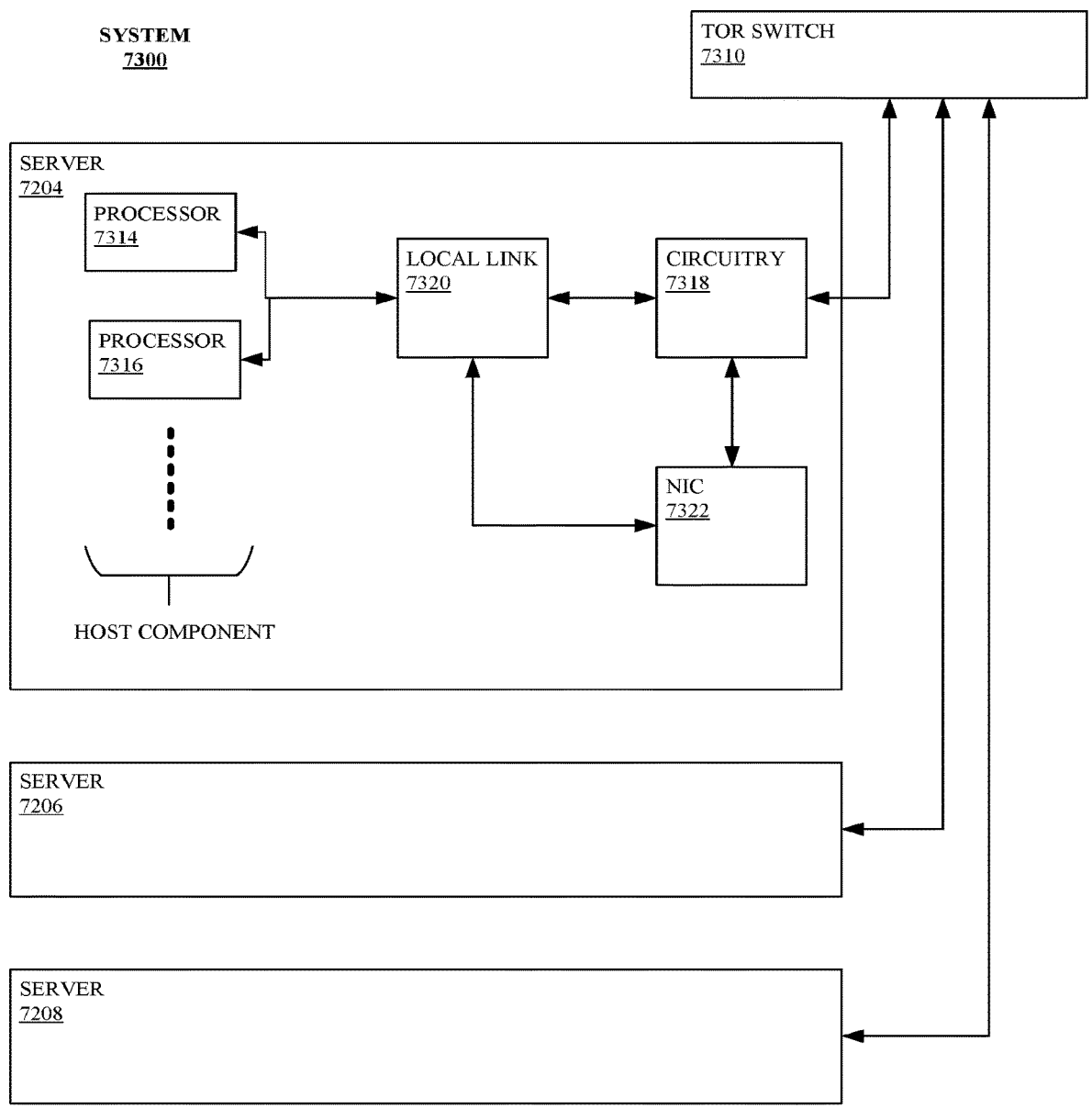
FIG. 73 illustrates a third example system.

FIG. 73 illustrates a system 7300 including distributed nodes, which may be implemented as a rack of servers (e.g., system 7000, system 100, or the like) in a datacenter (e.g., datacenter 7120). Although this figure shows a certain number of components of the system arranged in a certain manner, there could be more or fewer number of components arranged differently.

Each of the servers can be coupled to a top-of-rack (TOR) switch. Other racks, although not shown, may have a similar configuration. Each server may include at least one node or multiple nodes. Each node may include a server (e.g., sever 7304, sever 7306, or server 7308) and each server may be coupled to a TOR switch (e.g., TOR switch 7310). Server 7304 may include a host component including processors, such as processor 7314 and processor 7316, which may be coupled via a local link 7320 to a hardware node, e.g., circuitry 7318. Each hardware node may also be coupled by way of a network interface controller 7322 (e.g., used to communicate across the network infrastructure for the data center). System 7300 may allow nodes to perform processing on inference workloads that are received from (and/or sent to) TOR switch or other switches. Using this example system, individual nodes may be used to train inference models and/or generate inference from an inference models as described above. For example, processing of inference model workloads can be partitioned across various processing resources (e.g., processors, circuitry, etc.) within system 7300.

Parallelization of an inference model (e.g., a neural network, or the like) by splitting layers across multiple nodes or by splitting neural weights within a layer across multiple nodes. As an example, a single inference model (e.g., RNN, LSTM weight matrices, or the like) may be partitioned and pinned across multiple nodes. In an implementation of this example, an RNN model may be distributed across the memories (e.g., on-chip memory) of each of multiple circuitry.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, yet still co-operate or interact with each other.

In addition, in the foregoing Detailed Description, various features are grouped together in a single example to streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the Plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodology, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

Example 1. An apparatus, comprising: circuitry; and memory coupled to the circuitry, the memory storing instructions, which when executed by the circuitry cause the circuitry to: generate output data based in part on input data and an inference model; determine an inference probability for the generated output; determine whether the inference probability is greater than a threshold value; and provide a null output based on a determination that the inference probability is not greater than the threshold value.

Example 2. An apparatus, comprising: a circuitry; memory coupled to the circuitry, the memory storing instructions, which when executed by the circuitry cause the circuitry to: receive input data; generate, via an inference model, output based on the received input data; and provide an indication that use of the inference model is unauthorized based in part on the input data and the output data.

Example 3. An apparatus, comprising: circuitry; an interface coupled to the circuitry, the interface to couple to a network; and memory coupled to the circuitry, the memory storing instructions, which when executed by the circuitry cause the circuitry to: receive input data from an input device; receive, via the interface, a sanitization payload from a server coupled to the network, the sanitization payload comprising indications of a sanitization protocol; generate sanitized input data based in part by application of the sanitization protocol to the input data; and send the sanitized input data to the server via the interface and the network.

Example 4. An apparatus, comprising: circuitry; and memory coupled to the circuitry, the memory storing instructions, which when executed by the circuitry cause the circuitry to: receive input data from an input device; generate output data based in part on executing an inference model with the input data, the output data comprising an indication a one of either a visible class or a hidden class; determine whether the output data comprises an indication of the hidden class; and provide the generated output to an output consumer based on a determination that the output data does not comprise an indication of the hidden class.

Example 5. An apparatus, comprising: a circuitry; and a memory storing instructions, which when executed by the circuitry cause the circuitry to: obfuscate input data based in part on a key; and execute an inference model to using obfuscated input data to generate output data.

Example 6. An apparatus, comprising: a circuitry; and a memory storing instructions, which when executed by the circuitry cause the circuitry to: execute an inference model using input data to generate (1) output data comprising an indication of an inference and (2) an inference augmentation map; generate an input area affect map based on the input data and the inference augmentation map; and generate a reliability score based at least on the input area affect map, the reliability score comprising an indication of a reliability of the inference.

Example 7. An apparatus, comprising: a circuitry; and a memory storing instructions, which when executed by the circuitry cause the circuitry to: determine input device characteristics for an input device; select a trained inference model based on the input device characteristics; and classify input data from the input device with the inference model selected based on the input device characteristics.

Example 8. An apparatus, comprising: circuitry; memory coupled to the circuitry, the memory storing instructions, which when executed by the circuitry cause the circuitry to: receive input data from an input device; generate output data based in part on executing an inference model with the input data; and filter the output data to generate screened output data.

Example 9. An apparatus, comprising: circuitry; and memory storing instructions, which when executed by the circuitry cause the circuitry to: query a first server to determine capabilities of the first server; split an inference model into a plurality of model slices based in part on the capabilities of the first server; and send an information element to the first server including an indication of a one of the plurality of model slices and an instruction to execute the one of the plurality of model slices at the first server in a distributed manner.

Example 10. An apparatus, comprising: circuitry; and memory storing instructions, which when executed by the circuitry cause the circuitry to: receive, at a first server, a query to determine capabilities of the first server; and receive, at the first server, an information element including an indication of a one of a plurality of model slices and an instruction to execute the one of the plurality of model slices at the first server in a distributed manner, the inference model split into a plurality of model slices based in part on the capabilities of the first server.

Example 11. An apparatus, comprising: a circuitry; and a memory storing instructions, which when executed by the circuitry cause the circuitry to: receive input data; classify the input data based on an inference model to produce classification data; evaluate the input data as unacceptable based on the classification data; modify the input data to generate augmented input data when the classification data is evaluated as unacceptable; classify the augmented input data based on the inference model to produce augmented classification data; evaluate the augmented input data as acceptable based on the augmented classification data; and provide the augmented classification data as output data.

Example 12. An apparatus, comprising: a circuitry; and a memory storing instructions, which when executed by the circuitry cause the circuitry to: initialize one or more matrices corresponding to each output feature map for each layer in an inference model; accumulate activations of samples in a dataset into the one or more matrices to produce activation statistics; and determine first, second, and third parameters, wherein the first parameter includes a percent of activations that are fixed, the second parameter includes a total percent of nodes in the inference model that should be fired, and the third parameter includes a percentile of total top activations to take fixed activations from; and implement a dedicated activation function based on the activation statistics, the first parameter, the second parameter, and the third parameter.

Example 13. An apparatus, comprising: circuitry; and memory coupled to the circuitry, the memory storing instructions, which when executed by the circuitry cause the circuitry to: split an inference model input a plurality of model slices; and train the plurality of model slices based in part on a plurality of adversarial models.

Example 14. The apparatus of any one of examples 1 to 13, comprising a trusted execution environment (TEE) coupled to the circuitry, the TEE comprising TEE circuitry and trusted memory.

Example 15. An apparatus, comprising: a circuitry; memory coupled to the circuitry, the memory storing instructions, which when executed by the circuitry cause the circuitry to generate output data based in part on input data and an inference model; and a trusted execution environment (TEE) comprising: circuitry; and trusted memory coupled to the circuitry, the trusted memory storing a watermark and TEE instructions, the TEE instruction when executed by the circuitry cause the circuitry to: determine whether the input matches the watermark; and send, to the circuitry, a first indication to not generate the output data based on a determination that the input matches the watermark.

Example 16. An apparatus, comprising: a circuitry; a memory storing instructions, which when executed by the circuitry cause the circuitry to: determine a unique identification (UUID) associated with the apparatus; transform input data based in part on the UUID; and a trusted execution environment (TEE) comprising circuitry to: generate recovered input data based in part on a pre-loaded UUID and the transformed input data, the recovered input data used to generate an output via an inference model.

Example 17. The apparatus of any of examples 2 to 16, the memory further storing instructions that when executed by the circuitry, cause the circuitry to: generate output data based in part on input data and the inference model; determine an inference probability for the generated output; determine whether the inference probability is greater than a threshold value; and provide a null output based on a determination that the inference probability is not greater than the threshold value.

Example 18. The apparatus of any one of examples 1 or 3 to 16, the memory further storing instructions that when executed by the circuitry, cause the circuitry to: receive input data; generate, via an inference model, output based on the received input data; and provide an indication that use of the inference model is unauthorized based in part on the input data and the output data.

Example 19. The apparatus of any one of examples 1 to 2 or any one of examples 4 to 16, comprising an interface coupled to the circuitry, the interface to couple to a network; the memory further storing instructions that when executed by the circuitry, cause the circuitry to: receive input data from an input device; receive, via the interface, a sanitization payload from a server coupled to the network, the sanitization payload comprising indications of a sanitization protocol; generate sanitized input data based in part by application of the sanitization protocol to the input data; and send the sanitized input data to the server via the interface and the network.

Example 20. The apparatus of any one of examples 1 to 3 or any one of examples 5 to 16, the memory further storing instructions that when executed by the circuitry, cause the circuitry to: receive input data from an input device; generate output data based in part on executing an inference model with the input data, the output data comprising an indication a one of either a visible class or a hidden class; determine whether the output data comprises an indication of the hidden class; and provide the generated output to an output consumer based on a determination that the output data does not comprise an indication of the hidden class.

Example 21. The apparatus of any one of examples 1 to 4 or any one of examples 6 to 16, the memory further storing instructions that when executed by the circuitry, cause the circuitry to: obfuscate input data based in part on a key; and execute an inference model to using obfuscated input data to generate output data.

Example 22. The apparatus of any one of examples 1 to 5 or any one of examples 7 to 16, the memory further storing instructions that when executed by the circuitry, cause the circuitry to: execute an inference model using input data to generate (1) output data comprising an indication of an inference and (2) an inference augmentation map; generate an input area affect map based on the input data and the inference augmentation map; and generate a reliability score based at least on the input area affect map, the reliability score comprising an indication of a reliability of the inference.

Example 23. The apparatus of any one of examples 1 to 6 or any one of examples 8 to 16, the memory further storing instructions that when executed by the circuitry, cause the circuitry to: determine input device characteristics for an input device; select a trained inference model based on the input device characteristics; and classify input data from the input device with the inference model selected based on the input device characteristics.

Example 24. The apparatus of any one of examples 1 to 7 or any one of examples 9 to 16, the memory further storing instructions that when executed by the circuitry, cause the circuitry to: receive input data from an input device; generate output data based in part on executing an inference model with the input data; and filter the output data to generate screened output data.

Example 25. The apparatus of any one of examples 1 to 8 or any one of examples 10 to 16, the memory further storing instructions that when executed by the circuitry, cause the circuitry to: query a first server to determine capabilities of the first server; split an inference model into a plurality of model slices based in part on the capabilities of the first server; and send an information element to the first server including an indication of a one of the plurality of model slices and an instruction to execute the one of the plurality of model slices at the first server in a distributed manner.

Example 26. The apparatus of any one of examples 1 to 9 or any one of examples 11 to 16, the memory further storing instructions that when executed by the circuitry, cause the circuitry to: receive, at a first server, a query to determine capabilities of the first server; and receive, at the first server, an information element including an indication of a one of a plurality of model slices and an instruction to execute the one of the plurality of model slices at the first server in a distributed manner, the inference model split into a plurality of model slices based in part on the capabilities of the first server.

Example 27. The apparatus of any one of examples 1 to 10 or any one of examples 12 to 16, the memory further storing instructions that when executed by the circuitry, cause the circuitry to: receive input data; classify the input data based on an inference model to produce classification data; evaluate the input data as unacceptable based on the classification data; modify the input data to generate augmented input data when the classification data is evaluated as unacceptable; classify the augmented input data based on the inference model to produce augmented classification data; evaluate the augmented input data as acceptable based on the augmented classification data; and provide the augmented classification data as output data.

Example 28. The apparatus of any one of examples 1 to 11 or any one of examples 13 to 16, the memory further storing instructions that when executed by the circuitry, cause the circuitry to: initialize one or more matrices corresponding to each output feature map for each layer in an inference model; accumulate activations of samples in a dataset into the one or more matrices to produce activation statistics; and determine first, second, and third parameters, wherein the first parameter includes a percent of activations that are fixed, the second parameter includes a total percent of nodes in the inference model that should be fired, and the third parameter includes a percentile of total top activations to take fixed activations from; and implement a dedicated activation function based on the activation statistics, the first parameter, the second parameter, and the third parameter.

Example 29. The apparatus of any one of examples 1 to 12 or any one of examples 14 to 16, the memory further storing instructions that when executed by the circuitry, cause the circuitry to: split an inference model input a plurality of model slices; and train the plurality of model slices based in part on a plurality of adversarial models.

Example 30. The apparatus of any one of examples 14 or 16, the TEE instruction when executed by the TEE circuitry cause the TEE circuitry to: determine whether the input matches the watermark; and send, to the circuitry, a first indication to not generate the output data based on a determination that the input matches the watermark.

Example 31. The apparatus of any one of examples 14 to 15, the memory further storing instructions that when executed by the circuitry, cause the circuitry to: determine a unique identification (UUID) associated with the apparatus and transform input data based in part on the UUID; the TEE instruction when executed by the TEE circuitry cause the TEE circuitry to: generate recovered input data based in part on a pre-loaded UUID and the transformed input data, the recovered input data used to generate an output via an inference model.

Example 32. The apparatus of any of examples 1 to 31, the memory further storing instructions that when executed by the circuitry, cause the circuitry to: receive the input data; and generate the output responsive to receiving the input data.

Example 33. The apparatus of any of examples 1 to 32, the memory further storing instructions that when executed by the circuitry, cause the circuitry to provide the generated output to an output device based on a determination that the inference probability is greater than the threshold value.

Example 34. The apparatus of any of examples 1 to 33, the memory storing the inference model.

Example 35. The apparatus of any of examples 1 to 34, wherein the inference model is a neural network or a pattern classifier network.

Example 36. The apparatus of any one of examples 14 to 35, the trusted memory further storing TEE instructions that when executed by the circuitry, cause the circuitry to send, to the circuitry, a second indication to provide an indication of digital right violation of the inference model based on the determination that the input matches the watermark.

Example 37. The apparatus of example 36, the memory further storing instructions that when executed by the circuitry, cause the circuitry to: provide, to an output device, the indication of digital right violation of the inference model responsive to receiving the second indication; and not generate the output data responsive to receiving the first indication.

Example 38. The apparatus of any one of examples 14 to 37, the trusted memory further storing TEE instructions that when executed by the circuitry, cause the circuitry to: bit-wise compare the input data with the watermark; and determine that the input data matches the watermark based in part on the bit-wise comparison.

Example 39. The apparatus of any one of examples 14 to 38, the trusted memory further storing TEE instructions that when executed by the circuitry, cause the circuitry to send, to the circuitry, a third indication to generate the output data responsive to receiving the third indication.

Example 40. The apparatus of any one of examples 14 to 39, the memory further storing instructions that when executed by the circuitry, cause the circuitry to generate the output data responsive to receiving the first indication.

Example 41. The apparatus of any one of examples 14 to 40, the memory storing the inference model.

Example 42. The apparatus of any one of example 14 to 41, wherein the inference model is a neural network.

Example 43. The apparatus of any one of examples 14 to 42, the output comprising an indication of one of a plurality of classifications, the instructions when executed by the circuitry cause the circuitry to: determine whether the one of the plurality of classifications is correct based on the input data; and determine that use of the inference model is unauthorized based in part on a determination that the one of the plurality of classifications is correct based on the input data.

Example 44. The apparatus of any one of examples 14 to example 43, the instructions when executed by the circuitry cause the circuitry to provide the output based on a determination that use of the inference model is not unauthorized.

Example 45. The apparatus of any one of example 14 to 44, the instructions when executed by the circuitry cause the circuitry to: receive a plurality of input data; generate, via the inference model, an output based on each of the received plurality of input data, each of the plurality of outputs comprising an indication of a one of a plurality of classifications; determine, for each of the plurality of outputs, whether the one of the plurality of classifications is correct based on the one of the pluralities of input data corresponding to the one of the plurality of outputs; increment a counter based on a determination that the one of the plurality of classifications is correct based on the one of the pluralities of input data corresponding to the one of the plurality of outputs; and determine that use of the inference model is unauthorized based in part on the counter exceeding a threshold number.

Example 46. The apparatus of any one of examples 14 to 45, comprising an input device to capture the input data.

Example 47. The apparatus of any one of examples 14 to 46, the memory storing the inference model, the instructions when executed by the circuitry, cause the circuitry to execute the inference model to generate the output data based in part on the recovered input data.

Example 48. The apparatus of example 14 to 47, the TEE storing the inference model, the TEE circuitry arranged to execute the inference model to generate the output data based in part on the recovered input data.

Example 49. The apparatus of any one of examples 1 to 48, the memory further storing instructions, which when executed by the circuitry cause the circuitry to: receive, from the server, a query including an indication to report computing capabilities of the circuitry; and send a report to the server, the report including an indication of the computing capabilities of the circuitry.

Example 50. The apparatus of any one of examples 1 to 49, the memory further storing instructions, which when executed by the circuitry cause the circuitry to establish trusted connection with the server over the network.

Example 51. The apparatus of any one of examples 1 to 50, the memory further storing instructions, which when executed by the circuitry cause the circuitry to: generate decoded input data based in part on a converting the input data from a first data format to a second data format; generate filtered input data based in part on applying a filter to the decoded input data; and generate the sanitized input data based in part on converting the filtered input data from the second data format to the first data format.

Example 52. The apparatus of any one of examples 1 to 51, the sanitization payload comprising an indication of the second data format and the filter.

Example 53. The apparatus of any one of examples 1 to 52, the memory further storing instructions, which when executed by the circuitry cause the circuitry to send an alert to a monitoring system based on a determination that the output data comprises an indication of the hidden class.

Example 54. The apparatus of any one of examples 1 to 53, the memory further storing instructions, which when executed by the circuitry cause the circuitry to: generate, responsive to the determination that the output data comprises an indication of the hidden class, obfuscated output, the obfuscated output comprising an indication of the visible class; and provide, responsive to the determination that the output data comprises an indication of the hidden class, the obfuscated output to the output consumer.

Example 55. The apparatus of any one of examples 1 to 54, the memory further storing instructions, which when executed by the circuitry cause the circuitry to: collect, responsive to the determination that the output data comprises an indication of the hidden class, forensic data, the forensic data comprising an indication of at least one of the input data and the input device; and provide, responsive to the determination that the output data comprises an indication of the hidden class, the forensic data to the monitoring system.

Example 56. The apparatus of any one of examples 1 to 55, the visible class comprising a plurality of visible classes, the output data comprising an indication of the hidden class or a one of the plurality of visible classes.

Example 57. The apparatus of any one of example 1 to 56, the hidden class comprising a plurality of hidden classes, the output data comprising an indication of a one of the plurality of hidden classes or a one of the plurality of visible classes.

Example 58. The apparatus of any one of example 1 to 57, wherein at least one of the plurality of hidden classes corresponds to blacklisted inputs.

Example 59. The apparatus of any one of examples 1 to 58, the memory further storing instructions, which when executed by the circuitry cause the circuitry to: identify, responsive to the determination that the output data comprises an indication of the hidden class, a one of the plurality of visible classes associated with the one of the plurality of hidden classes indicated by the output data; and generate the obfuscated output to include an indication of the identified one of the plurality of visible classes.

Example 60. The apparatus of any one of examples 1 to 59, comprising an input device arranged to capture the input data, the instructions when executed by the circuitry cause the circuitry to receive the input data from the input device.

Example 61. The apparatus of any one of examples 1 to 60, comprising an input device, the instructions when executed by the circuitry cause the circuitry to receive the input data from the input device.

Example 62. The apparatus of any one of examples 1 to 61, wherein the inference augmentation map is a model activation map.

Example 63. The apparatus of any one of examples 1 to 62, the memory storing instructions, which when executed by the circuitry cause the circuitry to receive the input data and the input device characteristics from the input device.

Example 64. The apparatus of any one of examples 1 to 63, the memory storing instructions, which when executed by the circuitry cause the circuitry to request the input device characteristics from the input device.

Example 65. The apparatus of any one of examples 1 to 64, wherein the untrained inference models includes one or more of a feed-forward neural network (FFNN), a recurrent neural network (RNN), a convolutional neural network (CNN), a long/short term memory (LSTM) network, a deep neural network (DNN), a Bayesian belief network, and a Boltzmann machine.

Example 66. The apparatus of any one of examples 1 to 65, the output data comprising an indication of at least one of a plurality of classes, the memory further storing instructions, which when executed by the circuitry cause the circuitry to: determine whether the at least one of the plurality of classes is included in a subset of the plurality of classes; and remove indication to the at least one of the plurality of classes included in the subset of the plurality of classes to filter the output data.

Example 67. The apparatus of any one of examples 1 to 66, comprising an interface coupled to the circuitry, the interface to couple to a network and the memory further storing instructions, which when executed by the circuitry cause the circuitry to receive, via the interface, a privacy level specification from a server, the privacy level specification comprising an indication of the subset of the plurality of classes.

Example 68. The apparatus of example 67, the memory further storing instructions, which when executed by the circuitry cause the circuitry to provide, via the interface, the screened output to the server.

Example 69. The apparatus any one of examples 67 to 68, the memory further storing instructions, which when executed by the circuitry cause the circuitry to: receive a query from the server, the query including an indication to report screening capabilities of the circuitry; and send a report to the server, the report including an indication of the screening capabilities of the circuitry.

Example 70. The apparatus of any one of examples 67 to 69, the memory further storing instructions, which when executed by the circuitry cause the circuitry to: query a second server to determine capabilities of the second server; split the inference model into the plurality of model slices based in part on the capabilities of the first server and the second server; and send an information element to the second server including an indication of another one of the plurality of model slices and an instruction to execute the other one of the plurality of model slices at the second server in a distributed manner.

Example 71. The apparatus of any one of examples 67 to 70, wherein the capabilities of the first server and the second server include an indication of a security feature set of the respective first server and second server.

Example 72. The apparatus of any one of examples 67 to 71, the memory further storing instructions, which when executed by the circuitry cause the circuitry to assign the one of the plurality of model slices to the first server based on a vulnerability level of the one of the plurality of model slices and the security feature sets of the first and second servers.

Example 73. The apparatus of any one of examples 1 to 72, the inference model split input the plurality of model slices based in part on the capabilities of the first server and capabilities of a second server.

Example 74. The apparatus of any one of examples 1 to 73, wherein the capabilities of the first server and the second server include an indication of a security feature set of the respective first server and second server.

Example 75. The apparatus of any one of examples 1 to 74, the one of the plurality of model slices assigned to the first server based on a vulnerability level of the one of the plurality of model slices and the security feature set of the first and second servers.

Example 76. The apparatus of any one of examples 1 to 75, the classification data comprising a class of the input data and a confidence level associated with accuracy of the class, and the memory storing instructions, which when executed by the circuitry cause the circuitry to evaluate the classification data as unacceptable when the confidence level falls below a threshold and evaluate the classification data as acceptable when the confidence level exceeds the threshold.

Example 77. The apparatus of any one of examples 1 to 76, the memory storing instructions, which when executed by the circuitry cause the circuitry to modify the input data with one or more of a change in gamma, a pixel shift, de-noising, and error correction.

Example 78. The apparatus of any one of examples 1 to 77, the memory storing instructions, which when executed by the circuitry cause the circuitry to compare the classification data and the augmented classification data to detect operational anomalies.

Example 79. The apparatus of any one of examples 1 to 78, the input data comprising a data set of one or more samples for classification by the inference model.

Example 80. The apparatus of any one of examples 1 to 79, wherein activations of samples in the dataset are accumulated by forward-propagating each sample while activation maps for each layer of the inference model are stored.

Example 81. The apparatus of any one of examples 1 to 80, wherein implementation of the dedicated activation function includes passing all nodes that are in a corresponding matrix for a processed layer.

Example 82. The apparatus of any one of examples 1 to 81, wherein an activation percent is fulfilled by randomly firing one or more nodes in the inference model.

Example 83. The apparatus of any one of examples 1 to 82, wherein the activation percent equals the second parameter minus the first parameter.

Example 84. The apparatus of any one of examples 1 to 83, the memory storing instructions, which when executed by the circuitry cause the circuitry to determine the first, second, and third parameters based on input received from a user.

Example 85. The apparatus of any one of examples 1 to 84, the memory storing instructions, which when executed by the circuitry cause the circuitry to train each of the plurality of model slices based in part a plurality of substitutional sub-models and a plurality of adversarial models.

Example 86. The apparatus of any one of examples 1 to 85, wherein the plurality of substitutional sub-models comprises a substitutional sub-model for each of the plurality of model slices.

Example 87. The apparatus any one of examples 1 to 86, wherein the plurality of adversarial models comprises an adversarial model for each of the plurality of model slices.

Example 88. The apparatus of any one of examples 1 to 87, wherein the inference model includes one or more of a feed-forward neural network (FFNN), a recurrent neural network (RNN), a convolutional neural network (CNN), a long/short term memory (LSTM) network, a deep neural network (DNN), a Bayesian belief network, and a Boltzmann machine.

Example 89. An input device comprising: input capture circuitry arranged to output signals indicative of captured input; and input obfuscation circuitry arranged to modify the signals and generate obfuscated input data indicative of the modified signals.

Example 90. The input device of example 80, the input capture circuitry an image capture sensor, the input device comprising: a lens coupled to the image capture sensor; and a filter coupled to the lens arranged to obfuscate light transmitted through the lens.

Example 91. A non-transitory computer-readable storage medium comprising instructions that when executed by circuitry of a computing device, cause the computing device to: generate output data based in part on input data and an inference model; determine an inference probability for the generated output; determine whether the inference probability is greater than a threshold value; and provide a null output based on a determination that the inference probability is not greater than the threshold value.

Example 92. A non-transitory computer-readable storage medium comprising instructions that when executed by a computing device, cause the computing device to: receive input data from an input device; receive, via the interface, a sanitization payload from a server coupled to the network, the sanitization payload comprising indications of a sanitization protocol; generate sanitized input data based in part by application of the sanitization protocol to the input data; and send the sanitized input data to a server via an interface and a network.

Example 93. A non-transitory computer-readable storage medium comprising instructions that when executed by circuitry, cause the circuitry to: receive input data from an input device; generate output data based in part on executing an inference model with the input data, the output data comprising an indication a one of either a visible class or a hidden class; determine whether the output data comprises an indication of the hidden class; and provide the generated output to an output consumer based on a determination that the output data does not comprise an indication of the hidden class.

Example 94. A non-transitory computer-readable storage medium comprising instructions that when executed by circuitry, cause the circuitry to: obfuscate input data based in part on a key; and execute an inference model to using obfuscated input data to generate output data.

Example 95. A non-transitory computer-readable storage medium comprising instructions that when executed by circuitry, cause the circuitry to: execute an inference model using input data to generate (1) output data comprising an indication of an inference and (2) an inference augmentation map; generate an input area affect map based on the input data and the inference augmentation map; and generate a reliability score based at least on the input area affect map, the reliability score comprising an indication of a reliability of the inference.

Example 96. A non-transitory computer-readable storage medium comprising instructions that when executed by circuitry, cause the circuitry to: determine input device characteristics for an input device; select a trained inference model based on the input device characteristics; and classify input data from the input device with the inference model selected based on the input device characteristics.

Example 97. A non-transitory computer-readable storage medium comprising instructions that when executed by circuitry, cause the circuitry to: receive input data from an input device; generate output data based in part on executing an inference model with the input data; and filter the output data to generate screened output data.

Example 98. A non-transitory computer-readable storage medium comprising instructions that when executed by circuitry, cause the circuitry to: query a first server to determine capabilities of the first server; split an inference model into a plurality of model slices based in part on the capabilities of the first server; and send an information element to the first server including an indication of a one of the plurality of model slices and an instruction to execute the one of the plurality of model slices at the first server in a distributed manner.

Example 99. A non-transitory computer-readable storage medium comprising instructions that when executed by circuitry, cause the circuitry to: receive, at a first server, a query to determine capabilities of the first server; and receive, at the first server, an information element including an indication of a one of a plurality of model slices and an instruction to execute the one of the plurality of model slices at the first server in a distributed manner, the inference model split into a plurality of model slices based in part on the capabilities of the first server.

Example 100. A non-transitory computer-readable storage medium comprising instructions that when executed by circuitry, cause the circuitry to: receive input data; classify the input data based on an inference model to produce classification data; evaluate the input data as unacceptable based on the classification data; modify the input data to generate augmented input data when the classification data is evaluated as unacceptable; classify the augmented input data based on the inference model to produce augmented classification data; evaluate the augmented input data as acceptable based on the augmented classification data; and provide the augmented classification data as output data.

Example 101. A non-transitory computer-readable storage medium, comprising instructions that when executed by circuitry, cause the circuitry to: initialize one or more matrices corresponding to each output feature map for each layer in an inference model; accumulate activations of samples in a dataset into the one or more matrices to produce activation statistics; and determine first, second, and third parameters, wherein the first parameter includes a percent of activations that are fixed, the second parameter includes a total percent of nodes in the inference model that should be fired, and the third parameter includes a percentile of total top activations to take fixed activations from; and implement a dedicated activation function based on the activation statistics, the first parameter, the second parameter, and the third parameter.

Example 102. A non-transitory computer-readable storage medium comprising instructions that when executed by circuitry, cause the circuitry to: split an inference model input a plurality of model slices; and train the plurality of model slices based in part on a plurality of adversarial models.

Example 103. The non-transitory computer-readable storage medium of example any one of example 91 to 102, wherein the circuitry is part of a trusted execution environment (TEE).

Example 104. A non-transitory computer-readable storage medium comprising instructions that when executed by a computing device, cause the computing device to generate output data based in part on input data and an inference model; and when executed by a trusted execution environment (TEE) storing a marker, cause the TEE to determine whether the input matches the marker; and send, to the circuitry, a first indication to not generate the output data based on a determination that the input matches the marker.

Example 105. A non-transitory computer-readable storage medium comprising instructions that when executed by a computing device, cause the computing device to: determine a unique identification (UUID) associated with the apparatus; transform input data based in part on the UUID; and cause a trusted execution environment (TEE) to: generate recovered input data based in part on a pre-loaded UUID and the transformed input data, the recovered input data used to generate an output via an inference model.

Example 106. The non-transitory computer-readable storage medium of any one of examples 92 to 105, further comprising instructions, which when executed, cause the computing device, to: generate output data based in part on input data and an inference model; determine an inference probability for the generated output; determine whether the inference probability is greater than a threshold value; and provide a null output based on a determination that the inference probability is not greater than the threshold value.

Example 107. The non-transitory computer-readable storage medium of example 91 or any one of examples 93 to 105, further comprising instructions, which when executed, cause the computing device to: receive input data from an input device; receive, via the interface, a sanitization payload from a server coupled to the network, the sanitization payload comprising indications of a sanitization protocol; generate sanitized input data based in part by application of the sanitization protocol to the input data; and send the sanitized input data to a server via an interface and a network.

Example 108. The non-transitory computer-readable storage medium of any one of examples 91 to 92 or any one of examples 94 to 105, further comprising instructions, which when executed, cause the circuitry to: receive input data from an input device; generate output data based in part on executing an inference model with the input data, the output data comprising an indication a one of either a visible class or a hidden class; determine whether the output data comprises an indication of the hidden class; and provide the generated output to an output consumer based on a determination that the output data does not comprise an indication of the hidden class.

Example 109. The non-transitory computer-readable storage medium of any one of examples 91 to 93 or any one of examples 95 to 105, further comprising instructions, which when executed, cause the circuitry to: obfuscate input data based in part on a key; and execute an inference model to using obfuscated input data to generate output data.

Example 110. The non-transitory computer-readable storage medium of any one of examples 91 to 94 or any one of examples 96 to 105, further comprising instructions, which when executed, cause the circuitry to: execute an inference model using input data to generate (1) output data comprising an indication of an inference and (2) an inference augmentation map; generate an input area affect map based on the input data and the inference augmentation map; and generate a reliability score based at least on the input area affect map, the reliability score comprising an indication of a reliability of the inference.

Example 111. The non-transitory computer-readable storage medium of any one of examples 91 to 95 or any one of examples 97 to 105, further comprising instructions, which when executed, cause the circuitry to: determine input device characteristics for an input device; select a trained inference model based on the input device characteristics; and classify input data from the input device with the inference model selected based on the input device characteristics.

Example 112. The non-transitory computer-readable storage medium of any one of examples 91 to 96 or any one of examples 98 to 105, further comprising instructions, which when executed, cause the circuitry to: receive input data from an input device; generate output data based in part on executing an inference model with the input data; and filter the output data to generate screened output data.

Example 113. The non-transitory computer-readable storage medium of any one of examples 91 to 97 or any one of examples 99 to 105, further comprising instructions, which when executed, cause the circuitry to: query a first server to determine capabilities of the first server; split an inference model into a plurality of model slices based in part on the capabilities of the first server; and send an information element to the first server including an indication of a one of the plurality of model slices and an instruction to execute the one of the plurality of model slices at the first server in a distributed manner.

Example 114. The non-transitory computer-readable storage medium of any one of examples 91 to 98 or any one of examples 100 to 105, further comprising instructions, which when executed, cause the circuitry to: receive, at a first server, a query to determine capabilities of the first server; and receive, at the first server, an information element including an indication of a one of a plurality of model slices and an instruction to execute the one of the plurality of model slices at the first server in a distributed manner, the inference model split into a plurality of model slices based in part on the capabilities of the first server.

Example 115. The non-transitory computer-readable storage medium of any one of examples 91 to 99 or any one of examples 101 to 105, further comprising instructions, which when executed, cause the circuitry to: receive input data; classify the input data based on an inference model to produce classification data; evaluate the input data as unacceptable based on the classification data; modify the input data to generate augmented input data when the classification data is evaluated as unacceptable; classify the augmented input data based on the inference model to produce augmented classification data; evaluate the augmented input data as acceptable based on the augmented classification data; and provide the augmented classification data as output data.

Example 116. The non-transitory computer-readable storage medium of any one of examples 91 to 100 or any one of examples 102 to 105, further comprising instructions, which when executed, cause the circuitry to: initialize one or more matrices corresponding to each output feature map for each layer in an inference model; accumulate activations of samples in a dataset into the one or more matrices to produce activation statistics; and determine first, second, and third parameters, wherein the first parameter includes a percent of activations that are fixed, the second parameter includes a total percent of nodes in the inference model that should be fired, and the third parameter includes a percentile of total top activations to take fixed activations from; and implement a dedicated activation function based on the activation statistics, the first parameter, the second parameter, and the third parameter.

Example 117. The non-transitory computer-readable storage medium of any one of examples 91 to 101 or any one of examples 103 to 105, further comprising instructions, which when executed, cause the circuitry to: split an inference model input a plurality of model slices; and train the plurality of model slices based in part on a plurality of adversarial models.

Example 118. The non-transitory computer-readable storage medium of any one of examples 103 or 105, further comprising instructions, which when executed, cause the computing device to generate output data based in part on input data and an inference model; and when executed by a trusted execution environment (TEE) storing a marker, cause the TEE to determine whether the input matches the marker; and send, to the circuitry, a first indication to not generate the output data based on a determination that the input matches the marker.

Example 119. The non-transitory computer-readable storage medium of any one of examples 103 to 104, further comprising instructions, which when executed, cause the computing device to: determine a unique identification (UUID) associated with the apparatus; transform input data based in part on the UUID; and cause a trusted execution environment (TEE) to: generate recovered input data based in part on a pre-loaded UUID and the transformed input data, the recovered input data used to generate an output via an inference model.

Example 120. The non-transitory computer-readable storage medium of any one of examples 91 to 119, further comprising instructions, which when executed by a computing device, cause the computing device to: receive the input data; and generate the output responsive to receiving the input data.

Example 121. The non-transitory computer-readable storage medium of any one of examples 91 to 120, further comprising instructions, which when executed by a computing device, cause the computing device to provide the generated output to an output device based on a determination that the inference probability is greater than the threshold value.

Example 122. The non-transitory computer-readable storage medium of any one of examples 91 to 121, further comprising instructions, which when executed by a computing device, cause the computing device to store the inference model in memory coupled to the circuitry.

Example 123. The non-transitory computer-readable storage medium of any one of examples 91 to 122, wherein the inference model is a neural network.

Example 124. The non-transitory computer-readable storage medium of any one of examples 91 to 123, wherein the inference model is a pattern classifier network.

Example 125. The non-transitory computer-readable storage medium of any one of examples 91 to 124, further comprising instructions, which when executed by the computing device, cause the computing device to: receive, from the server, a query including an indication to report computing capabilities of the circuitry; and send a report to the server, the report including an indication of the computing capabilities of the circuitry Example 126. The non-transitory computer-readable storage medium of any one of examples 91 to 125, further comprising the instructions, which when executed by the computing device, cause the computing device to establish trusted connection with the server over the network.

Example 127. The non-transitory computer-readable storage medium of any one of examples 91 to 126, further comprising instructions, which when executed by the computing device, cause the computing device to: generate decoded input data based in part on a converting the input data from a first data format to a second data format; generate filtered input data based in part on applying a filter to the decoded input data; and generate the sanitized input data based in part on converting the filtered input data from the second data format to the first data format.

Example 128. The non-transitory computer-readable storage medium of any one of examples 91 to 127, the sanitization payload comprising an indication of the second data format and the filter.

Example 129. The non-transitory computer-readable storage medium of any one of examples 91 to 128, further storing instructions, which when executed by the circuitry cause the circuitry to send an alert to a monitoring system based on a determination that the output data comprises an indication of the hidden class.

Example 130. The non-transitory computer-readable storage medium of any one of examples 91 to 129, further storing instructions, which when executed by the circuitry cause the circuitry to: generate, responsive to the determination that the output data comprises an indication of the hidden class, obfuscated output, the obfuscated output comprising an indication of the visible class; and provide, responsive to the determination that the output data comprises an indication of the hidden class, the obfuscated output to the output consumer.

Example 131. The non-transitory computer-readable storage medium of any one of examples 91 to 130, further storing instructions, which when executed by the circuitry cause the circuitry to: collect, responsive to the determination that the output data comprises an indication of the hidden class, forensic data, the forensic data comprising an indication of at least one of the input data and the input device; and provide, responsive to the determination that the output data comprises an indication of the hidden class, the forensic data to the monitoring system.

Example 132. The non-transitory computer-readable storage medium of any one of examples 91 to 131, the visible class comprising a plurality of visible classes, the output data comprising an indication of the hidden class or a one of the plurality of visible classes.

Example 133. The non-transitory computer-readable storage medium of any one of examples 91 to 132, the hidden class comprising a plurality of hidden classes, the output data comprising an indication of a one of the plurality of hidden classes or a one of the plurality of visible classes.

Example 134. The non-transitory computer-readable storage medium of any one of examples 91 to 133, wherein at least one of the plurality of hidden classes corresponds to blacklisted inputs.

Example 135. The non-transitory computer-readable storage medium of any one of examples 91 to 134, further storing instructions, which when executed by the circuitry cause the circuitry to: identify, responsive to the determination that the output data comprises an indication of the hidden class, a one of the plurality of visible classes associated with the one of the plurality of hidden classes indicated by the output data; and generate the obfuscated output to include an indication of the identified one of the plurality of visible classes.

Example 136. The non-transitory computer-readable storage medium of any one of examples 91 to 135, comprising the instructions when executed by the circuitry, cause the circuitry to receive the input data from an input device.

Example 137. The non-transitory computer-readable storage medium of any one of examples 91 to 136, wherein the inference augmentation map is a model activation map.

Example 138. The non-transitory computer-readable storage medium of any one of examples 91 to 137, storing instructions, which when executed by the circuitry cause the circuitry to receive the input data and the input device characteristics from the input device.

Example 139. The non-transitory computer-readable storage medium of any one of examples 91 to 138, storing instructions, which when executed by the circuitry cause the circuitry to request the input device characteristics from the input device.

Example 140. The non-transitory computer-readable storage medium of any one of examples 91 to 139, wherein the untrained inference models includes one or more of a feed-forward neural network (FFNN), a recurrent neural network (RNN), a convolutional neural network (CNN), a long/short term memory (LSTM) network, a deep neural network (DNN), a Bayesian belief network, and a Boltzmann machine.

Example 141. The non-transitory computer-readable storage medium of any one of examples 91 to 140, the output data comprising an indication of at least one of a plurality of classes, the instructions, which when executed by the circuitry cause the circuitry to: determine whether the at least one of the plurality of classes is included in a subset of the plurality of classes; and remove indication to the at least one of the plurality of classes included in the subset of the plurality of classes to filter the output data.

Example 142. The non-transitory computer-readable storage medium of any one of examples 91 to 141, comprising an interface coupled to the circuitry, the interface to couple to a network and the instructions, which when executed by the circuitry cause the circuitry to receive, via the interface, a privacy level specification from a server, the privacy level specification comprising an indication of the subset of the plurality of classes.

Example 143. The non-transitory computer-readable storage medium of any one of examples 91 to 142, the instructions, which when executed by the circuitry cause the circuitry to provide, via the interface, the screened output to the server.

Example 144. The non-transitory computer-readable storage medium of any one of examples 91 to 143, the instructions, which when executed by the circuitry cause the circuitry to: receive a query from the server, the query including an indication to report screening capabilities of the circuitry; and send a report to the server, the report including an indication of the screening capabilities of the circuitry.

Example 145. The non-transitory computer-readable storage medium of any one of examples 91 to 144, the instructions, which when executed by the circuitry cause the circuitry to: query a second server to determine capabilities of the second server; split the inference model into the plurality of model slices based in part on the capabilities of the first server and the second server; and send an information element to the second server including an indication of another one of the plurality of model slices and an instruction to execute the other one of the plurality of model slices at the second server in a distributed manner.

Example 146. The non-transitory computer-readable storage medium of any one of examples 91 to 145, wherein the capabilities of the first server and the second server include an indication of a security feature set of the respective first server and second server.

Example 147. The non-transitory computer-readable storage medium of any one of examples 91 to 146, the instructions, which when executed by the circuitry cause the circuitry to assign the one of the plurality of model slices to the first server based on a vulnerability level of the one of the plurality of model slices and the security feature sets of the first and second servers.

Example 148. The non-transitory computer-readable storage medium of any one of examples 91 to 147, the inference model split input the plurality of model slices based in part on the capabilities of the first server and capabilities of a second server.

Example 149. The non-transitory computer-readable storage medium of any one of examples 91 to 148, wherein the capabilities of the first server and the second server include an indication of a security feature set of the respective first server and second server.

Example 150. The non-transitory computer-readable storage medium of any one of examples 91 to 149, the one of the plurality of model slices assigned to the first server based on a vulnerability level of the one of the plurality of model slices and the security feature set of the first and second servers.

Example 151. The non-transitory computer-readable storage medium of any one of examples 91 to 150, the classification data comprising a class of the input data and a confidence level associated with accuracy of the class, and the medium storing instructions, which when executed by the circuitry cause the circuitry to evaluate the classification data as unacceptable when the confidence level falls below a threshold and evaluate the classification data as acceptable when the confidence level exceeds the threshold.

Example 152. The non-transitory computer-readable storage medium of any one of examples 91 to 151, the instructions, which when executed by the circuitry cause the circuitry to modify the input data with one or more of a change in gamma, a pixel shift, de-noising, and error correction.

Example 153. The non-transitory computer-readable storage medium of any one of examples 91 to 152, the instructions, which when executed by the circuitry cause the circuitry to compare the classification data and the augmented classification data to detect operational anomalies.

Example 154. The non-transitory computer-readable storage medium of any one of examples 91 to 153, wherein the inference model includes one or more of a feed-forward neural network (FFNN), a recurrent neural network (RNN), a convolutional neural network (CNN), a long/short term memory (LSTM) network, a deep neural network (DNN), a Bayesian belief network, and a Boltzmann machine.

Example 155. The non-transitory computer-readable storage medium of any one of examples 91 to 154, the input data comprising a data set of one or more samples for classification by the inference model.

Example 156. The non-transitory computer-readable storage medium of any one of examples 91 to 155, wherein activations of samples in the dataset are accumulated by forward-propagating each sample while activation maps for each layer of the inference model are stored.

Example 157. The non-transitory computer-readable storage medium of any one of examples 91 to 156, wherein implementation of the dedicated activation function includes passing all nodes that are in a corresponding matrix for a processed layer.

Example 158. The non-transitory computer-readable storage medium of any one of examples 91 to 157, wherein an activation percent is fulfilled by randomly firing one or more nodes in the inference model.

Example 159. The non-transitory computer-readable storage medium of any one of examples 91 to 158, wherein the activation percent equals the second parameter minus the first parameter.

Example 160. The non-transitory computer-readable storage medium of any one of examples 91 to 159, the instructions, which when executed by the circuitry cause the circuitry to determine the first, second, and third parameters based on input received from a user.

Example 161. The non-transitory computer-readable storage medium of any one of examples 91 to 160, wherein the inference model includes one or more of a feed-forward neural network (FFNN), a recurrent neural network (RNN), a convolutional neural network (CNN), a long/short term memory (LSTM) network, a deep neural network (DNN), a Bayesian belief network, and a Boltzmann machine.

Example 162. The non-transitory computer-readable storage medium of any one of examples 91 to 161, instructions that when executed by circuitry, cause the circuitry to train each of the plurality of model slices based in part a plurality of substitutional sub-models and a plurality of adversarial models.

Example 163. The non-transitory computer-readable storage medium of any one of examples 91 to 162, wherein the plurality of substitutional sub-models comprises a substitutional sub-model for each of the plurality of model slices.

Example 164. The non-transitory computer-readable storage medium of any one of examples 91 to 163, wherein the plurality of adversarial models comprises an adversarial model for each of the plurality of model slices.

Example 165. The non-transitory computer-readable storage medium of any one of examples 103 to 164, further comprising instructions that when executed by the TEE, cause the TEE to send, to the circuitry, a second indication to provide an indication of digital right violation of the inference model based on the determination that the input matches the marker.

Example 166. The non-transitory computer-readable storage medium of any one of examples 103 to 165, further comprising instructions that when executed by the circuitry, cause the circuitry to: provide, to an output device, the indication of digital right violation of the inference model responsive to receiving the second indication; and not generate the output data responsive to receiving the first indication.

Example 167. The non-transitory computer-readable storage medium of any one of examples 103 to 166, further comprising instructions that when executed by the TEE, cause the TEE to: bit-wise compare the input data with the marker; and determine that the input data matches the marker based in part on the bit-wise comparison.

Example 168. The non-transitory computer-readable storage medium of any one of examples 103 to 167, further comprising instructions that when executed by the TEE, cause the TEE to send, to the circuitry, a third indication to generate the output data responsive to receiving the third indication.

Example 169. The non-transitory computer-readable storage medium of any one of examples 103 to 168, further comprising instructions that when executed by the circuitry, cause the circuitry to generate the output data responsive to receiving the first indication.

Example 170. The non-transitory computer-readable storage medium of any one of examples 103 to 169, further comprising the inference model.

Example 171. The non-transitory computer-readable storage medium of any one of examples 103 to 170, wherein the inference model is a neural network.

Example 172. The non-transitory computer-readable storage medium of any one of examples 103 to 171, further comprising instructions, which when executed by the computing device cause the computing device to receive the input data from an input device.

Example 173. The non-transitory computer-readable storage medium of any one of examples 103 to 172, further comprising the inference model, the instructions when executed by the circuitry, cause the circuitry to execute the inference model to generate the output data based in part on the recovered input data.

Example 174. The non-transitory computer-readable storage medium of any one of examples 103 to 173, the TEE storing the inference model, further comprising instructions that when executed by the TEE cause the TEE to generate the output data based in part on the recovered input data.

Example 175. A computer-implemented method, comprising: generating output data based in part on input data and an inference model; determining an inference probability for the generated output; determining whether the inference probability is greater than a threshold value; and providing a null output based on a determination that the inference probability is not greater than the threshold value.

Example 176. A computer-implemented method, comprising: receiving input data; generating, via an inference model, output based on the received input data; and providing an indication that use of the inference model is unauthorized based in part on the input data and the output data.

Example 177. A computer-implemented method, comprising: receiving input data from an input device; receive, via the interface, a sanitization payload from a server coupled to the network, the sanitization payload comprising indications of a sanitization protocol; generating sanitized input data based in part by application of the sanitization protocol to the input data; and sending the sanitized input data to a server via an interface and a network.

Example 178. A computer-implemented method, comprising: receiving input data from an input device; generating output data based in part on executing an inference model with the input data, the output data comprising an indication a one of either a visible class or a hidden class; determining whether the output data comprises an indication of the hidden class; and providing the generated output to an output consumer based on a determination that the output data does not comprise an indication of the hidden class.

Example 179. A computer-implemented method comprising: obfuscating input data based in part on a key; and executing an inference model to using obfuscated input data to generate output data.

Example 180. A computer-implemented method comprising: executing an inference model using input data to generate (1) output data comprising an indication of an inference and (2) an inference augmentation map; generating an input area affect map based on the input data and the inference augmentation map; and generating a reliability score based at least on the input area affect map, the reliability score comprising an indication of a reliability of the inference.

Example 181. A computer-implemented method, comprising: determining input device characteristics for an input device; selecting a trained inference model based on the input device characteristics; and classifying input data from the input device with the inference model selected based on the input device characteristics.

Example 182. A computer-implemented method, comprising: receiving input data from an input device; generating output data based in part on executing an inference model with the input data; and filtering the output data to generate screened output data.

Example 183. A computer-implemented method, comprising: querying a first server to determine capabilities of the first server; splitting an inference model into a plurality of model slices based in part on the capabilities of the first server; and sending an information element to the first server including an indication of a one of the plurality of model slices and an instruction to execute the one of the plurality of model slices at the first server in a distributed manner.

Example 184. A computer-implemented method, comprising: receiving, at a first server, a query to determine capabilities of the first server; and receiving, at the first server, an information element including an indication of a one of a plurality of model slices and an instruction to execute the one of the plurality of model slices at the first server in a distributed manner, the inference model split into a plurality of model slices based in part on the capabilities of the first server.

Example 185. A computer-implemented method, comprising: receiving input data; classifying the input data based on an inference model to produce classification data; evaluating the input data as unacceptable based on the classification data; modifying the input data to generate augmented input data when the classification data is evaluated as unacceptable; classifying the augmented input data based on the inference model to produce augmented classification data; evaluating the augmented input data as acceptable based on the augmented classification data; and providing the augmented classification data as output data.

Example 186. A computer-implemented method, comprising: initializing one or more matrices corresponding to each output feature map for each layer in an inference model; accumulating activations of samples in a dataset into the one or more matrices to produce activation statistics; and determining first, second, and third parameters, wherein the first parameter includes a percent of activations that are fixed, the second parameter includes a total percent of nodes in the inference model that should be fired, and the third parameter includes a percentile of total top activations to take fixed activations from; and implementing a dedicated activation function based on the activation statistics, the first parameter, the second parameter, and the third parameter.

Example 187. A computer-implemented method, comprising: splitting an inference model input a plurality of model slices; and training the plurality of model slices based in part on a plurality of adversarial models.

Example 188. A computer-implemented method, comprising: generating output data based in part on input data and an inference model; determining, via a trusted execution environment (TEE) storing a marker, whether the input matches the marker; and sending, from the TEE to the circuitry, a first indication to not generate the output data based on a determination that the input matches the marker.

Example 189. A computer-implemented method, comprising: determining a unique identification (UUID) associated with the apparatus; transforming input data based in part on the UUID; and causing a trusted execution environment (TEE) to: generate recovered input data based in part on a pre-loaded UUID and the transformed input data, the recovered input data used to generate an output via an inference model.

Example 190. The computer-implemented method of any one of examples 176 to 189, comprising: generating output data based in part on input data and an inference model; determining an inference probability for the generated output; determining whether the inference probability is greater than a threshold value; and providing a null output based on a determination that the inference probability is not greater than the threshold value.

Example 191. The computer-implemented method of example 175 or any one of examples 177 to 189, comprising: receiving input data; generating, via an inference model, output based on the received input data; and providing an indication that use of the inference model is unauthorized based in part on the input data and the output data.

Example 192. The computer-implemented method of any one of examples 175 to 176 or any one of examples 178 to 189, comprising: receiving input data from an input device; receive, via the interface, a sanitization payload from a server coupled to the network, the sanitization payload comprising indications of a sanitization protocol; generating sanitized input data based in part by application of the sanitization protocol to the input data; and sending the sanitized input data to a server via an interface and a network.

Example 192. The computer-implemented method of any one of examples 175 to 177 or any one of examples 179 to 189, comprising: receiving input data from an input device; generating output data based in part on executing an inference model with the input data, the output data comprising an indication a one of either a visible class or a hidden class; determining whether the output data comprises an indication of the hidden class; and providing the generated output to an output consumer based on a determination that the output data does not comprise an indication of the hidden class.

Example 193. The computer-implemented method of any one of examples 175 to 178 or any one of examples 180 to 189, comprising: obfuscating input data based in part on a key; and executing an inference model to using obfuscated input data to generate output data.

Example 194. The computer-implemented method of any one of examples 175 to 179 or any one of examples 181 to 189, comprising: executing an inference model using input data to generate (1) output data comprising an indication of an inference and (2) an inference augmentation map; generating an input area affect map based on the input data and the inference augmentation map; and generating a reliability score based at least on the input area affect map, the reliability score comprising an indication of a reliability of the inference.

Example 195. The computer-implemented method of any one of examples 175 to 180 or any one of examples 182 to 189, comprising: determining input device characteristics for an input device; selecting a trained inference model based on the input device characteristics; and classifying input data from the input device with the inference model selected based on the input device characteristics.

Example 196. The computer-implemented method of any one of examples 175 to 181 or any one of examples 183 to 189, comprising: receiving input data from an input device; generating output data based in part on executing an inference model with the input data; and filtering the output data to generate screened output data.

Example 197. The computer-implemented method of any one of examples 175 to 182 or any one of examples 184 to 189, comprising: querying a first server to determine capabilities of the first server; splitting an inference model into a plurality of model slices based in part on the capabilities of the first server; and sending an information element to the first server including an indication of a one of the plurality of model slices and an instruction to execute the one of the plurality of model slices at the first server in a distributed manner.

Example 198. The computer-implemented method of any one of examples 175 to 183 or any one of examples 185 to 189, comprising: receiving, at a first server, a query to determine capabilities of the first server; and receiving, at the first server, an information element including an indication of a one of a plurality of model slices and an instruction to execute the one of the plurality of model slices at the first server in a distributed manner, the inference model split into a plurality of model slices based in part on the capabilities of the first server.

Example 199. The computer-implemented method of any one of examples 175 to 184 or any one of examples 186 to 189, comprising: receiving input data; classifying the input data based on an inference model to produce classification data; evaluating the input data as unacceptable based on the classification data; modifying the input data to generate augmented input data when the classification data is evaluated as unacceptable; classifying the augmented input data based on the inference model to produce augmented classification data; evaluating the augmented input data as acceptable based on the augmented classification data; and providing the augmented classification data as output data.

Example 200. The computer-implemented method of any one of examples 175 to 185 or any one of examples 187 to 189, comprising: initializing one or more matrices corresponding to each output feature map for each layer in an inference model; accumulating activations of samples in a dataset into the one or more matrices to produce activation statistics; and determining first, second, and third parameters, wherein the first parameter includes a percent of activations that are fixed, the second parameter includes a total percent of nodes in the inference model that should be fired, and the third parameter includes a percentile of total top activations to take fixed activations from; and implementing a dedicated activation function based on the activation statistics, the first parameter, the second parameter, and the third parameter.

Example 201. The computer-implemented method of any one of examples 175 to 186 or any one of examples 188 to 189, comprising: splitting an inference model input a plurality of model slices; and training the plurality of model slices based in part on a plurality of adversarial models.

Example 202. The computer-implemented method of any one of examples 175 to 187 or example 189, comprising: generating output data based in part on input data and an inference model; determining, via a trusted execution environment (TEE) storing a marker, whether the input matches the marker; and sending, from the TEE to the circuitry, a first indication to not generate the output data based on a determination that the input matches the marker.

Example 203. The computer-implemented method of any one of examples 175 to 188, comprising: determining a unique identification (UUID) associated with the apparatus; transforming input data based in part on the UUID; and causing a trusted execution environment (TEE) to: generate recovered input data based in part on a pre-loaded UUID and the transformed input data, the recovered input data used to generate an output via an inference model.

Example 204. The computer-implemented method of any one of examples 175 to 203, comprising receiving the input data; and generate the output responsive to receiving the input data.

Example 205. The computer-implemented method of any one of examples 175 to 204, comprising providing the generated output to an output device based on a determination that the inference probability is greater than the threshold value.

Example 206. The computer-implemented method of any one of examples 175 to 205, comprising storing the inference model in memory.

Example 207. The computer-implemented method of any one of examples 175 to 206, wherein the inference model is a neural network.

Example 208. The computer-implemented method of any one of examples 175 to 207, wherein the inference model is a pattern classifier network.

Example 209. The computer-implemented method of any one of examples 175 to 208, the output comprising an indication of one of a plurality of classifications, the method comprising: determining whether the one of the plurality of classifications is correct based on the input data; and determining that use of the inference model is unauthorized based in part on a determination that the one of the plurality of classifications is correct based on the input data.

Example 210. The computer-implemented method of any one of examples 175 to 209, comprising providing the output based on a determination that use of the inference model is not unauthorized.

Example 211. The computer-implemented method of any one of examples 175 to 210, comprising: receiving a plurality of input data; generating, via the inference model, an output based on each of the received plurality of input data, each of the plurality of outputs comprising an indication of a one of a plurality of classifications; determining, for each of the plurality of outputs, whether the one of the plurality of classifications is correct based on the one of the pluralities of input data corresponding to the one of the plurality of outputs; incrementing a counter based on a determination that the one of the plurality of classifications is correct based on the one of the pluralities of input data corresponding to the one of the plurality of outputs; and determining that use of the inference model is unauthorized based in part on the counter exceeding a threshold number.

Example 212. The computer-implemented method of any one of examples 175 to 211, comprising: receiving, from the server, a query including an indication to report computing capabilities of the circuitry; and sending a report to the server, the report including an indication of the computing capabilities of the circuitry Example 213. The computer-implemented method of any one of examples 175 to 212, comprising establishing trusted connection with the server over the network.

Example 214. The computer-implemented method of any one of examples 175 to 213, comprising: generating decoded input data based in part on a converting the input data from a first data format to a second data format; generating filtered input data based in part on applying a filter to the decoded input data; and generating the sanitized input data based in part on converting the filtered input data from the second data format to the first data format.

Example 215. The computer-implemented method of any one of examples 175 to 214, the sanitization payload comprising an indication of the second data format and the filter.

Example 216. The computer-implemented method of any one of examples 175 to 215, comprising sending an alert to a monitoring system based on a determination that the output data comprises an indication of the hidden class.

Example 217. The computer-implemented method of any one of examples 175 to 216, comprising: generating, responsive to the determination that the output data comprises an indication of the hidden class, obfuscated output, the obfuscated output comprising an indication of the visible class; and providing, responsive to the determination that the output data comprises an indication of the hidden class, the obfuscated output to the output consumer.

Example 218. The computer-implemented method of any one of examples 175 to 217, comprising: collecting, responsive to the determination that the output data comprises an indication of the hidden class, forensic data, the forensic data comprising an indication of at least one of the input data and the input device; and providing, responsive to the determination that the output data comprises an indication of the hidden class, the forensic data to the monitoring system.

Example 219. The computer-implemented method of any one of examples 175 to 218, the visible class comprising a plurality of visible classes, the output data comprising an indication of the hidden class or a one of the plurality of visible classes.

Example 220. The computer-implemented method of any one of examples 175 to 219, the hidden class comprising a plurality of hidden classes, the output data comprising an indication of a one of the plurality of hidden classes or a one of the plurality of visible classes.

Example 221. The computer-implemented method of any one of examples 175 to 220, comprising: identifying, responsive to the determination that the output data comprises an indication of the hidden class, a one of the plurality of visible classes associated with the one of the plurality of hidden classes indicated by the output data; and generating the obfuscated output to include an indication of the identified one of the plurality of visible classes.

Example 222. The computer-implemented method of any one of examples 175 to 221, comprising receiving the input data from an input device.

Example 223. The computer-implemented method of any one of examples 175 to 222, wherein the inference augmentation map is a model activation map.

Example 224. The computer-implemented method of any one of examples 175 to 223, comprising receiving the input data and the input device characteristics from the input device.

Example 225. The computer-implemented method of any one of examples 175 to 224, comprising requesting the input device characteristics from the input device.

Example 226. The computer-implemented method of any one of examples 175 to 225, wherein the untrained inference models includes one or more of a feed-forward neural network (FFNN), a recurrent neural network (RNN), a convolutional neural network (CNN), a long/short term memory (LSTM) network, a deep neural network (DNN), a Bayesian belief network, and a Boltzmann machine.

Example 227. The computer-implemented method of any one of examples 175 to 226, the output data comprising an indication of at least one of a plurality of classes, the method comprising: determining whether the at least one of the plurality of classes is included in a subset of the plurality of classes; and removing indication to the at least one of the plurality of classes included in the subset of the plurality of classes to filter the output data.

Example 228. The computer-implemented method of any one of examples 175 to 227, comprising receiving, via an interface, a privacy level specification from a server, the privacy level specification comprising an indication of the subset of the plurality of classes.

Example 229. The computer-implemented method of any one of examples 175 to 228, comprising providing, via the interface, the screened output to the server.

Example 230. The computer-implemented method of any one of examples 175 to 229, comprising: receiving a query from the server, the query including an indication to report screening capabilities of the circuitry; and sending a report to the server, the report including an indication of the screening capabilities of the circuitry.

Example 231. The computer-implemented method of any one of examples 175 to 230, comprising: querying a second server to determine capabilities of the second server; splitting the inference model into the plurality of model slices based in part on the capabilities of the first server and the second server; and sending an information element to the second server including an indication of another one of the plurality of model slices and an instruction to execute the other one of the plurality of model slices at the second server in a distributed manner.

Example 232. The computer-implemented method of any one of examples 175 to 231, wherein the capabilities of the first server and the second server include an indication of a security feature set of the respective first server and second server.

Example 233. The computer-implemented method of any one of examples 175 to 232, comprising assigning the one of the plurality of model slices to the first server based on a vulnerability level of the one of the plurality of model slices and the security feature sets of the first and second servers.

Example 234. The computer-implemented method of any one of examples 175 to 233, the inference model split input the plurality of model slices based in part on the capabilities of the first server and capabilities of a second server.

Example 235. The computer-implemented method of any one of examples 175 to 234, wherein the capabilities of the first server and the second server include an indication of a security feature set of the respective first server and second server.

Example 236. The computer-implemented method of any one of examples 175 to 235, the one of the plurality of model slices assigned to the first server based on a vulnerability level of the one of the plurality of model slices and the security feature set of the first and second servers.

Example 237. The computer-implemented method of any one of examples 175 to 236, the classification data comprising a class of the input data and a confidence level associated with accuracy of the class, and the medium storing instructions, which when executed by the circuitry cause the circuitry to evaluate the classification data as unacceptable when the confidence level falls below a threshold and evaluate the classification data as acceptable when the confidence level exceeds the threshold.

Example 238. The computer-implemented method of any one of examples 175 to 237, comprising modifying the input data with one or more of a change in gamma, a pixel shift, de-noising, and error correction.

Example 239. The computer-implemented method of any one of examples 175 to 238, comprising comparing the classification data and the augmented classification data to detect operational anomalies.

Example 240. The computer-implemented method of any one of examples 175 to 239, wherein the inference model includes one or more of a feed-forward neural network (FFNN), a recurrent neural network (RNN), a convolutional neural network (CNN), a long/short term memory (LSTM) network, a deep neural network (DNN), a Bayesian belief network, and a Boltzmann machine.

Example 241. The computer-implemented method of any one of examples 175 to 240, the input data comprising a data set of one or more samples for classification by the inference model.

Example 242. The computer-implemented method of any one of examples 175 to 241, wherein activations of samples in the dataset are accumulated by forward-propagating each sample while activation maps for each layer of the inference model are stored.

Example 243. The computer-implemented method of any one of examples 175 to 242, wherein implementation of the dedicated activation function includes passing all nodes that are in a corresponding matrix for a processed layer.

Example 244. The computer-implemented method of any one of examples 175 to 243, wherein an activation percent is fulfilled by randomly firing one or more nodes in the inference model.

Example 245. The computer-implemented method of any one of examples 175 to 244, wherein the activation percent equals the second parameter minus the first parameter.

Example 246. The computer-implemented method of any one of examples 175 to 245, comprising determining the first, second, and third parameters based on input received from a user.

Example 247. The computer-implemented method of any one of examples 175 to 246, wherein the inference model includes one or more of a feed-forward neural network (FFNN), a recurrent neural network (RNN), a convolutional neural network (CNN), a long/short term memory (LSTM) network, a deep neural network (DNN), a Bayesian belief network, and a Boltzmann machine.

Example 248. The computer-implemented method of any one of examples 175 to 247, comprising training each of the plurality of model slices based in part a plurality of substitutional sub-models and a plurality of adversarial models.

Example 249. The computer-implemented method of any one of examples 175 to 248, wherein the plurality of substitutional sub-models comprises a substitutional sub-model for each of the plurality of model slices.

Example 250. The computer-implemented method of any one of examples 175 to 249, wherein the plurality of adversarial models comprises an adversarial model for each of the plurality of model slices.

Example 251. The computer-implemented method of any one of examples 188 to 250, comprising sending, to the circuitry, a second indication to provide an indication of digital right violation of the inference model based on the determination that the input matches the marker.

Example 252. The computer-implemented method of any one of examples 188 to 251, further comprising instructions that when executed by the circuitry, cause the circuitry to: provide, to an output device, the indication of digital right violation of the inference model responsive to receiving the second indication; and not generate the output data responsive to receiving the first indication.

Example 253. The computer-implemented method of any one of examples 188 to 252, further comprising instructions that when executed by the TEE, cause the TEE to: bit-wise compare the input data with the marker; and determine that the input data matches the marker based in part on the bit-wise comparison.

Example 254. The computer-implemented method of any one of examples 188 to 253, further comprising instructions that when executed by the TEE, cause the TEE to send, to the circuitry, a third indication to generate the output data responsive to receiving the third indication.

Example 255. The computer-implemented method of any one of examples 188 to 254, further comprising instructions that when executed by the circuitry, cause the circuitry to generate the output data responsive to receiving the first indication.

Example 256. The computer-implemented method of any one of examples 188 to 255, further comprising the inference model in memory.

Example 257. The computer-implemented method of any one of examples 188 to 256, wherein the inference model is a neural network.

Example 258. The computer-implemented method of any one of examples 188 to 257, comprising receiving the input data from an input device.

Example 259. The computer-implemented method of any one of examples 188 to 258, comprising executing the inference model to generate the output data based in part on the recovered input data.

Example 260. The computer-implemented method of any one of examples 188 to 259, the TEE storing the inference model, the method comprising causing the TEE to generate the output data based in part on the recovered input data.

Example 261. An apparatus, comprising: a circuitry; memory coupled to the circuitry, the memory storing instructions, which when executed by the circuitry cause the circuitry to: receive training data for an inference model, the training data comprising indications of a plurality of inputs and a plurality of adversarial inputs, the training data further comprising indications of an expected output for each of the plurality of inputs and the plurality of adversarial inputs; and train the inference model based in part on the training data.

Example 262. An apparatus, comprising: a circuitry; and a memory storing instructions, which when executed by the circuitry cause the circuitry to: receive a training data set with a plurality of samples; generate classification data for two or more inference models based on a sample in the training data set; determine whether the classification data generated for each of the two or more inference models matches; add the sample in the training data set to uncorrelated output data when the classification data generated for each of the two or more inference models fails to match; and add the sample in the training data set to correlated output data when the classification data generated for each of the two or more inference models matches.

Example 263. An apparatus, comprising: a circuitry; and a memory storing instructions, which when executed by the circuitry cause the circuitry to: determine input device characteristics for an input device; select an untrained inference model based on the input device characteristics; and train the untrained inference model selected based on the input device characteristics with input data from the input device.

Example 264. An apparatus, comprising: a circuitry; and a memory storing instructions, which when executed by the circuitry cause the circuitry to: receive input data; transcode the input data; generate a training data set integrity state (TSIS) value based on the transcoded input data; and provide the TSIS value as output to enable verification that an inference model is trained based on the input data.

Example 265. An apparatus, comprising: circuitry; and memory storing instructions, which when executed by the circuitry cause the circuitry to: detect at least one error in a training data set utilized to train an inference model; receive recovery training data; and train the inference model with the recovery training data.

Example 266. An apparatus, comprising: circuitry; and memory storing instructions, which when executed by the circuitry cause the circuitry to: split an inference model into at least a public model partition and a private model partition; and train the public model partition based in part on an adversarial model.

Example 267. The apparatus of any one of examples 262 to 266, the memory further storing instructions that when executed by the circuitry, cause the circuitry to: receive training data for an inference model, the training data comprising indications of a plurality of inputs and a plurality of adversarial inputs, the training data further comprising indications of an expected output for each of the plurality of inputs and the plurality of adversarial inputs; and train the inference model based in part on the training data.

Example 268. The apparatus of any one of example 261 or any one of examples 263 to 266, the memory further storing instructions that when executed by the circuitry, cause the circuitry to: receive a training data set with a plurality of samples; generate classification data for two or more inference models based on a sample in the training data set; determine whether the classification data generated for each of the two or more inference models matches; add the sample in the training data set to uncorrelated output data when the classification data generated for each of the two or more inference models fails to match; and add the sample in the training data set to correlated output data when the classification data generated for each of the two or more inference models matches.

Example 269. The apparatus of any one of examples 261 to 262 or any one of examples 264 to 266, the memory further storing instructions that when executed by the circuitry, cause the circuitry to: determine input device characteristics for an input device; select an untrained inference model based on the input device characteristics; and train the untrained inference model selected based on the input device characteristics with input data from the input device.

Example 270. The apparatus of any one of examples 261 to 263 or any one of examples 265 to 266, the memory further storing instructions that when executed by the circuitry, cause the circuitry to: receive input data; transcode the input data; generate a training data set integrity state (TSIS) value based on the transcoded input data; and provide the TSIS value as output to enable verification that an inference model is trained based on the input data.

Example 271. The apparatus of any one of examples 261 to 264 or example 266, the memory further storing instructions that when executed by the circuitry, cause the circuitry to: detect at least one error in a training data set utilized to train an inference model; receive recovery training data; and train the inference model with the recovery training data.

Example 272. The apparatus of any one of examples 261 to 265, the memory further storing instructions that when executed by the circuitry, cause the circuitry to: split an inference model into at least a public model partition and a private model partition; and train the public model partition based in part on an adversarial model.

Example 273. The apparatus of any one of examples 261 to 272, each of the plurality of expected outputs corresponding to a one of plurality of classes.

Example 274. The apparatus of any one of examples 261 to 273, the memory storing instructions, which when executed by the circuitry cause the circuitry to utilize the correlated output data set to train a trusted inference model.

Example 275. The apparatus of any one of examples 261 to 274, the memory storing instructions, which when executed by the circuitry cause the circuitry to utilize the uncorrelated output data in one or more training flows.

Example 276. The apparatus of any one of examples 261 to 275, the one or more training flows comprising a resiliency training flow or an adversarial training flow.

Example 277. The apparatus of any one of examples 261 to 276, the memory storing instructions, which when executed by the circuitry cause the circuitry to: determine a remaining sample in the training data set that has not been added to one of the uncorrelated output data or the correlated output data; generate additional classification data for two or more inference models based on the remaining sample in the training data set; determine whether the additional classification data generated for each of the two or more inference models matches; add the remaining sample in the training data set to uncorrelated output data when the additional classification data generated for each of the two or more inference models fails to match; and add the remaining sample in the training data set to correlated output data when the additional classification data generated for each of the two or more inference models matches.

Example 278. The apparatus of any one of examples 261 to 277, wherein the two or more inference models include two or more of a feed-forward neural network (FFNN), a recurrent neural network (RNN), a convolutional neural network (CNN), a long/short term memory (LSTM) network, a deep neural network (DNN), a Bayesian belief network, and a Boltzmann machine.

Example 279. The apparatus of any one of examples 261 to 278, the memory storing instructions, which when executed by the circuitry cause the circuitry to receive the input data and the input device characteristics from the input device.

Example 280. The apparatus of any one of examples 261 to 279, the memory storing instructions, which when executed by the circuitry cause the circuitry to request the input device characteristics from the input device.

Example 281. The apparatus of any one of examples 261 to 280, wherein the untrained inference models includes one or more of a feed-forward neural network (FFNN), a recurrent neural network (RNN), a convolutional neural network (CNN), a long/short term memory (LSTM) network, a Bayesian belief network, and a Boltzmann machine.

Example 282. The apparatus of any one of examples 261 to 281, the memory storing instructions, which when executed by the circuitry cause the circuitry to: train the inference model based on the input data; and provide the inference model in the output.

Example 283. The apparatus of any one of examples 261 to 282, the memory storing instructions, which when executed by the circuitry cause the circuitry to: generate an inference model integrity state (IMIS) value based on the inference model; and provide the IMIS value in the output.

Example 284. The apparatus of any one of examples 261 to 283, wherein the TSIS value, the IMIS value, and the inference model are provided in the output as a tuple.

Example 285. The apparatus of any one of examples 261 to 284, the memory storing instructions, which when executed by the circuitry cause the circuitry to transform the input data into a mathematical representation to transcode the input data.

Example 286. The apparatus of any one of examples 261 to 285, the memory storing instructions, which when executed by the circuitry cause the circuitry to generate the TSIS value with a cryptographic function.

Example 287. The apparatus of any one of examples 261 to 286, the memory storing instructions, which when executed by the circuitry cause the circuitry to: receive the training data set; and train the inference mode with the training data set.

Example 288. The apparatus of any one of examples 261 to 287, the recovery training data comprising indications of a plurality of inputs and for each of the plurality of inputs a corresponding output.

Example 289. The apparatus of any one of examples 261 to 288, wherein the plurality of outputs corresponds to at least one wildcard class arranged to classify inputs associated with the at least one error into the at least one wildcard class.

Example 290. The apparatus of any one of examples 261 to 289, the memory storing instructions, which when executed by the circuitry cause the circuitry to: add a layer $L_1$ and $L_2$ of the inference model to the private model partition; and remove the layer $L_1$ and $L_2$ of the inference model from the public model partition.

Example 291. The apparatus of any one of examples 261 to 290, the memory storing instructions, which when executed by the circuitry cause the circuitry to: evaluate a performance cost for the private model partition, the performance cost based in part on executing the private model partition in a trusted execution environment; determine whether a performance budget is exceeded by the performance cost; and add a layer $L_3$ of the inference model to the private model partition and remove the layer $L_3$ of the inference model from the public model partition based on a determination that the performance budget is not exceeded by the performance cost.

Example 292. The apparatus of any one of examples 261 to 291, the memory storing instructions, which when executed by the circuitry cause the circuitry to remove the layer $L_2$ of the inference model from to the private model partition and add the layer $L_2$ of the inference model to the public model partition based on a determination that the performance budget is exceeded by the performance cost.

Example 293. A non-transitory computer-readable storage medium comprising instructions that when executed by a computing device, cause the computing device to: receive training data for an inference model, the training data comprising indications of a plurality of inputs and a plurality of adversarial inputs, the training data further comprising indications of an expected output for each of the plurality of inputs and the plurality of adversarial inputs; and train the inference model based in part on the training data.

Example 294. A non-transitory computer-readable storage medium comprising instructions that when executed by circuitry, cause the circuitry to: receive a training data set with a plurality of samples; generate classification data for two or more inference models based on a sample in the training data set; determine whether the classification data generated for each of the two or more inference models matches; add the sample in the training data set to uncorrelated output data when the classification data generated for each of the two or more inference models fails to match; and add the sample in the training data set to correlated output data when the classification data generated for each of the two or more inference models matches.

Example 295. A non-transitory computer-readable storage medium comprising instructions that when executed by circuitry, cause the circuitry to: determine input device characteristics for an input device; select an untrained inference model based on the input device characteristics; and train the untrained inference model selected based on the input device characteristics with input data from the input device.

Example 296. A non-transitory computer-readable storage medium comprising instructions that when executed by circuitry, cause the circuitry to: receive input data; transcode the input data; generate a training data set integrity state (TSIS) value based on the transcoded input data; and provide the TSIS value as output to enable verification that an inference model is trained based on the input data.

Example 297. A non-transitory computer-readable storage medium comprising instructions that when executed by circuitry, cause the circuitry to: detect at least one error in a training data set utilized to train an inference model; receive recovery training data; and train the inference model with the recovery training data.

Example 298. A non-transitory computer-readable storage medium comprising instructions that when executed by circuitry, cause the circuitry to: split an inference model input at least a public model partition and a private model partition; and train the public model partition based in part on an adversarial model.

Example 299. The non-transitory computer-readable storage medium of any one of examples 294 to 298, further storing instructions, which when executed by the circuitry cause the circuitry to: receive training data for an inference model, the training data comprising indications of a plurality of inputs and a plurality of adversarial inputs, the training data further comprising indications of an expected output for each of the plurality of inputs and the plurality of adversarial inputs; and train the inference model based in part on the training data.

Example 300. The non-transitory computer-readable storage medium of example 293 of any one of examples 295 to 298, further storing instructions, which when executed by the circuitry cause the circuitry to: receive a training data set with a plurality of samples; generate classification data for two or more inference models based on a sample in the training data set; determine whether the classification data generated for each of the two or more inference models matches; add the sample in the training data set to uncorrelated output data when the classification data generated for each of the two or more inference models fails to match; and add the sample in the training data set to correlated output data when the classification data generated for each of the two or more inference models matches.

Example 301. The non-transitory computer-readable storage medium of any one of examples 293 to 294 or any one of examples 296 to 297, further storing instructions, which when executed by the circuitry cause the circuitry to: determine input device characteristics for an input device; select an untrained inference model based on the input device characteristics; and train the untrained inference model selected based on the input device characteristics with input data from the input device.

Example 302. The non-transitory computer-readable storage medium of any one of examples 293 to 295 or any one of examples 297 to 298, further storing instructions, which when executed by the circuitry cause the circuitry to: receive input data; transcode the input data; generate a training data set integrity state (TSIS) value based on the transcoded input data; and provide the TSIS value as output to enable verification that an inference model is trained based on the input data.

Example 303. The non-transitory computer-readable storage medium of any one of examples 293 to 295 or example 298, further storing instructions, which when executed by the circuitry cause the circuitry to: detect at least one error in a training data set utilized to train an inference model; receive recovery training data; and train the inference model with the recovery training data.

Example 304. The non-transitory computer-readable storage medium of any one of examples 293 to 297, further storing instructions, which when executed by the circuitry cause the circuitry to: split an inference model input at least a public model partition and a private model partition; and train the public model partition based in part on an adversarial model.

Example 305. The non-transitory computer-readable storage medium of any one of examples 293 to 304, each of the plurality of expected outputs corresponding to a one of plurality of classes.

Example 306. The non-transitory computer-readable storage medium of any one of examples 293 to 305, storing instructions, which when executed by the circuitry cause the circuitry to utilize the correlated output data set to train a trusted inference model.

Example 307. The non-transitory computer-readable storage medium of any one of examples 293 to 306, storing instructions, which when executed by the circuitry cause the circuitry to utilize the uncorrelated output data in one or more training flows.

Example 308. The non-transitory computer-readable storage medium of any one of examples 293 to 307, the one or more training flows comprising a resiliency training flow or an adversarial training flow.

Example 309. The non-transitory computer-readable storage medium of any one of examples 293 to 308, storing instructions, which when executed by the circuitry cause the circuitry to: determine a remaining sample in the training data set that has not been added to one of the uncorrelated output data or the correlated output data; generate additional classification data for two or more inference models based on the remaining sample in the training data set; determine whether the additional classification data generated for each of the two or more inference models matches; add the remaining sample in the training data set to uncorrelated output data when the additional classification data generated for each of the two or more inference models fails to match; and add the remaining sample in the training data set to correlated output data when the additional classification data generated for each of the two or more inference models matches.

Example 310. The non-transitory computer-readable storage medium of any one of examples 293 to 309, wherein the two or more inference models include two or more of a feed-forward neural network (FFNN), a recurrent neural network (RNN), a convolutional neural network (CNN), a long/short term memory (LSTM) network, a deep neural network (DNN), a Bayesian belief network, and a Boltzmann machine.

Example 311. The non-transitory computer-readable storage medium of any one of examples 293 to 310, storing instructions, which when executed by the circuitry cause the circuitry to receive the input data and the input device characteristics from the input device.

Example 312. The non-transitory computer-readable storage medium of any one of examples 293 to 311, storing instructions, which when executed by the circuitry cause the circuitry to request the input device characteristics from the input device.

Example 313. The non-transitory computer-readable storage medium of any one of examples 293 to 312, wherein the untrained inference models includes one or more of a feed-forward neural network (FFNN), a recurrent neural network (RNN), a convolutional neural network (CNN), a long/short term memory (LSTM) network, a Bayesian belief network, and a Boltzmann machine.

Example 314. The non-transitory computer-readable storage medium of any one of examples 293 to 313, the instructions, when executed by the circuitry cause the circuitry to: train the inference model based on the input data; and provide the inference model in the output.

Example 315. The non-transitory computer-readable storage medium of any one of examples 293 to 314, the instructions, which when executed by the circuitry cause the circuitry to: generate an inference model integrity state (IMIS) value based on the inference model; and provide the IMIS value in the output.

Example 316. The non-transitory computer-readable storage medium of any one of examples 293 to 315, wherein the TSIS value, the IMIS value, and the inference model are provided in the output as a tuple.

Example 317. The non-transitory computer-readable storage medium of any one of examples 293 to 316, the instructions, which when executed by the circuitry cause the circuitry to transform the input data into a mathematical representation to transcode the input data.

Example 318. The non-transitory computer-readable storage medium of any one of examples 293 to 317, the instructions, which when executed by the circuitry cause the circuitry to generate the TSIS value with a cryptographic function.

Example 319. The non-transitory computer-readable storage medium of any one of examples 293 to 318, the instructions, which when executed by the circuitry cause the circuitry to: receive the training data set; and train the inference mode with the training data set.

Example 320. The non-transitory computer-readable storage medium of any one of examples 293 to 319, the recovery training data comprising indications of a plurality of inputs and for each of the plurality of inputs a corresponding output.

Example 321. The non-transitory computer-readable storage medium of any one of examples 293 to 320, wherein the plurality of outputs corresponds to at least one wildcard class arranged to classify inputs associated with the at least one error into the at least one wildcard class.

Example 322. The non-transitory computer-readable storage medium of any one of examples 293 to 321, the instructions, which when executed by the circuitry cause the circuitry to: add a layer $L_1$ and $L_2$ of the inference model to the private model partition; and remove the layer $L_1$ and $L_2$ of the inference model from the public model partition.

Example 323. The non-transitory computer-readable storage medium of any one of examples 293 to 322, the instructions, which when executed by the circuitry cause the circuitry to: evaluate a performance cost for the private model partition, the performance cost based in part on executing the private model partition in a trusted execution environment; determine whether a performance budget is exceeded by the performance cost; and add a layer $L_3$ of the inference model to the private model partition and remove the layer $L_3$ of the inference model from the public model partition based on a determination that the performance budget is not exceeded by the performance cost.

Example 324. The non-transitory computer-readable storage medium of any one of examples 293 to 323, the instructions, which when executed by the circuitry cause the circuitry to remove the layer $L_2$ of the inference model from to the private model partition and add the layer $L_2$ of the inference model to the public model partition based on a determination that the performance budget is exceeded by the performance cost.

Example 325. A computer-implemented method, comprising: receiving training data for an inference model, the training data comprising indications of a plurality of inputs and a plurality of adversarial inputs, the training data further comprising indications of an expected output for each of the plurality of inputs and the plurality of adversarial inputs; and training the inference model based in part on the training data.

Example 326. A computer-implemented method, comprising: receiving a training data set with a plurality of samples; generating classification data for two or more inference models based on a sample in the training data set; determining whether the classification data generated for each of the two or more inference models matches; adding the sample in the training data set to uncorrelated output data when the classification data generated for each of the two or more inference models fails to match; and adding the sample in the training data set to correlated output data when the classification data generated for each of the two or more inference models matches.

Example 327. A computer-implemented method, comprising: determining input device characteristics for an input device; selecting an untrained inference model based on the input device characteristics; and training the untrained inference model selected based on the input device characteristics with input data from the input device.

Example 328. A computer-implemented method, comprising: receiving input data; transcoding the input data; generating a training data set integrity state (TSIS) value based on the transcoded input data; and providing the TSIS value as output to enable verification that an inference model is trained based on the input data.

Example 329. A computer-implemented method, comprising: detecting at least one error in a training data set utilized to train an inference model; receiving recovery training data; and training the inference model with the recovery training data.

Example 330. A computer-implemented method, comprising: splitting an inference model input at least a public model partition and a private model partition; and training the public model partition based in part on an adversarial model.

Example 331. The computer-implemented method of any one of examples 326 to 330, comprising: receiving training data for an inference model, the training data comprising indications of a plurality of inputs and a plurality of adversarial inputs, the training data further comprising indications of an expected output for each of the plurality of inputs and the plurality of adversarial inputs; and training the inference model based in part on the training data.

Example 332. The computer-implemented method of example 325 or any one of examples 327 to 330, comprising: receiving a training data set with a plurality of samples; generating classification data for two or more inference models based on a sample in the training data set; determining whether the classification data generated for each of the two or more inference models matches; adding the sample in the training data set to uncorrelated output data when the classification data generated for each of the two or more inference models fails to match; and adding the sample in the training data set to correlated output data when the classification data generated for each of the two or more inference models matches.

Example 333. The computer-implemented method of any one of examples 325 to 326 or any one of examples 328 to 330, comprising: determining input device characteristics for an input device; selecting an untrained inference model based on the input device characteristics; and training the untrained inference model selected based on the input device characteristics with input data from the input device.

Example 334. The computer-implemented method of any one of examples 325 to 327 or any one of examples 329 to 330, comprising: receiving input data; transcoding the input data; generating a training data set integrity state (TSIS) value based on the transcoded input data; and providing the TSIS value as output to enable verification that an inference model is trained based on the input data.

Example 335. The computer-implemented method of any one of examples 325 to 328 or example 330, comprising: detecting at least one error in a training data set utilized to train an inference model; receiving recovery training data; and training the inference model with the recovery training data.

Example 336. The computer-implemented method of any one of examples 325 to 329, comprising: splitting an inference model input at least a public model partition and a private model partition; and training the public model partition based in part on an adversarial model.

Example 337. The computer-implemented method of any one of examples 325 to 336, each of the plurality of expected outputs corresponding to a one of plurality of classes.

Example 338. The computer-implemented method of any one of examples 325 to 337, comprising utilizing the correlated output data set to train a trusted inference model.

Example 339. The computer-implemented method of any one of examples 325 to 338, comprising utilizing the uncorrelated output data in one or more training flows.

Example 340. The computer-implemented method of any one of examples 325 to 339, the one or more training flows comprising a resiliency training flow or an adversarial training flow.

Example 341. The computer-implemented method of any one of examples 325 to 340, comprising: determining a remaining sample in the training data set that has not been added to one of the uncorrelated output data or the correlated output data; generating additional classification data for two or more inference models based on the remaining sample in the training data set; determining whether the additional classification data generated for each of the two or more inference models matches; adding the remaining sample in the training data set to uncorrelated output data when the additional classification data generated for each of the two or more inference models fails to match; and adding the remaining sample in the training data set to correlated output data when the additional classification data generated for each of the two or more inference models matches.

Example 342. The computer-implemented method of any one of examples 325 to 341, wherein the two or more inference models include two or more of a feed-forward neural network (FFNN), a recurrent neural network (RNN), a convolutional neural network (CNN), a long/short term memory (LSTM) network, a deep neural network (DNN), a Bayesian belief network, and a Boltzmann machine.

Example 343. The computer-implemented method of any one of examples 325 to 342, comprising receiving the input data and the input device characteristics from the input device.

Example 344. The computer-implemented method of any one of examples 325 to 343, comprising requesting the input device characteristics from the input device.

Example 345. The computer-implemented method of any one of examples 325 to 344, wherein the untrained inference models includes one or more of a feed-forward neural network (FFNN), a recurrent neural network (RNN), a convolutional neural network (CNN), a long/short term memory (LSTM) network, a Bayesian belief network, and a Boltzmann machine.

Example 346. The computer-implemented method of any one of examples 325 to 345, comprising: training the inference model based on the input data; and providing the inference model in the output.

Example 347. The computer-implemented method of any one of examples 325 to 346, comprising: generating an inference model integrity state (IMIS) value based on the inference model; and providing the IMIS value in the output.

Example 348. The computer-implemented method of any one of examples 325 to 347, wherein the TSIS value, the IMIS value, and the inference model are provided in the output as a tuple.

Example 349. The computer-implemented method of any one of examples 325 to 348, comprising transforming the input data into a mathematical representation to transcode the input data.

Example 350. The computer-implemented method of any one of examples 325 to 349, comprising generating the TSIS value with a cryptographic function.

Example 351. The computer-implemented method of any one of examples 325 to 350, comprising: receiving the training data set; and training the inference mode with the training data set.

Example 352. The computer-implemented method of any one of examples 325 to 351, the recovery training data comprising indications of a plurality of inputs and for each of the plurality of inputs a corresponding output.

Example 353. The computer-implemented method of any one of examples 325 to 352, wherein the plurality of outputs corresponds to at least one wildcard class arranged to classify inputs associated with the at least one error into the at least one wildcard class.

Example 354. The computer-implemented method of any one of examples 325 to 353, comprising: adding a layer $L_1$ and $L_2$ of the inference model to the private model partition; and removing the layer $L_1$ and $L_2$ of the inference model from the public model partition.

Example 355. The computer-implemented method of any one of examples 325 to 354, comprising: evaluate a performance cost for the private model partition, the performance cost based in part on executing the private model partition in a trusted execution environment; determining whether a performance budget is exceeded by the performance cost; and adding a layer $L_3$ of the inference model to the private model partition and remove the layer $L_3$ of the inference model from the public model partition based on a determination that the performance budget is not exceeded by the performance cost.

Example 356. The computer-implemented method of any one of examples 325 to 355, comprising removing the layer $L_2$ of the inference model from to the private model partition and add the layer $L_2$ of the inference model to the public model partition based on a determination that the performance budget is exceeded by the performance cost.

Example 357. An apparatus, comprising means arranged to implement the function of any one of examples 175 to 260 or any one of examples 325 to 356.

What is claimed is:

1. An apparatus, comprising:
   circuitry; and
   memory coupled to the circuitry, the memory storing instructions, which when executed by the circuitry cause the circuitry to:
   receive input data from an input device;
   generate output data based in part on executing an inference model with the input data, the output data comprising an indication of a visible class of a plurality of visible classes or an indication of a hidden class of a plurality of hidden classes, wherein the visible class is a type of category the inference model is trained to classify when the input data is expected input data and the hidden class is a type of category the inference model is trained to classify when the input data is adversarial input data designed to cause the inference model to misclassify the adversarial input data into the visible class;
   determine whether the output data comprises an indication of the hidden class from the plurality of hidden classes, wherein at least one of the plurality of hidden classes corresponds to blacklisted inputs;
   provide the generated output to an output consumer based on a determination that the output data does not comprise an indication of the hidden class; and
   provide obfuscated output to the output consumer based on a determination that the output data does comprise an indication of the hidden class, the obfuscated output comprising an indication of a visible class associated with the hidden class instead of the hidden class.

2. The apparatus of claim 1, the memory further storing instructions, which when executed by the circuitry cause the circuitry to send an alert to a monitoring system based on a determination that the output data comprises an indication of the hidden class.

3. The apparatus of claim 2, the memory further storing instructions, which when executed by the circuitry cause the circuitry to:
   generate, responsive to the determination that the output data comprises an indication of the hidden class, the obfuscated output.

4. The apparatus of claim 3, the memory further storing instructions, which when executed by the circuitry cause the circuitry to:
   collect, responsive to the determination that the output data comprises an indication of the hidden class, forensic data, the forensic data comprising an indication of at least one of the input data and the input device; and
   provide, responsive to the determination that the output data comprises an indication of the hidden class, the forensic data to the monitoring system.

5. The apparatus of claim 1, the memory further storing instructions, which when executed by the circuitry cause the circuitry to:
   identify, responsive to the determination that the output data comprises an indication of the hidden class, a one of the plurality of visible classes associated with the one of the plurality of hidden classes indicated by the output data; and
   generate the obfuscated output to include an indication of the identified one of the plurality of visible classes.

6. The apparatus of claim 1, comprising a trusted execution environment (TEE), the TEE comprising the circuitry and the memory.

7. A non-transitory computer-readable storage medium comprising instructions that when executed by circuitry, cause the circuitry to:
   receive input data from an input device;
   generate output data based in part on executing an inference model with the input data, the output data comprising an indication of a visible class of a plurality of visible classes or an indication of a hidden class of a plurality of hidden classes, wherein the visible class is a type of category the inference model is trained to classify when the input data is expected input data and the hidden class is a type of category the inference model is trained to classify when the input data is adversarial input data designed to cause the inference model to misclassify the adversarial input data into the visible class;
   determine whether the output data comprises an indication of the hidden class from the plurality of hidden classes, wherein at least one of the plurality of hidden classes corresponds to blacklisted inputs;
   provide the generated output to an output consumer based on a determination that the output data does not comprise an indication of the hidden class; and
   provide obfuscated output to the output consumer based on a determination that the output data does comprise an indication of the hidden class, the obfuscated output comprising an indication of a visible class associated with the hidden class instead of the hidden class.

8. The non-transitory computer-readable storage medium of claim 7, the memory further storing instructions, which when executed by the circuitry cause the circuitry to send an alert to a monitoring system based on a determination that the output data comprises an indication of the hidden class.

9. The non-transitory computer-readable storage medium of claim 8, further storing instructions, which when executed by the circuitry cause the circuitry to:
generate, responsive to the determination that the output data comprises an indication of the hidden class, the obfuscated output.

10. The non-transitory computer-readable storage medium of claim 9, further storing instructions, which when executed by the circuitry cause the circuitry to:
collect, responsive to the determination that the output data comprises an indication of the hidden class, forensic data, the forensic data comprising an indication of at least one of the input data and the input device; and
provide, responsive to the determination that the output data comprises an indication of the hidden class, the forensic data to the monitoring system.

11. The non-transitory computer-readable storage medium of claim 7, further storing instructions, which when executed by the circuitry cause the circuitry to:
identify, responsive to the determination that the output data comprises an indication of the hidden class, a one of the plurality of visible classes associated with the one of the plurality of hidden classes indicated by the output data; and
generate the obfuscated output to include an indication of the identified one of the plurality of visible classes.

12. The non-transitory computer-readable storage medium of claim 7, wherein the circuitry is part of a trusted execution environment (TEE).

13. A computer-implemented method, comprising:
receiving input data from an input device;
generating output data based in part on executing an inference model with the input data, the output data comprising an indication of a visible class of a plurality of visible classes or an indication of a hidden class of a plurality of hidden classes, wherein the visible class is a type of category the inference model is trained to classify when the input data is expected input data and the hidden class is a type of category the inference model is trained to classify when the input data is adversarial input data designed to cause the inference model to misclassify the adversarial input data into the visible class;
determine whether the output data comprises an indication of the hidden class from the plurality of hidden classes, wherein at least one of the plurality of hidden classes corresponds to blacklisted inputs
provide the generated output to an output consumer based on a determination that the output data does not comprise an indication of the hidden class; and
provide obfuscated output to the output consumer based on a determination that the output data does comprise an indication of the hidden class, the obfuscated output comprising an indication of a visible class associated with the hidden class instead of the hidden class.

14. The computer-implemented method of claim 13, comprising sending an alert to a monitoring system based on a determination that the output data comprises an indication of the hidden class.

15. The computer-implemented method of claim 14, comprising:
generate, responsive to the determination that the output data comprises an indication of the hidden class, the obfuscated output.

16. The computer-implemented method of claim 15, comprising:
collecting, responsive to the determination that the output data comprises an indication of the hidden class, forensic data, the forensic data comprising an indication of at least one of the input data and the input device; and
providing, responsive to the determination that the output data comprises an indication of the hidden class, the forensic data to the monitoring system.

17. The computer-implemented method of claim 13, comprising:
identifying, responsive to the determination that the output data comprises an indication of the hidden class, a one of the plurality of visible classes associated with the one of the plurality of hidden classes indicated by the output data; and
generating the obfuscated output to include an indication of the identified one of the plurality of visible classes.

* * * * *